(12) United States Patent
Bilgic

(10) Patent No.: US 6,256,492 B1
(45) Date of Patent: Jul. 3, 2001

(54) COMMUNICATION CONTROL FOR A USER OF A CENTRAL COMMUNICATION CENTER

(75) Inventor: Izzet M. Bilgic, Colorado Springs, CO (US)

(73) Assignee: Omnipoint Corporation, Bethesda, MD (US)

( * ) Notice: Subject to any disclaimer, the term of this patent is extended or adjusted under 35 U.S.C. 154(b) by 0 days.

(21) Appl. No.: 09/354,926

(22) Filed: Jul. 15, 1999

Related U.S. Application Data

(63) Continuation of application No. 08/823,234, filed on Mar. 20, 1997.

(51) Int. Cl.[7] .................................................. H04Q 7/20
(52) U.S. Cl. ............................................ 455/418; 455/435
(58) Field of Search .................................. 455/418, 419, 455/433, 435, 426, 414, 434, 461, 450; 370/328, 329, 331, 332, 333, 346; 379/114, 67.1, 116, 246

(56) References Cited

U.S. PATENT DOCUMENTS

| | | | | |
|---|---|---|---|---|
| 4,893,335 | * | 1/1990 | Fuller et al. | 379/200 |
| 4,924,457 | * | 5/1990 | Shimizu | 370/346 |
| 5,440,560 | * | 8/1995 | Rypinski | 370/457 |
| 5,446,739 | * | 8/1995 | Nakano et al. | 370/337 |
| 5,461,390 | * | 10/1995 | Hoshen | 342/419 |
| 5,461,627 | * | 10/1995 | Rypinski | 370/346 |
| 5,504,803 | * | 4/1996 | Yamada et al. | 455/426 |
| 5,509,052 | * | 4/1996 | Chia et al. | 455/465 |
| 5,548,583 | * | 8/1996 | Bustamante | 370/335 |
| 5,559,804 | * | 9/1996 | Amada et al. | 370/347 |
| 5,627,882 | * | 5/1997 | Chien et al. | 455/464 |
| 5,659,596 | * | 8/1997 | Dunn | 455/456 |
| 5,671,219 | * | 9/1997 | Jensen et al. | 370/280 |
| 5,677,909 | * | 10/1997 | Heide | 370/347 |
| 5,734,977 | * | 3/1998 | Sanmugam | 455/410 |
| 5,737,330 | * | 4/1998 | Fulthorp et al. | 370/346 |
| 5,740,535 | * | 4/1998 | Rune | 455/437 |
| 5,758,278 | * | 5/1998 | Lansdowne | 455/343 |
| 5,819,184 | * | 10/1998 | Cashman | 455/553 |
| 5,842,127 | * | 11/1998 | Pashtan et al. | 455/435 |
| 5,842,141 | * | 11/1998 | Vaihoja et al. | 455/574 |
| 5,862,482 | * | 1/1999 | Beesley | 455/434 |
| 5,892,794 | * | 4/1999 | Slegers | 375/219 |
| 5,953,652 | * | 9/1999 | Amin et al. | 455/410 |
| 5,978,366 | * | 11/1999 | Massingill et al. | 370/337 |
| 6,014,376 | * | 1/2000 | Abreu et al. | 370/350 |

* cited by examiner

*Primary Examiner*—Dwayne Bost
*Assistant Examiner*—Jean A Gelin
(74) *Attorney, Agent, or Firm*—Lyon & Lyon LLP

(57) ABSTRACT

A computer program for a user in a wireless communication system to communicate on the system. The communication protocol embodied in the computer program enables the user to acquire a channel on a base station in the system and register with a base station on the system. The communication protocol embodied in the computer program also enables the user to place and receive calls on the communication system. The computer program is comprised of a main controller task and various other tasks, also called subtasks, which are activated by the main controller task. These subtasks are each designed to perform a protocol function for the user on the communication system.

28 Claims, 88 Drawing Sheets

COMMUNICATION CONTROL FOR A USER OF A CENTRAL COMMUNICATION CENTER

This is a continuation of co-pending application Ser. No. 08/823,234 filed Mar. 20, 1997.

BACKGROUND OF THE INVENTION

1) Field of the Invention

The field of this invention pertains to communications and, more particularly, to a method for transferring information within a mobile communication system.

2) Description of the Related Art

Digital communication systems have become increasingly popular for many applications. One class of digital communication systems provides wireless data communication connections for stationary or mobile (e.g., handset) end users. Examples of such wireless mobile communication systems include public safety radio systems, cellular telephone systems, and personal communication systems (PCS). A wireless communication system may include a number of base stations for completing communication paths with the end users, or, as more generally denoted herein, mobile stations. The base stations may be connected to a network, either directly or via a switch.

In operation, signaling information is passed among various components of a communication system. Signaling information can comprise control messages relating to the operation of the communication system. An example of signaling information is a message from a mobile station to a base station indicating that the mobile station wishes to acquire a channel on the base station for use as a communication link within the communications system.

New features and functionalities are being added to wireless communication systems at an alarming rate. One of the problems associated with the addition of these new features and functionalities is the need to continuously modify the computer programs which handle the signals for utilizing these features and functionalities. It is time consuming and cumbersome to have to modify and recompile the entirety of a computer program that handles the transfer of messages and signals when only one function of the software is actually impacted by the new functionality.

It would therefore be advantageous to have a wireless communication system software program that facilitates the addition of new functionalities.

It would be advantageous to provide a mobile communication system with an improved communication protocol for handling communications by various mobile stations.

SUMMARY OF THE INVENTION

The present invention provides a computer program for use in a mobile station in a wireless communication system. The mobile station computer program is comprised of a main task and a plurality of independent other tasks, also referred to as subtasks. The main task activates each of the subtasks to perform a discrete communication function in the wireless communication system. In operation, only the main task and one subtask of the mobile station computer program are activated at any given time.

In the mobile station computer program, at least some of the subtasks are capable of notifying the physical layer of the mobile station that there is information to be transmitted from the mobile station. Also in the mobile station computer program, at least some of the subtasks are capable of being notified by the mobile station's physical layer that information has been received by the mobile station.

The mobile station computer program is designed so that each of the subtasks of the computer program may be modified to alter the functionality of the program without the need to modify any other subtask of the program.

BRIEF DESCRIPTION OF THE DRAWINGS

The various objects, features and advantages of the present invention may be better understood by examining the Detailed Description of the Preferred Embodiments found below, together with the appended figures, wherein.

DESCRIPTION OF THE PREFERRED EMBODIMENTS

Figure 1A:
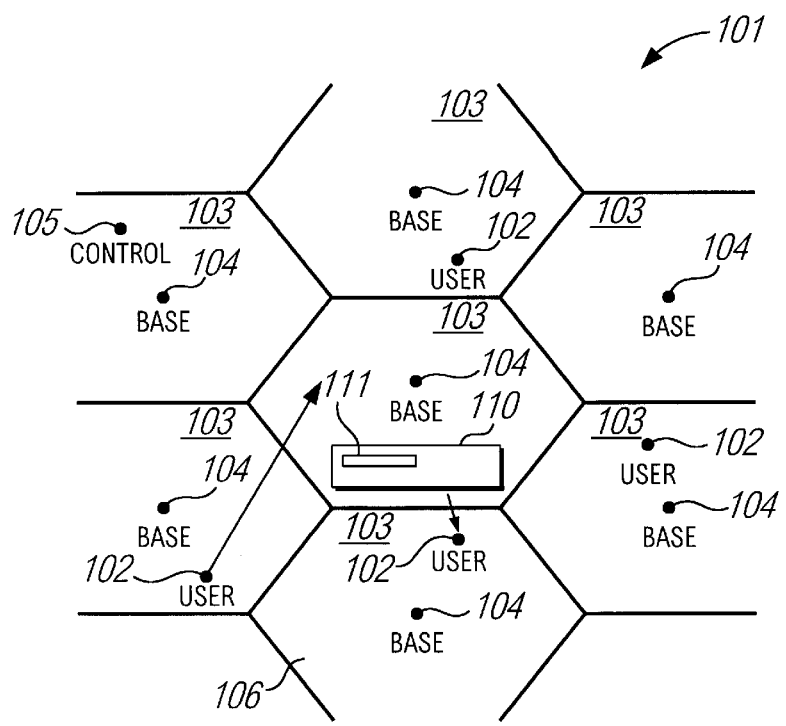
FIG. 1A is a diagram of a pattern of cells in a wireless communication system.

FIG. 1A is a diagram of a pattern of cells in a wireless communication system 101 for communication among a plurality of users, in this case, mobile stations 102. The wireless communication system 101 of FIG. 1A includes a plurality of cells 103, each with a base station 104, the base station typically located at the center of the cell 103. Each mobile station 102 and each base station 104 generally comprise both a receiver and a transmitter.

In a preferred embodiment, a base station controller 105 manages the resources of the communication system 101. In a preferred embodiment, the base station controller 105 is comprised of a switch and a mobility control platform. The base station controller 105 may assign the base station 104 transmitter and mobile station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum."

Figure 1B:
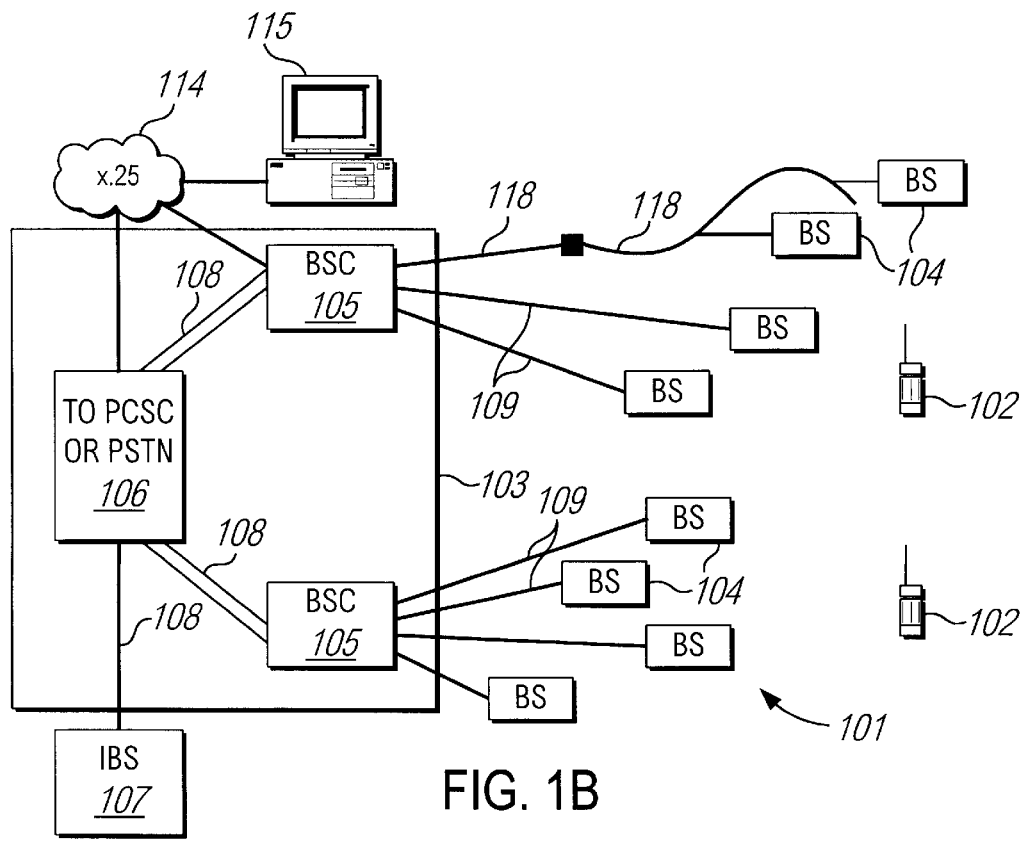
FIG. 1B is a block diagram of a communication system.

FIG. 1B is a block diagram of a communication system architecture utilized in a preferred embodiment of the present invention. The FIG. 1B communication system 101 comprises a plurality of base stations 104 for communicating with a plurality of mobile stations 102. The base stations and the mobile stations may operate in a personal communications system (PCS), such as may be authorized under rules prescribed by the Federal Communications Commission (FCC).

Each base station 104 may be coupled to a base station controller 105 by any of a variety of communication paths 109. The communication paths 109 may each comprise one or more communication links 118. Each communication link 118 may include a coaxial cable, a fiber optic cable, a digital radio link, or a telephone line.

Each base station controller 105 may also be connected to one or more networks 106, such as a public switched telephone network (PSTN) or a personal communication system switching center (PCSC). Each base station controller 105 is connected to a network 106 by means of one or more communication paths 108, each of which may include a coaxial cable, a fiber optic cable, a digital radio link, or a telephone line.

The FIG. 1B communication system 101 may also include one or more "intelligent" base stations 107 which connect directly to a network 106, without interfacing through a base station controller 105. The intelligent base station 107, therefore, incorporates the functions of the base station controller 105 for communicating with the network 106.

The base station controllers 105 and the network 106 collectively comprise a system controller 103. In operation, each base station 104 formats and transmits digital information to its respective base station controller 105, or directly to the network 106 in the case of an intelligent base station 107, and thus, to the system controller 103, on what is generally referred to herein as the backhaul interface.

Figure 2:
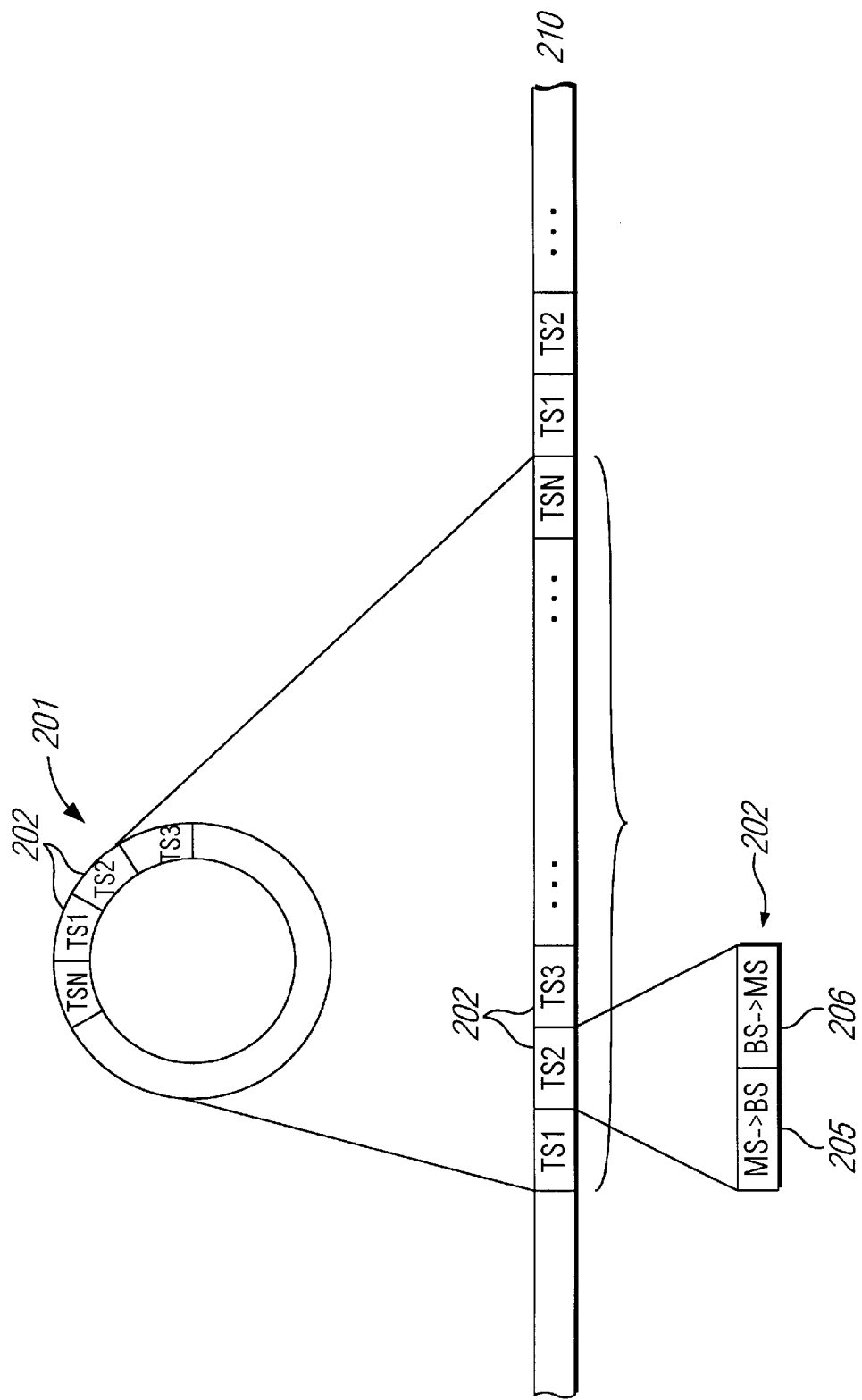
FIG. 2 is a diagram of a time frame divided into a plurality of time slots.

FIG. 2 is a diagram showing a timing structure for a particular TDMA system. According to the timing structure of FIG. 2, communication over time is broken into a continuous series of time frames 201. A single complete time frame 201 is shown along a time line 210 in FIG. 2. Similar time frames are assumed to precede and follow time frame 201 in a continuous pattern along time line 210.

Utilizing a Time Division Duplex (TDD) mode, each time frame 201 is divided into a plurality of time slots 202, numbered consecutively TS1, TS2, ... TSN, each of which may support duplex communication with a mobile station 102. Time frame 201 may be thought of as a "polling loop" or a time loop, as depicted in FIG. 2, whereby mobile stations 102 are communicated with sequentially over the time frame 201 in a manner analogous to polling, each mobile station transmitting and receiving messages in a designated time slot 202.

In the FIG. 2 embodiment, each time slot 202 comprises a user portion 205, wherein a mobile station 102 transmits a mobile station-to-base station message to a base station 104, and a base portion 206, wherein a base station 104 transmits a base station-to-mobile station message. In a preferred embodiment, the first half of the TDMA/TDD time slot is allocated for the mobile station 102 transmit function and the second half of the TDMA/TDD time slot is allocated for the base station 104 transmit function (to the mobile stations 102).

A time slot 202, or time slots, over time frames 201 define a transmission channel. To provide a greater area of communications coverage, or to provide a greater user communication capacity in densely populated regions, each transmission channel may further be defined by a distinct frequency channel, a distinct spread spectrum code, a distinct spatial direction, or some combination thereof.

In an exemplary TDMA communication system, time frames 201 are each 20 milliseconds in duration, with each time frame equally divided between sixteen full duplex time slots 202, or, alternatively, eight time slots, to support an extended range through increased guard times. In a preferred embodiment, each time slot 202 is 1.25 milliseconds long.

In some embodiments, a mobile station 102 may communicate in more than one time slot 202 in each time frame 201, supporting an increased data rate. Similarly, in some embodiments, a mobile station 102 may periodically skip time frames 201, communicating in some subset of all time frames 201 (e.g., every other time frame 201, or every fourth time frame 201), thereby supporting a reduced data rate.

Signaling messages, i.e., messages used for control traffic, are used to assist in the acquisition and maintenance of a channel for a mobile station 102 on a base station 104, as well as for registration processing, call establishment, maintenance, and cessation, and call "handover" processing, between base stations. Signaling messages are generally transparent to the mobile stations' end users. A signaling message may include a message type element located in a message field (i.e., a designated series of bits in a message). The message type element defines the format of the remainder of the message, and acts as a form of operation code for the destination unit (either mobile station 102, base station 104, base station controller 105, or network 106).

Bearer data (i.e., communication system 101 user traffic, also referred to as Traffic messages) comprises, in general, data which originates at a mobile station 102 end user and is passed through the communication system 101 to another mobile station 102 end user (e.g., voice messages).

The communication system 101 transfers information comprising signaling data and bearer data between a base station 104 and a mobile station 102 across an "O-Interface."

In a preferred embodiment, the O-Interface is an over-the-air interface operating according to an over-the-air protocol with time division duplexing (TDD) and time division multiple access (TDMA) techniques. A preferred protocol for the O-Interface is shown in and described with respect to FIG. 2.

A base station 104 or a mobile station 102 may receive an erroneous message on the O-Interface. As used herein, an erroneous message is a message with a transmission error associated with it. In either the case of the mobile station or the base station, the transmission error may comprise a parity error, a hardware component transmission timeout error, or any other transmission error recognized by the respective base or mobile station's receiver hardware and/or software.

A base station 104 or a mobile station 102 may also receive an unexpected message on the O-Interface. As used herein, an unexpected message is a message that was received with no associated transmission error, but which is either an unknown message, or a known message the base station, or mobile station, respectively, did not expect at that time in the given protocol processing.

In a preferred embodiment, if a mobile station 102 or base station 104 receives an unexpected or erroneous message on the O-Interface, it will execute a "Leaky Bucket" process, or routine. In the Leaky Bucket process, the mobile station, or base station, adjusts a LeakyBucket(unexpected message) counter or a LeakyBucket(erroneous message) counter if it receives an unexpected message or an erroneous message respectively.

In the communication system 101, a mobile station 102 may register with a base station 104, to indicate its presence to the base station, and, thus, the communication system 101 generally, thereby gaining access to the communication system in order to be able to place and receive calls thereon. A mobile station accomplishes registration via a Registration protocol sequence. Mobile stations may also receive calls from others on the communication system 101, via the execution of a Call Terminate protocol sequence, and place calls to others (referred to herein as callees) on the communication system 101, via the execution of a Call Originate protocol sequence. A mobile station may also determine that its current call link has an insufficient signal quality, and attempt to "handover" its call to another base station in the communication system 101, via the execution of a Handover protocol sequence.

As used herein, a protocol sequence comprises one or more signaling messages transmitted between various components of the communication system 101 to accomplish a function. A protocol sequence may also comprise the establishment and use of timers, LeakyBucket counters, previously described, and other variables necessary to accomplish the protocol sequence processing. For example, the Register protocol sequence comprises signaling messages transmitted between a mobile station 102, a base station 104, and a base station controller 105 or network 106, as well as the establishment of timers and LeakyBucket counters by both the base station and the mobile station, to accomplish the function of registering the mobile station with the base station.

A mobile station 102 "communicates" with its end user through its user interface. Thus, when the end user places, or receives, a call on the communication system 101, the mobile station transmits bearer data to its end user and receives bearer data from its end user on its user interface. A mobile station also posts various "indications" to its user interface, to indicate the current status of a protocol sequence. For example, at the end of a Registration protocol sequence, the mobile station either posts a Registered indication 708, or a Service Unavailable/Registration Rejected indication 709 to its user interface, as depicted in FIG. 7B. In the mobile station computer program, the MS_C task 2101 sends messages to the UI task 2111. The UI task 2111 then uses the information in these message to post indications to the mobile station's user interface. Any particular indication posted to a mobile station's user interface may either be a display message, a tone, an LED signal, or any other signaling mechanism supported by the user interface.

The UI task 2111, for its part, receives indications on the mobile station's user interface, which it then uses to form appropriate messages to send to the MS_C 2101 task.

As discussed herein, the mobile station transmits messages to the base station, and the base station transmits message to the mobile station. In the mobile station computer program, the subtasks of the mobile station forward information, also called messages, to the mobile station physical layer 2115, depicted in FIG. 21. The mobile station physical layer then transmits the appropriate information, also called messages, on the O-Interface. The mobile station physical layer 2115 also receives information on the O-Interface, which it provides as messages to the mobile station computer program.

The mobile station physical layer 2115 consists of circuitry and to act upon messages received from the mobile station computer program tasks, and, in response to those messages, transmit the appropriate information over the Over-the-Air Interface. The mobile station physical layer 2115 also consists of circuitry and hardware necessary to act upon information received on the Over-the-Air Interface, and in response to this information, send appropriate messages to the mobile station computer program subtasks.

The hardware and circuitry associated with the mobile station physical layer 2115 includes a Digital Signal Processor (DSP), and a digital radio and transceiver.

As discussed herein, the base station 104 and the mobile station 102 are indicated as being in various states, depending on the current function (i.e., protocol processing) they are performing. For example, when a mobile station successfully registers with a base station, it is said to transition to the Registered Idle state 801, depicted in FIG. 8, also discussed as the MS_C(5) state 2205, depicted in FIG. 22f. These states are used for ease of description and categorization of protocol processing and are not meant to denote physical states that either the base or mobile stations assume.

Figure 18:
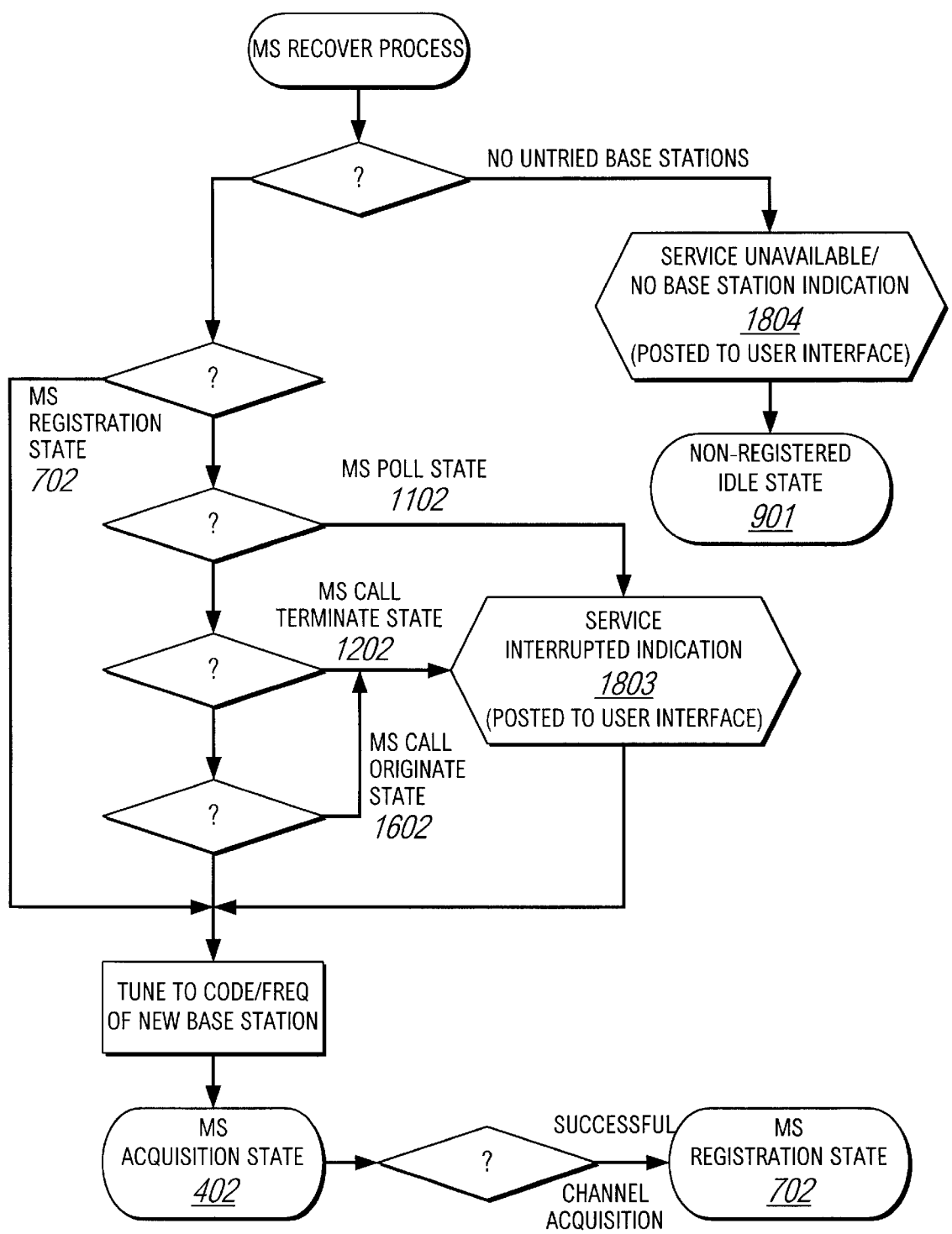
FIG. 18 is a diagram of the mobile station state processing and communication protocol when it fails to acquire a channel on, or loses synchronization with the, base station, and the mobile station was attempting to register, place a call, or receive a call with the base station.

Also as discussed herein, the base station 104 and the mobile station 102 are, at various times, noted as executing a "process." For example, if a mobile station fails to acquire a channel on a base station to Register with, on power on, it executes an MS Recover process, depicted in FIG. 18. A process is akin to a subroutine for a protocol sequence; it may be called from various points in any one protocol sequence, or even from various protocol sequences.

Figure 3A:
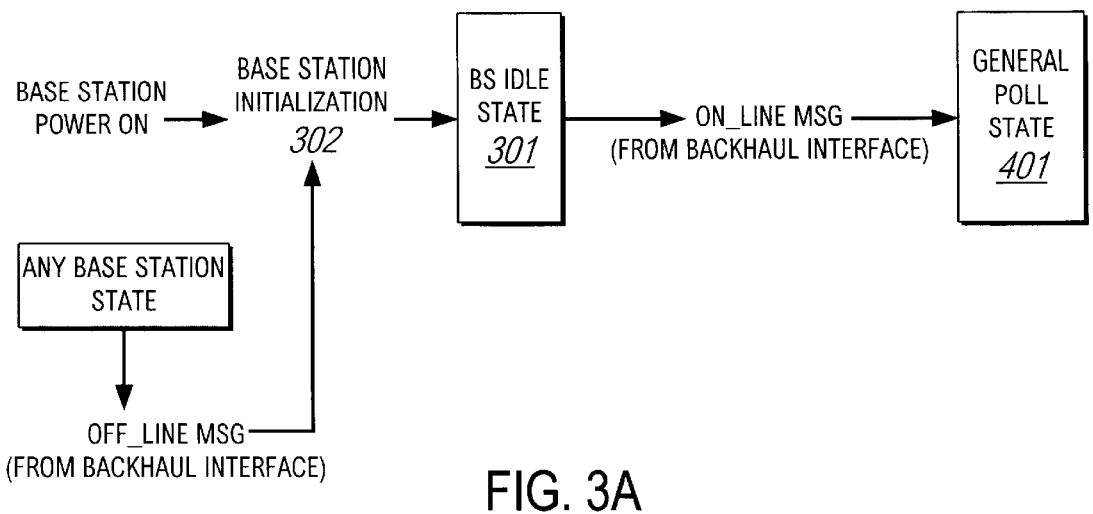
FIG. 3A is a diagram of a base station state processing on Power On and on receiving an On_Line and an Off_Line message.

FIG. 3A is a state diagram of the processing a base station 104 performs when it is first powered on. On power on, a base station performs a Base Station Initialization sequence 302, which includes, but is not limited to, the establishment and initialization of various databases, queues and variables used for communication processing and maintenance within the communication system 101. Once the Base Station Initialization sequence 302 is completed, the base station transitions to the BS Idle state 301. In the BS Idle state 301, the base station will not transmit messages to or receive and process messages from any mobile station 102. The base station remains in this BS Idle state 301 until it receives an On_Line message on the backhaul interface, from the system controller 103, indicating that the base station is to engage in communication processing with mobile stations.

While in any Base Station state, if a base station receives an Off_Line message on the backhaul interface, it transitions to the BS Idle state 301, as depicted in FIG. 3A. In a preferred embodiment, the base station performs the Base Station Initialization sequence 302, or a subset of the functions of this sequence 302, after receiving an Off_Line message, before it transitions to the BS Idle state 301.

Once a base station receives an On_Line message on the backhaul interface, it transitions to the General Poll state 401 for all its channels, as depicted in FIG. 3A. In the General Poll state 401, depicted in FIG. 4, for each of its currently unused (non-dedicated) channels, the base station transmits a CT_GPO (General Poll) message, one per time frame 202, on the O-Interface. The CT_GPO message of any channel is an invitation for any mobile station to seize the channel, and thereby acquire a communication link to the base station, and, thus, the communication system 101.

Figure 3B:
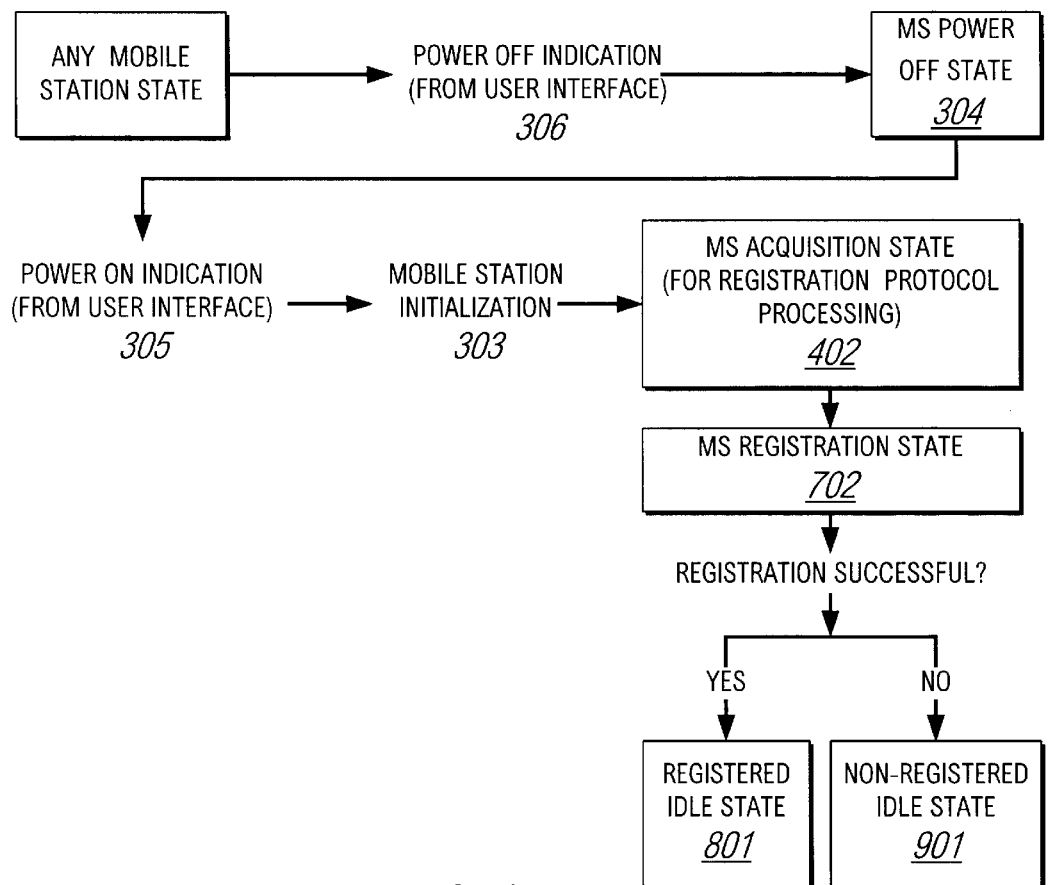
FIG. 3B is a diagram of a mobile station state processing on Power On and on Power Off.

FIG. 3B is a state diagram of the processing a mobile station 102 performs when it first powers on. Upon receiving a Power On indication 305 from its user interface, a mobile station performs a Mobile Station Initialization sequence 303, which includes, but is not limited to, the establishment and initialization of various databases, queues and variables used for communication functions within the communication system 101. In a preferred embodiment, the mobile station registers with a base station 104 each time the mobile station first powers on.

Figure 4:
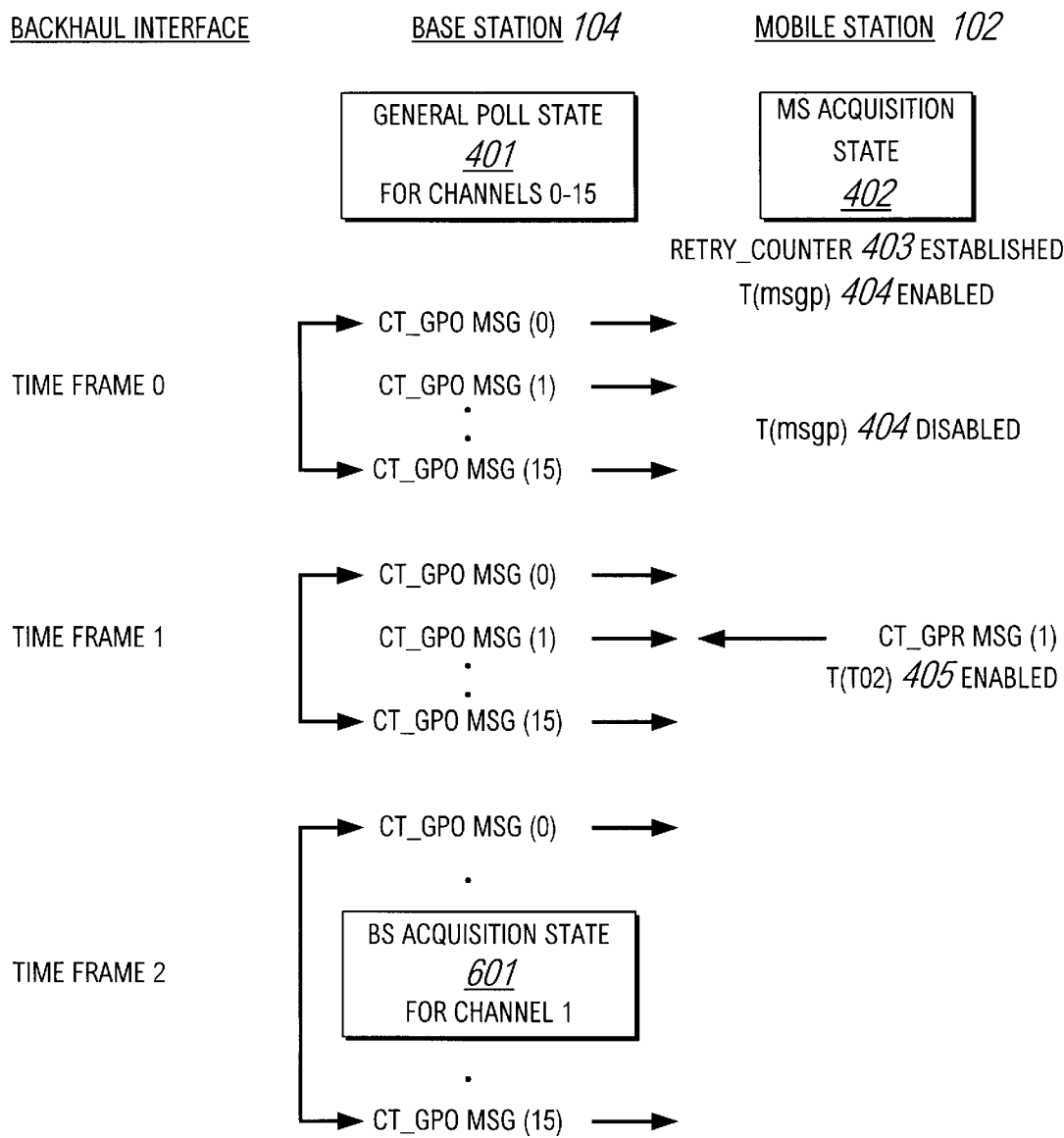
FIG. 4 is a diagram of a base station communication protocol for its non-dedicated channels, and a mobile station state processing for a channel acquisition attempt on the base station.
Figure 5:
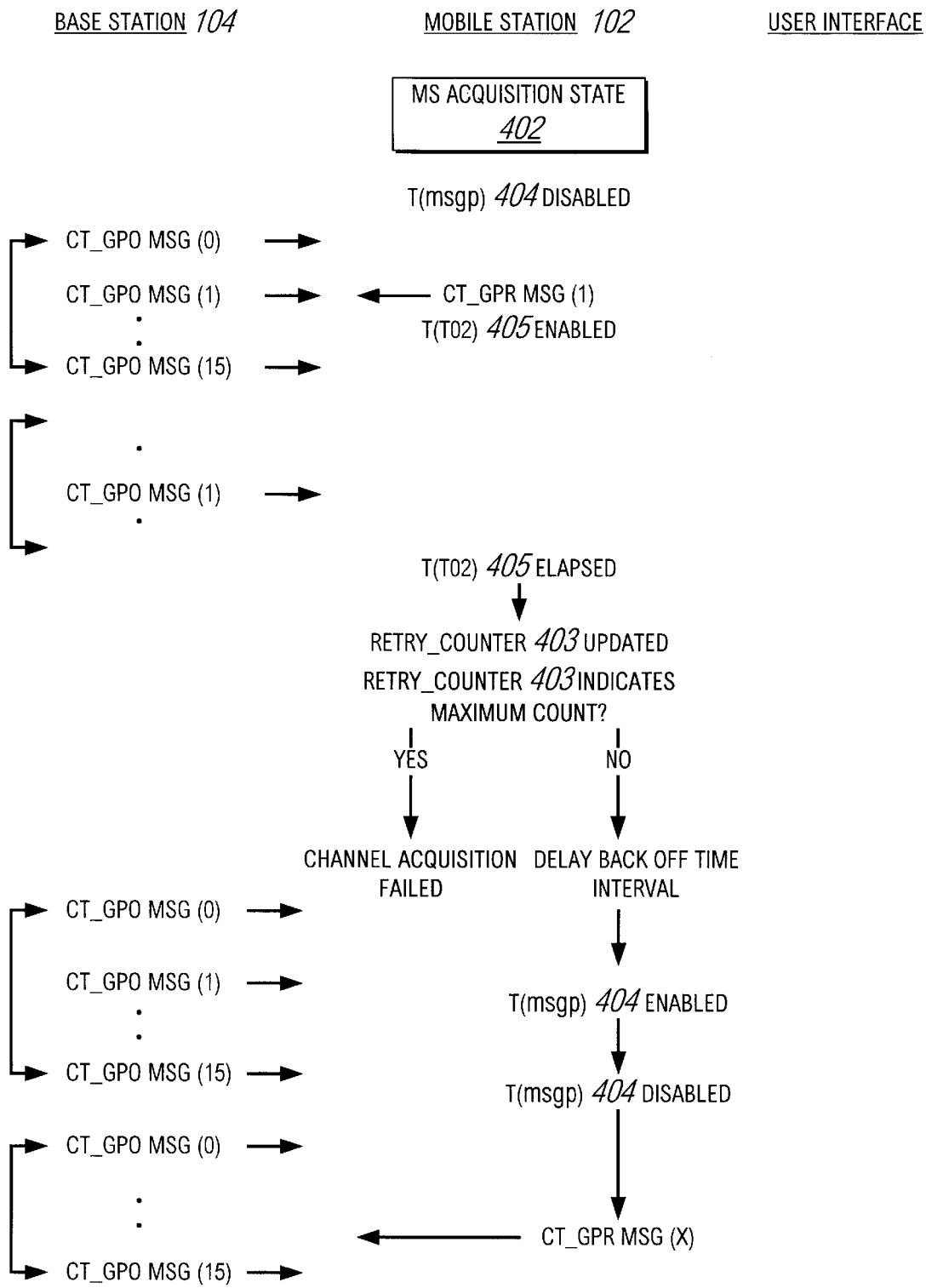
FIG. 5 is a diagram of a mobile station state processing when it fails to receive a valid response from the base station during a channel acquisition attempt.
Figure 6:
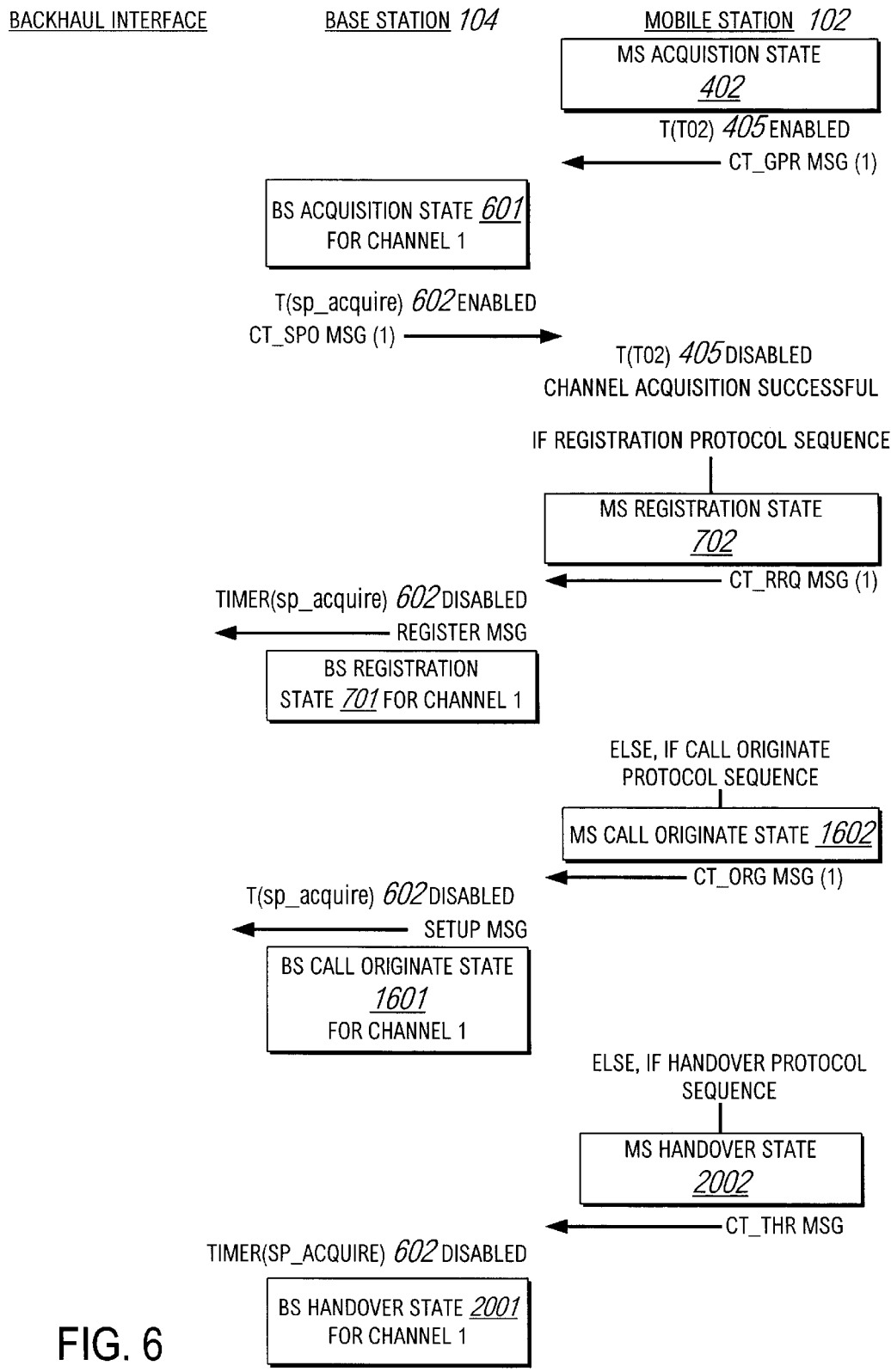
FIG. 6 is a diagram of a base station and a mobile station state processing and communication protocol for a successful channel acquisition by the mobile station on the base station.

In order to register, the mobile station first transitions to the MS Acquisition state 402, depicted in FIGS. 4–6, where it performs the Acquisition protocol sequence necessary to acquire a channel on a base station, for communication with the base station, and, thus, the communication system 101 in general. More generally, in each instance where a mobile station wishes to communicate within the communication system 101, i.e., for Registration, Call Originate, or Handover protocol sequence processing, the mobile station must first acquire a channel on a base station.

Figure 7A:
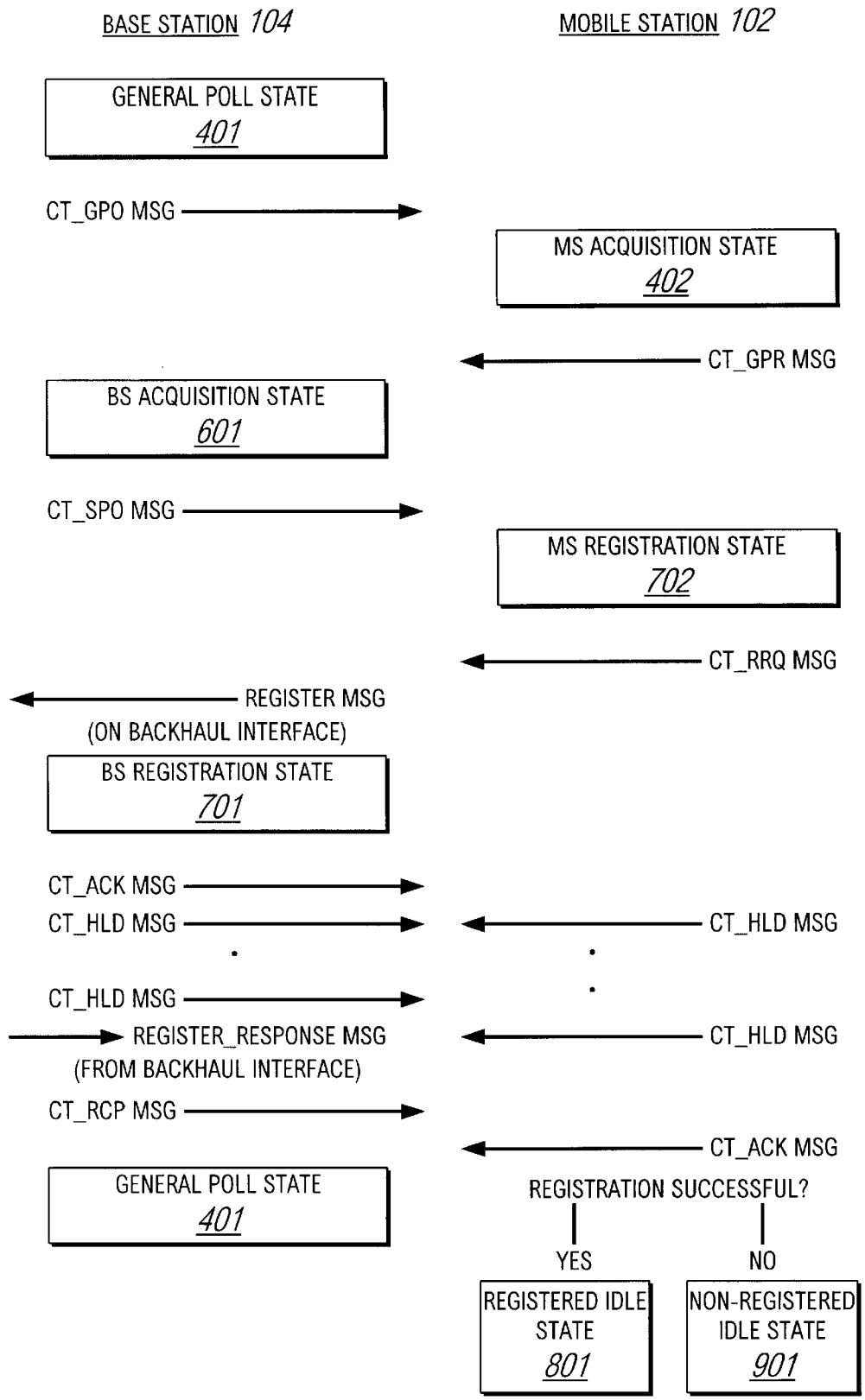
FIG. 7A is a diagram of a base station and a mobile station state processing and communication protocol for the registration of the mobile station on the base station.
Figures 1, 7B:
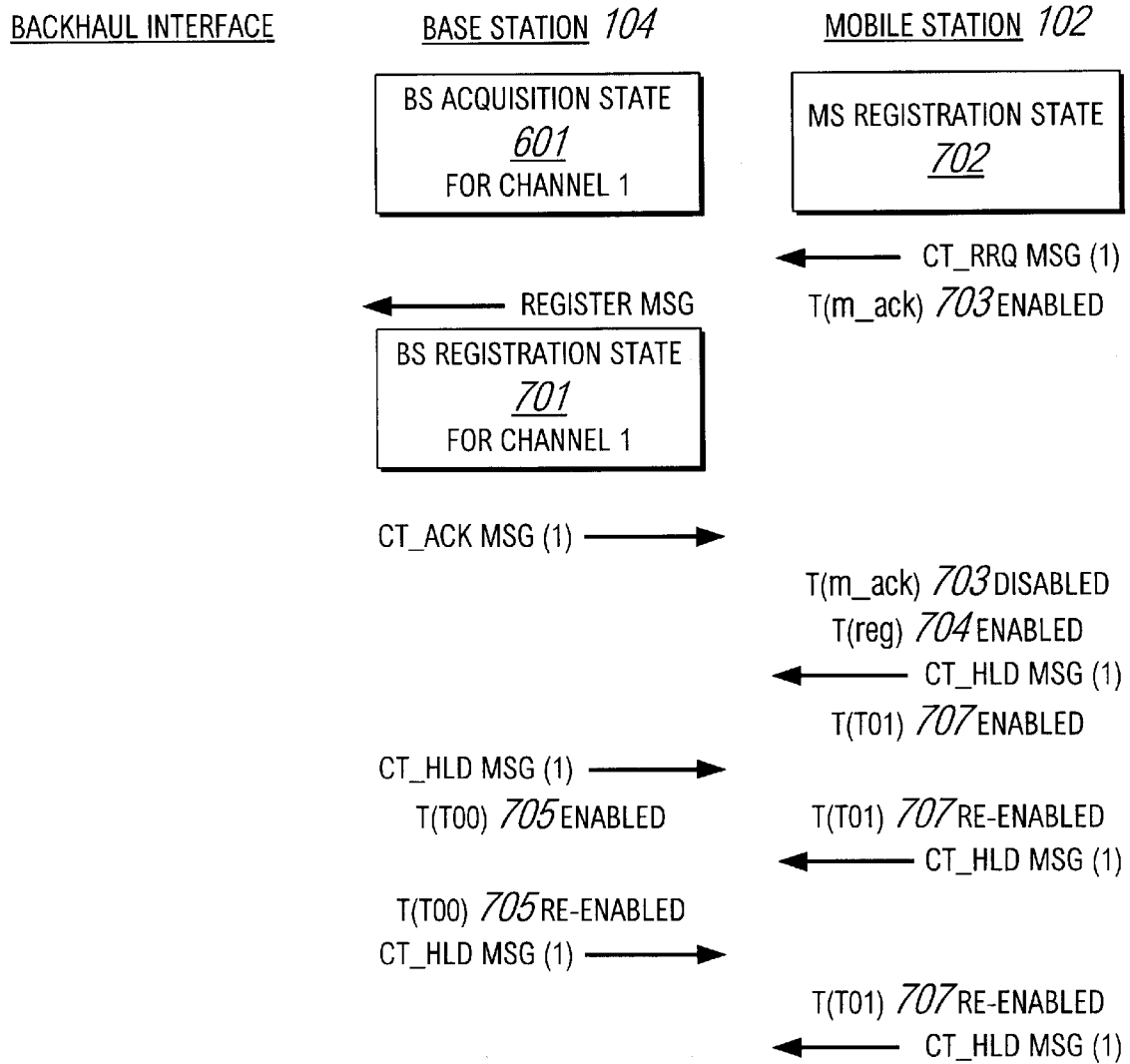
FIG. 7B is a diagram of a preferred embodiment communication protocol for a base station and a mobile station, for the registration of the mobile station on the base station.
Figures 2, 7B:
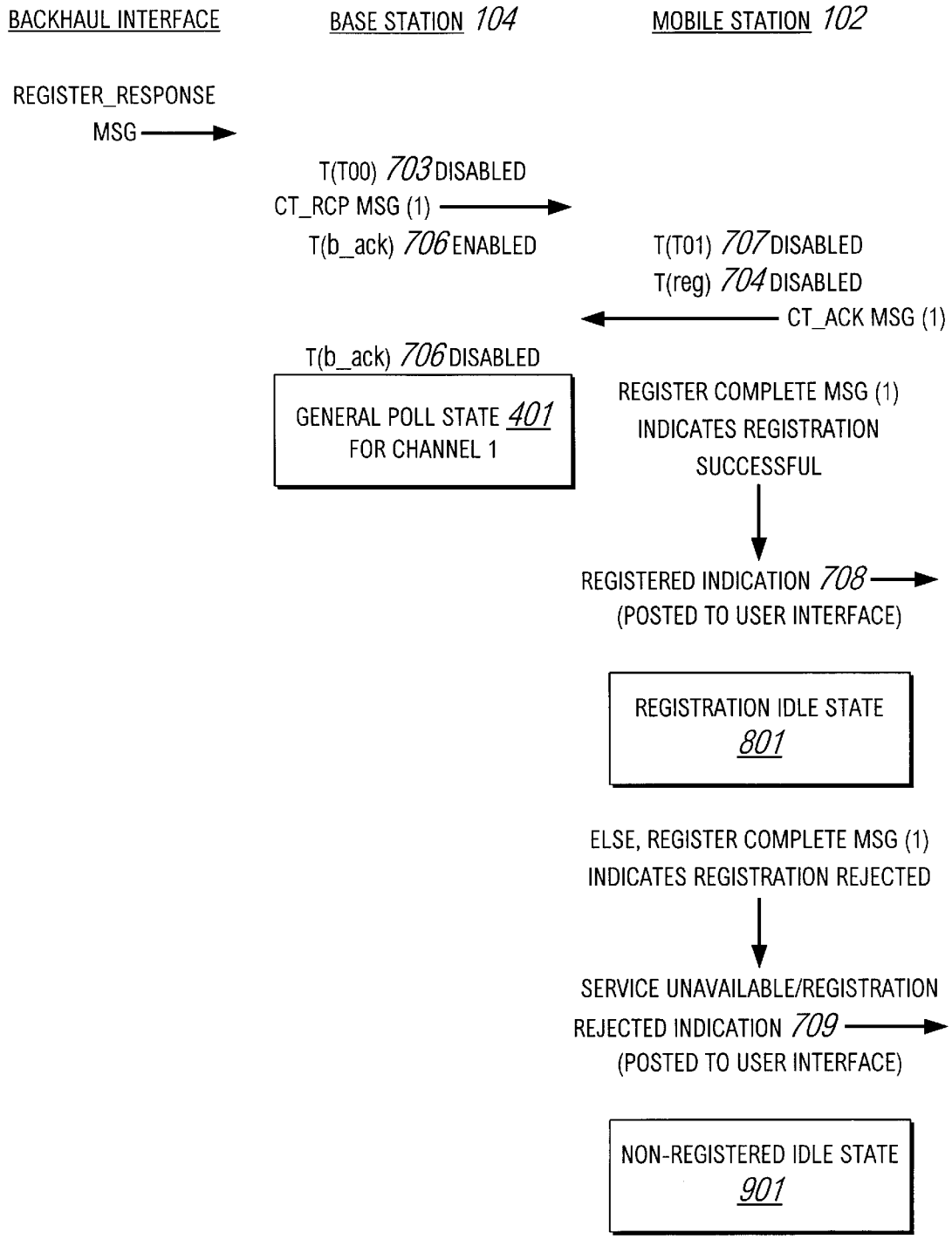

If, on power on, a mobile station successfully acquires a channel on a base station, it then transitions to the MS Registration state 702, depicted in FIG. 7A, where it performs the Registration protocol sequence, to register with the base station.

Figure 8:
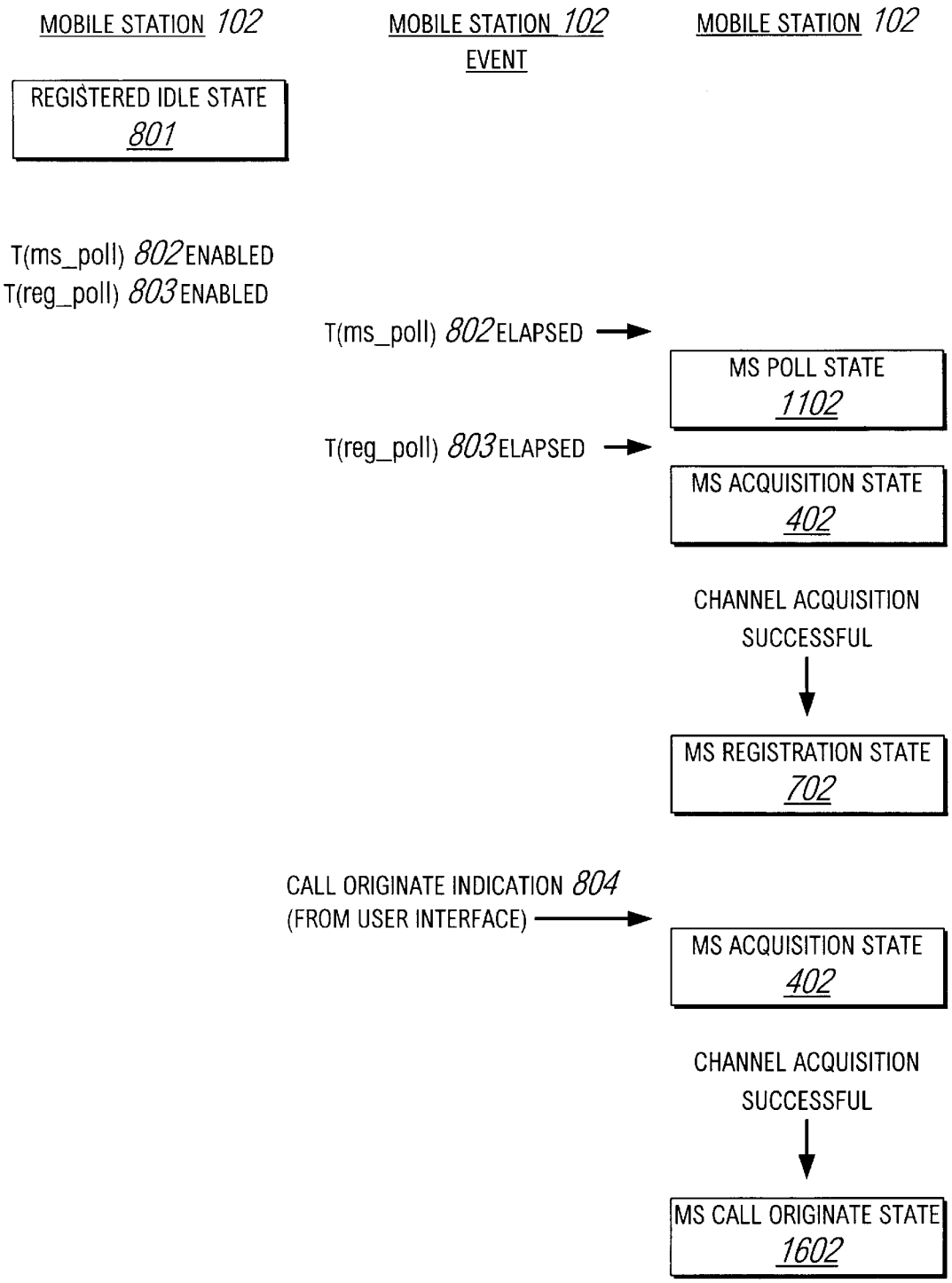
FIG. 8 is a diagram of the processing of a successfully registered mobile station in the idle state.

If the mobile station successfully registers with the base station, it transitions to the Registered Idle state 801, depicted in FIG. 8. In this state, the mobile station periodically re-registers with a base station and periodically polls the O-Interface, to see if there is a call on the communication system 101 pending for it. In the Registered Idle state 801, the mobile station can also place calls on the communication system 101, as requested by its end user, via its user interface.

Figure 9:
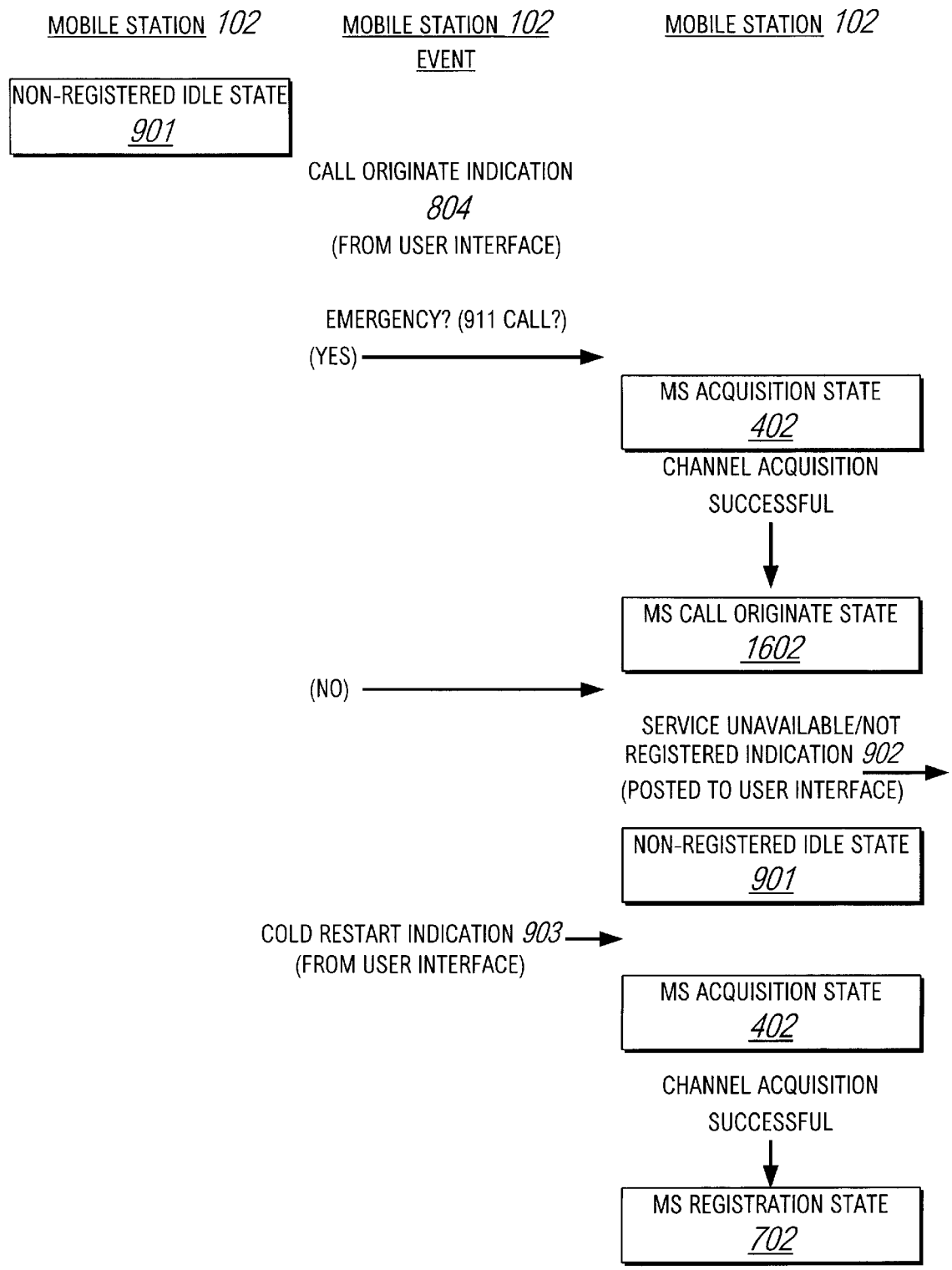
FIG. 9 is a diagram of the processing of an unsuccessfully registered mobile station in the idle state.

If mobile station is unsuccessful in registering with a base station after power on, it transitions to the Non-Registered Idle state 901, depicted in FIG. 9. In this state, the mobile station can place emergency (i.e., 911) calls on the communication system 101, and can also perform a cold restart (i.e., perform as if it had just been powered on), as requested by its end user, via its user interface.

As depicted in FIG. 3B, if a mobile station receives a Power Off indication 306 on its user interface while in any Mobile Station state, it transitions to the MS Power Off state 304. While in the MS Power Off state 304, the mobile station is idle, non-communicative with any base station, or the communication system 101 in general.

In the MS Acquisition state 402, depicted in FIG. 4, the mobile station establishes a Retry_Counter 403, which represents the maximum retry attempts the mobile station will make to acquire a channel on the base station it is currently tuned to. In a preferred embodiment, a mobile station is only tuned to the code/frequency of one base station transmission at any one time.

In a preferred embodiment of the MS Acquisition state 402, the mobile station also establishes its LeakyBucket counters, the LeakyBucket process previously described. In this state 402, the mobile station establishes a timer, T(msgp) 404, which represents the maximum time it will wait to receive a CT_GPO (General Poll) message from the base station before it deems its wait a retry. If the mobile station receives a CT_GPO message before T(msgp) 404 elapses, it disables T(msgp). If T(msgp) elapses, the mobile station updates Retry_Counter 403, re-establishes T(msgp), and then waits another T(msgp) time period to receive a CT_GPO message from the base station it is tuned to.

As previously described, for any base station channel not already acquired by a mobile station (i.e., a non-dedicated channel), the base station transmits a CT_GPO message in the channel's base portion 206 of each time frame 202, as shown in FIG. 4. When a mobile station wishes to acquire a channel, it responds to a CT_GPO message with a CT_GPR (General Poll Response) message transmitted in the channel's user portion 205 of a time frame. The mobile station then waits for a CT_SPO (Specific Poll) message for it from the base station. The CT_SPO message is an invitation for only the mobile station identified in the message to seize the channel.

In a normal Acquisition protocol sequence, depicted in FIG. 6, upon receiving a CT_GPR message on a non-dedicated channel from one mobile station, the base station dedicates the channel to the mobile station, and transitions to the BS Acquisition state 601 for that channel, where it then transmits a CT_SPO message to the mobile station.

In a preferred embodiment, a CT_SPO message received by a mobile station at this time indicates that it has successfully acquired a channel on the base station. In an alternative embodiment, the CT_SPO message may contain a message field which indicates to the mobile station whether or not it has acquired the channel. If the CT_SPO message in this alternative embodiment indicates the mobile station has not acquired the channel, the mobile station determines that the Acquisition protocol sequence with the base station it is currently tuned to has failed. Otherwise, if the CT_SPO message indicates the mobile station has acquired the channel, the mobile station proceeds as discussed below, and depicted in FIG. 6.

Should more than one mobile station respond to a CT_GPO (General Poll) message in a particular channel, the base station remains processing in the General Poll state 401 for that channel, continuing to transmit CT_GPO messages in each time frame of the channel. This base station processing is equivalent to a non-response to the mobile stations' CT_GPR (General Poll Response) messages.

In a preferred embodiment, the mobile station establishes a timer, T(T02) 405, for the maximum time it will wait for a CT_SPO message for it from the base station, once it has transmitted a CT_GPR message to the base station. If the mobile station receives a CT_SPO message for it before T(T02) 405 elapses, it disables T(T02). If, however, T(T02) elapses, the mobile station assumes there has been a channel acquisition collision with at least one other mobile station. In this situation, depicted in FIG. 5, the mobile station updates Retry_Counter 403 and then "backs off," for some time interval, before again attempting to seize a channel on the base station.

In a preferred embodiment, a mobile station presumes it has been involved in a channel acquisition collision if it fails to receive a CT_SPO message for it in the following time frame of the channel the mobile station transmitted its CT_GPR message in. Thus, T(T02) 405 preferably represents one time frame.

After a back off time interval elapses, the mobile station once again establishes timer T(msgp) 404, and then waits to receive a CT_GPO (General Poll) message from the base station.

Thus, as shown in FIG. 5, a mobile station continues processing in the MS Acquisition state 402 if it does not receive a CT_GPO message from the base station, or a valid response to its own CT_GPR (General Poll Response) message from the base station, until Retry_Counter 403 indicates a maximum retry count has been reached. If Retry_Counter indicates a maximum retry count, the mobile station determines the Acquisition protocol sequence with the base station it is currently tuned to has failed.

A base station remains in the General Poll state 401 for each non-dedicated channel, transmitting a CT_GPO message in each time frame of the channel, until it receives one CT_GPR message from a mobile station, as depicted in FIG. 4, until it receives a Page message on the backhaul interface, for a Paging protocol sequence, as discussed below, and depicted in FIG. 11, or until it receives an Off_Line message on the backhaul interface, as previously discussed, and depicted in FIG. 3A.

Once a base station receives a CT_GPR message in a non-dedicated channel from a mobile station, as depicted in FIG. 6, it transitions to the BS Acquisition state 601 for that channel, which it now designates "dedicated." In response to the CT_GPR message in exemplary non-dedicated channel 1, the base station 104 transmits one or more CT_SPO (Specific Poll) messages for the mobile station on this now dedicated channel 1.

From this point on, until such time as the dedicated channel is redesignated non-dedicated, the mobile station is said to have acquired the dedicated channel. The base station transmits to the mobile station in the base portion 206 of this channel, and the mobile station correspondingly transmits to the base station in the user portion 205 of this channel.

A base station can be in different states for its different channels, as shown in FIG. 4. For example, a base station can be in the BS Acquisition state 601 for channel 1, while it is in the General Poll state 401 for channels 0 and 2–15.

In a preferred embodiment of the BS Acquisition state 601, as depicted in FIG. 6, the base station establishes a timer, T(sp_acquire) 602, for the maximum time it will continue transmitting CT_SPO messages for the mobile station in a dedicated channel, waiting for a valid response from the mobile station. If the base station receives a valid mobile station response before T(sp_acquire) 602 elapses, it disables T(sp_acquire). If, however, T(sp_acquire) elapses, the base station redesignates the dedicated channel as non-dedicated, and transitions to the General Poll state 401 for the now non-dedicated channel.

As depicted in FIG. 6, if the base station receives a CT_RRQ (Register Request) message from the mobile station in response to the CT_SPO message(s), it transmits a Register message on the backhaul interface, to notify the system controller 103 that the mobile station requests to register with the base station. The base station then transitions to the BS Registration state 701 for the dedicated channel, depicted in FIG. 7A.

Figure 16A:
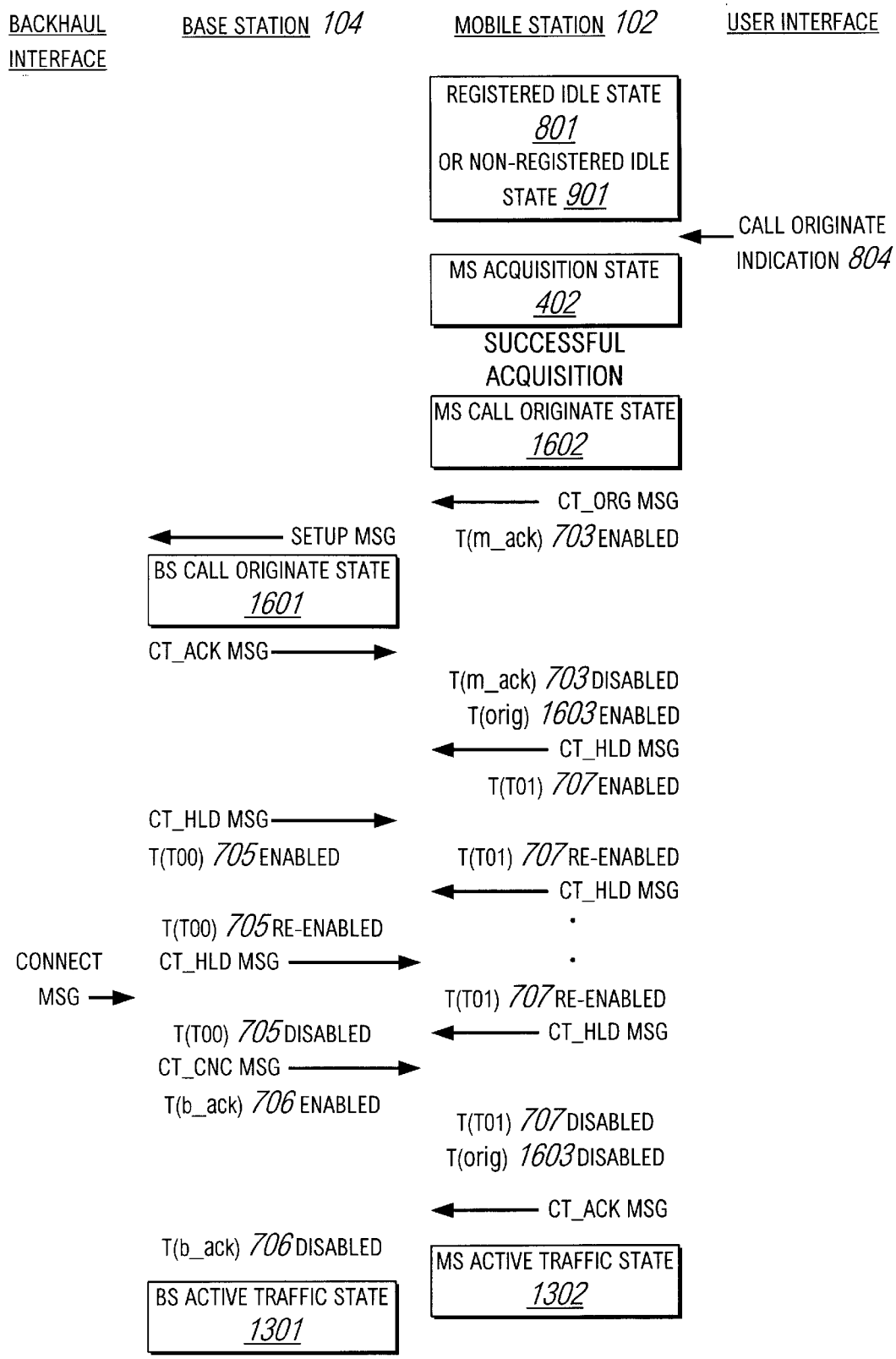
FIG. 16A is a diagram of a base station and a mobile station state processing and communication protocol when a mobile station end user initiates a call on the communication system.

If the base station receives a CT_ORG (Call Originate) message from the mobile station in response to the CT_SPO message(s), it transmits a Setup message on the backhaul interface, to notify the system controller 103 that the mobile station wishes to originate a call (i.e., call another) on the communication system 101. The base station then transitions to the BS Call Originate state 1601 for the dedicated channel, depicted in FIG. 16A.

Figure 20A:
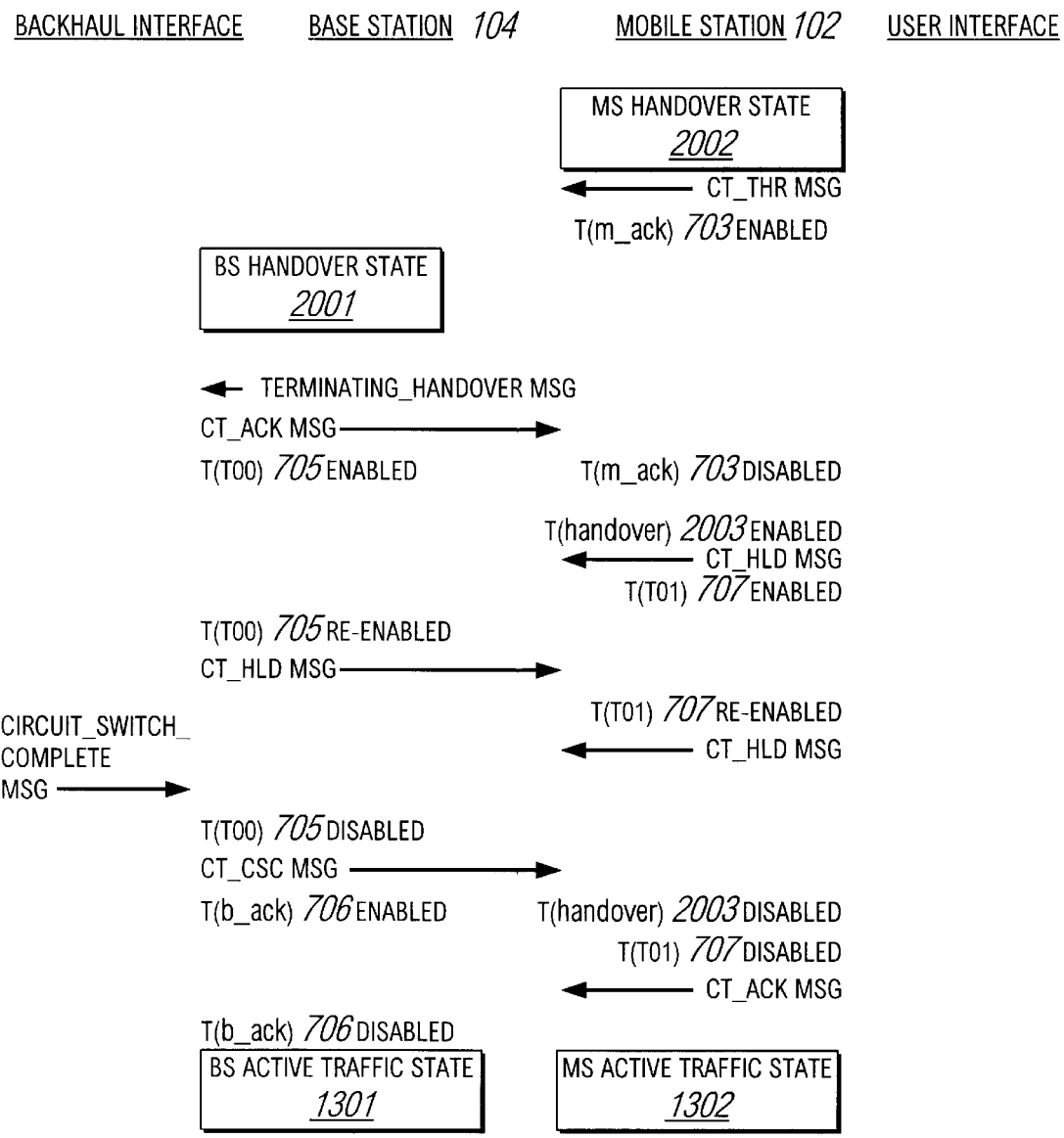
FIG. 20A is a diagram of a base station and a mobile station state processing and communication protocol when the mobile station successfully acquires a channel on the base station and wishes to handover its call to this base station.

If the base station receives a CT_THR (Terminating Handover Request) message from the mobile station in response to the CT_SPO message(s), it transitions to the BS Handover state 2001 for the dedicated channel, depicted in FIG. 20A.

In a preferred embodiment, as previously discussed, a mobile station registers with a base station when the mobile station first powers on, and periodically thereafter. In order to register, a mobile station must acquire a channel on a base station; thus, it transitions to the MS Acquisition state 402, previously described. If the mobile station is unsuccessful in acquiring a channel for the Registration protocol sequence on the base station it is currently tuned to, it executes the MS Recover process, depicted in FIG. 18.

In the MS Recover process, the mobile station checks its database to see if there is any untried base station 104 candidate it may attempt to acquire a channel on. If no, the mobile station transitions to the Non-Registered Idle state 901. In a preferred embodiment, before transitioning to the Non-Registered Idle state 901, the mobile station posts a Service Unavailable/No Base Station indication 1804 on its user interface. In this case, as the mobile station was attempting to acquire a channel on a base station to register with, the register attempt is now terminated.

If, however, the mobile station's database indicates there is at least one untried base station candidate it may yet attempt to acquire a channel on, it tunes to the code/frequency of one of the untried base stations' transmission. The mobile station, still processing in the MS Acquisition state 402, then attempts to acquire a channel on this new base station, to use to register with the new base station.

If a mobile station fails to acquire a channel on the base station it is initially tuned to, and if it then executes the MS Recover process, as when it is attempting to acquire a base station channel to then register with, it repeatedly executes the MS Recover process, until it either successfully acquires a channel on a base station, or there are no more base station candidates for it to attempt a channel acquisition on.

If a mobile station successfully acquires a channel in the MS Acquisition state 402 for a Registration protocol sequence, it then transitions to the MS Registration state 702, depicted in FIGS. 7A and 7B. In the MS Registration state 702, the mobile station transmits a CT_RRQ (Registration Request) message in the acquired dedicated channel. In a preferred embodiment, the mobile station then waits for a CT_ACK (Ack) message response from the base station, indicating the base station acknowledges the mobile station's request to register.

In a preferred embodiment, as depicted in FIG. 7B, the mobile station establishes a timer, T(m_ack) 703, for the maximum time it will wait for a CT_ACK message from the base station. If the mobile station receives the expected CT_ACK message before T(m_ack) 703 elapses, it disables T(m_ack), and then waits for a CT_RCP (Registration Complete) message from the base station, indicating the communication system 101's response to the mobile station's registration request. If, however, T(m_ack) 703 elapses, the mobile station presumes it is out of synchronization ("out of sync") with the base station, and executes an MS Resync process, depicted in FIG. 10A.

In the MS Resync process, the mobile station checks whether the base station is transmitting it a CT_SPO (Specific Poll) message. If the mobile station receives a CT_SPO message for it, it remains in the MS Registration state 702 and restarts the Registration protocol sequence anew, transmitting a new CT_RRQ (Registration Request) message to the base station. This new CT_RRQ message is both a registration request and an indication that the mobile station has resynced with the base station.

In a preferred embodiment, the mobile station enables a timer, T(resync) 1001, for the maximum time it will continue to check if the base station is transmitting it a CT_SPO message. If the mobile station receives a CT_SPO message for it before T(resync) 1001 elapses, it disables T(resync). If, however, T(resync) elapses, the mobile station determines that is has no communication with the base station, and executes the MS Recover process, previously discussed, and depicted in FIG. 18, where it determines if there is another base station it can acquire a channel on, and, thus, register with.

As previously discussed, and depicted in FIG. 7A, if a base station receives a CT_RRQ (Registration Request) message while processing in the BS Acquisition state 601 for a dedicated channel, it transmits a Register message on the backhaul interface. The base station then transitions to the BS Registration state 701, depicted in FIGS. 7A and 7B, to wait for a Register_Response message from the system controller 103, indicating the communication system 101's response to the mobile station's registration request. In a preferred embodiment, once the base station transitions to the BS Registration state 701, it transmits a CT_ACK message to the mobile station, acknowledging the mobile station's CT_RRQ message.

If the base station receives the expected Register_Response message on the backhaul interface, it transmits a CT_RCP (Registration Complete) message to the mobile station. In a preferred embodiment, the base station then waits for a CT_ACK message response from the mobile station.

In a preferred embodiment, upon receiving the expected CT_RCP message, the mobile station transmits a CT_ACK message to the base station, acknowledging the CT_RCP message. Then, if the CT_RCP message indicates that the registration was successful, the mobile station transitions to the Registered Idle state 801. In a preferred embodiment, as depicted in FIG. 7B, the mobile station posts a Registered indication 708 to its user interface, prior to transitioning to the Registered Idle state 801.

If, however, the CT_RCP message indicates that the registration was rejected, the mobile station transitions to the Non-Registered Idle state 901. In a preferred embodiment, as depicted in FIG. 7B, the mobile station posts a Service Unavailable/Registration Rejected indication 709 to its user interface, prior to transitioning to the Non-Registered Idle state 901.

Figure 7C:
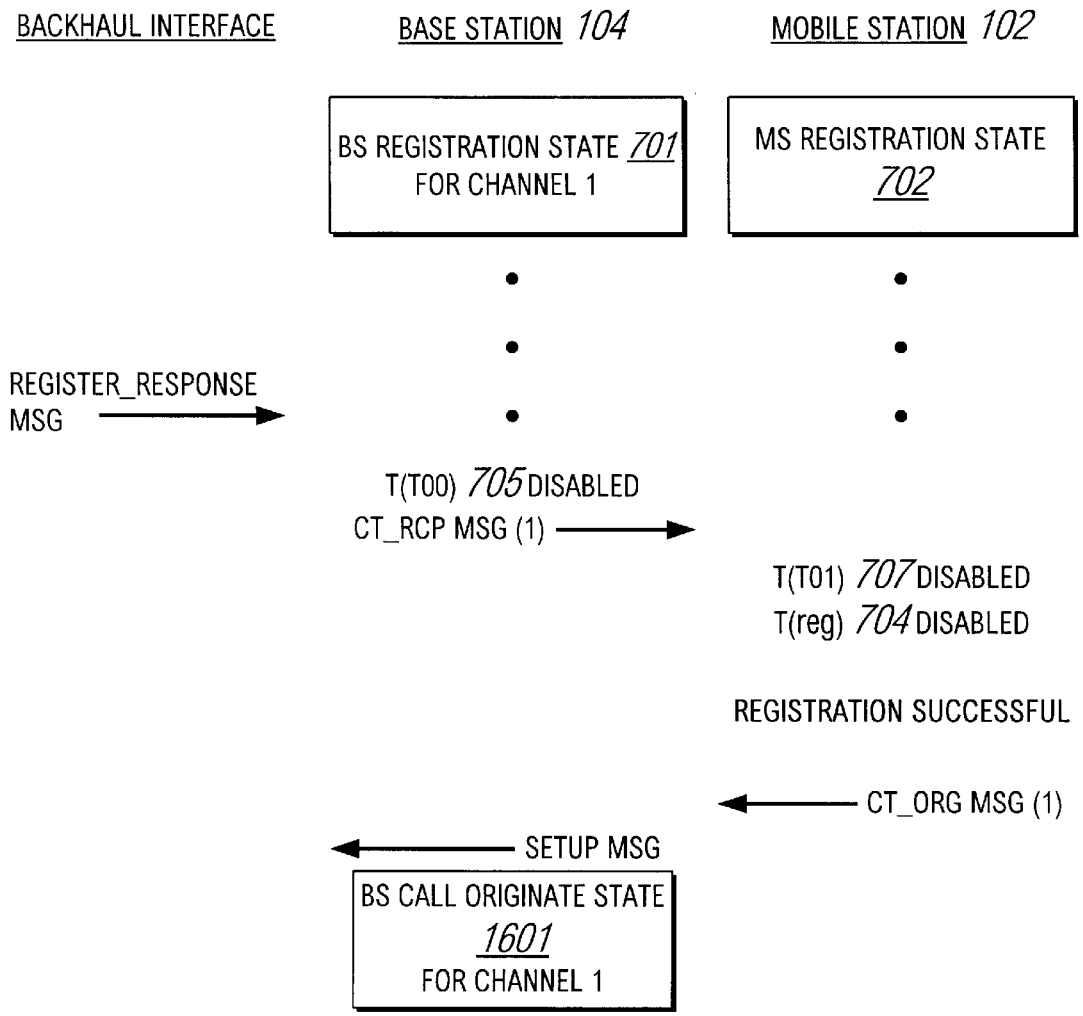
FIG. 7C is a diagram of an alternative embodiment communication protocol for a base station and a mobile station, on the successful registration of the mobile station on the base station.

In an alternative embodiment, as depicted in FIG. 7C, if the CT_RCP message transmitted from the base station indicates that the registration was successful, the mobile station may transmit a CT_ORG (Call Originate) message, in lieu of the CT_ACK message, to the base station. In this alternative embodiment, if the base station receives a CT_ORG message at this time, it transmits a Setup message on the backhaul interface, and then transitions to the BS Call Originate state 1601 for the dedicated channel, depicted in FIG. 16A.

As previously noted, in a preferred embodiment, the mobile station transmits a CT_ACK message to the base station in response to the CT_RCP message. Upon receiving this CT_ACK message, the base station redesignates the dedicated channel as non-dedicated, and transitions to the General Poll state 401 for the now non-dedicated channel.

Figure 17:
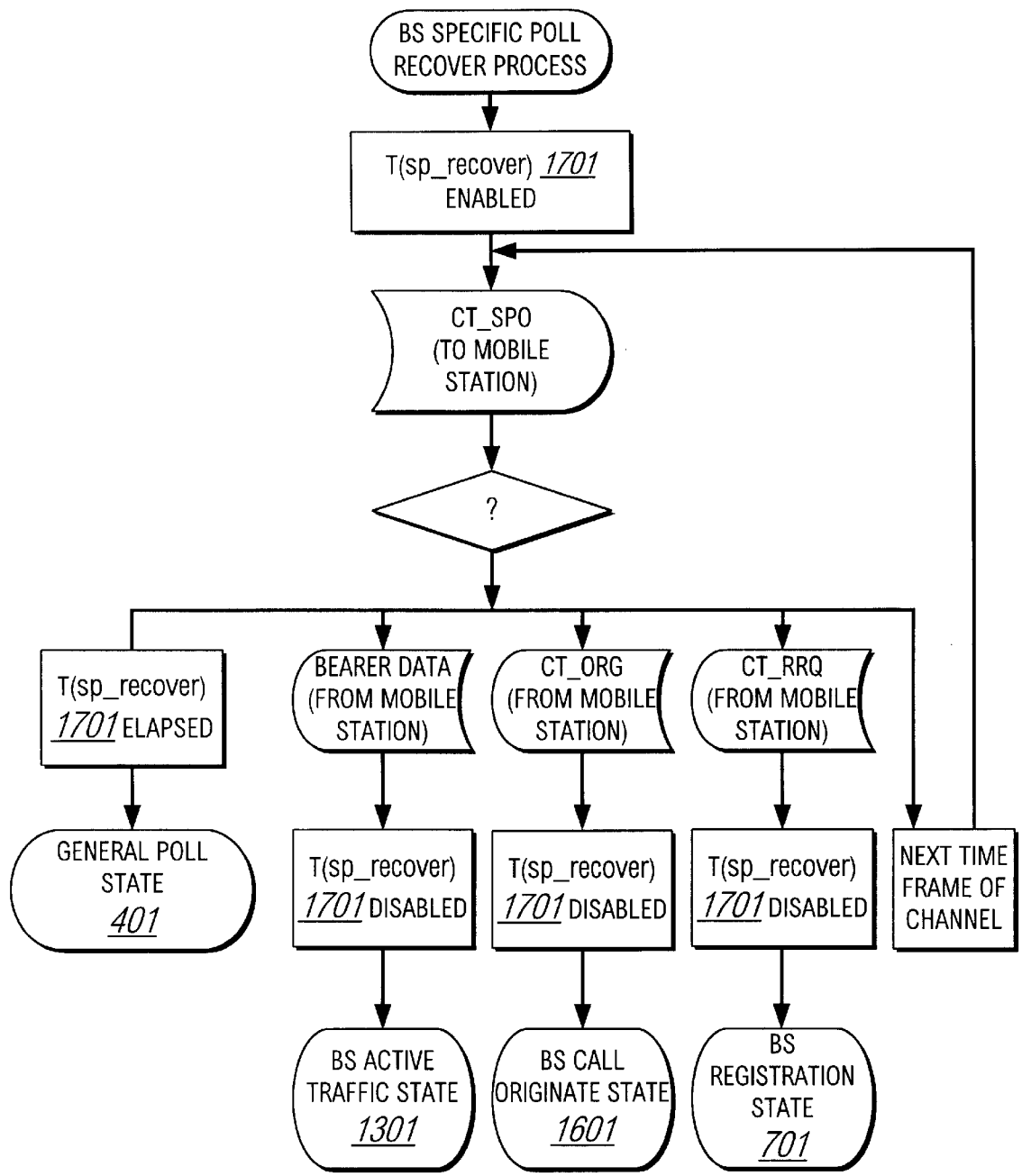
FIG. 17 is a diagram of the mobile station state processing and communication protocol for resynchronizing with a base station when the mobile station is attempting to register or place a call with the base station, or is already processing an established call with the base station.

In a preferred embodiment, the base station establishes a timer, T(b_ack) 706, for the maximum time it will wait for a CT_ACK message from the mobile station. If the base station receives the expected CT_ACK message before T(b_ack) 706 elapses, it disables T(b_ack). If, however, T(b_ack) elapses, the base station presumes it is out of sync with the mobile station, and executes a BS Specific Poll Recover process, depicted in FIG. 17.

In the BS Specific Poll Recover process, the base station transmits a CT_SPO (Specific Poll) message for the mobile station in each time frame of the channel, to provide the mobile station a message to resynchronize (resync) to. If the base station now receives a CT_RRQ (Registration Request) message from the mobile station, it remains in the BS Registration state 702 and begins the Registration protocol processing anew, transmitting a CT_ACK message to the mobile station in response to the mobile station's latest CT_RRQ message. This latest CT_RRQ message is both a request to register and an indication that the mobile station has resynced with the base station.

If the BS Specific Poll Recover process is executed in the BS Registration state 701 because T(b_ack) 706 elapsed, the base station has already received a Register_Response message from the system controller 103, in response to the mobile station's previous CT_RRQ message. Thus, if the base station resyncs with the mobile station at this time, and begins the Registration protocol sequence anew, once it transmits the CT_ACK message to the mobile station, it then transmits a CT_RCP (Registration Complete) message to the mobile station, in the next time frame of the channel, corresponding to the Register_Response message already received. The base station then resumes the normal Registration protocol sequence processing, waiting for a CT_ACK message response from the mobile station.

In a preferred embodiment, the base station enables a timer, T(sp_recover) 1701, for the maximum time it will transmit CT_SPO (Specific Poll) messages for the mobile station in the channel, one per time frame, and wait for a CT_RRQ message in return. If the base station receives a CT_RRQ message before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

In a preferred embodiment in the MS Registration state 702, the mobile station establishes a timer, T(reg) 704, for the maximum time it will wait for a CT_RCP (Registration Complete) message from the base station. If the mobile station receives a CT_RCP message before T(reg) 704 elapses, it disables T(reg). If, however, T(reg) elapses, the mobile station transitions to the Non-Registered Idle state 901. In a preferred embodiment, the mobile station posts a Service Unavailable/Network Not Responding indication 710 to its user interface, prior to transitioning to the Non-Registered Idle state 901.

In a preferred embodiment in the MS Registration state 702, as depicted in FIG. 7B, while the mobile station waits for a CT_RCP (Registration Complete) message, it transmits a CT_HLD (Hold) message to the base station in the user portion 205 of each time frame of the dedicated channel in which it has no other message to send to the base station. The base station, in its turn, while in the BS Registration state 701, waiting for a Register_Response message from the backhaul interface, transmits a CT_HLD message to the mobile station in the base portion 206 of each time frame of the dedicated channel in which it has no other message to send to the mobile station.

In a preferred embodiment, while the mobile station is in the MS Registration state 702, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives a CT_RCP message from the base station. If T(T01) elapses, the mobile station presumes it is out of sync with the base station, and executes the MS Resync process, described above, and depicted in FIG. 10A.

In a preferred embodiment, while the base station is in the BS Registration state 701 for a dedicated channel, transmitting and receiving CT_HLD messages on the O-Interface, it establishes a timer, T(T00) 705, for the maximum time it will wait for a CT_HLD message. The base station re-establishes T(T00) 705 each time it receives an expected CT_HLD message, and disables T(T00) when it receives a Register_Response message on the backhaul interface. If T(T00) elapses, the base station presumes it is out of sync with the mobile station, and executes the BS Specific Poll Recover process, described above, and depicted in FIG. 17.

While executing the BS Specific Poll Recover process at this time, the base station may, or may not, receive a Register_Response message on the backhaul interface. If the base station does not receive a Register_Response message at this time, and successfully resyncs with the mobile station, it begins processing from the start of the BS Registration state 701, transmitting a CT_ACK message response to the mobile station's latest CT_RRQ (Registration Request) message. This latest CT_RRQ is both a registration request and an indication that the mobile station has resynced with the base station.

If, however, the base station does receive a Register_Response message while executing the BS Specific Poll Recover process at this time, and it successfully resyncs with the mobile station, it transmits a CT_ACK message in response to the mobile station's latest CT_RRQ message. Then, in the next time frame of the channel, the base station transmits a CT_RCP (Registration Complete) message to the mobile station, corresponding to the Register_Response message. The base station then continues the normal Registration protocol sequence, waiting for a CT_ACK message response from the mobile station.

While the mobile station is in the MS Registration state 702, it may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, and continues processing in the MS Registration state 702 from that point. If, however, any Leaky-Bucket counter indicates a maximum error count, the mobile station executes the MS Resync process, described above, and depicted in FIG. 10A.

While in the BS Registration state 701 for a dedicated channel, the base station may also receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing in the BS Registration state 702 from that point. If, however, any LeakyBucket counter indicates a maximum error count, the mobile station executes the BS Specific Poll Recover process, described above, and depicted in FIG. 17.

While executing the BS Specific Poll Recover process at this time, the base station may, or may not, receive a Register_Response message on the backhaul interface. If the base station does not receive a Register_Response message at this time, and successfully resyncs with the mobile station, it begins processing from the start of the BS Registration state 701, transmitting a CT_ACK message response to the mobile station's latest CT_RRQ (Registration Request) message. This latest CT_RRQ is both a registration request and an indication that the mobile station has resynced with the base station.

If, however, the base station does receive a Register_Response message while executing the BS Specific Poll Recover process at this time, and it successfully resyncs with the mobile station, it transmits a CT_ACK message in response to the mobile station's latest CT_RRQ message. Then, in the next time frame of the channel, the base station transmits a CT_RCP (Registration Complete) message to the mobile station, corresponding to the Register_Response message. The base station then continues the normal Registration protocol sequence, waiting for a CT_ACK message response from the mobile station.

As previously described, once a mobile station successfully registers with a base station, it transitions to the Registered Idle state 801, depicted in FIG. 8. In the Registered Idle state 801, the mobile station establishes a timer, T(reg_poll) 803, for the periodic time, from transitioning to the Registered Idle state 801, that the mobile station will wait before re-registering with a base station. When T(reg_poll) 803 elapses, the mobile station first transitions to the MS Acquisition state 402, to process acquiring a channel on a base station, and then, if successful, transitions to the MS Registration state 702, to process the Registration protocol sequence.

In a preferred embodiment, in the Registered Idle state 801, the mobile station also establishes a timer, T(ms_poll) 802, for the periodic time, from transitioning to the Registered Idle state 801, that the mobile station will wait before checking to see if the communication system 101 is paging it, for a call; the Paging protocol sequence is discussed below and depicted in FIG. 11. When T(ms_poll) 802 elapses, the mobile station transitions to the MS Poll state 1102, where it checks whether a base station is sending it a CT_PPO (Paging Poll) message, indicating it is being paged.

While in the Registered Idle state 801, the mobile station may also receive a Call Originate indication 804 on its user interface, indicating its end user wishes to place a call on the communication system 101. Upon receiving a Call Originate indication 804, the mobile station first transitions to the MS Acquisition state 402, to process acquiring a channel on a base station. Then, if successful, the mobile station transitions to the MS Call Originate state 1602, depicted in FIG. 16A, where it processes the Call Originate protocol sequence for establishing a call link on the communication system 101.

In the Non-Registered Idle state 901, depicted in FIG. 9, the mobile station may also receive a Call Originate indication 804 on its user interface, indicating its end user wishes to place a call on the communication system 101. In a preferred embodiment, if it is an emergency call, i.e., a 911 call, the mobile station first transitions to the MS Acquisition state 402, to process acquiring a channel on a base station, and then, if successful, transitions to the MS Call Originate state 1602, depicted in FIG. 16A. If the call is not an emergency call, however, the mobile station remains in the Non-Registered Idle state 901. In a preferred embodiment, upon receiving a non-emergency call indication on its user interface at this time, the mobile station posts a Service Unavailable/Not Registered indication 902 on its user interface.

While in the Non-Registered Idle state 901, the mobile station may also receive a Cold Restart indication 903 on its user interface, indicating that the mobile station should attempt to re-register with a base station. Upon receiving this Cold Restart indication 903, the mobile station first transitions to the MS Acquisition state 402, to process acquiring a channel on a base station. Then, if successful, it transitions to the MS Registration state 702, to process the Registration protocol sequence.

Figure 11:
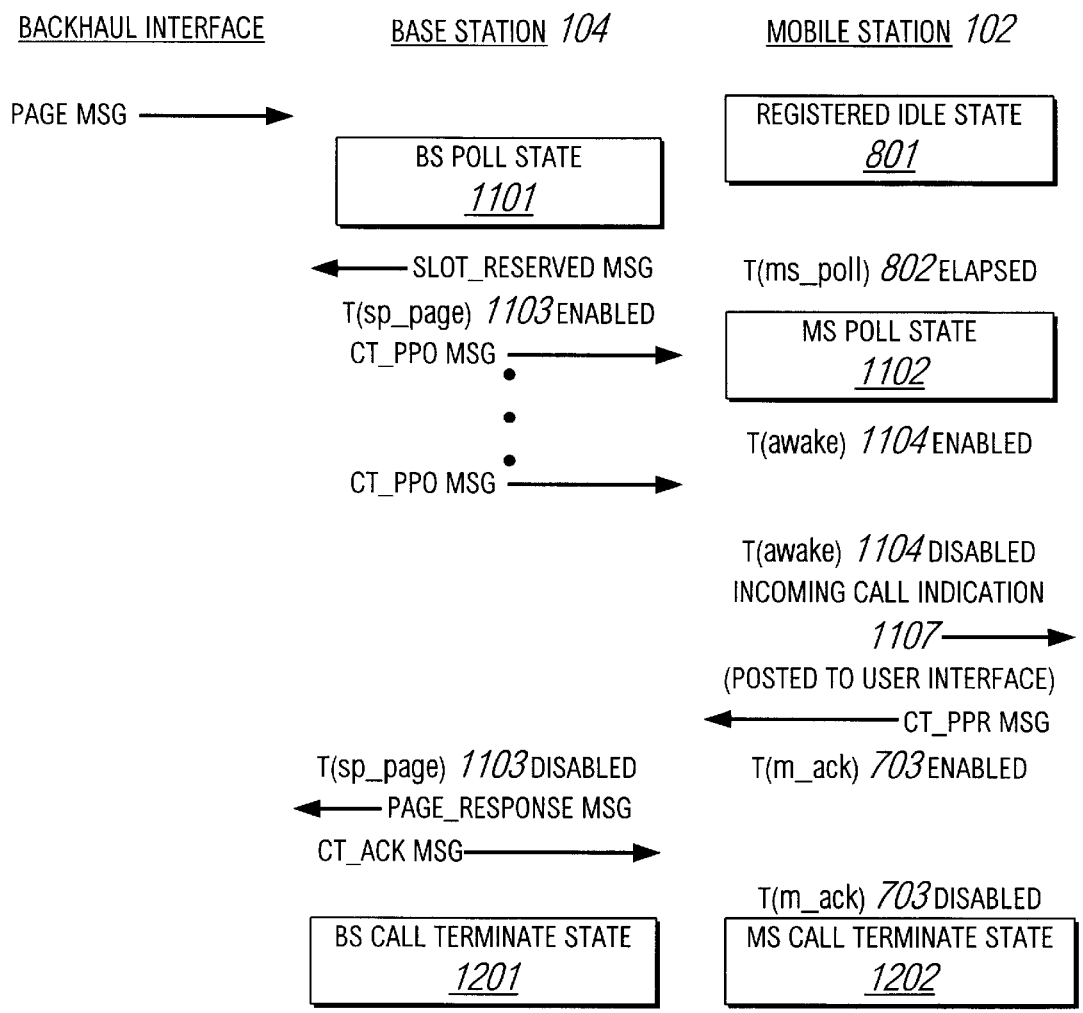
FIG. 11 is a diagram of a base station and a mobile station state processing and communication protocol for the paging of the mobile station for a call on the communication system.

A Paging protocol sequence, depicted in FIG. 11, is utilized by the communication system 101 when one mobile station wishes to place a call with another, or, alternatively, when the communication system 101 itself wishes to establish a call link with a mobile station. The base station transitions to the BS Poll state 1101 when it receives a Page message on the backhaul interface, indicating that the communication system 101 wishes to establish a call link with a designated mobile station. In the BS Poll state 1101, the base station dedicates a non-dedicated channel for the mobile station to be paged. The base station transmits a CT_PPO (Paging Poll) message for the mobile station in each time frame of the now dedicated channel, in effect, paging the mobile station, and waits for a CT_PPR (Paging Poll Response) message from the mobile station.

In a normal Paging protocol sequence, the designated mobile station responds to a CT_PPO message by transmitting a CT_PPR message to the base station. When the base station receives this CT_PPR message, it transmits a Page_Response message on the backhaul interface, indicating to the system controller 103 that the mobile station responded to the page. In a preferred embodiment, the base station also transmits a CT_ACK message to the mobile station, acknowledging the mobile station's CT_PPR message. The base station then transitions to the BS Call Terminate state 1201 for the dedicated channel, depicted in FIG. 12A.

In a preferred embodiment, while in the BS Poll state 1101 for a dedicated channel, the base station establishes a timer, T(sp_page) 1103, for the maximum time it will continue transmitting CT_PPO (Paging Poll) messages for the mobile station and waiting for a CT_PPR (Paging Poll Response) message in return. If the base station receives the expected CT_PPR message before T(sp_page) 1103 elapses, it disables T(sp_page). If, however, T(sp_page) elapses, the base station redesignates the dedicated channel as non-dedicated, and transitions to the General Poll state 401 for the now non-dedicated channel.

As previously described, once a mobile station transitions to the Registered Idle state 801, it periodically transitions to the MS Poll state 1102, as depicted in FIG. 8. In the MS Poll state 1102, depicted in FIG. 11, the mobile station polls the O-Interface to see if there is a CT_PPO (Paging Poll) message being transmitted to it. If the mobile station receives a CT_PPO message for it, it transmits a CT_PPR (Paging Poll Response) message to the base station. In a preferred embodiment, the mobile station posts an Incoming Call indication 1107 to its user interface and waits for a CT_ACK message response from the base station. When the mobile station receives this CT_ACK message, it transitions to the MS Call Terminate state 1202, depicted in FIG. 12A.

In a preferred embodiment, the mobile station establishes a timer, T(awake) 1104, for the maximum time it will continue to process in the MS Poll state 1102, polling for a CT_PPO message for it. If the mobile station receives a CT_PPO message for it before T(awake) 1104 elapses, it disables T(awake). If, however, T(awake) 1104 elapses, the mobile station transitions to the Registered Idle state 801.

Also in a preferred embodiment, the mobile station establishes a timer, T(m_ack) 703, for the maximum time it will wait for the expected CT_ACK message from the base station. If the mobile station receives a CT_ACK message before T(m_ack) 703 elapses, it disables T(m_ack), and, as previously discussed, transitions to the MS Call Terminate state 1202. If, however, T(m_ack) elapses, the mobile station executes a Lost Link Drop process, depicted in FIG. 10B.

In the Lost Link Drop process, the mobile station checks whether the base station is transmitting a CT_SPO (Specific Poll) message for it, which it users to resync to the base station with. If the mobile station receives a CT_SPO message for it at this time, it transitions to the Registered Idle state 801. In a preferred embodiment, the mobile station posts a Call Dropped indication 1106 to its user interface, prior to transitioning to the Registered Idle state 801. From the mobile station's perspective, the Paging protocol sequence is terminated at this time.

In a preferred embodiment, the mobile station enables a timer, T(resync) 1001, for the maximum time it will execute the Lost Link Drop process, checking whether the base station is transmitting it a CT_SPO message. If the mobile station receives a CT_SPO message for it before T(resync) 1001 elapses, it disables T(resync). If, however, T(resync) elapses, the mobile station determines that its service has been interrupted with the base station, and executes the MS Recover process, previously discussed in regards to the Registration protocol sequence, and depicted in FIG. 18. In a preferred embodiment in the MS Recover process during the Paging protocol sequence, the mobile station posts a Service Interrupted indication 1803 to its user interface, if its database indicates there is at least one untried base station candidate it may yet attempt to acquire a channel on, prior to transitioning to the MS Acquisition state 402.

Once the mobile station executes the MS Recover process while in the MS Poll state 1102, the Paging protocol sequence is terminated. From this point on, the mobile station attempts to acquire a channel on a base station which it can then use to register with the new base station. In essence, the mobile station now processes as if it has powered on, and must register with a base station, as previously described.

While the mobile station is in the MS Poll state 1102, it may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, in this case, the CT_PPR (Paging Poll Response) message, and continues to wait for a CT_ACK message response from the base station. If, however, any LeakyBucket counter indicates a maximum error count, the mobile station executes the Lost. Link Drop process, previously described, and depicted in FIG. 10B.

Figures 1, 12A:
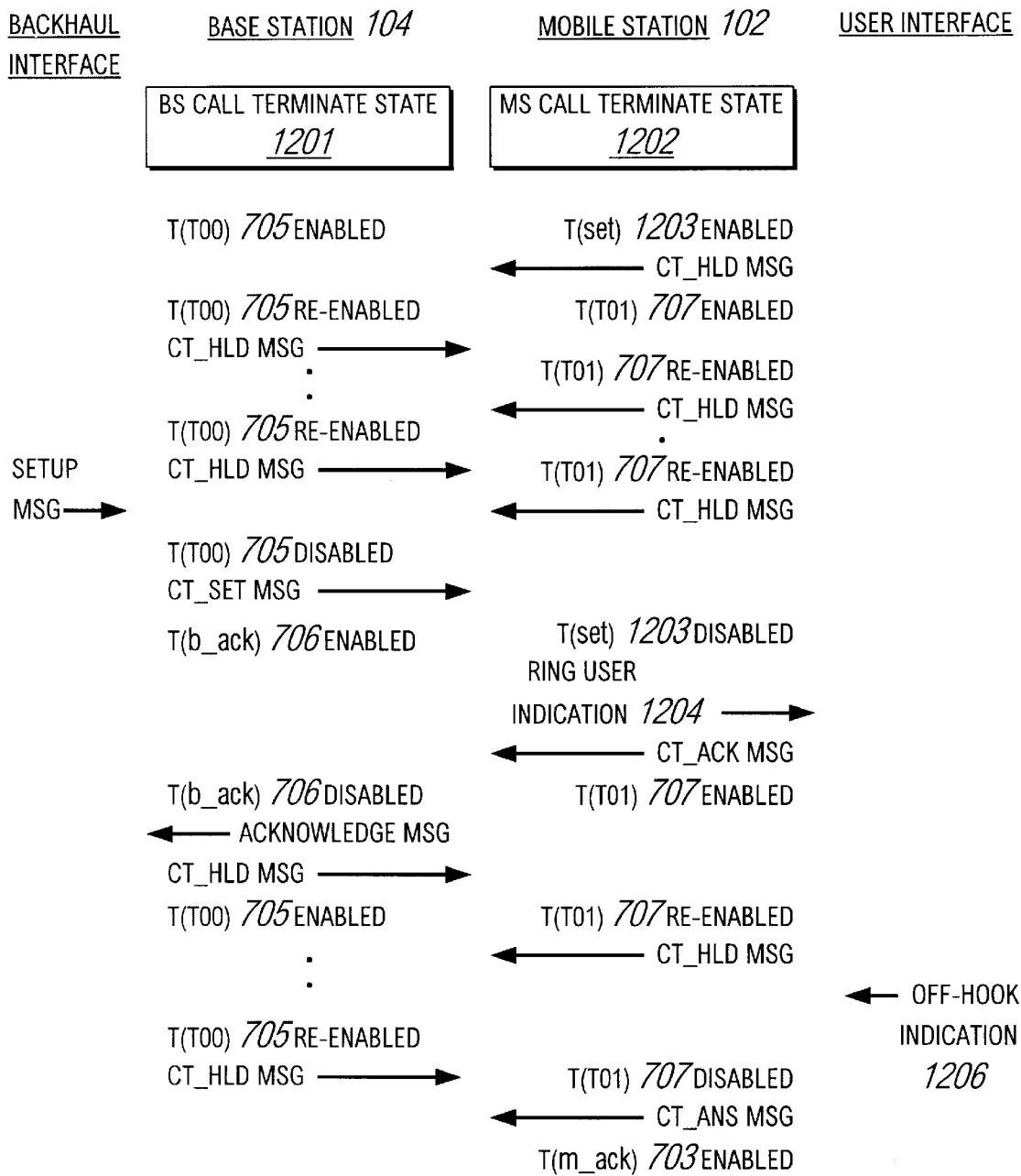
FIG. 12A is a diagram of a base station and a mobile station state processing and communication protocol for establishing a call link for the mobile station being called by another on the system.
Figures 2, 12A:
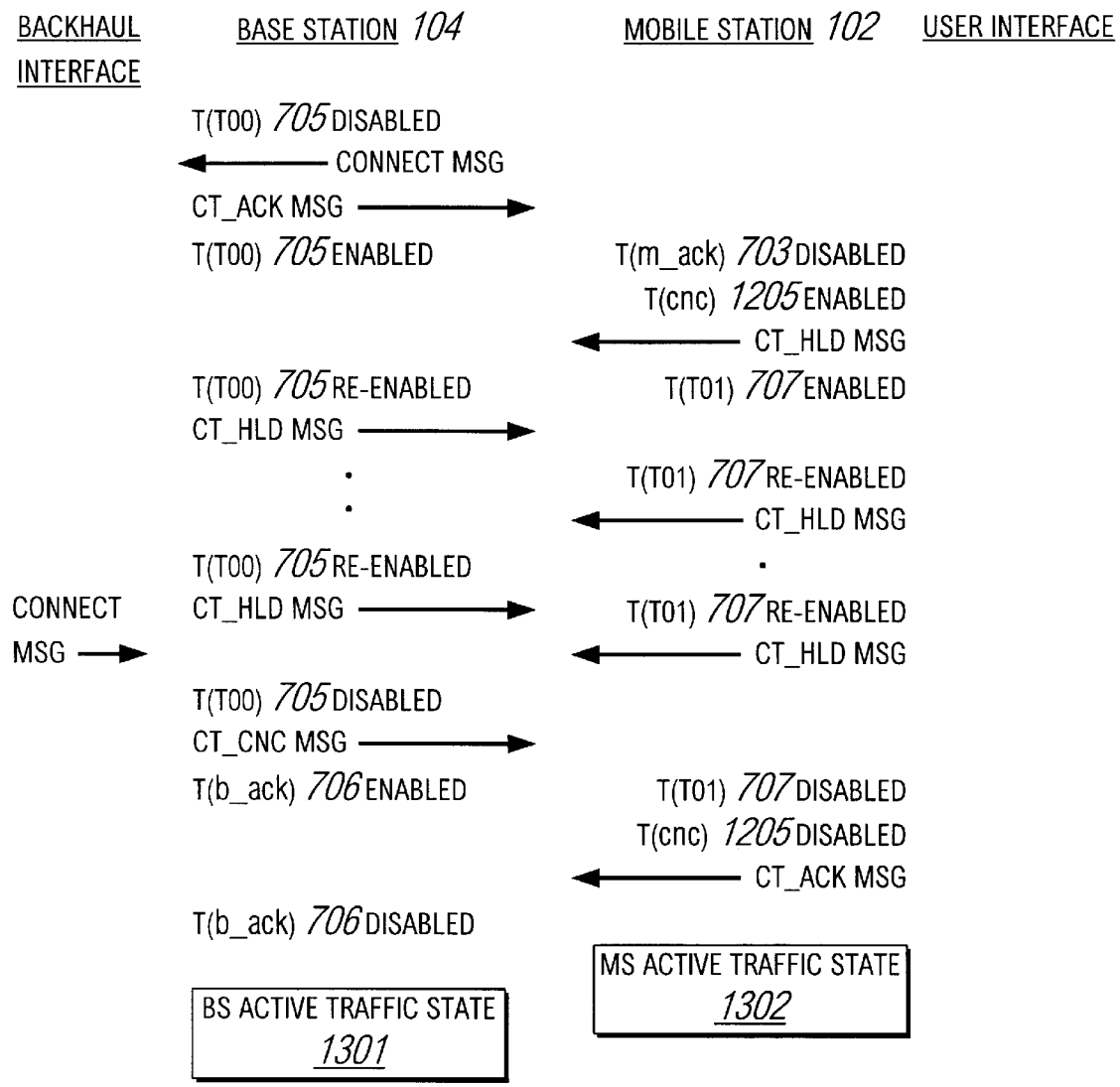

As previously described, once the base station successfully pages a mobile station, it transitions to the BS Call Terminate state 1201 for the dedicated channel, to process the Call Terminate protocol sequence for establishing a call link with the mobile station on the communication system 101. As depicted in FIG. 12A, in a normal Call Terminate protocol sequence, the base station receives a Setup message on the backhaul interface, in response to the Page_Response message it transmitted during the Paging protocol sequence, depicted in FIG. 11. The Setup message indicates that the communication system 101 is attempting to establish a call link between two, or more, mobile stations. The base station, on receiving this Setup message, transmits a CT_SET (Set) message to the mobile station, indicating that the mobile station should change the characteristics of its O-Interface service. The CT_SET message sent to the mobile station at this time also indicates that the mobile station should now ring its end user to pick up the phone. In a preferred embodiment, the base station then waits for a CT_ACK message response from the mobile station, indicating that the mobile station received the CT_SET message and is ringing its end user.

A mobile station processing the Call Terminate protocol sequence, for its part, once it transitions to the MS Call Terminate state 1202, waits for a CT_SET message from the base station. As depicted in FIG. 12A, in a preferred embodiment, the mobile station establishes a timer, T(set) 1203, for the maximum time it will wait for a CT_SET message. If the mobile station receives the expected CT_SET message before T(set) 1203 elapses, it disables T(set) and posts a Ring User indication 1204 on its user interface, to ring its end user, to notify him/her there is a call for them. The mobile station then waits for an Off-Hook indication 1206 from its user interface, indicating its end user picked up (i.e., answered) the phone. In a preferred embodiment, the mobile station also transmits a CT_ACK message to the base station, acknowledging the CT_SET message.

If T(set) 1203 elapses, the mobile station transitions to the Registered Idle state 801. In a preferred embodiment, the mobile station posts a Call Dropped indication 1106 to its user interface, prior to transitioning to the Registered Idle state 801.

As previously discussed, in a preferred embodiment, the mobile station transmits a CT_ACK message to the base station in response to the CT_SET message. For its part, when the base station receives this CT_ACK message, it transmits an Acknowledge message on the backhaul interface to the system controller 103, indicating that the mobile station received the CT_SET message and is ringing its end user. The base station then waits for a CT_ANS (Answer) message from the mobile station, indicating the mobile station's end user answered the phone.

Figure 12B:
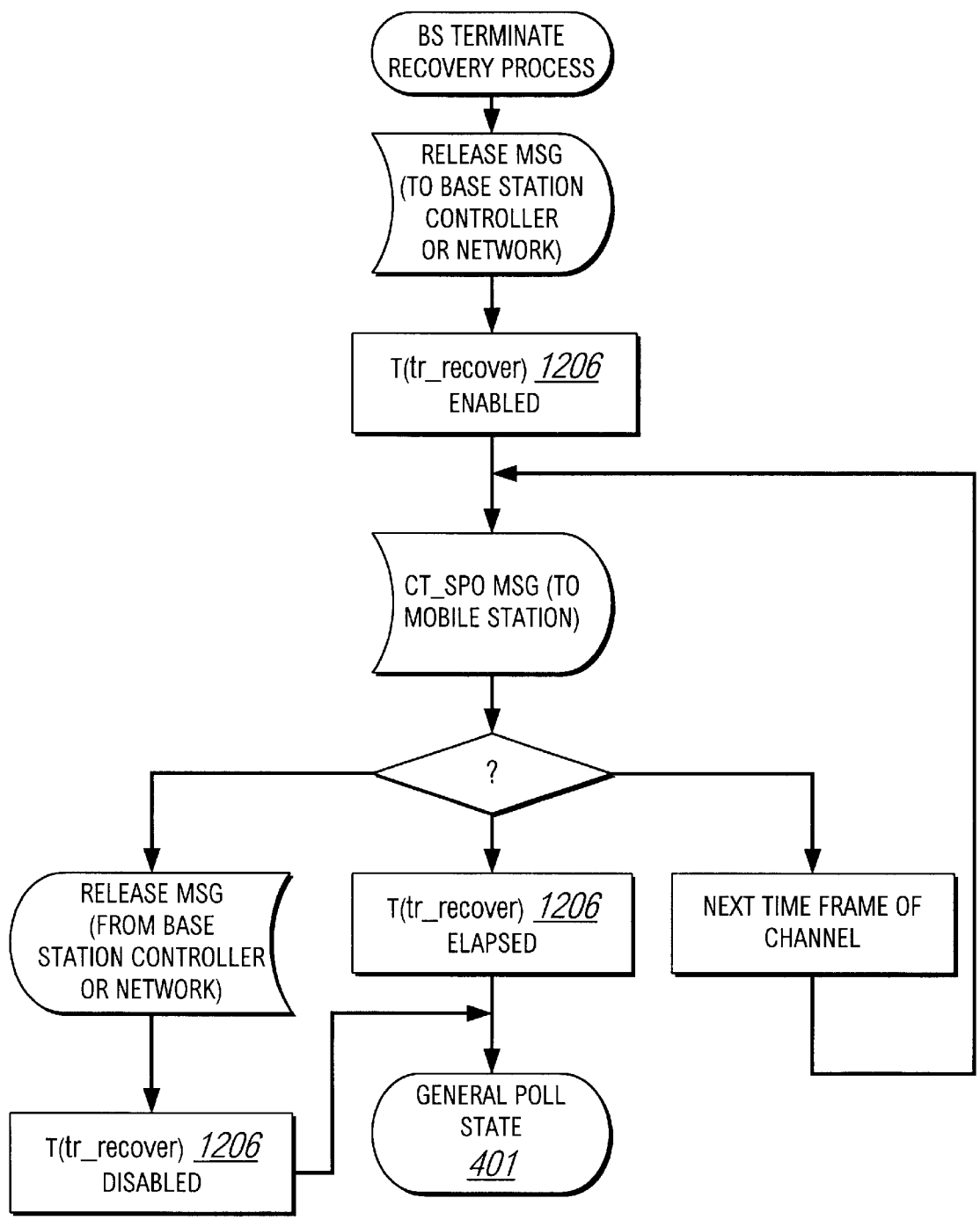
FIG. 12B is a diagram of a base station protocol processing when it loses synchronization with the mobile station it is attempting to establish a call link on the communication system for, for a call initiated by another on the system.

In a preferred embodiment, the base station establishes a timer, T(b_ack) 706, for the maximum time it will wait for a CT_ACK message from the mobile station. If the base station receives the expected CT_ACK message before T(b_ack) 706 elapses, it disables T(b_ack). If, however, T(b_ack) elapses, the base station presumes it is out of sync with the mobile station, and executes a BS Terminate Recovery process, depicted in FIG. 12B.

In the BS Terminate Recovery process, the base station transmits a Release message on the backhaul interface to the system controller 103, indicating it is releasing the dedicated channel, and, thus, ending the Call Terminate protocol sequence for the mobile station. The base station, also at this time, transmits a CT_SPO (Specific Poll) message for the mobile station in each time frame of the channel, to provide the mobile station a message to resync to it with. The base station establishes a timer, T(tr_recover) 1206, for the maximum time it will transmit CT_SPO messages for the mobile station in the channel, one per time frame. When T(tr_recover) 1206 elapses, the base station redesignates the dedicated channel as non-dedicated, and transitions to the General Poll state 401 for the now non-dedicated channel.

While executing the BS Terminate Recovery process in the BS Call Terminate state 1201, the base station may receive a Release message on the backhaul interface, indicating that the system controller 103 wishes the designated call link be terminated. Upon receiving a Release message at this time, the base station redesignates the dedicated channel as non-dedicated, disables T(tr_recover) 1206, and transitions to the General Poll state 401 for the now non-dedicated channel.

In a normal Call Terminate protocol sequence, once the mobile station receives an Off-Hook indication 1206 on its user interface, it transmits a CT_ANS (Answer message) to the base station. Upon receiving the CT_ANS message, the base station transmits a Connect message to the system controller 103. Both the CT_ANS message and the Connect message indicate that the mobile station end user answered the call. In a preferred embodiment, upon receiving the CT_ANS message, the base station transmits a CT_ACK message to the mobile station, acknowledging the CT_ANS message. The base station then begins to wait for a Connect message from the system controller 103, indicating the call link has been established on the communication system 101.

In a preferred embodiment, the mobile station, upon transmitting the CT_ANS message to the base station, establishes a timer, T(m_ack) 703, for the maximum time it will wait for a CT_ACK message response from the base station. If the mobile station receives the expected CT_ACK message before T(m_ack) 703 elapses, it disables T(m_ack), and then waits for a CT_CNC (Connection Complete) message from the base station, indicating the call link has been established on the communication system 101. If, however, T(m_rack) elapses, the mobile station presumes it is out of sync with the base station, and executes the Lost Link Drop process, depicted in FIG. 10B. In the Lost Link Drop process, as previously described in regards to the Paging protocol sequence, the mobile station checks whether the base station is transmitting it a CT_SPO (Specific Poll) message, which it uses to resync to the base station with. If the mobile station receives a CT_SPO message for it at this time, it transitions to the Registered Idle state 801. In a preferred embodiment, the mobile station posts a Call Dropped indication 1106 to its user interface, prior to transitioning to the Registered Idle state 801. From the mobile station's perspective, the Call Terminate protocol sequence is now terminated.

Figure 10A:
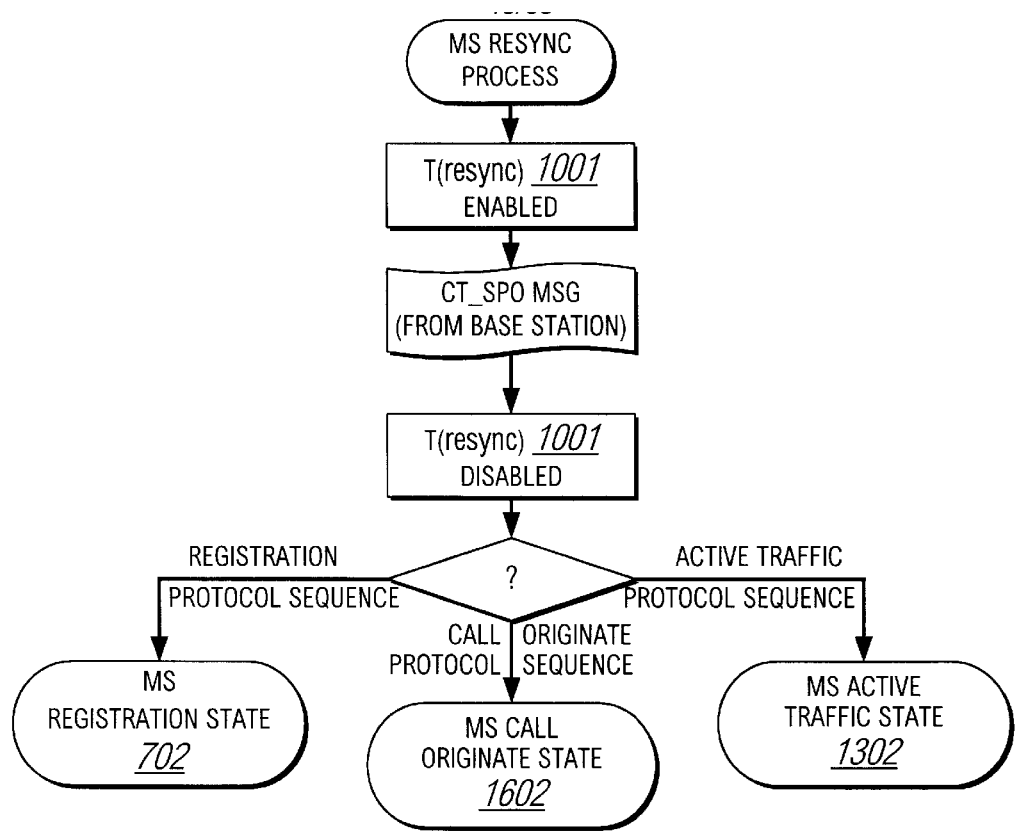
FIG. 10A is a diagram of a mobile station protocol processing for the successful resynchronization of the mobile station to the base station, where the mobile station then continues another protocol sequence with the base station.
Figure 10B:
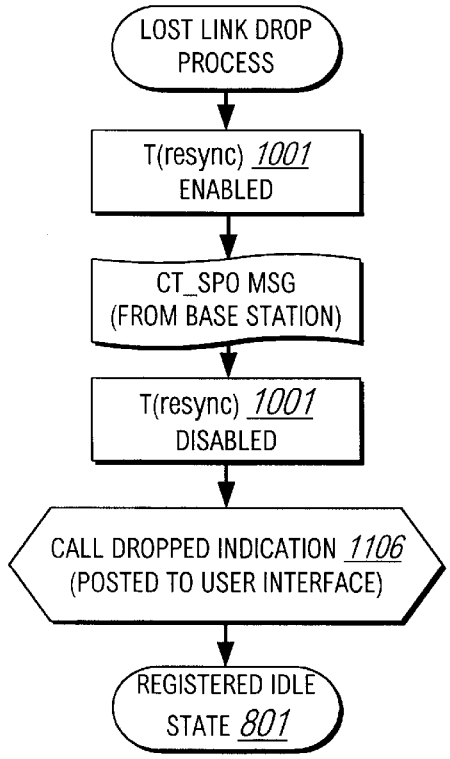
FIG. 10B is a diagram of a mobile station protocol processing for the successful resynchronization of the mobile station to the base station, where the mobile station then terminates any other protocol sequence with the base station.

In a preferred embodiment, as seen in FIG. 10B, the mobile station enables a timer, T(resync) 1001, for the maximum time it will execute the Lost Link Drop process, checking whether the base station is transmitting it a CT_SPO message. If the mobile station receives a CT_SPO message for it before T(resync) 1001 elapses, it disables T(resync). If, however, T(resync) elapses, the mobile station determines that its service has been interrupted with the base station, and executes the MS Recover process, previously described in regards to the Registration protocol sequence, and depicted in FIG. 18. In a preferred embodiment in the MS Recover process during the Call Terminate protocol sequence, the mobile station posts a Service Interrupted indication 1803 to its user interface, if its database indicates there is at least one untried base station candidate it may yet attempt to acquire a channel on, prior to transitioning to the MS Acquisition state 402.

Once the mobile station executes the MS Recover process while in the MS Terminate state 1202, the Call Terminate protocol sequence is terminated. From this point on, the mobile station attempts to acquire a channel on a base station which it can then use to register with the new base station. In essence, the mobile station now processes as if it has powered on and must register with a base station, as previously described.

In a preferred embodiment in the normal Call Terminate protocol sequence, once the mobile station receives the expected CT_ACK message, it establishes a timer, T(cnc) 1205, for the maximum time it will wait for a CT_CNC message from the base station. If the mobile station receives a CT_CNC message before T(cnc) 1205 elapses, it disables T(cnc), and transitions to the MS Active Traffic state 1302, where it processes the Active Traffic protocol sequence. In a preferred embodiment, the mobile station transmits a CT_ACK message to the base station, prior to transitioning to the MS Active Traffic state 1302, acknowledging the CT_CNC message.

If, however, T(cnc) 1205 elapses, the mobile station transitions to the Registered Idle state 801. In a preferred embodiment, the mobile station posts a Call Dropped indication 1106 to its user interface, prior to transitioning to the Registered Idle state 801.

Once a call link has been established on the communication system 101, the base station is sent a Connect message on the backhaul interface. In response to this Connect message, the base station transmits a CT_CNC (Connection Complete) message to the mobile station, indicating that a call link has been established, and actual bearer data may now be transmitted (i.e., the end user of the mobile station may now communicate with another on the communication system 101). In a preferred embodiment, the base station then waits for a CT_ACK message response from the mobile station. When the base station receives this CT_ACK message, it transitions to the BS Active Traffic state 1301 for the dedicated channel, where it processes the Active Traffic protocol sequence.

In a preferred embodiment, the base station establishes a timer, T(b_ack) 706, for the maximum time it will wait for a CT_ACK message from the mobile station. The base station disables T(b_ack) 706 if it receives the expected CT_ACK message. If T(b_ack) elapses, however, the base station presumes it is out of sync with the mobile station, and executes the BS Terminate Recovery process, previously discussed, and depicted in FIG. 12B.

As depicted in FIG. 12A, in a preferred embodiment in the BS Call Terminate state 1201, while waiting for a Setup message and a Connect message on the backhaul interface and a CT_ANS (Answer) message from the mobile station, the base station transmits a CT_HLD (Hold) message to the mobile station in each time frame of the dedicated channel in which it has no other message to transmit to the mobile station. The mobile station, for its part, while in the MS Call Terminate state 1202 waiting for a CT_SET (Set) message and a CT_CNC (Connection Complete) message from the base station and an Off-Hook indication 1206 on its user interface, transmits a CT_HLD message to the base station in each time frame of the dedicated channel in which it has no other message to transmit to the base station.

In a preferred embodiment, while the base station is in the BS Call Terminate state 1201, transmitting and receiving CT_HLD messages on the O-Interface, it establishes a timer, T(T00) 705, for the maximum time it will wait for a CT_HLD message. The base station re-establishes T(T00) 705 each time it receives an expected CT_HLD message, and disables T(T00) when it receives the Setup message, the CT_ANS message, and the Connect message, respectively. If T(T00) elapses, the base station presumes it is out of sync with the mobile station, and executes the BS Terminate Recovery process, previously discussed, and depicted in FIG. 12B.

In a preferred embodiment, while the mobile station is in the MS Call Terminate state 1202, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives the CT_SET message, the Off-Hook indication 1206, and the CT_CNC message, respectively. If T(T01) elapses, the mobile station presumes it is out of sync with the base station, and executes the Lost Link Drop process, previously described for the MS Call Terminate state 1202, and depicted in FIG. 10B.

While processing in the BS Call Terminate state 1201 for a dedicated channel, the base station may receive an unexpected or erroneous message (previously defined) on the O-Interface. In a preferred embodiment, if the base station receives either an unexpected or erroneous message at this time, it executes a Leaky Bucket process, as previously described. If no LeakyBucket counter indicates a maximum error count has been reached, the base station re-transmits the last message it transmitted to the mobile station, and continues processing the normal Call Terminate protocol sequence from that point. If, however, any LeakyBucket counter indicates a maximum error count, the base station executes the BS Terminate Recovery process, previously described, and depicted in FIG. 12B.

While processing in the MS Call Terminate state 1202, the mobile station may also receive an unexpected or erroneous message (previously defined) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station re-transmits the last message it transmitted to the base station, and continues processing the normal Call Terminate protocol sequence from that point. If, however, any LeakyBucket counter indicates a maximum error count, the mobile station executes the Lost Link Drop process, as previously described for the MS Call Terminate state 1202, and depicted in FIG. 10B.

While in the BS Call Terminate state 1201, processing the normal Call Terminate protocol sequence, the base station may receive a Release message on the backhaul interface, indicating that the system controller 103 wishes the designated call be terminated. Upon receiving a Release message at this time, the base station transitions to the BS System Call Release state 1501, discussed below, and depicted in FIG. 15.

Figure 15:
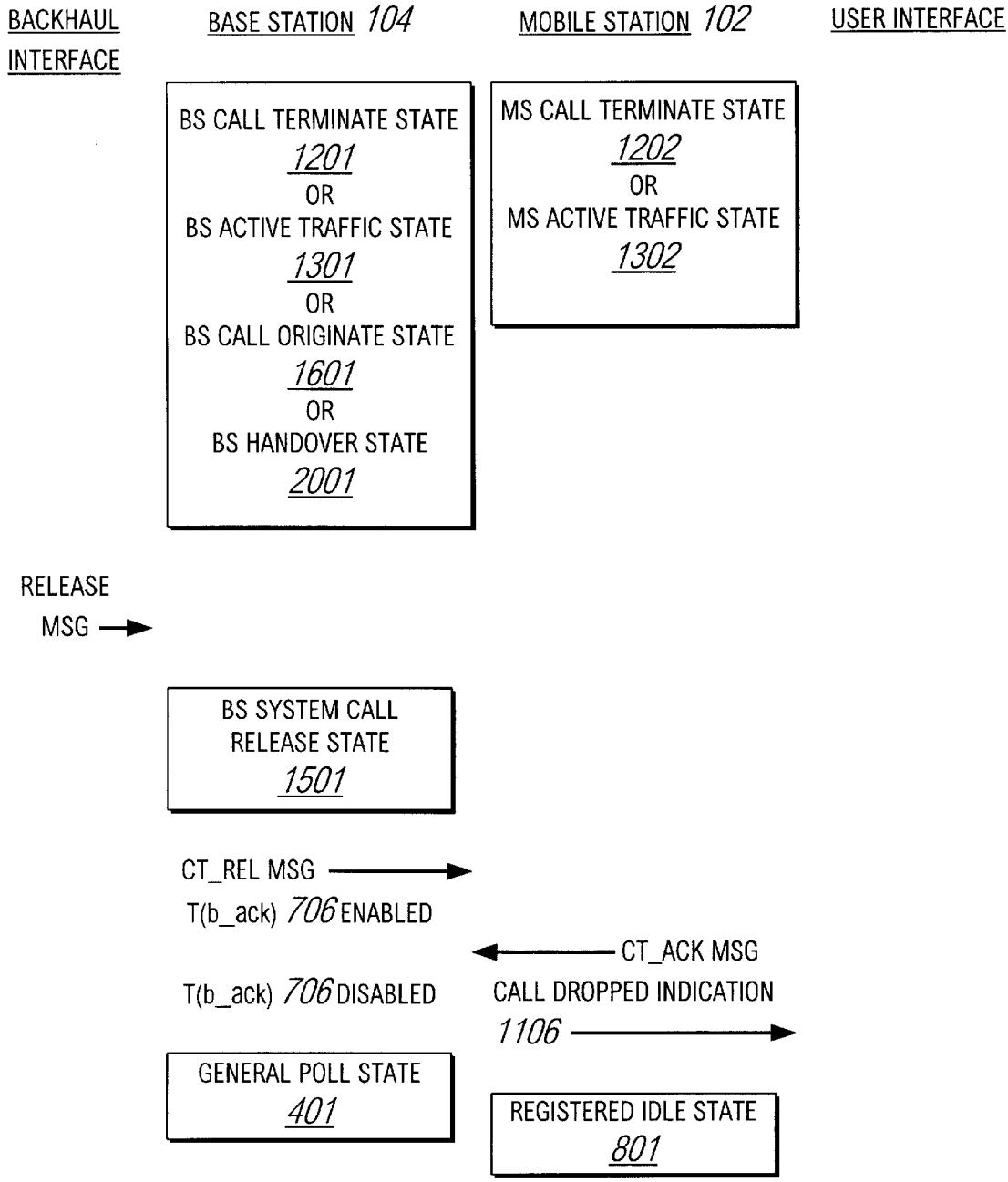
FIG. 15 is a diagram of a base station and a mobile station state processing and communication protocol when the communication system releases the mobile station's call link on the system.

While in the MS Call Terminate state 1202, the mobile station may receive a CT_REL (Release) message from the base station, indicating that the system controller 103 wishes its call be terminated. Upon receiving a CT_REL message at this time, the mobile station transitions to the Registered Idle state 801, as depicted in FIG. 15. In a preferred embodiment, the mobile station transmits a CT_ACK message to the base station, acknowledging the CT_REL message, and posts a Call Dropped indication 1106 on its user interface, prior to transitioning to the Registered Idle state 801.

Figure 14:
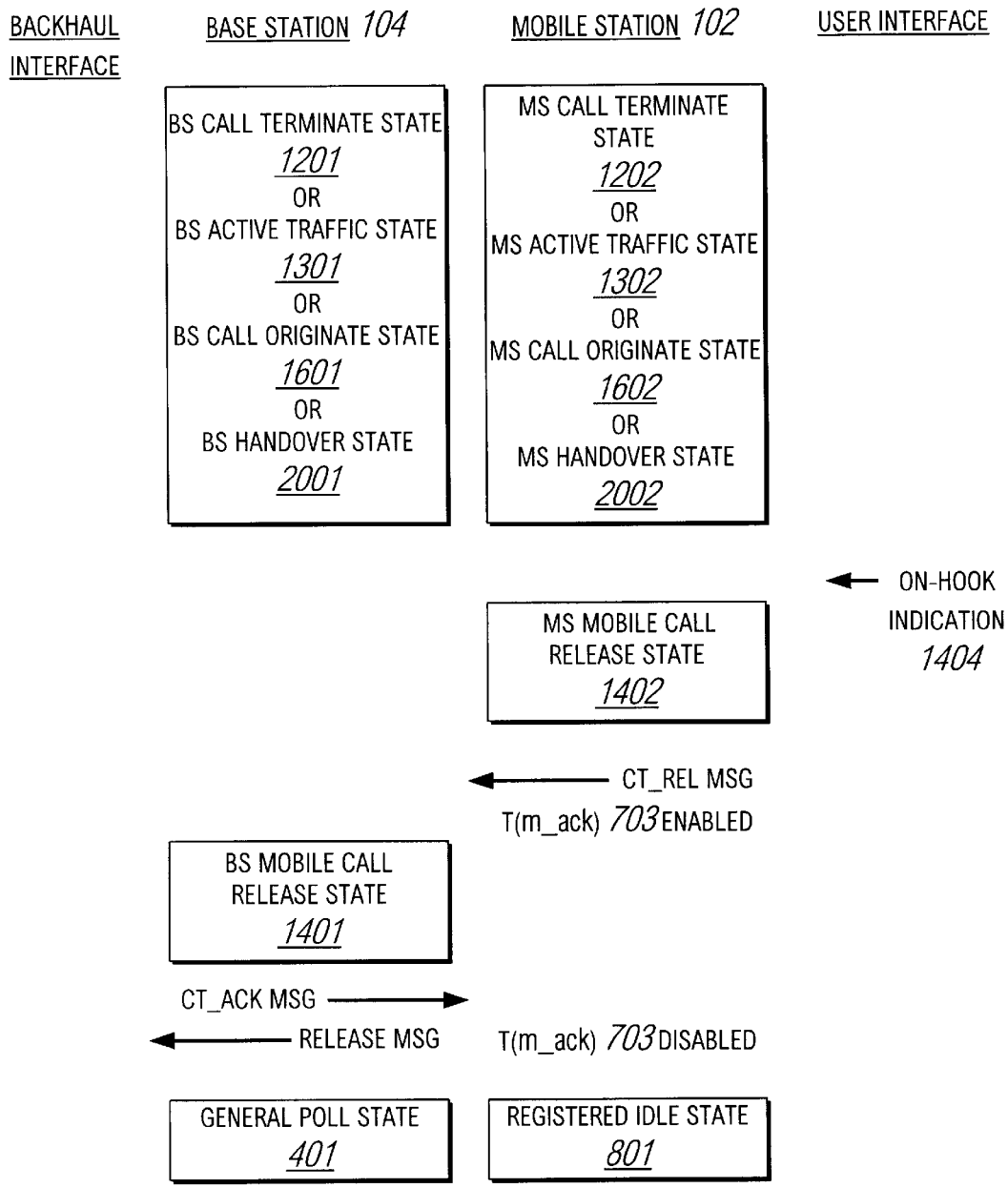
FIG. 14 is a diagram of a base station and a mobile station state processing and communication protocol when a mobile station's end user hangs up the phone.

While processing in the MS Call Terminate state 1202, the mobile station may receive an On-Hook indication 1404 on its user interface, indicating its end user terminated the call (i.e., hung up). Upon receiving an On-Hook indication 1404 at this time, the mobile station transitions to the MS Mobile Call Release state 1402, discussed below, and depicted in FIG. 14.

While processing in the BS Call Terminate state 1201, the base station may receive a CT_REL (Release) message on the O-Interface, indicating the mobile station's end user terminated the call. Upon receiving a CT_REL message at this time, the base station transitions to the BS Mobile Call Release state 1401, discussed below, and depicted in FIG. 14.

Once a call link has been established on the communication system 101, either through the Call Terminate protocol sequence, discussed above, or the Call Originate protocol sequence, discussed below, the base station transitions to the BS Active Traffic state 1301, depicted in FIG. 13A, and the mobile station transitions to the MS Active Traffic state 1302, also depicted in FIG. 13A.

In the BS Active Traffic state 1301, the base station receives bearer data in the user portion 205 of the time frames of the dedicated channel, from the mobile station, which it then transmits on the backhaul interface to the system controller 103. Also, in the BS Active Traffic state 1301, the base station receives bearer data on the backhaul interface, which it then transmits on the O-Interface to the mobile station in the base portion 206 of the time frames of the dedicated channel.

In the MS Active Traffic state 1302, the mobile station accepts bearer data from its user interface, which it then transmits on the O-Interface to the base station in the user portion 205 of the time frames of the dedicated channel. Also, in the MS Active Traffic state 1302, the mobile station receives bearer traffic from the base station in the base portion 206 of the time frames of the dedicated channel, which it then posts to its user interface.

Bearer data transmitted between a base station and a mobile station is organized into sequential data packets, in order that any one data packet can be transmitted in the base or user portion of a time frame.

Throughout the following discussion of the Active Traffic protocol sequence, an "original" base station is the base station the mobile station was processing the Active Traffic protocol sequence with when it tried to find another base station, to either gather statistics on, as discussed below regarding the Look Base process, or to acquire a channel on, for a Handover protocol sequence, also as discussed below.

While processing in the BS Active Traffic state 1301, the base station may receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station continues processing the normal Active Traffic protocol sequence from that point, transmitting and receiving the next sequential data packets on the O-Interface. If, however, any LeakyBucket counter indicates a maximum error count, the base station executes a BS Specific Poll Recover process, depicted in FIG. 17.

In the BS Specific Poll Recover process, as previously discussed regarding the BS Registration state 701, the base station transmits a CT_SPO (Specific Poll) message for the mobile station in each time frame of the dedicated channel, to provide the mobile station a message to resync to. If the base station receives a data packet from the mobile station at this time, it resumes the normal Active Traffic protocol sequence, described above, from that point.

In a preferred embodiment, the base station enables a timer, T(sp_recover) 1701, for the maximum time it will transmit CT_SPO messages for the mobile station and wait for a data packet from the mobile station. If the base station receives a data packet from the mobile station before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

While executing the BS Specific Poll Recover process in the BS Active Traffic state 1301, the base station may receive a Release message transmitted on the backhaul interface, indicating the system controller 103 wishes the designated call link be terminated. Upon receiving a Release message at this time, the base station redesignates the dedicated channel as non-dedicated, disables Timer(sp_recover) 1701, and then transitions to the General Poll state 401 for the now non-dedicated channel.

While executing the normal Active Traffic protocol sequence in the BS Active Traffic state 1301, the base station may also receive a Release message on the backhaul interface. In this case, the base station transitions to the BS System Call Release state 1501, discussed below, and depicted in FIG. 15.

While in the MS Active Traffic state 1302, the mobile station may receive a CT_REL (Release) message from the base station, indicating that the system controller 103 wishes its call link be terminated. Upon receiving a CT_REL message at this time, the mobile station transitions to the Registered Idle state 801, as depicted in FIG. 15. In a preferred embodiment, the mobile station transmits a CT_ACK message to the base station, acknowledging the CT_REL message, and posts a Call Dropped indication 1106 on its user interface, prior to transitioning to the Registered Idle state 801.

While processing in the MS Active Traffic state 1302, the mobile station may also receive an On-Hook indication 1404 on its user interface, indicating its end user terminated the call. Upon receiving an On-Hook indication 1404 at this time, the mobile station transitions to the MS Mobile Call Release state 1402, discussed below, and depicted in FIG. 14.

While processing in the BS Active Traffic state 1301, the base station may receive a CT_REL (Release) message on the O-Interface, indicating the mobile station's end user terminated the call. Upon receiving a CT_REL message at this time, the base station transitions to the BS Mobile Call Release state 1401, discussed below, and depicted in FIG. 14.

While processing in the MS Active Traffic state 1302, the mobile station may receive an unexpected or erroneous message (previously described) on the O-Interface. In a preferred embodiment, if the mobile station receives an unexpected or erroneous message at this time, it executes a Leaky Bucket process, as previously described. If no LeakyBucket counter indicates a maximum error count has been reached, the mobile station continues processing the normal Active Traffic protocol sequence from that point, transmitting and receiving the next sequential data packets on the O-Interface. If, however, any LeakyBucket counter indicates a maximum error count, the mobile station determines its call link with the base station has failed, and, thus, checks its database to determine if there is an untried base station candidate it can attempt to acquire a channel on. If no, the mobile station performs the MS Resync process, depicted in FIG. 10A.

In the MS Resync process, as previously described in regards to the MS Registration state 702, the mobile station checks whether the base station is transmitting it a CT_SPO (Specific Poll) message. In a preferred embodiment, while executing the MS Resync process in the MS Active Traffic state 1302, the mobile station suspends transmitting and receiving bearer data on the O-Interface. If the mobile station receives a CT_SPO message for it at this time, it transmits the next sequential data packet to be output to the base station, and resumes the normal Active Traffic protocol sequence from this point.

In a preferred embodiment, the mobile station enables a timer, T(resync) 1001, for the maximum time it will execute the MS Resync process, checking whether the base station is transmitting it a CT_SPO message. If the mobile station receives a CT_SPO message for it before T(resync) 1001 elapses, it disables T(resync). If, however, T(resync) elapses, the mobile station transitions to the Non-Registered Idle state 901. In a preferred embodiment, the mobile station posts a Service Unavailable/No Base Station indication 1804 on its user interface, prior to transitioning to the Non-Registered Idle state 901.

Figure 13A:
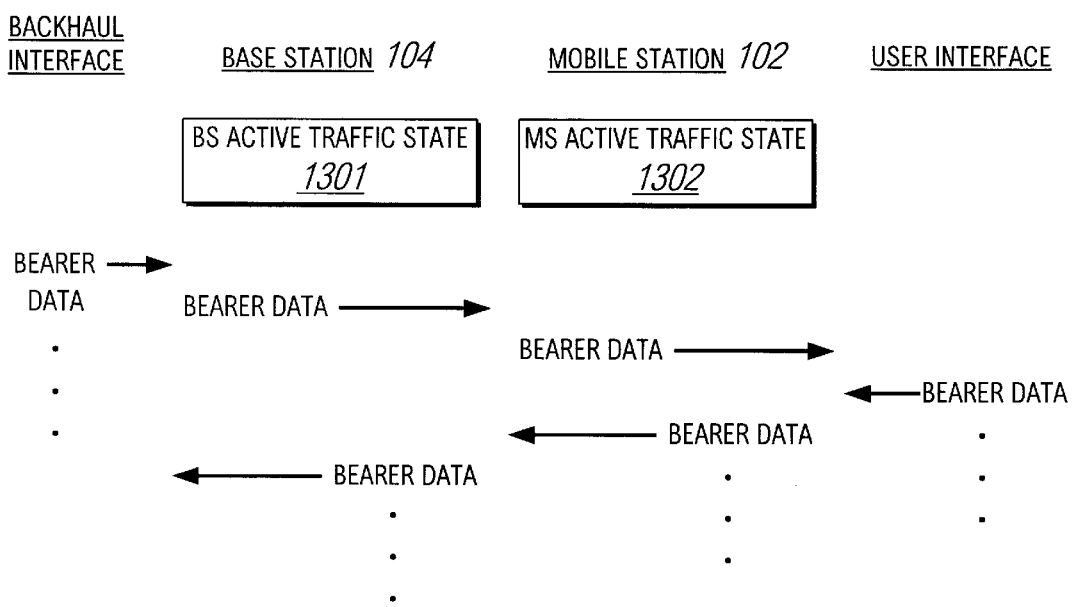
FIG. 13A is a diagram of a base station and a mobile station communication protocol for bearer data transmission.
Figure 13B:
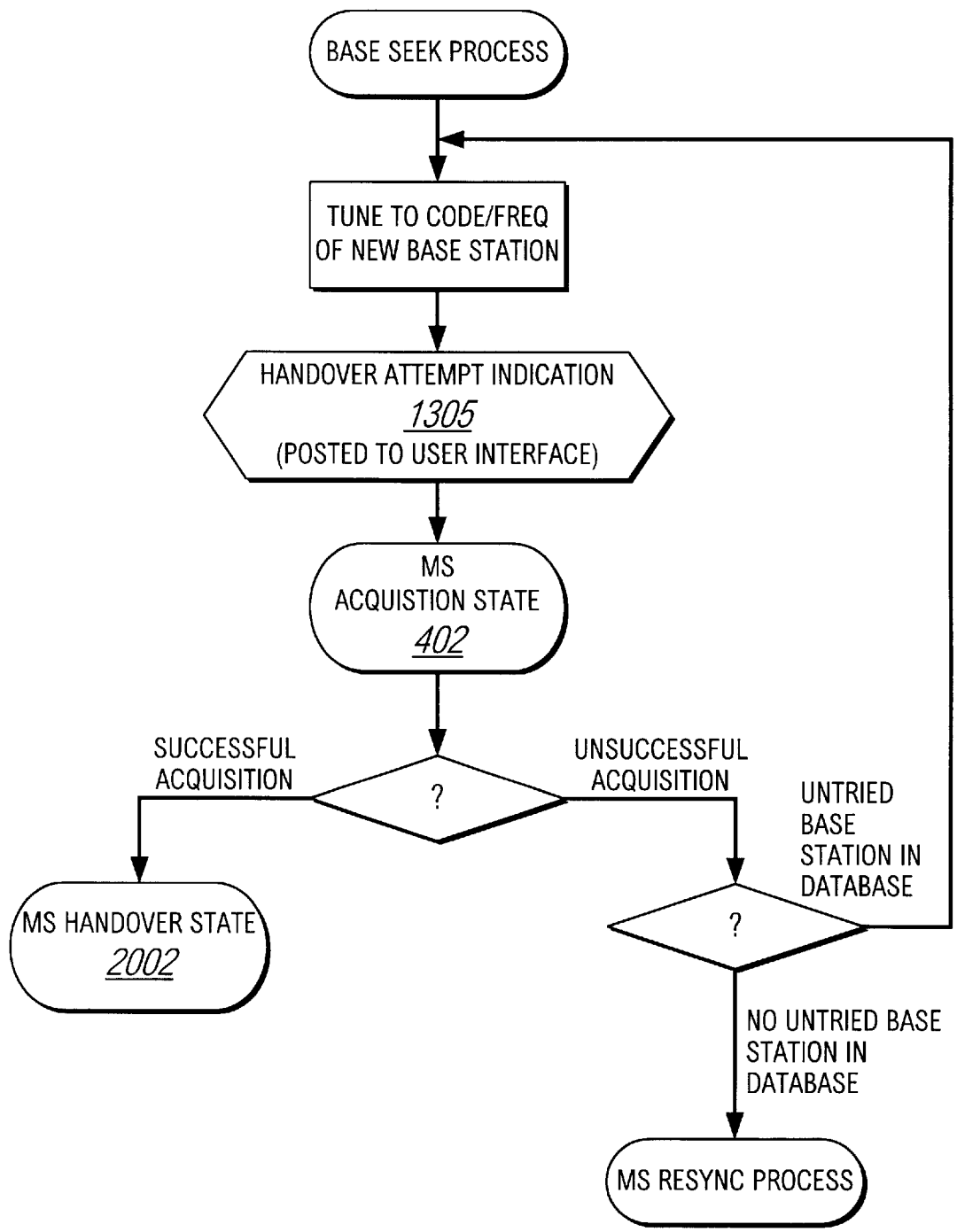
FIG. 13B is a diagram of a mobile station state processing when it determines to hand its current call over to another base station in the communication system.

If there is at least one untried base station candidate indicated in the mobile station's database that it can attempt to acquire a channel on, it executes a Base Seek process, depicted in FIG. 13B. In the Base Seek process, the mobile station tunes to the code/frequency of a new, untried base station's transmission. In a preferred embodiment, the mobile station prioritizes the base station candidates, based on their signal strength, frame error rate and channel availability, and now tunes to the untried base station candidate with the highest priority. The mobile station then transitions to the MS Acquisition state 402, to attempt to acquire a channel on this new base station, for a Handover protocol sequence. In a preferred embodiment, the mobile station posts a Handover Attempt indication 1305 on its user interface, and ceases transmitting or receiving bearer data to/from the original base station, prior to transitioning to the MS Acquisition state 402.

If the mobile station successfully acquires a channel on this new base station, it transitions to the MS Handover state 2002, discussed below, to process a Handover protocol sequence. If, however, the mobile station fails to acquire a channel on this new base station, it re-executes the Base Seek process in the MS Active Traffic state 1302, until it either successfully acquires a channel on a base station, or there are no base station candidates remaining for it to attempt an Acquisition protocol sequence with. If the mobile station acquires a channel on any new base station, as previously discussed, it transitions to the MS Handover state 2002. If, however, the mobile station fails to acquire a channel on any base station noted in its database, it executes the MS Resync process with the original base station, as previously discussed in regards to the MS Active Traffic state 1302, and depicted in FIG. 10A.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

Figure 19:
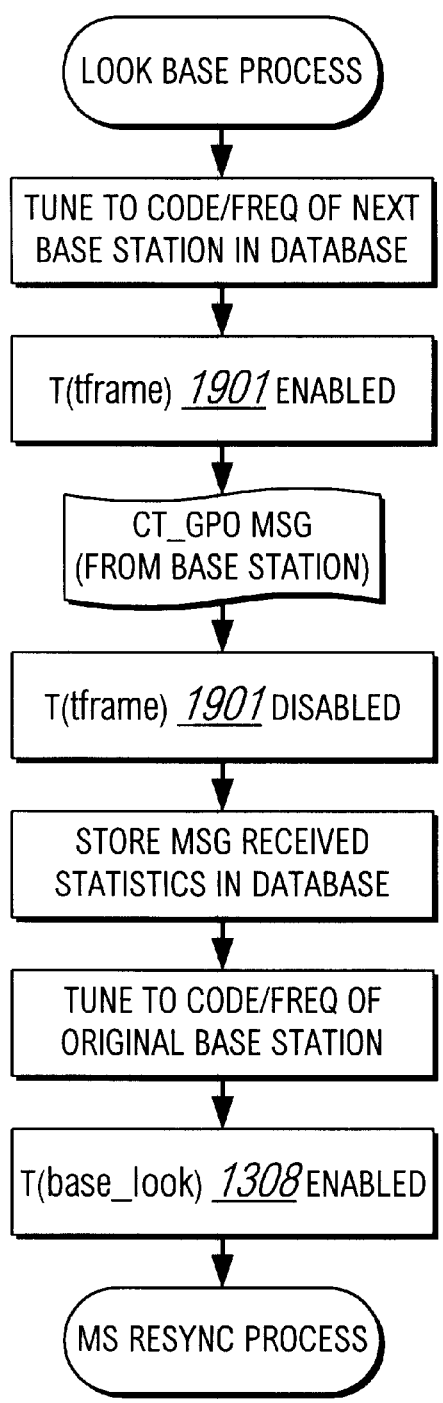
FIG. 19 is a diagram of the mobile station state processing when its call link quality falls below a first threshold during an established call protocol processing.

In the MS Active Traffic state 1302, while the mobile station is receiving bearer data from the base station, it measures the received signal quality of its call link. This value, along with the current frame error rate and other metrics, provides an indication of the call link quality. The mobile station uses two threshold values, Threshold Low 1306 and Threshold High 1307, each of which represents a call link quality level. While executing an Active Traffic protocol sequence with a particular base station, the first time the mobile station determines its call link quality has dropped below Threshold Low 1306, it executes a Look Base process, depicted in FIG. 19.

In the Look Base process, the mobile station checks its database and tunes to the code/frequency transmission of the next base station candidate indicated therein. The mobile station then waits to receive an error-free message from this new base station. In a preferred embodiment, the mobile station only looks for a CT_GPO (General Poll) message from the new base station, as CT_GPO messages are associated with the maximum signal strength a base station can transmit. Also in a preferred embodiment, while executing the Look Base process, the mobile station suspends processing the normal Active Traffic protocol sequence of receiving and transmitting bearer data on the O-Interface.

During the Look Base process, the mobile station establishes a timer, T(tframe) 1901, for the maximum time it will stay tuned to the new base station, looking for an error-free message transmitted from it. If the mobile station receives such an error-free message before T(tframe) 1901 elapses, it disables T(tframe), and records statistics regarding the signal strength, and other information contained in the received message, in its database. If the mobile station receives an error-free message, or, alternatively, T(tframe) elapses, it re-tunes to the code/frequency transmission of the original base station, and executes the MS Resync process, described above in regards to the MS Active Traffic state 1302, and depicted in FIG. 10A, to resync to the original base station, in order to resume the normal Active Traffic protocol sequence.

If the mobile station successfully resyncs with the original base station, it resumes the normal Active Traffic protocol sequence. If, however, the mobile station fails to resync with the original base station at this time, it checks its database to see if there is at least one untried base station candidate it may acquire a channel on, and, thus, resume its current call on. If yes, the mobile station executes the Base Seek process, previously described in regards to the MS Active Traffic state 1302, and depicted in FIG. 13B.

If there are no untried base station candidates it may acquire a channel on, or it subsequently fails to acquire a channel on any of the base stations indicated in its database, the mobile station executes the MS Resync process once again, with the original base station, as previously described in regards to the MS Active Traffic state 1302, and depicted in FIG. 10A.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

In the MS Active Traffic state 1302, processing the Active Traffic protocol sequence with a particular base station, each time the mobile station executes the Look Base process, and then successfully recovers the call link with the original base station, it establishes a timer, T(base_look) 1308, for the maximum time it will wait before it can execute the Look Base process again, for the particular call link.

Thereafter, when T(base_look) 1308 elapses, the mobile station checks to see if the current call link quality is above Threshold Low 1306. If no, the mobile station once again executes the Look Base process, previously described, and depicted in FIG. 19. If, however, the current call link quality is above Threshold Low 1306, the mobile station re-establishes T(base_look) and continues the normal Active Traffic protocol sequence.

If the mobile station's call link quality falls below Threshold High 1307, it checks its database to determine if there is an untried base station candidate it can attempt to acquire a channel on. If no, the mobile station executes the MS Resync process with the original base station, discussed above in regards to the MS Active Traffic state 1302, and depicted in FIG. 10A. If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

If, however, there is at least one untried base station candidate indicated in its database, the mobile station executes the Base Seek process, discussed above in regards to the MS Active Traffic state 1302, and depicted in FIG. 13B. At this time, the mobile station re-executes the Base Seek process until it either successfully acquires a channel on a base station, which it then processes the Handover protocol sequence with, discussed below, or until there are no base station candidates remaining for it to attempt a channel acquisition with. If the mobile station fails to acquire a channel on a base station at this time, it executes the MS Resync process, discussed above in regards to the MS Active Traffic state 1302, and depicted in FIG. 10A, with the original base station.

If the mobile station successfully resyncs with the original base station, it resumes the normal Active Traffic protocol sequence. If, however, the mobile station fails to resync with the original base station at this time, it transitions to the Non-Registered Idle state 901. In a preferred embodiment, the mobile station posts a Service Unavailable/No Base Station indication 1804 on its user interface, prior to transitioning to the Non-Registered Idle state 901.

As previously discussed, while in the Registered Idle state 801, the mobile station may receive a Call Originate indication 804 on its user interface, as depicted in FIG. 8, indicating its end user wishes to place a call on the communication system 101. Alternatively, while in the Non-Registered Idle state 901, the mobile station may receive a Call Originate indication 804 for an emergency (i.e., 911) call on its user interface, as depicted in FIG. 9, indicating its end user wishes to place an emergency call on the communication system 101. In either event, the mobile station first transitions to the MS Acquisition state 402, to acquire a channel on the base station it is currently tuned to, for a call link. If the mobile station successfully acquires a channel on this base station, it transitions to the MS Call Originate state 1602, depicted in FIG. 16A, to process the Call Originate protocol sequence.

If, however, the mobile station fails to acquire a channel on this base station, it determines that its service has been interrupted with the base station, and executes the MS Recover process, depicted in FIG. 18. In the MS Recover process, as previously described in regards to the Registration protocol sequence processing, the mobile station checks its database to see if there is any untried base station candidates it may attempt to acquire a channel on. If no, the mobile station transitions to the Non-Registered Idle state 901. In a preferred embodiment, before transitioning to the Non-Registered Idle state 901, the mobile station posts a Service Unavailable/No Base Station indication 1804 on its user interface. At this time, the mobile station stops trying to acquire a channel on a base station for its end user's current call request.

If, however, the mobile station's database indicates there is at least one untried base station candidate it may yet attempt to acquire a channel on, the mobile station tunes to the code/frequency of one of the untried base station's transmission. The mobile station then transitions to the MS Acquisition state 402, to attempt to acquire a channel on this new base station, which it can then use to Register with the new base station. At this time, the mobile station no longer tries to process its end user's current call request, and, is instead processing as if it just powered on and must register with a base station, as previously described. In a preferred embodiment, if the mobile station's database indicates there is a base station candidate it may attempt to acquire a channel on, the mobile station posts a Service Interrupted indication 1803 to its user interface, prior to transitioning to the MS Acquisition state 402.

If the mobile station fails in its attempt to acquire a channel on the base station it is initially tuned to, and if it then executes the MS Recover process, it will continue to re-execute the MS Recover process, until it either successfully acquires a channel on a base station, or there are no more base station candidates for it to attempt a channel acquisition on.

If the mobile station successfully acquires a channel on the base station it is currently tuned to, for its end user's call request, it transitions to the MS Call Originate state 1602. In the MS Call Originate state 1602, depicted in FIG. 16A, the mobile station transmits a CT_ORG (Call Originate) message to the base station, indicating it wishes to place a call on the communication system 101 with a designated callee. In a preferred embodiment, the mobile station then waits for a CT_ACK message response from the base station.

In a preferred embodiment, the mobile station establishes a timer, T(m_ack) 703, for the maximum time it will wait for a CT_ACK message. If the mobile station receives the expected CT_ACK message before T(m_ack) 703 elapses, it disables T(m_ack), and then waits for a CT_CNC (Connection Complete) message from the base station, indicating that the communication system 101 has established a call link between the mobile station and the callee. If, however, T(m_ack) elapses, the mobile station presumes it is out of sync with the base station, and executes the MS Resync process, depicted in FIG. 10A.

In the MS Resync process, as previously described in regards to the MS Registration state 702, the mobile station checks whether the base station is transmitting it a CT_SPO (Specific Poll) message. If the mobile station receives a CT_SPO message for it at this time, it remains in the MS Call Originate state 1602, and restarts the Call Originate protocol sequence from the beginning, transmitting a CT_ORG (Call Originate) message to the base station.

In a preferred embodiment, the mobile station enables a timer, T(resync) 1001, for the maximum time it will continue to poll the O-Interface for a CT_SPO message for it. If the mobile station receives a CT_SPO message for it before T(resync) 1001 elapses, it disables T(resync). If, however, T(resync) elapses, the mobile station determines its service has been interrupted with the base station, and executes the MS Recover process, previously discussed in regards to the Call Originate protocol sequence, and depicted in FIG. 18.

Once a base station receives a CT_ORG message from a mobile station assigned a dedicated channel, it transmits a Setup message on the backhaul interface to the system controller 103, indicating a call link is requested by a mobile station. The base station then transitions to the BS Call Originate state 1601, depicted in FIG. 16A, where it waits for a Connect message on the backhaul interface, indicating whether the callee answered the call and the communication system 101 established a call link for the call. In a preferred embodiment, upon transitioning to the BS Call Originate state 1601, the base station also transmits a CT_ACK message to the mobile station, acknowledging the CT_ORG message.

In a preferred embodiment in the MS Call Originate state 1602, the mobile station establishes a timer, T(orig) 1603, for the maximum time it will wait for a CT_CNC (Connection Complete) message from the base station. If the mobile station receives a CT_CNC message before T(orig) 1603 elapses, it disables T(orig). If, however, T(orig) elapses, the mobile station transitions to the Registered Idle state 801. In a preferred embodiment, prior to transitioning to the Registered Idle state 801, the mobile station posts a Service Unavailable/Network Not Responding indication 709 on its user interface.

In the normal Call Originate protocol sequence, once the base station receives a Connect message on the backhaul interface, it transmits a CT_CNC message to the mobile station. In a preferred embodiment, the base station then waits for a CT_ACK message response from the mobile station.

Upon receiving a CT_CNC message, the mobile station transitions to the MS Active Traffic state 1302, previously discussed, and depicted in FIG. 13A. In a preferred embodiment, the mobile station transmits a CT_ACK message to the base station, prior to transitioning to the MS Active Traffic state 1302, acknowledging the CT_CNC message. Once the base station receives this CT_ACK message, it transitions to the BS Active Traffic state 1301, previously discussed, and depicted in FIG. 13A. At this time, bearer data may now be transmitted through the communication system 101.

In a preferred embodiment, the base station establishes a timer, T(b_ack) 706 for the maximum time it will wait for a CT_ACK message response to its CT_CNC (Connection Complete) message. If the base station receives the expected CT_ACK message before T(b_ack) 706 elapses, it disables T(b_ack). If, however, T(b_ack) elapses, the base station presumes it is out of sync with the mobile station, and executes a BS Specific Poll Recover process, depicted in FIG. 17.

In the BS Specific Poll Recover process, as previously discussed in regards to the Registration protocol sequence, the base station transmits a CT_SPO (Specific Poll) message for the mobile station in the base portion 206 of the time frames of the channel, to provide the mobile station a message to resync to. If the base station receives a CT_ORG (Call Originate) message from the mobile station in response to a CT_SPO message, it begins the Call Originate protocol sequence anew, transmitting a CT_ACK message response to the mobile station. This latest CT_ORG message, along with being a call originate request, is an indication that the mobile station has resynced with the base station.

If the BS Specific Poll Recover process is executed because T(b_ack) 706 elapsed, the base station has already received a Connect message from the system controller 103, in response to the mobile station's previous CT_ORG message. Thus, if the base station resyncs with the mobile station at this time, and begins the Call Originate protocol sequence anew, it transmits a CT_ACK message to the mobile station, in response to this latest CT_ORG message. Then, the base station transmits a CT_CNC (Connection Complete) message in the next time frame of the channel to the mobile station, corresponding to the Connect message. The base station then resumes normal Call Originate protocol sequence processing, waiting for a CT_ACK message response from the mobile station.

In a preferred embodiment, the base station enables a timer, T(sp_recover) 1701, for the maximum time it will transmit CT_SPO messages for the mobile station in the channel, one per time frame, and wait for a CT_ORG message in return from the mobile station. If the base station receives a CT_ORG message before T(sp_recover) 1701 elapses, it disables T(sp_recover). If, however, T(sp_recover) elapses, the base station redesignates the dedicated channel as non-dedicated, and transitions to the General Poll state 401 for the now non-dedicated channel.

While executing the BS Specific Poll Recover process in the BS Call Originate state 1601, the base station may receive a Release message on the backhaul interface, indicating the system controller 103 wishes the designated call link be terminated. Upon receiving a Release message at this time, the base station redesignates the dedicated channel as non-dedicated, disables timer T(sp_recover) 1701, and transitions to the General Poll state 401 for the now non-dedicated channel.

While executing a normal Call Originate protocol sequence in the BS Call Originate state 1601, the base station may also receive a Release message on the backhaul interface. In this case, the base station transitions to the BS System Call Release state 1501, discussed below, and depicted in FIG. 15.

In a preferred embodiment in the MS Call Originate state 1602, while waiting for a CT_CNC (Connection Complete) message from the base station, the mobile station transmits a CT_HLD (Hold) message to the base station in the user portion 205 of each time frame of the dedicated channel in which it has no other message to transmit to the base station. The base station, in its turn, while processing in the BS Call Originate state 1601 waiting for a Connect message on its backhaul interface, transmits a CT_HLD message to the mobile station in the base portion 206 of each time frame of the dedicated channel in which it has no other message to transmit to the mobile station.

In a preferred embodiment, while the mobile station is in the MS Call Originate state 1602, transmitting and receiving CT_HLD messages on the O-Interface, it establishes a timer, T(T01) 707, for the maximum time it will wait for a CT_HLD message. The mobile station re-establishes T(T01) 707 each time it receives an expected CT_HLD message, and disables T(T01) when it receives a CT_CNC message from the base station. If T(T01) elapses, the mobile station presumes it is out of sync with the base station, and executes the MS Resync process, previously discussed in regards to the Call Originate protocol sequence, and depicted in FIG. 10A.

If the mobile station successfully resyncs with the base station in the MS Resync process at this time, recovering the call link, it remains in the MS Call Originate state 1602, and restarts processing from the beginning, transmitting a CT_ORG (Call Originate) message to the base station. If, however, the mobile station fails to successfully resync with the base station, it determines that its service has been interrupted with the base station, and executes the MS Recover process, previously discussed in regards to the Call Originate protocol consequence, and depicted in FIG. 18.

In a preferred embodiment, while the base station is in the BS Call Originate state 1601, transmitting and receiving CT_HLD messages on the O-Interface, it establishes a timer, T(T00) 705, for the maximum time it will wait for a CT_HLD message. The base station re-establishes T(T00) 705 each time it receives the expected CT_HLD message, and disables T(T00) when it receives a Connect message on the backhaul interface. If T(T00) elapses, the base station presumes it is out of sync with the mobile station, and executes the BS Specific Poll Recover process, discussed above in regards to the Call Originate protocol sequence, and depicted in FIG. 17.

While executing the BS Specific Poll Recover process at this time, the base station may, or may not, receive a Connect message on the backhaul interface, for the mobile station's prior CT_ORG message. If the base station does not receive a Connect message at this time, and successfully resyncs with the mobile station, it begins processing from the start of the BS Call Originate state 1601, transmitting a CT_ACK message response to the mobile station's latest CT_ORG message. This latest CT_ORG message is both a call originate request and an indication that the mobile station has resynced with the base station.

If, however, the base station does receive a Connect message while executing the BS Specific Poll Recover process at this time, and it successfully resyncs with the mobile station, it transmits a CT_ACK message response to the mobile station's latest CT_ORG message. Then, the base station transmits a CT_CNC (Connection Complete) message in the next frame of the channel to the mobile station, corresponding to the Connect message. The base station then continues in the normal Call Originate protocol sequence, waiting for a CT_ACK message response from the mobile station.

While processing in the BS Call Originate state 1601, the base station may receive an unexpected or erroneous message (previously described) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing the normal Call Originate protocol sequence from that point. If, however, any LeakyBucket counter indicates a maximum error count, the base station executes the BS Specific Poll Recover process, as described above in regards to the Call Originate protocol sequence, and depicted in FIG. 17.

While executing the BS Specific Poll Recover process at this time, the base station may, or may not, receive a Connect message on the backhaul interface, or it may have already received a Connect message, for the mobile station's previous CT_ORG (Call Originate) message. If the base station does not receive a Connect message at this time, and has not previously received a Connect message for the current Call Originate protocol sequence, and it successfully resyncs with the mobile station, it begins processing from the start of the BS Call Originate state 1601, transmitting a CT_ACK message response to the mobile station's latest CT_ORG message.

If, however, the base station does receive a Connect message while executing the BS Specific Poll Recover process at this time, or it previously received a Connect message for the current Call Originate protocol sequence, and it successfully resyncs with the mobile station, it transmits a CT_ACK message response to the mobile station's latest CT_ORG message. Then, the base station transmits a CT_CNC (Connection Complete) message to the mobile station, corresponding to the Connect message. The base station then continues in the normal Call Originate protocol sequence, waiting for a CT_ACK message response from the mobile station.

While processing in the MS Call Originate state 1602, the mobile station may also receive an unexpected or erroneous message (previously described) on the O-Interface. In a preferred embodiment, if the mobile station receives an unexpected or erroneous message at this time, it executes a Leaky Bucket process, as previously described. If no Leaky-Bucket counter indicates a maximum error count has been reached, the mobile station re-transmits the last message it transmitted to the base station, and continues processing the normal Call Originate protocol sequence from that point. If any LeakyBucket counter indicates a maximum error count, the mobile station executes the MS Resync process, previously discussed in regards to the Call Originate protocol sequence, and depicted in FIG. 10A.

If the mobile station successfully resyncs with the base station at this time, recovering the call link, it remains in the MS Call Originate state 1602, and restarts processing from the beginning, transmitting a CT_ORG (Call Originate) message to the base station. If, however, the mobile station fails to successfully resync with the base station, it executes the MS Recover process, previously discussed in regards to the Call Originate protocol sequence, and depicted in FIG. 18.

Figure 16B:
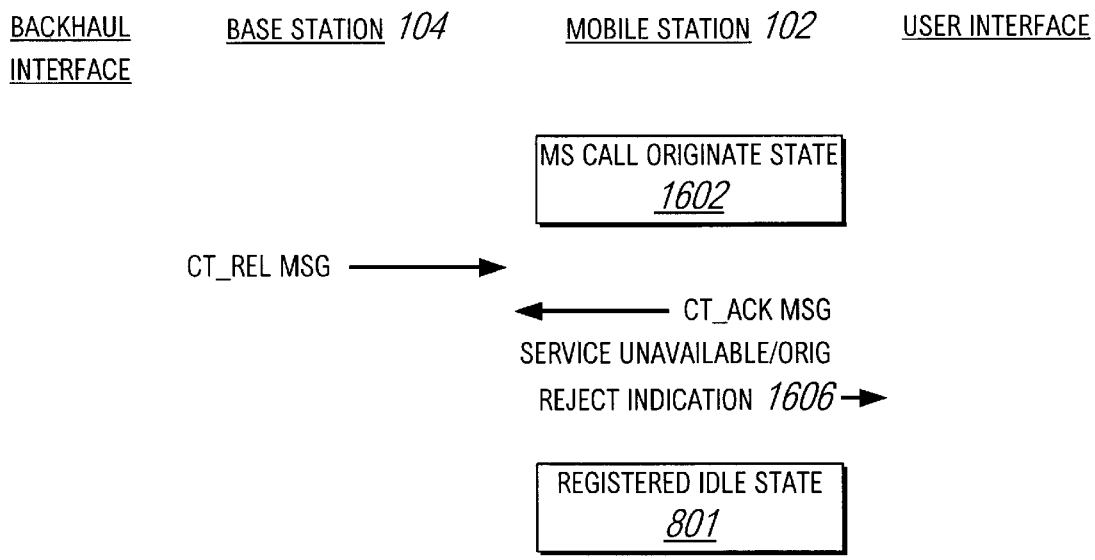
FIG. 16B is a diagram of the mobile station state processing and communication protocol when the communication system releases the call link currently being established for a call the mobile station's end user initiated.

While in the MS Call Originate state 1602, the mobile station may receive a CT_REL (Release) message on the O-Interface, indicating that the system controller 103 wishes to terminate its call. In response to this CT_REL message, as depicted in FIG. 16B, the mobile station transitions to the Registered Idle state 801. In a preferred embodiment, prior to transitioning to the Registered Idle state 801, the mobile station transmits a CT_ACK message to the base station, acknowledging the CT_REL message, and posts a Service Unavailable/Orig Reject indication 1606 to its user interface.

While in the MS Call Originate state 1602, the mobile station may also receive an On-Hook indication 1404 on its user interface, indicating its end user terminated the call. Upon receiving an On-Hook indication 1404 at this time, the mobile station transitions to the MS Mobile Call Release state 1402, discussed below, and depicted in FIG. 14.

While in the BS Call Originate state 1601, the base station may receive a CT_REL (Release) message on the O-Interface, indicating that the mobile station's end user terminated the call. Upon receiving a CT_REL message at this time, the base station transitions to the BS Mobile Call Release state 1401, discussed below, and depicted in FIG. 14.

As previously discussed, if the mobile station is in the MS Active Traffic state 1302 and it determines its call link quality is inadequate, it may attempt to find another base station it can continue its current call on. If the mobile station successfully acquires a channel on a new base station at this time, it transitions to the MS Handover state 2002, depicted in FIG. 20A, where it transmits a CT_THR (Terminating Handover Request) message to the new base station, indicating it wishes to handover its current call to this new base station. In a preferred embodiment, the mobile station then waits for a CT_ACK message response from the new base station.

If a base station receives a CT_THR message from a mobile station that has acquired a channel on it, it transitions to the BS Handover state 2001, depicted in FIG. 20A. In the BS Handover state 2001, the base station transmits a Terminating_Handover message on the backhaul interface to the system controller 103, indicating that the mobile station wishes to handover its call to this new base station.

In a preferred embodiment, the base station transmits a CT_ACK message to the mobile station, acknowledging the CT_THR (Terminating Handover Request) message. The base station then waits for a Circuit_Switch_Complete message on the backhaul interface, indicating the communication system 101 has established the call link for this base station to now handle the mobile station's call.

Once the mobile station receives the expected CT_ACK message, it then waits for a CT_CSC (Circuit Switch Complete) message from the base station, indicating that the Handover protocol sequence has been successful, and the mobile station has an established call link with the new base station.

In a preferred embodiment, the mobile station establishes a timer, T(m_ack) 703, for the maximum time it will wait for the CT_ACK message. If the mobile station receives the expected CT_ACK message before T(m_ack) 703 elapses, it disables T(m_ack). If, however, T(m_ack) elapses, the mobile station checks its database to determine if there is an untried base station candidate it can attempt to acquire a channel on. If no, the mobile station transitions to the Non-Registered Idle state 901. In a preferred embodiment, the mobile station posts a Service Unavailable/No Base Station indication 1804 on its user interface, prior to transitioning to the Non-Registered Idle state 901.

If there is at least one untried base station candidate indicated in its database, the mobile station executes the Base Seek process, depicted in FIG. 13B. In the Base Seek process, as previously discussed in regards to the MS Active Traffic state 1302, the mobile station tunes to the code/frequency of a new, untried base station's transmission. In a preferred embodiment, the mobile station prioritizes the base station candidates in its database, based on their signal strength, frame error rate, and channel availability, and now tunes to the untried base station candidate with the highest priority. The mobile station then transitions to the MS Acquisition state 402, to attempt to acquire a channel on this new base station, for a Handover protocol sequence. In a preferred embodiment, the mobile station posts a Handover Attempt indication 1305 to its user interface, prior to transitioning to the MS Acquisition state 402.

If the mobile station successfully acquires a channel on this new base station, it begins the MS Handover protocol sequence anew, transmitting a CT_THR (Terminating Handover Request) message to this new base station, and waiting for a CT_ACK message in response.

If, however, the mobile station fails to acquire a channel on this new base station, it re-executes the Base Seek process in the MS Handover state 2002, until it either successfully acquires a channel on a base station, or there are no base station candidates remaining for it to attempt a channel acquisition with. If the mobile station fails to acquire a channel on any base station, it executes the MS Resync process, depicted in FIG. 10A, with the base station it was processing the Active Traffic protocol sequence with, before it attempted the Handover protocol sequence (the "original" base station).

As previously discussed with regards to the MS Active Traffic state 1302, in the MS Resync process, the mobile station checks whether the base station is transmitting it a CT_SPO (Specific Poll) message. If the mobile station receives a CT_SPO message for it at this time, it transmits the next sequential data packet to be output to the base station, and re-transitions to the MS Active Traffic state 1302, depicted in FIG. 13A.

In a preferred embodiment, the mobile station enables a timer, T(resync) 1001, for the maximum time it will execute the MS Resync process, checking whether the original base station is transmitting it a CT_SPO message. If the mobile station receives a CT_SPO message for it before T(resync) 1001 elapses, it disables T(resync). If, however, T(resync) elapses, the mobile station transitions to the Non-Registered Idle state 901, depicted in FIG. 9. In a preferred embodiment, the mobile station posts a Service Unavailable/No Base Station indication 1804 on its user interface, prior to transitioning to the Non-Registered Idle state 901.

In the normal Handover Protocol sequence, when the base station receives the expected Circuit_Switch_Complete message on the backhaul interface, it transmits a CT_CSC (Circuit Switch Complete) message to the mobile station. In a preferred embodiment, the base station then waits for a CT_ACK message response from the mobile station.

In a preferred embodiment, after receiving the CT_ACK message response to its CT_THR (Terminating Handover Request) message, the mobile station establishes a timer; T(handover) 2003, for the maximum time it will wait for a CT_CSC message from the base station. If the mobile station receives a CT_CSC message before T(handover) 2003 elapses, it disables T(handover), If, however, T(handover) elapses, the mobile station processes as if T(m_ack) 703 elapsed in the MS Handover state 2002, as previously described.

In a preferred embodiment, once the mobile station receives the CT_CSC message, it transmits a CT_ACK message to the base station, acknowledging the CT_CSC message. The mobile station then transitions to the MS Active Traffic state 1302, and resumes transmitting and receiving bearer data on the O-Interface, now with the new base station.

Once the base station receives the CT_ACK message response to its CT_CSC message, it transitions to the BS Active Traffic state 1301, where it transmits and receives bearer data with the mobile station on the O-Interface, as well as transmitting and receiving bearer data on the backhaul interface, with the system controller 103.

Figure 20B:
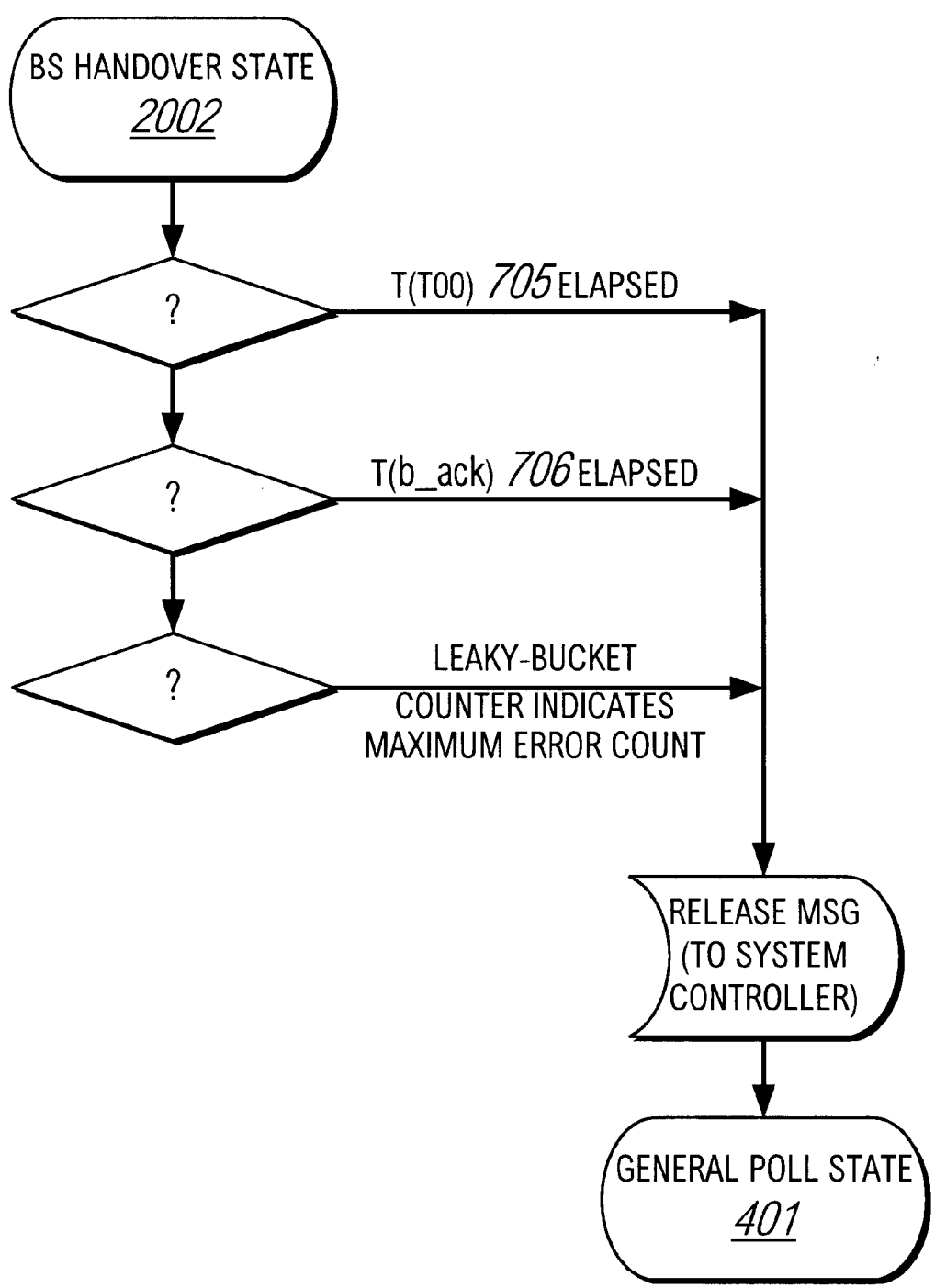
FIG. 20B is a diagram of a preferred embodiment base station state processing and communication protocol when it loses synchronization with a mobile station attempting to handover its call to it.

In a preferred embodiment, the base station establishes a timer, T(b_ack) 706, for the maximum time it will wait for a CT_ACK message response. If the base station receives the expected CT_ACK message before T(b_ack) 706 elapses, it disables T(b_ack). If, however, T(b_ack) elapses, the base station transmits a Release message on the backhaul interface, to notify the system controller 103 that the call link with the mobile station is terminated, as depicted in FIG. 20B. The base station then redesignates the dedicated channel as non-dedicated, and transitions to the General Poll state 401 for the now non-dedicated channel.

In a preferred embodiment in the MS Handover state 2002, while waiting for a CT_CSC (Circuit Switch Complete) message, the mobile station transmits a CT_HLD (Hold) message to the base station in the user portion 205 of each time frame of the dedicated channel in which it has no other message to transmit to the base station. The base station, for its part, while processing in the BS Handover state 2001, waiting for a Circuit_Switch_Complete message, transmits a CT_HLD message to the mobile station in the base portion 206 of each time frame of the dedicated channel in which it has no other message to transmit to the mobile station.

In a preferred embodiment, while the mobile station is in the MS Handover state 2002, transmitting and receiving CT_HLD messages on the O-Interface, it establishes a timer, T(T01) 707, for the maximum time it will wait for a CT_HLD message. The mobile station re-establishes T(T01) 707 each time it receives the expected CT_HLD message, and disables T(T01) when it receives a CT_CSC (Circuit Switch Complete) message from the base station. If T(T01) elapses, the mobile station processes as if T(m_ack) 703 elapsed in the MS Handover state 2002, as previously described.

In a preferred embodiment, while the base station is in the BS Handover state 2001, transmitting and receiving CT_HLD messages on the O-Interface, it establishes a timer, T(T00) 705, for the maximum time it will wait for a CT_HLD message. The base station re-establishes T(T00) 705 each time it receives the expected CT_HLD message, and disables T(T00) when it receives a Circuit_Switch_Complete message on the backhaul interface. If T(T00) elapses, the base station transmits a Release message, as depicted in FIG. 20B, on the backhaul interface, indicating its call link with the mobile station is terminated. The base station then redesignates the dedicated channel as non-dedicated, and transitions to the General Poll state 401 for the now non-dedicated channel.

While processing in the BS Handover state 2001 for a dedicated channel, the base station may receive an unexpected or erroneous message (previously defined) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, and continues processing the Handover protocol sequence from that point. If, however, any LeakyBucket counter indicates a maximum error count, the base station transmits a Release message, as depicted in FIG. 20B, on the backhaul interface, indicating its call link with the mobile station is terminated. The base station then redesignates the dedicated channel as non-dedicated, and transitions to the General Poll state 401 for the now non-dedicated channel.

While processing in the MS Handover state 2002, the mobile station may also receive an unexpected or an erroneous message (previously defined) on the O-Interface. In a preferred embodiment, if the mobile station receives an unexpected or erroneous message at this time, it executes a Leaky Bucket process, as previously described. If no Leaky-Bucket counter indicates a maximum error count has been reached, the mobile station re-transmits the last message it transmitted to the base station, and continues processing the Handover protocol sequence from that point. If, however, any LeakyBucket counter indicates a maximum error count, the mobile station processes as if T(m_ack) 703 elapsed in the MS Handover state 2002, as previously described.

While in the BS Handover state 2001, the base station may receive a Release message on the backhaul interface, indicating that the system controller 103 wishes the designated call link be terminated. The base station, upon receiving a Release message at this time, transitions to the BS System Call Release state 1501, described below, and depicted in FIG. 15.

While in the MS Handover state 2002, the mobile station may receive a CT_REL (Release) message from the base station, indicating that the system controller 103 wishes its call link with the current base station be terminated. The mobile station, upon receiving a CT_REL message at this time, processes as if T(m_ack) 703 elapsed in the MS Handover state 2002, as previously described. In a preferred embodiment, the mobile station transmits a CT_ACK message to the base station, acknowledging the CT_REL message.

While in the MS Handover state 2002, the mobile station may receive an On-Hook 1404 indication on its user interface, indicating its end user terminated the call. Upon receiving an On-Hook indication 1404 at this time, the mobile station transitions to the MS Mobile Call Release state 1402, described below, and depicted in FIG. 14.

While processing in the BS Handover state 2001, the base station may receive a CT_REL (Release) message on the O-Interface, indicating the mobile station's end user terminated the call. Upon receiving a CT_REL message at this time, the base station transitions to the BS Mobile Call Release state 1401, described below, and depicted in FIG. 14.

As previously discussed, while in the MS Call Terminate state 1202, the MS Active Traffic state 1302, the MS Call Originate state 1602, or the MS Handover state 2002, the mobile station may receive an On-Hook indication 1404 on its user interface, indicating its end user terminated the call. The mobile station then transitions to the MS Mobile Call Release state 1402, depicted in FIG. 14. In the MS Mobile Call Release state 1402, the mobile station transmits a CT_REL (Release) message to the base station, indicating it is releasing the call link on the communication system 101. In a preferred embodiment, the mobile station also establishes a timer, T(m_ack) 703, for the maximum time it will wait for a CT_ACK message response from the base station. If the mobile station receives the expected CT_ACK message before T(m_ack) 703 elapses, it disables T(m_ack) and transitions to the Registered Idle state 801. If T(m_ack) elapses, the mobile station also transitions to the Registered Idle state 801.

While the mobile station is in the MS Mobile Call Release state 1402, it may receive an unexpected or erroneous message (previously described) on the O-Interface. In a preferred embodiment, if the mobile station receives an unexpected or erroneous message at this time, it executes a Leaky Bucket process, as previously described. If any LeakyBucket counter indicates a maximum error count has been reached, the mobile station transitions to the Registered Idle state 801. If no LeakyBucket counter indicates a maximum error count, the mobile station re-transmits the last message it transmitted on the O-Interface, in this case, the CT_REL (Release) message, and continues processing in the MS Mobile Call Release state 1402, waiting for a CT_ACK message response from the base station.

As previously discussed, while in the BS Call Terminate state 1201, the BS Active Traffic state 1301, the BS Call Originate state 1601, or the BS Handover state 2001 for a dedicated channel, the base station may receive a CT_REL (Release) message on the O-Interface, indicating the mobile station end user terminated the call. Upon receiving a CT_REL message at one of these times, the base station transitions to the BS Mobile Call Release state 1401 for the dedicated channel, depicted in FIG. 14. In the BS Mobile Call Release state 1401, the base station transmits a Release message on the backhaul interface, notifying the communication system 101 that the mobile station end user terminated the call, and, thus, is relinquishing the call link. In a preferred embodiment, the base station also transmits a CT_ACK message to the mobile station, acknowledging the CT_REL message. The base station redesignates the dedicated channel as non-dedicated, and then transitions to the General Poll state 401 for the now non-dedicated channel.

Also as previously discussed, while in the BS Call Terminate state 1201, the BS Active Traffic state 1301, the BS Call Originate state 1601, or the BS Handover state 2001 for a dedicated channel, the base station may receive a Release message on the backhaul interface, indicating that the system controller 103 wishes a designated call be terminated. Upon receiving a Release message at one of these times, the base station transitions to the BS System Call Release state 1501 for the dedicated channel, depicted in FIG. 15, where it transmits a CT_REL (Release) message to the mobile station, indicating that the mobile station's call link is terminated. The base station redesignates the dedicated channel as non-dedicated, and then transitions to the General Poll state 401 for the now non-dedicated channel.

In a preferred embodiment in the BS System Call Release state 1501, the base station establishes a timer, T(b_ack) 706, for the maximum time it will wait for a CT_ACK message response to its CT_REL message from the mobile station. If the base station receives the expected CT_ACK message, or T(b_ack) 706 elapses, the base station redesignates the dedicated channel as non-dedicated, and transitions to the General Poll state 401 for the now non-dedicated channel. If the base station receives the CT_ACK message before T(b_ack) elapses, it disables T(b_ack) prior to transitioning to the General Poll state 401.

While processing in the BS System Call Release state 1501 for a dedicated channel, the base station may receive an unexpected or erroneous message (previously defined) on the O-Interface. In a preferred embodiment, if the base station receives an unexpected or erroneous message at this time, it executes a Leaky Bucket process, as previously described. If no LeakyBucket counter indicates a maximum error count has been reached, the base station re-transmits the last message it transmitted to the mobile station, in this case, the CT_REL (Release) message, and continues to process in the BS System Call Release state 1501, waiting for a CT_ACK message response. If, however, any Leaky-Bucket counter indicates a maximum error count, the base station redesignates the dedicated channel as non-dedicated, and then transitions to the General Poll state 401 for the now non-dedicated channel.

The following is a description of a presently preferred computer program, to operate on a mobile station, in accordance with the invention disclosed herein. Information about an exemplary base station computer program may be found in U.S. Pat. No. 5,819,041, entitled "Communication Control for a Central Communication Center," which is hereby incorporated by reference as if fully set forth herein.

Figure 21:
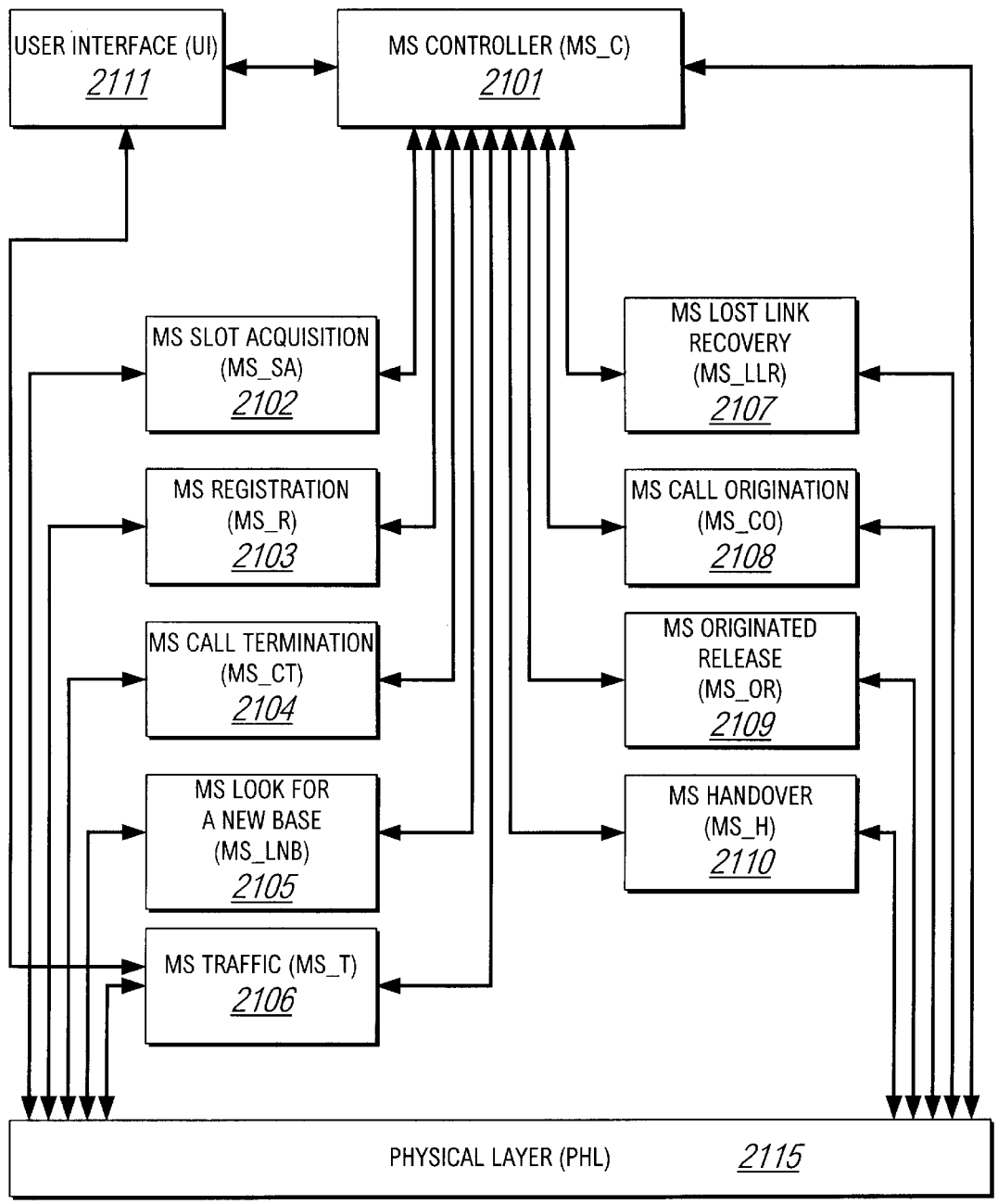
FIG. 21 is diagram of the tasks comprising the MS software.

FIG. 21 is a diagram of the tasks comprising the mobile station computer program (the "MS software"). The MS Controller (MS_C) is the main task, from which all other mobile station tasks are called, or activated. The other mobile station software tasks include the MS Slot Acquisition (MS_SA) task 2102, the MS Registration (MS_R) task 2103, the MS Call Termination (MS_CT) task 2104, the MS Look For A New Base (MS_LNB) task 2105, the MS Traffic (MS_T) task 2106, the MS Lost Link Recovery (MS_LLR) task 2107, the MS Call Origination (MS_CO) task 2108, the MS Originated Release (MS_OR) task 2109, and the MS Handover (MS_H) task 2110. The mobile station software is also comprised of a User Interface (UI) task 2111, for handling the input and output of indications to the mobile station's user interface.

Figure 22A:
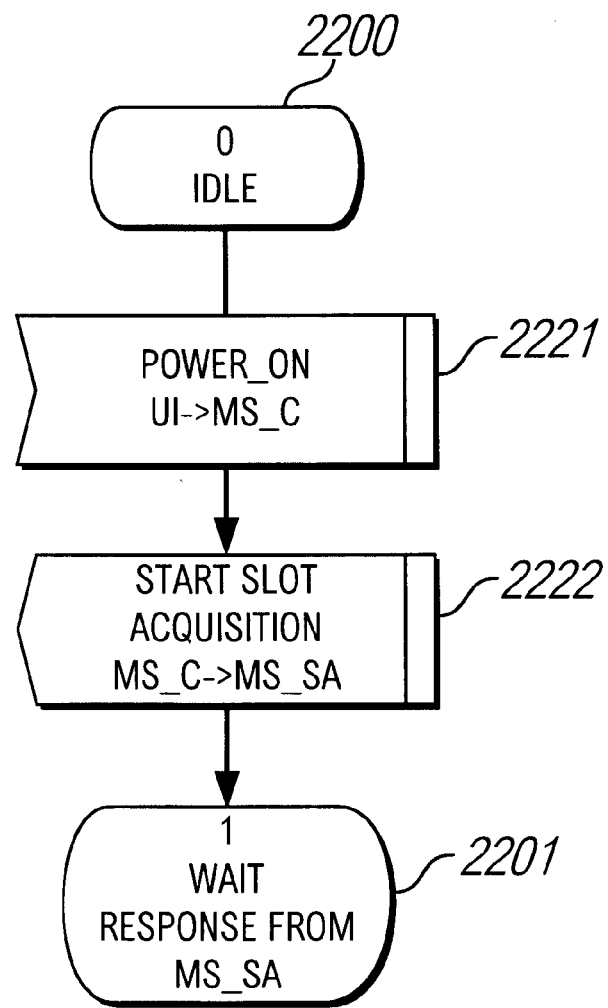
FIG. 22a–22u are state diagrams of all the states in the MS software Controller (MS_C) task.

The MS_C task 2101 is activated from the MS_C(0) ("Idle") state 2200, FIG. 22a, by a Power On message 2221 posted from the UI task 2111. When the MS_C task 2101 receives a Power On message 2221, it activates the MS_SA task 2102 by sending it a Start Slot Acquisition message 2222. The MS_C task 2101 then transitions to the MS_C (1) state 2201, depicted in FIG. 22b.

Figures 1, 23:
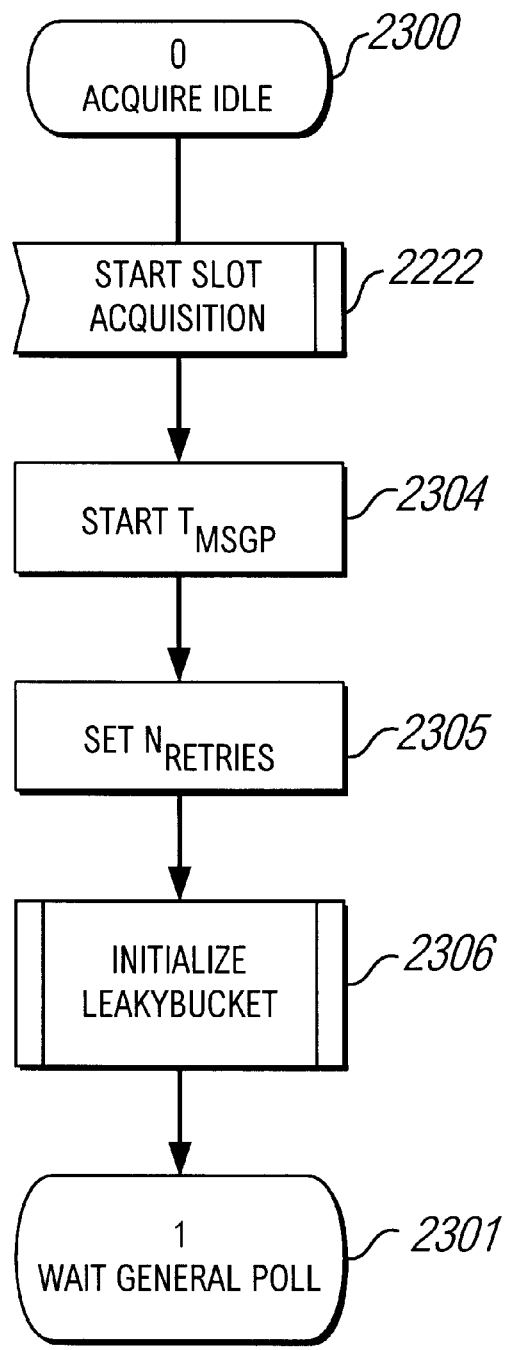
FIG. 23 is a state diagram of the MS software Slot Acquisition (MS_SA) task.
Figures 2, 23:
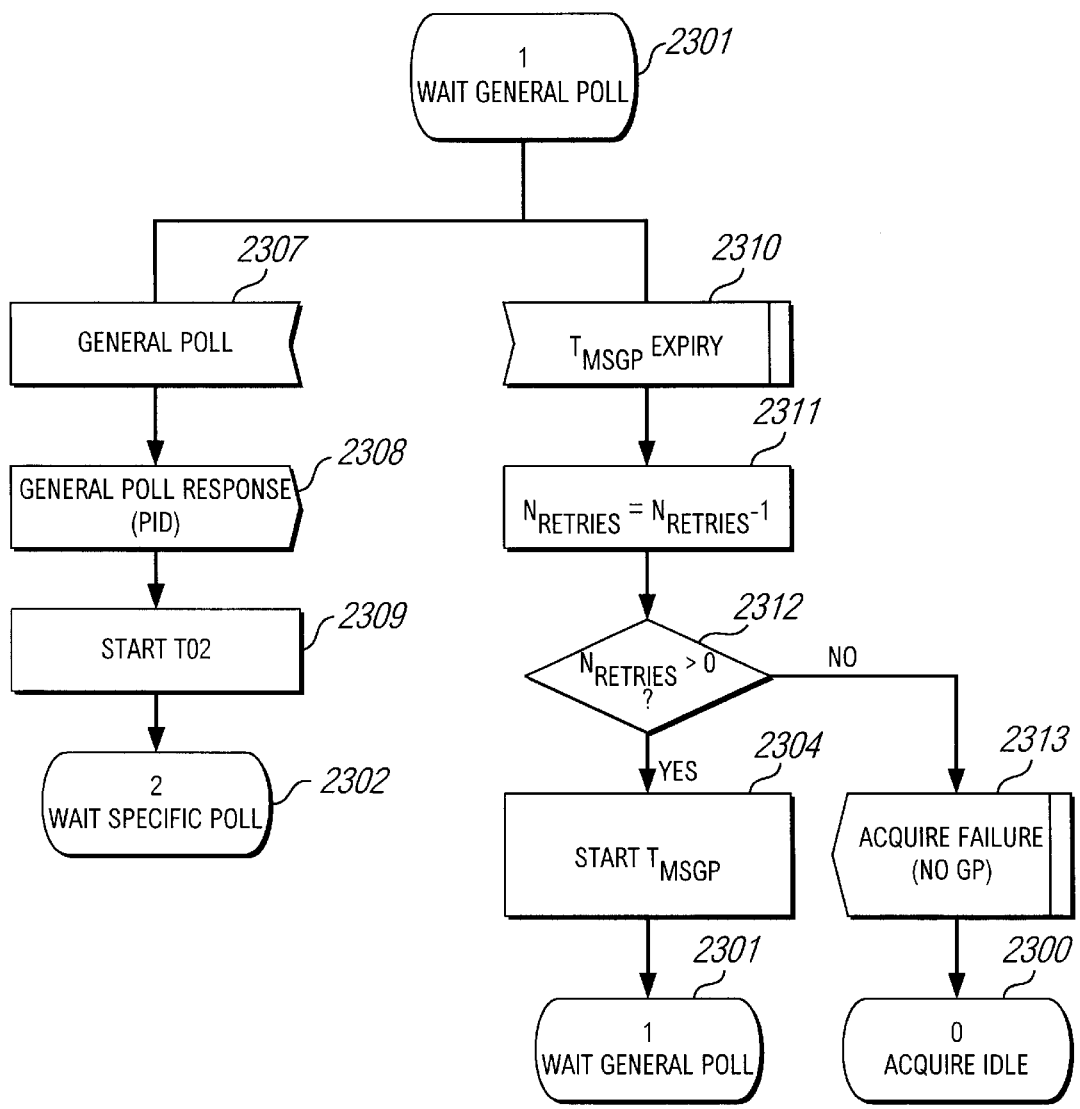
Figures 3, 23:
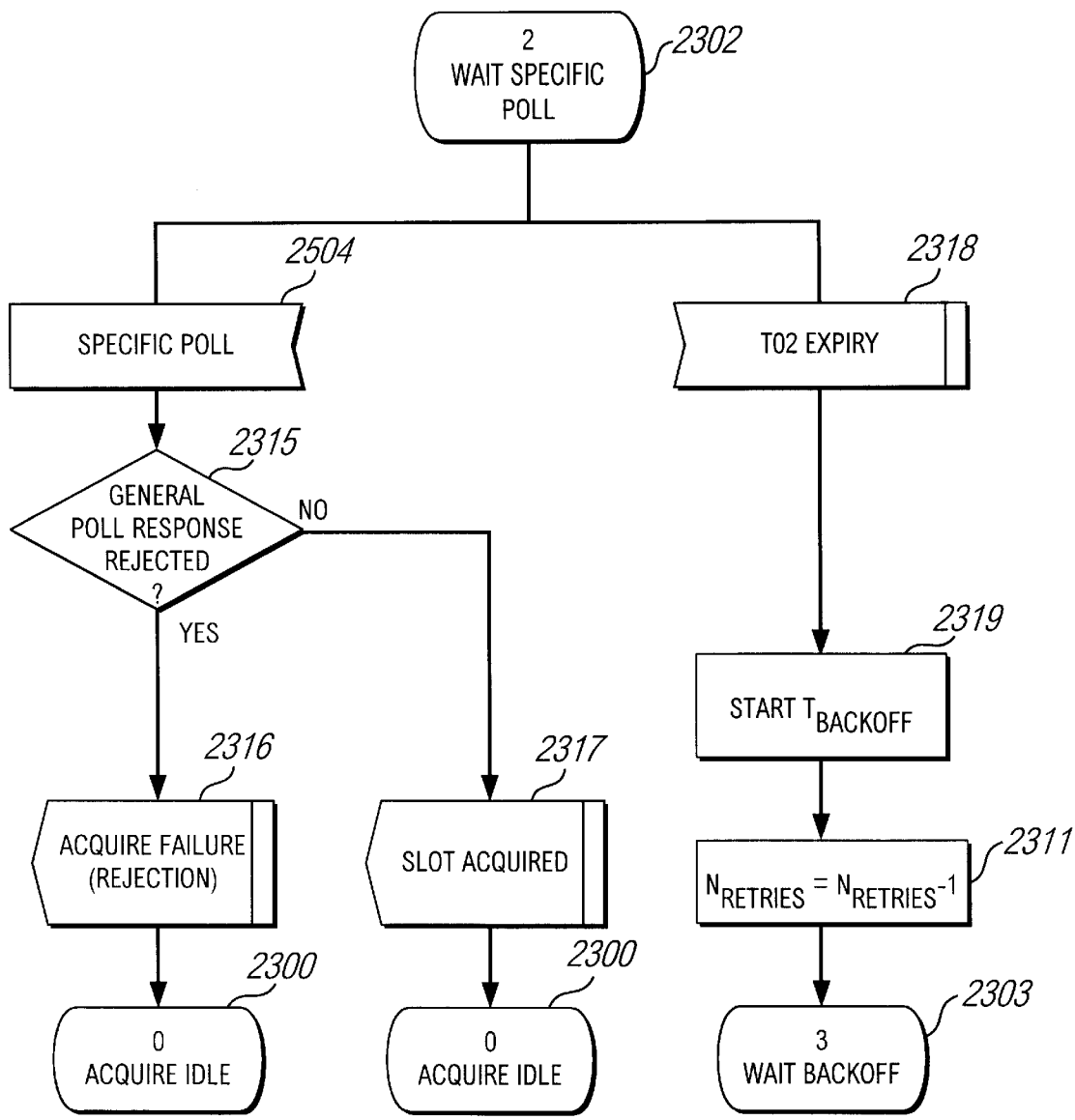
Figures 4, 23:
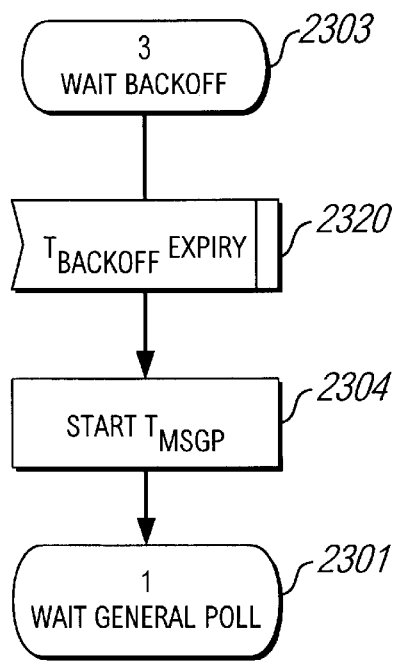
Figures 5, 23:
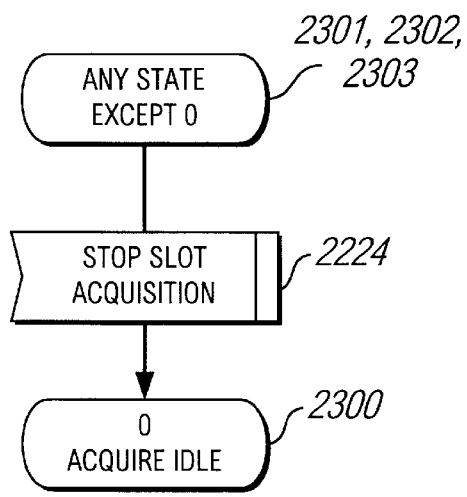

The MS_SA task 2102, depicted in FIG. 23, processes the slot acquisition protocol for the mobile station to acquire a channel on a base station. Upon being activated from the MS_SA(0) ("Idle") state 2300 by a Start Slot Acquisition message 2222 from the MS_C task 2101, the MS_SA task 2102 establishes a counter N(Retries) 2305, which represents the maximum retry attempts the mobile station will make to acquire a channel on the base station it is currently tuned to. In a preferred embodiment, a mobile station is only tuned to the code/frequency of one base station transmission at any one time.

The MS_SA task 2102 also establishes its LeakyBucket counters 2306, the LeakyBucket process previously described. The MS_SA task 2102 also establishes a timer T(msgp) 2304, which represents the maximum time it will wait to receive a General Poll message from the base station, before it deems its wait a retry. The MS_SA task 2102 then transitions to the MS_SA(1) state 2301, where it waits to receive a General Poll message from the base station it is currently tuned to. The General Poll message transmitted in any base station channel is an invitation for any mobile station to seize the channel, and thereby acquire a communication link to the base station.

If the mobile station receives a General Poll message 2307 before T(msgp) expires, the MS_SA task 2102 transmits a General Poll Response message 2308 to the base station, indicating its mobile station Personal Identification (PID). In a preferred embodiment, the mobile station transmits the General Poll Response message to the base station in a subsequent time frame of the same channel it received the General Poll message from the base station in. The MS_SA task 2102 then establishes a second timer, T02 2309, and transitions to the MS_SA(2) state 2302, where it waits for a Specific Poll message response from the base station. Timer T02 is established for the maximum time the MS_SA task 2102 will wait for a Specific Poll message from the base station, before it determines there has been a slot acquisition collision with another mobile station for the same base station channel. The Specific Poll message received at this time is an invitation for only the mobile station identified in the message to seize the channel.

If T(msgp) expires 2310 in the MS_SA(1) state 2301, the MS_SA task 2102 decrements the N(Retry) counter 2311. The MS_SA task 2102 then checks 2312 if the N(Retry) counter is greater than zero. If yes, the MS_SA task 2102 re-establishes T(msgp) 2304, and remains in the MS_SA(1) state 2301, waiting another T(msgp) time period to receive a General Poll message from the base station it is tuned to.

If, however, N(Retry) counter is not greater than zero after being decremented, the MS_SA task 2102 sends an Acquire Failure (No GP) message 2313 to the MS_C task 2101, and then terminates processing, re-transitioning to the MS_SA (0) state 2300.

In the MS_SA(2) state 2302, if the mobile station receives the expected Specific Poll message 2504 for it, from the base station, it then checks 2315 to see if the Specific Poll message indicates the mobile station's General Poll Response message was rejected. If the Specific Poll message does not indicate the mobile station's General Poll Response message was rejected, the MS_SA task 2102 sends a Slot Acquired message 2317 to the MS_C task 2101, and then terminates processing, re-transitioning to the MS_SA(0) state 2300.

If, on the other hand, the received Specific Poll message does indicate the mobile station's General Poll Response message was rejected, the MS_SA task 2102 sends an Acquire Failure (Rejection) message 2316 to the MS_C task 2101, and then terminates processing, re-transitioning to the MS_SA(0) state 2300.

Should more than one mobile station respond to a General Poll message in a particular channel, a slot acquisition collision has occurred. The base station will not dedicate the channel to any of the mobile stations on a slot acquisition collision, and, thus, will not respond to any of the mobile stations' General Poll Response messages with a Specific Poll message.

In the MS_SA task 2102, timer T02 expires if the mobile station does not receive a Specific Poll message response to its General Poll Response message within time T02. If T02 expires 2318 in the MS_SA(2) state 2302, the MS_SA task 2102 decrements the N(Retry) counter 2311, establishes a timer T(backoff) 2319, for the time it will wait before once again seeking a base station General Poll message the mobile station can respond to, and then transitions to the MS_SA(3) state 2303, where it waits for T(backoff) to expire.

When T(backoff) expires 2320, the MS_SA task 2102 re-enables timer T(msgp) 2304 and re-transitions to the MS_SA(1) state 2301, where it waits to receive a General Poll message from the base station the mobile station is currently tuned to.

Figure 22B:
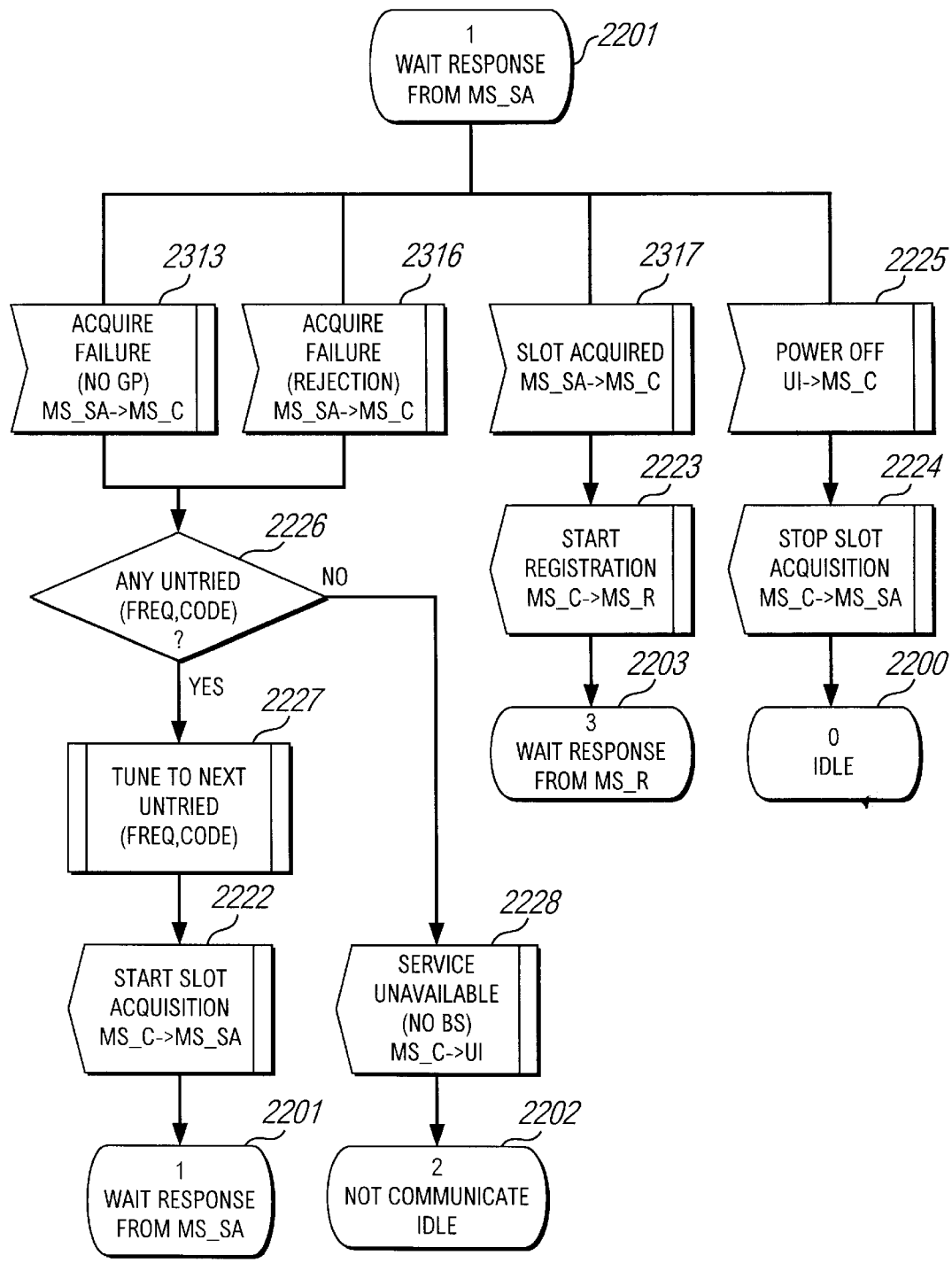
Figures 1, 24:
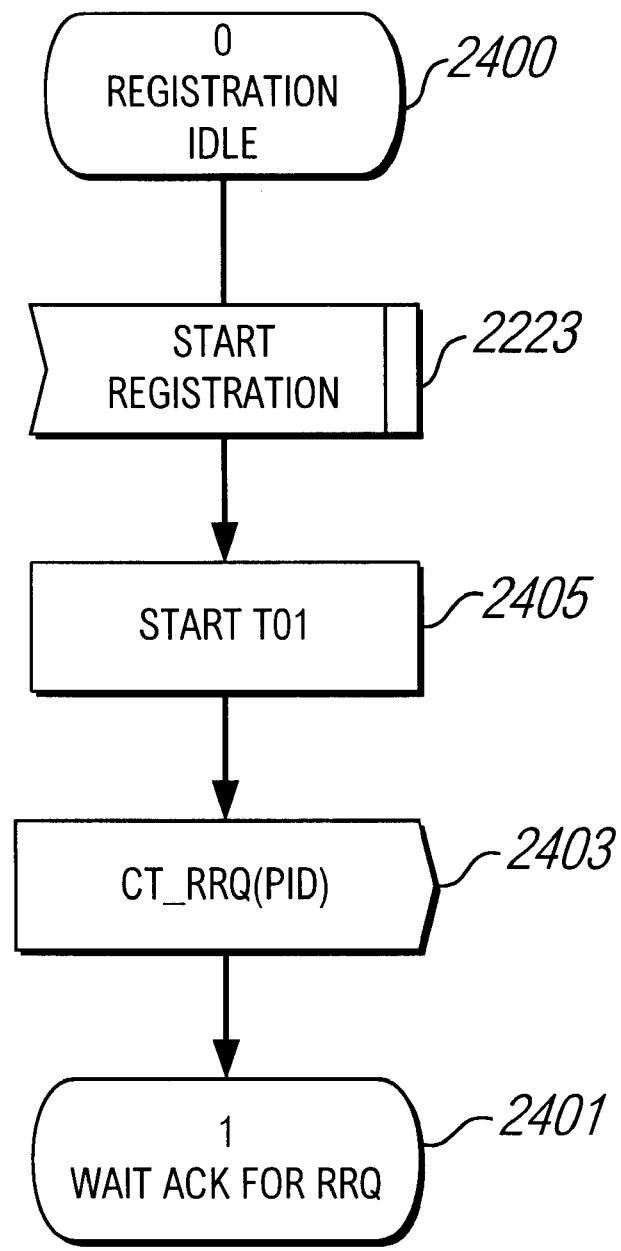
FIG. 24 is a state diagram of the MS software Registration (MS_R) task.
Figures 2, 24:
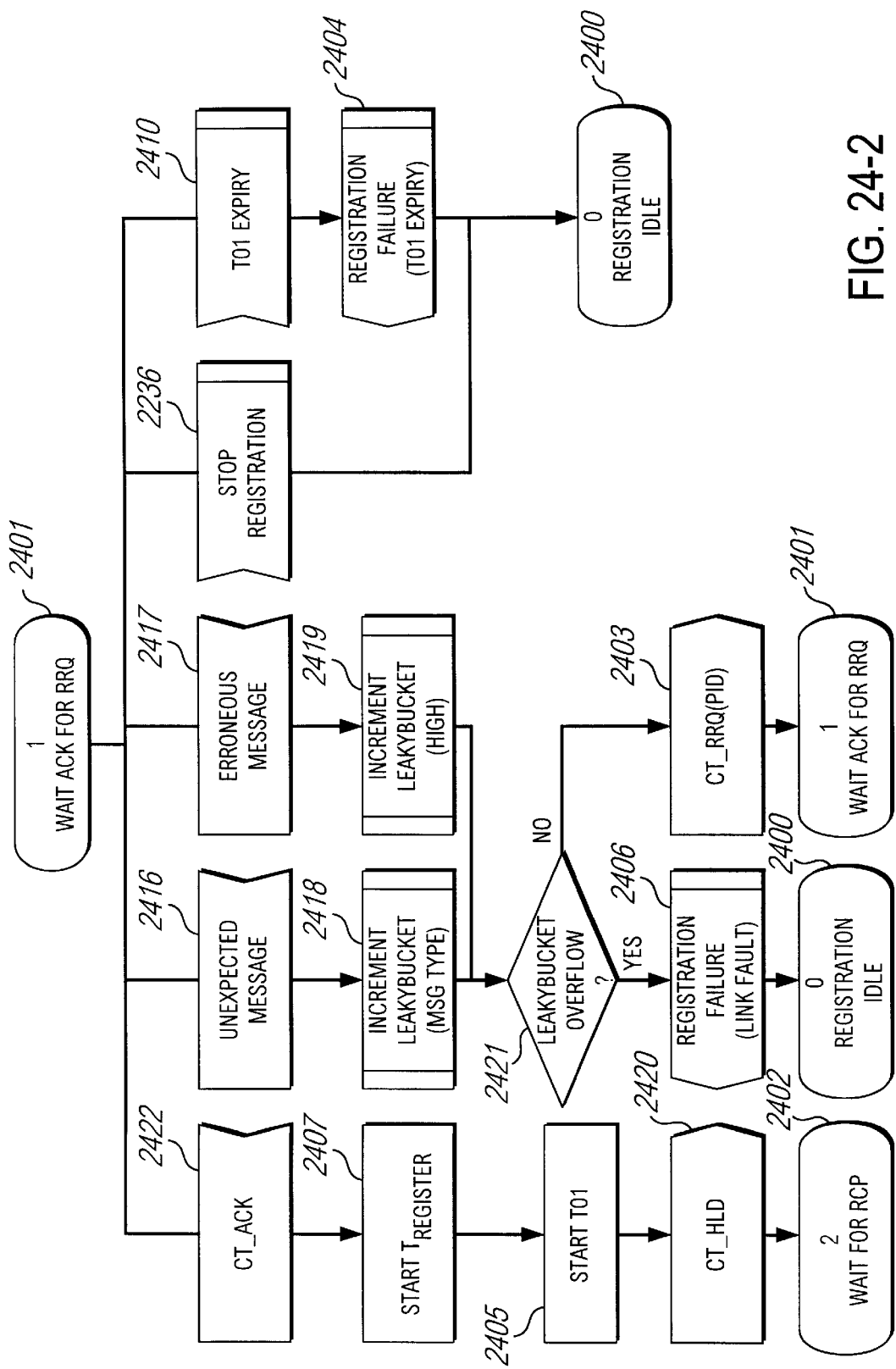
Figures 3, 24:
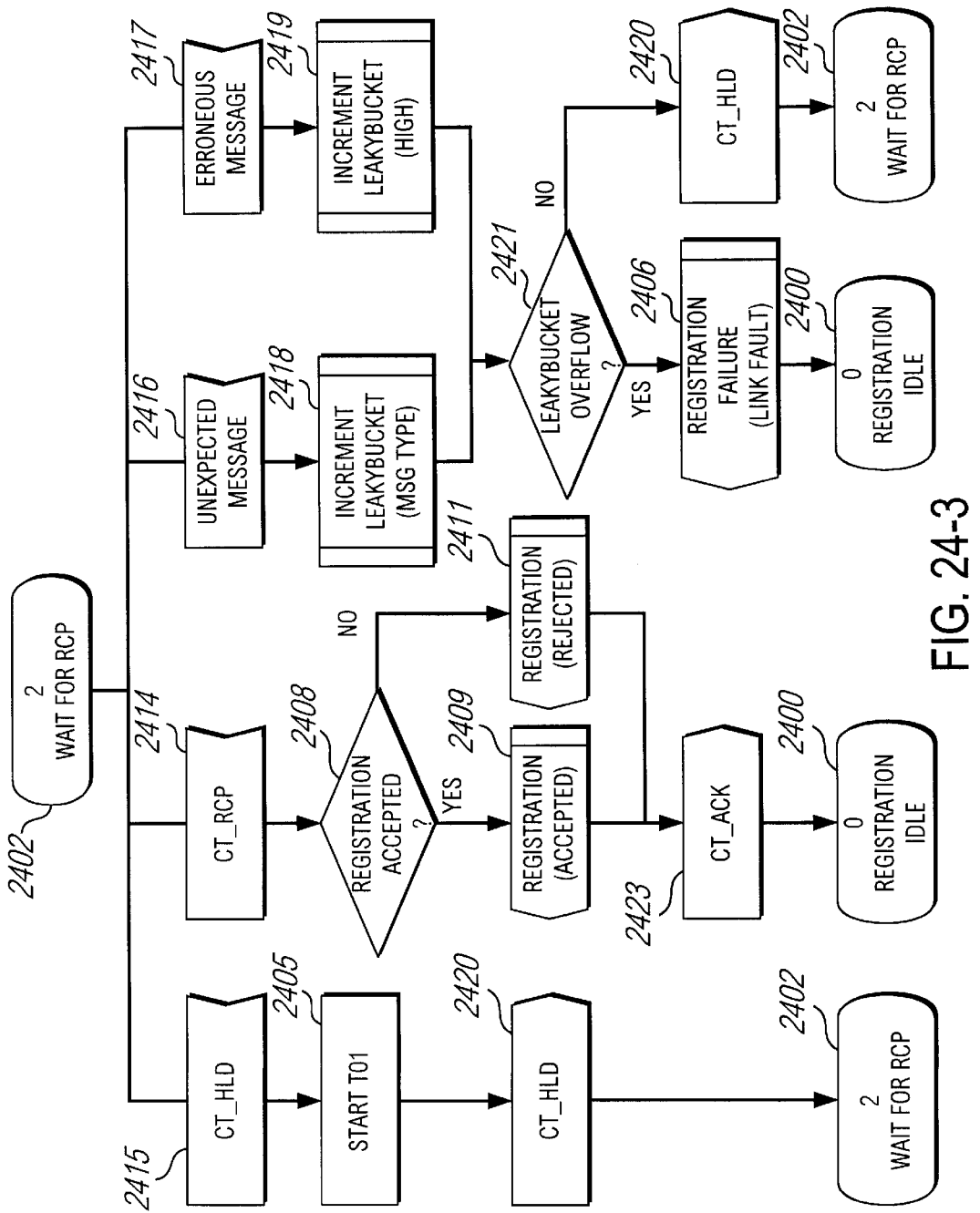
Figures 4, 24:
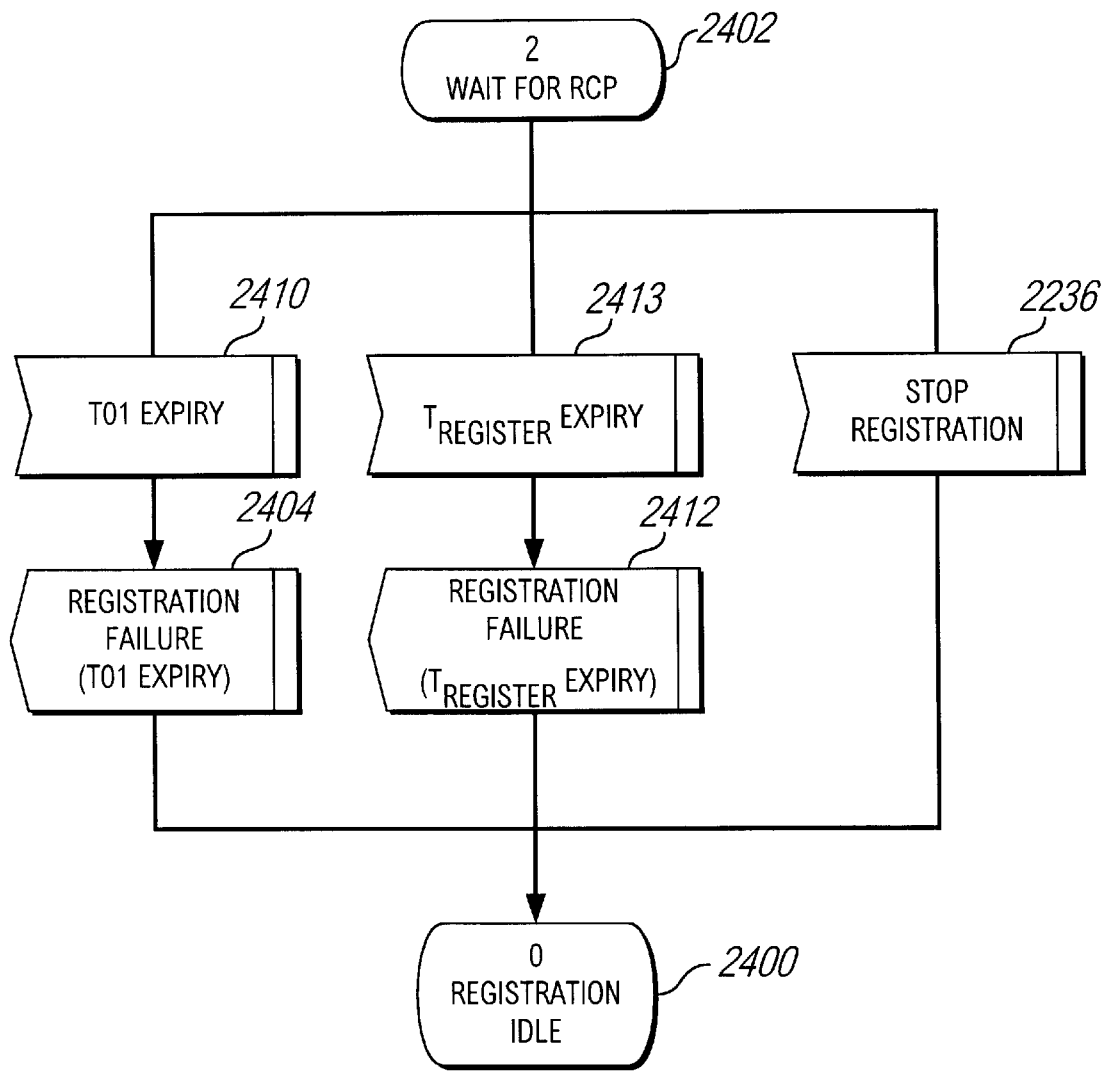

In the MS_C(1) state 2201, depicted in FIG. 22b, if the MS_C task 2101 receives a Slot is Acquired message 2317 from the MS_SA task 2102, the MS_C task 2101 activates the MS_R task 2103, depicted in FIG. 24, by sending it a Start Registration message 2223. The MS_C task 2101 then transitions to the MS_C(3) state 2203, depicted in FIG. 22d.

In the MS_C(1) state 2201, if the MS_C task 2101 receives a Power Off message 2225 from the UI task 2111, the MS_C task 2101 sends a Stop Slot Acquisition message 2224 to the MS_SA task 2102, and transitions to the MS_C(0) state 2200.

In the MS_SA(1) state 2301, the MS_SA(2) state 2302, or the MS_SA(3) state 2303, if the MS_SA task 2102 receives a Stop Slot Acquisition message 2224 from the MS_C task 2101, it terminates processing, re-transitioning to the MS_SA(0) state 2300.

In the MS_C(1) state 2201, if the MS_SA task 2102 sends the MS_C task 2101 an Acquire Failure(No GP) message 2313 or an Acquire Failure(Rejection) message 2316, the MS_C task 2101 checks 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, depicted in FIG. 22c.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102 once again, by sending it a Start Slot Acquisition message 2222. The MS_C task 2101 then remains in the MS_C(1) state 2201, waiting for a Slot Acquired message from the MS_SA task 2102.

In the MS_C(2) state 2202, the mobile station has failed to successfully register on a base station. In the MS_C(2) state 2202, the MS_C task 2101 may receive a Power Off message 2225 from the UI task 2111, indicating that the MS_C task 2101 is to transition to the MS_C(0) state 2200, previously described, and depicted in FIG. 22a.

In the MS_C(2) state 2202, the mobile station may also receive a Restart message 2231 from the UI task 2111, indicating that the mobile station should perform as if it has just received a Power On message. In this case, the MS_C task 2101 activates the MS_SA task 2102, by sending it a Start Slot Acquisition message 2222. The MS_C task 2101 then transitions to the MS_C(1) state 2201, previously discussed, and depicted in FIG. 22b.

In the MS_C(2) state 2202, the MS_C task 2101 may receive a Originate Call message 2229 from the UI task 2111, indicating the mobile station's end user wishes to place a call on the communication system 101. On receiving an Originate Call message 2229 at this time, the MS_C task 2101 checks 2232 whether the call is an emergency (i.e., 911) call or not. If it is not a emergency call, the MS_C task 2101 posts a Service Unavailable (Not Registered) message 2235 to the UI task 2111, and remains processing in the MS_C(2) state 2202.

Figure 22C:
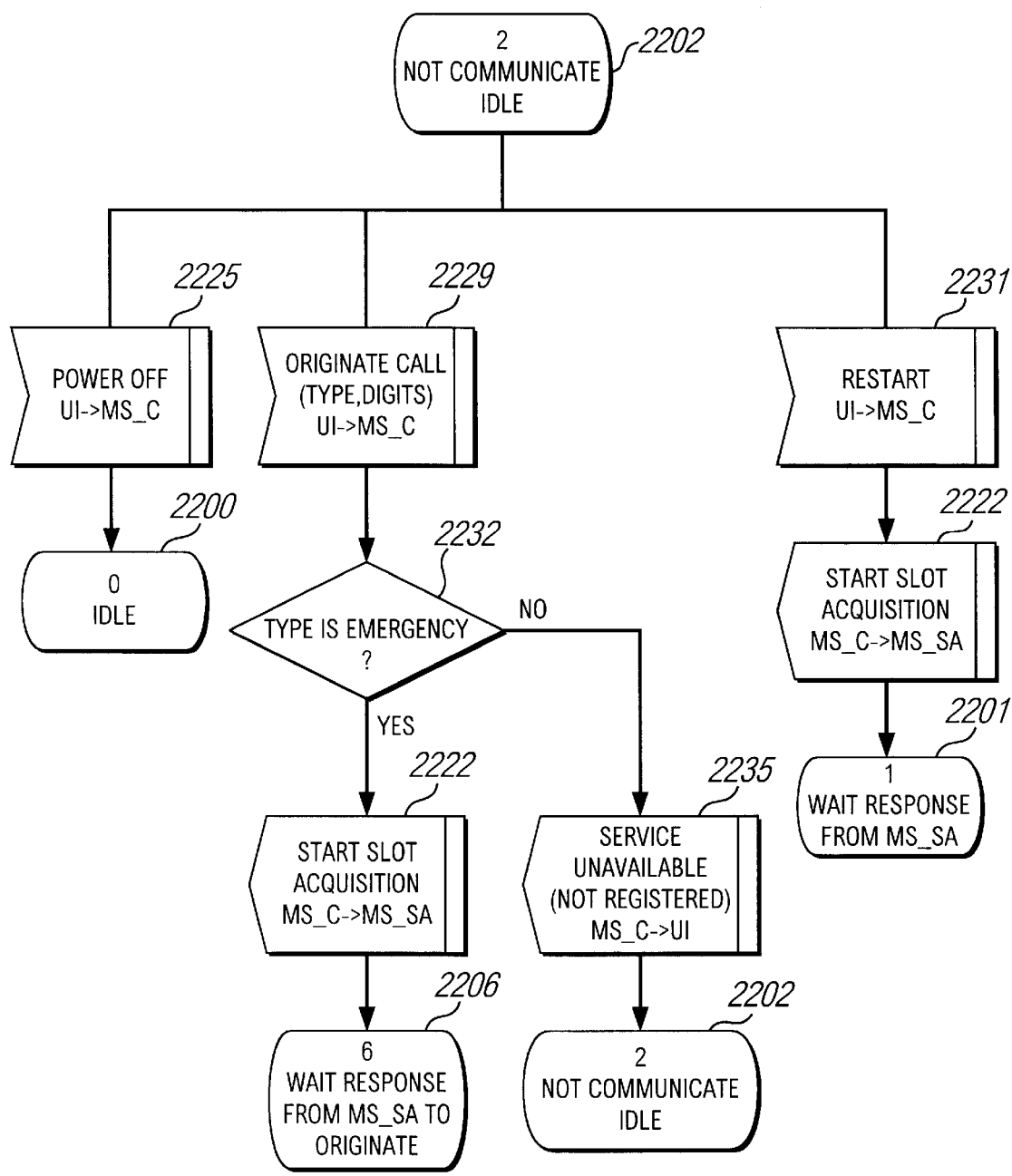

If, however, the call is an emergency call, the MS software attempts to place it on the communication system 101, even though the mobile station has previously failed to register with a base station on the system. In this case, the MS_C task 2101 activates the MS_SA task 2102, by sending it a Start Slot Acquisition message 2222. The MS_SA task 2102 has been previously described, and is depicted in FIG. 23. The MS_C task 2101 then transitions to the MS_C(6) state 2206, depicted in FIG. 22g.

Figures 1, 22D:
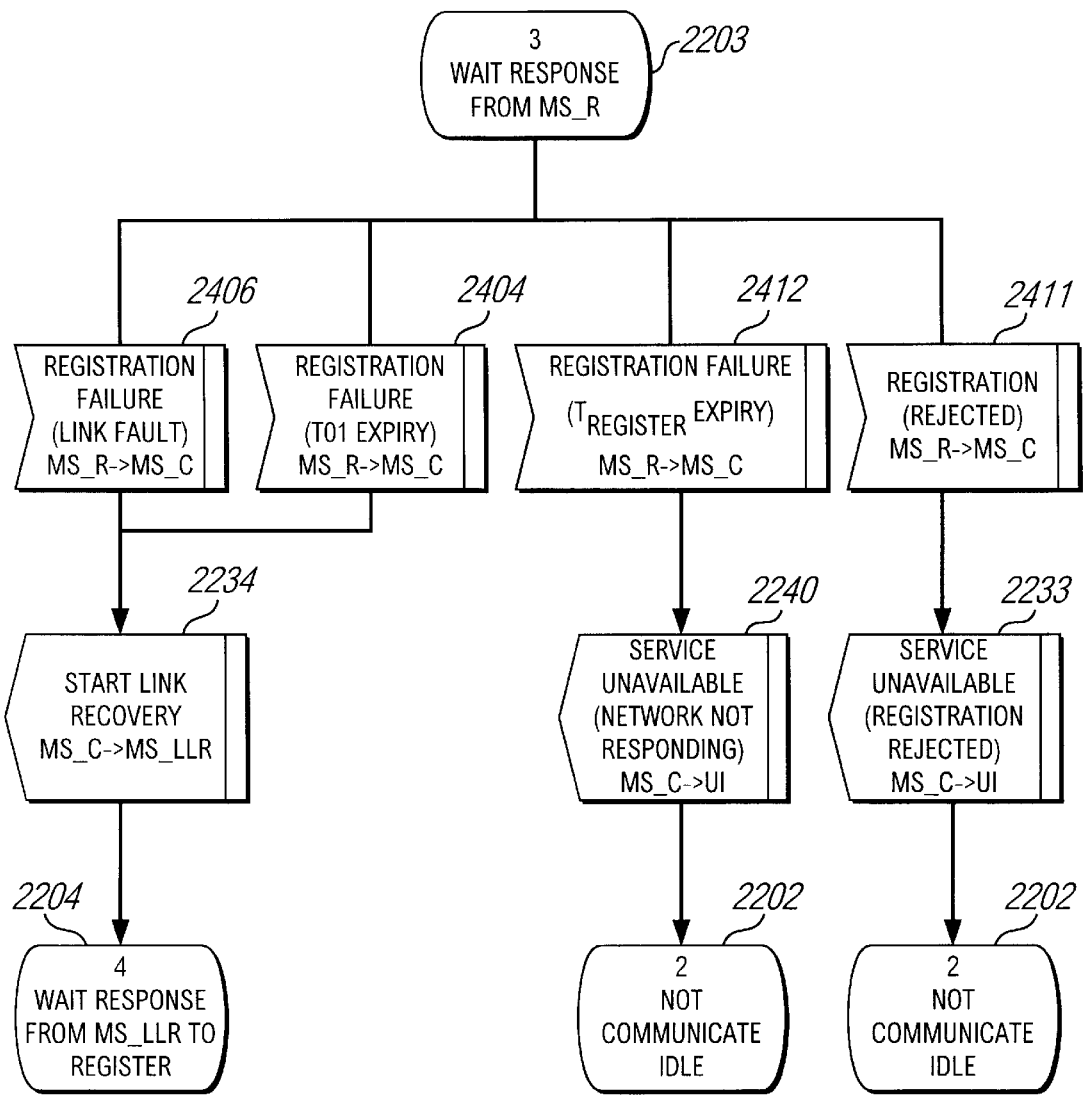
Figures 2, 22D:
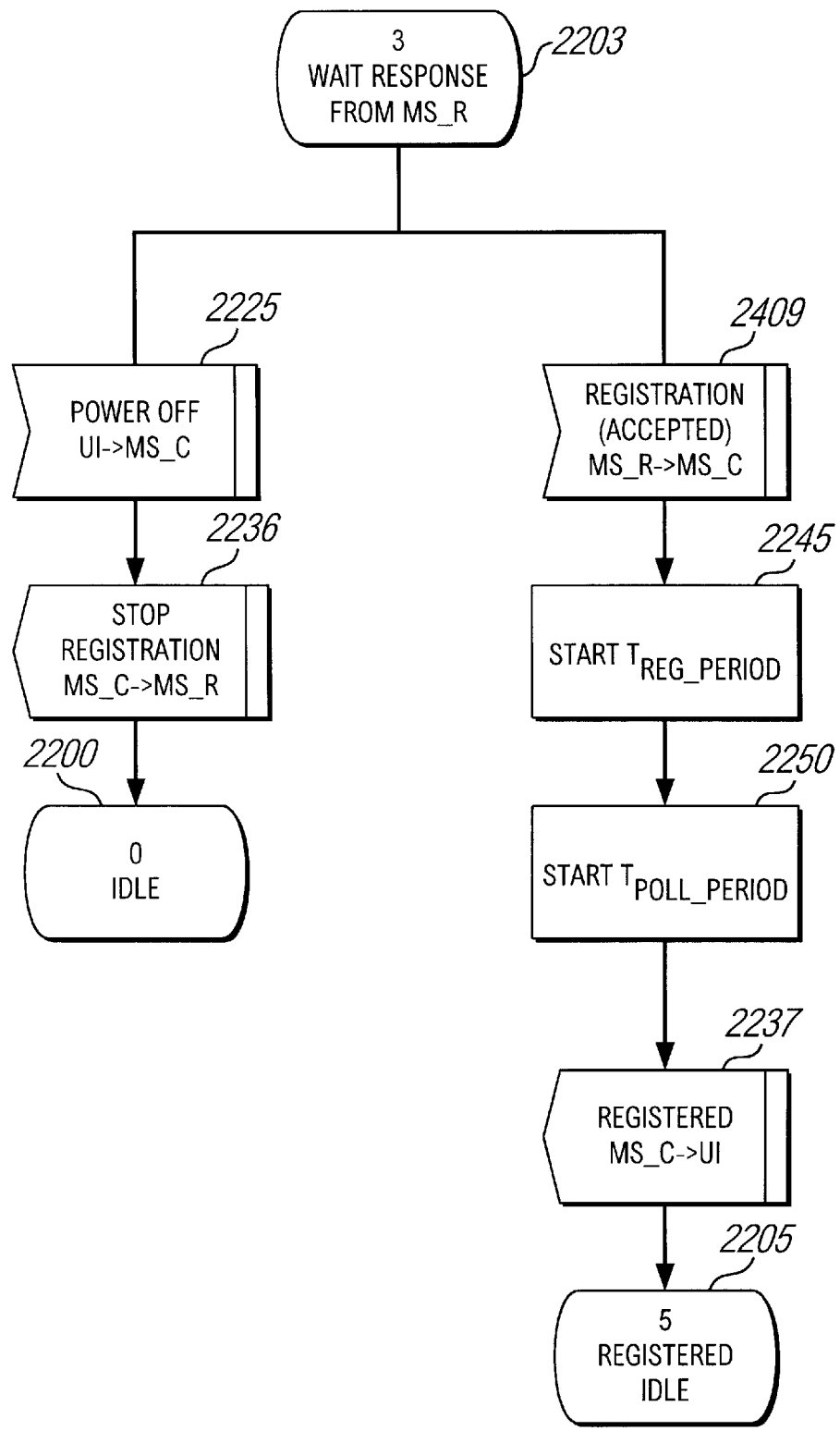

In the MS_C(3) state 2203, depicted in FIG. 22d, the mobile station has acquired a channel on a base station and is now attempting to register with the base station. The MS_C task 2101 is waiting for a Registration (Accepted) message 2409 from the MS_R task 2103, which was activated previously, in the MS_C(2) state 2202.

The MS_R task 2103, depicted in FIG. 24, is activated from the MS_R(0) ("Idle") state when the MS_C task 2101 sends it a Start Registration message 2223. The MS_R task 2103 transmits a CT_RRQ (Registration Request) message 2403 to the base station, establishes a timer T01 2405, for the maximum time it will wait to receive a CT_ACK message response from the base station, and then transitions to the MS_R(1) state 2401.

If T01 expires 2410 in the MS_R(1) state 2401, the MS_R task 2103 sends a Registration Failure (T01 Expiry) message 2404 to the MS_C task 2101, and then terminates processing, re-transitioning to the MS_R(0) state 2400.

If the mobile station receives the expected CT_ACK message 2422 from the base station while processing in the MS_R(1) state 2401, the MS_R task 2103 enables a timer T(register), for the maximum time the MS_R task 2103 will wait to receive a CT_RCP (Registration Complete) message 2414 from the base station. The MS_R task 2103 also re-enables timer T01 2405, transmits a 2420 message to the base station, and then transitions to the MS_R(2) state 2402. Timer TOI is established for the maximum time the MS_R task 2103 will wait for a CT_HLD message from the base station. The base station and the mobile station transmit CT_HLD messages to each other when they are executing a protocol sequence, such as the registration protocol sequence currently being described, and have no other message to transmit to the other.

In the MS_R(2) state 2402, the MS_R task 2103 continues to process the transmission 2420 and reception 2415 of CT_HLD messages to/from the base station, re-enabling timer T01 2405 each time a CT_HLD message is received 2415 from the base station. If T01 expires 2410 in this state, the MS_R task 2103 sends a Registration Failure (T01 Expiry) message 2404 to the MS_C task 2101, and then terminates processing, re-transitioning to the MS_R(0) state 2400.

If the mobile station receives the expected CT_RCP (Registration Complete) message 2414 from the base station before timer T(register) expires, the MS_R task 2103 checks 2408 the CT_RCP message to see if the mobile station's registration request was accepted. If no, the MS_R task 2103 sends a Registration (Rejected) message 2411 to the MS_C task 2101. If, however, the CT_RCP message indicates the mobile station's registration request was accepted, the MS_R task 2103 sends a Registration (Accepted) message 2409 to the MS_C task 2101. In either event, upon receiving the CT_RCP message 2414, the MS_R task 2103 also transmits a CT_ACK message 2423 to the base station, acknowledging the CT_RCP message. The MS_R task 2103 then terminates processing, re-transitioning to the MS_R(0) state 2400.

If timer T(register) expires 2413, the MS_R task 2103 sends a Registration Failure (T(register) Expiry) message 2412 to the MS_C task 2101. The MS_R task 2103 then terminates processing, re-transitioning to the MS_R(0) state 2400.

In the MS_R(1) state 2401 or the MS_R(2) state 2402, the mobile station may receive an unexpected 2416 or erroneous 2417 message on the O-Interface (as previously described). Upon receiving an unexpected or erroneous message while processing in either of these states, the MS_R task 2103 increments the appropriate LeakyBucket counter (2418 or 2419). The MS_R task 2103 then checks 2421 if either LeakyBucket counter indicates a maximum error count has been reached. If no, the MS_R task 2103 re-transmits the last message it transmitted to the base station, and continues processing in the current MS_R state. If the MS_R task 2103 is in the MS_R(1) state 2401, the last message transmitted was a CT_RRQ (Registration Request) message 2403. If the MS_R task 2103 is in the MS_R(2) state 2402, the last message transmitted was a CT_HLD message 2420.

If, however, the MS_R task 2103 checks 2421 its Leaky-Bucket counters and finds that either indicates a maximum error count, it sends a Registration Failure (Link Fault) message 2406 to the MS_C task 2101, and then terminates processing, re-transitioning to the MS_R(0) state 2400.

As previously noted, the MS_C task 2101 is in the MS_C(3) state 2203, depicted in FIG. 22d, while it waits for a Registration (Accepted) message 2409 from the MS_R task 2103. While in the MS_C(3) state 2203, if the MS_C task 2101 receives a Power Off message 2225 from the UI task 2111, its sends a Stop Registration message 2236 to the MS_R task 2103. The MS_C task 2101 then transitions to the MS_C(0) state 2200, previously discussed, and depicted in FIG. 22a.

While in the MS_R(1) state 2401 or the MS_R(2) state 2402, if the MS_R task 2103 receives a Stop Registration message 2236 from the MS_C task 2101, it terminates processing, re-transitioning to the MS_R(0) state 2400.

In the MS_C(3) state 2203, if the MS_C task 2101 receives a Registration Failure (T(register) Expiry) message 2412 from the MS_R task 2103, the MS_C task 2101 posts a Service Unavailable (Network Not Responding) message 2240 to the UI task 2111, and then transitions to the MS_R(2) state 2402, previously discussed, and depicted in FIG. 22c.

In the MS_C(3) state 2203, if the MS_C task 2101 receives a Registration (Rejected) message 2411 from the MS_R task 2103, the MS_C task 2101 posts a Service Unavailable (Registration Rejected) message 2233 to the UI task 2111, and then transitions to the MS_R(2) state 2402, previously discussed, and depicted in FIG. 22c.

In the MS_C(3) state 2203, if the MS_C task 2101 receives a Registration Failure (Link Fault) message 2406 or a Registration Failure (T01 Expiry) message 2404 from the MS_R task 2103, the MS_C task 2101 activates the MS_LLR task 2107, by sending it a Start Link Recovery message 2234. The MS_C task 2101 then transitions to the MS_C(4) state 2204, depicted in FIG. 22e.

In the MS_C(3) state 2203, if the MS_C task 2101 receives a Registration (Accepted) message 2409 from the MS_R task 2103, indicating the mobile station has successfully registered with a base station, the MS_C task 2101 posts a Registered message 2237 to the UI task 2111. The MS_R task 2103 also enables a timer, T(reg period) 2245, set for the time the MS_C task 2101 will wait before attempting to register with a base station again. In a preferred embodiment, while a mobile station is powered on, it periodically re-registers with a base station in the communication system 101.

At this time, the MS_C task 2101 also enables a timer, T(poll_period) 2250, set for the time the MS_C task 2101 will wait before it checks to see if the base station it is currently tuned to is paging it, for a call for the mobile station's end user. The MS_C task 2101 then transitions to the MS_C(5) state 2205, depicted in FIG. 22f.

Figure 22E:
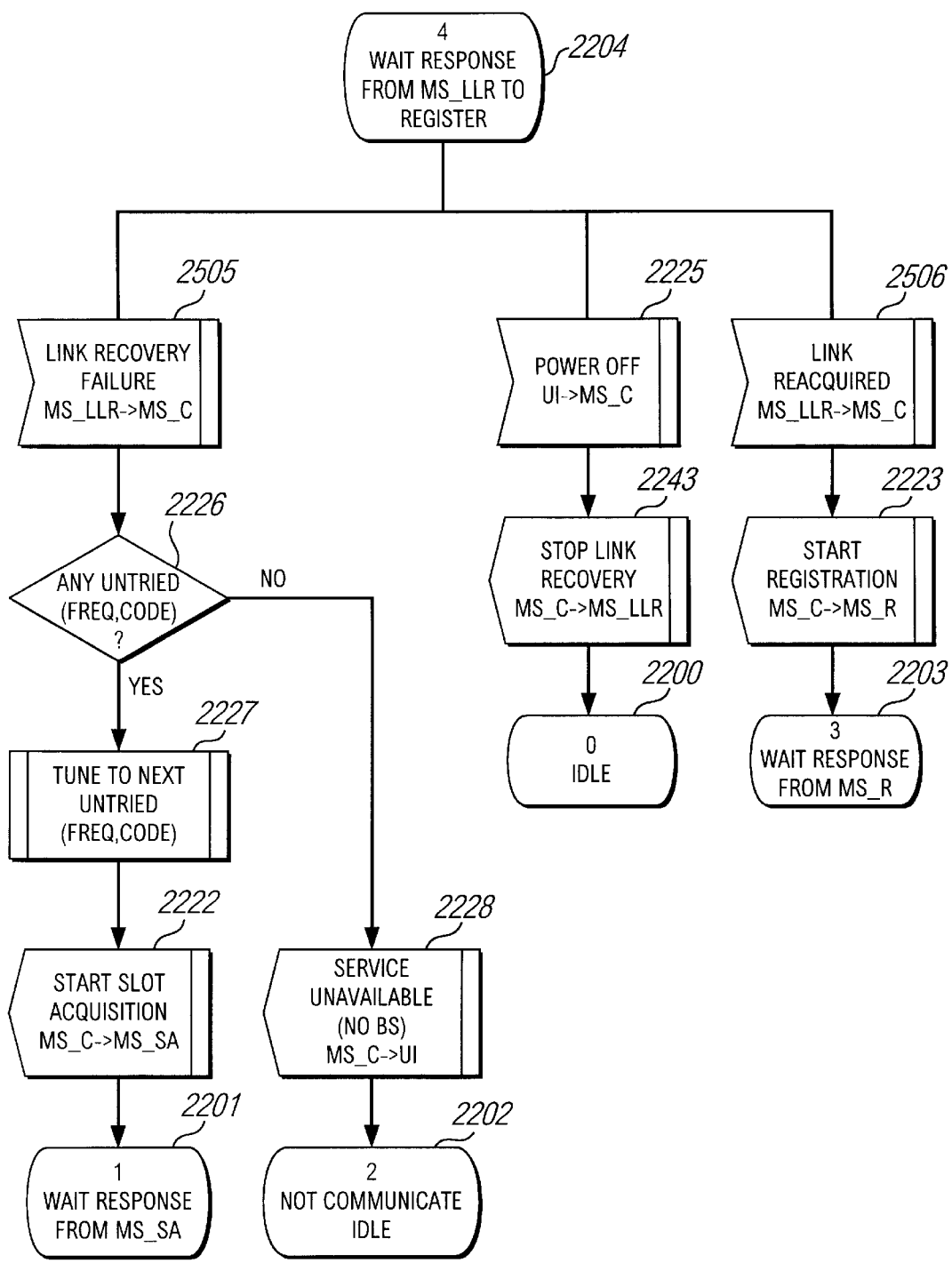

In the MS_C(4) state 2204, depicted in FIG. 22e, the MS_C task 2101 is waiting for a Link Reacquired message from the MS_LLR task 2107.

Figures 1, 25:
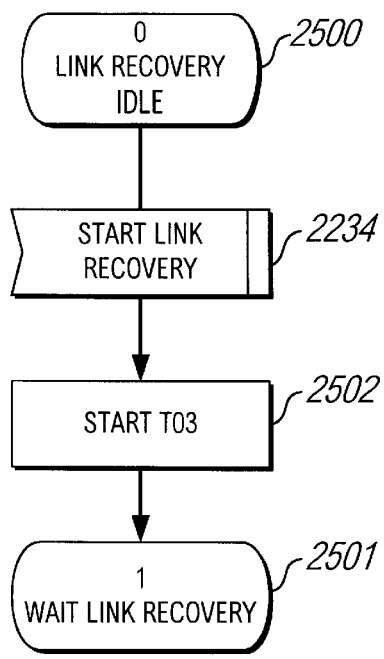
FIG. 25 is a state diagram of the MS software Lost Link Recovery (MS_LLR) task.
Figures 2, 25:
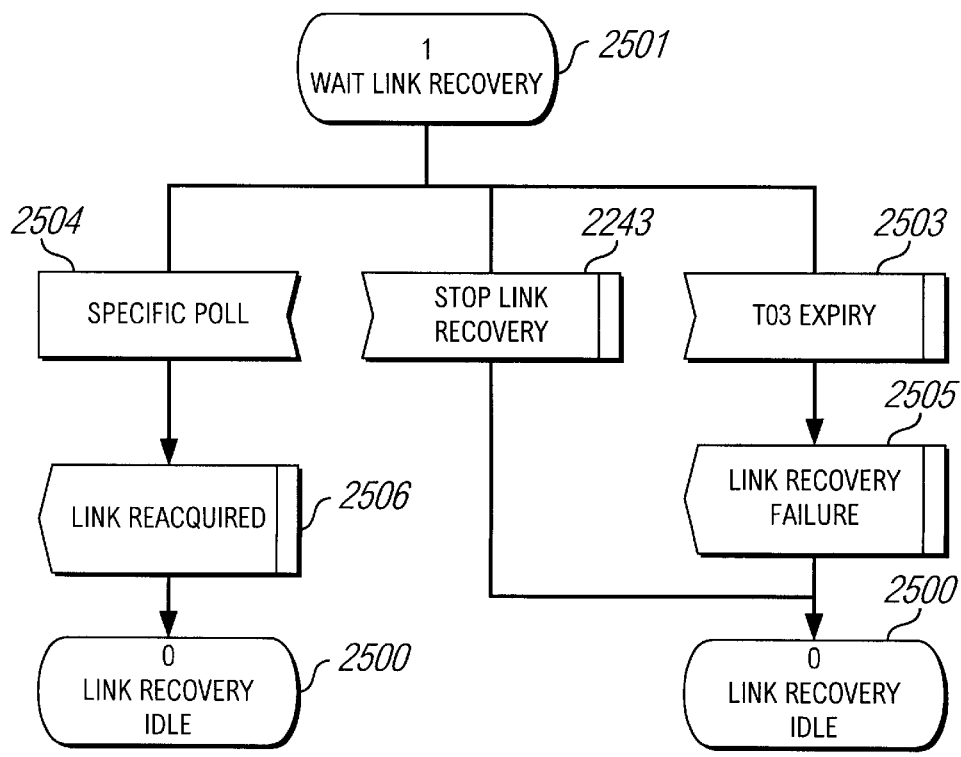

The MS_LLR task 2107, depicted in FIG. 25, is activated from its MS_LLR(0) ("Idle") state 2500 when the MS_C task 2101 sends it a Start Link Recovery message 2234. The MS_LLR task 2107 enables a timer T03 2502, for the maximum time it will wait for the mobile station to receive a Specific Poll message for it, which the mobile station can use to resync to the base station it is currently tuned to. The MS_LLR task 2107 then transitions to the MS_LLR(1) state 2501.

In the MS_LLR(1) state, if the mobile station receives a Specific Poll message 2504 for it before T03 expires, it sends a Link Reacquired message 2506 to the MS_C task 2101. The MS_LLR task 2107 then terminates processing, re-transitioning to the MS_LLR(0) state 2500.

In the MS_LLR (1) state, if T03 expires 2503, the MS_LLR task 2107 sends a Link Recovery Failure message 2505 to the MS_C task 2101. The MS_LLR task 2107 then terminates processing, re-transitioning to the MS_LLR(0) state 2500.

The MS_C task 2101, while processing in the MS_C(4) state 2204, waiting for the MS_LLR task 2107 to resync the mobile station to the base station, may receive a Power Off message 2225 from the UI task 2111. On receiving a Power Off message 2225 at this time, the MS_C task 2101 sends a Stop Link Recovery message 2243 to the MS_LLR task 2107, and then transitions to the MS_C(0) state 2200, previously discussed, and depicted in FIG. 22a.

In the MS_LLR(1) state 2501, if the MS_LLR task 2107 receives a Stop Link Recovery message 2243 from the MS_C task 2101, it terminates processing, re-transitioning to the MS_LLR(0) state 2500.

In the MS_C(4) state 2204, if the MS_C task 2101 receives a Link Recovery Failure message 2505 from the MS_LLR task 2107, it checks 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, previously discussed, and depicted in FIG. 22c.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102, depicted in FIG. 23, by sending it a Start Slot Acquisition message 2222. The MS_C task 2101 then transitions to the MS_C(1) state 2201, previously discussed, and depicted in FIG. 22b, where it waits for a Slot Acquired message from the MS_SA task 2102.

In the MS_C(4) state 2204, if the MS_C task 2101 receives a Link Reacquired message 2506 from the MS_LLR task 2107, the MS_C task 2101 activates the MS_R task 2103, previously discussed, and depicted in FIG. 24, by sending it a Start Registration message 2223. The MS_C task 2101 then transitions to the MS_C(3) state 2203, also previously discussed, and depicted in FIG. 22d.

Figure 22F:
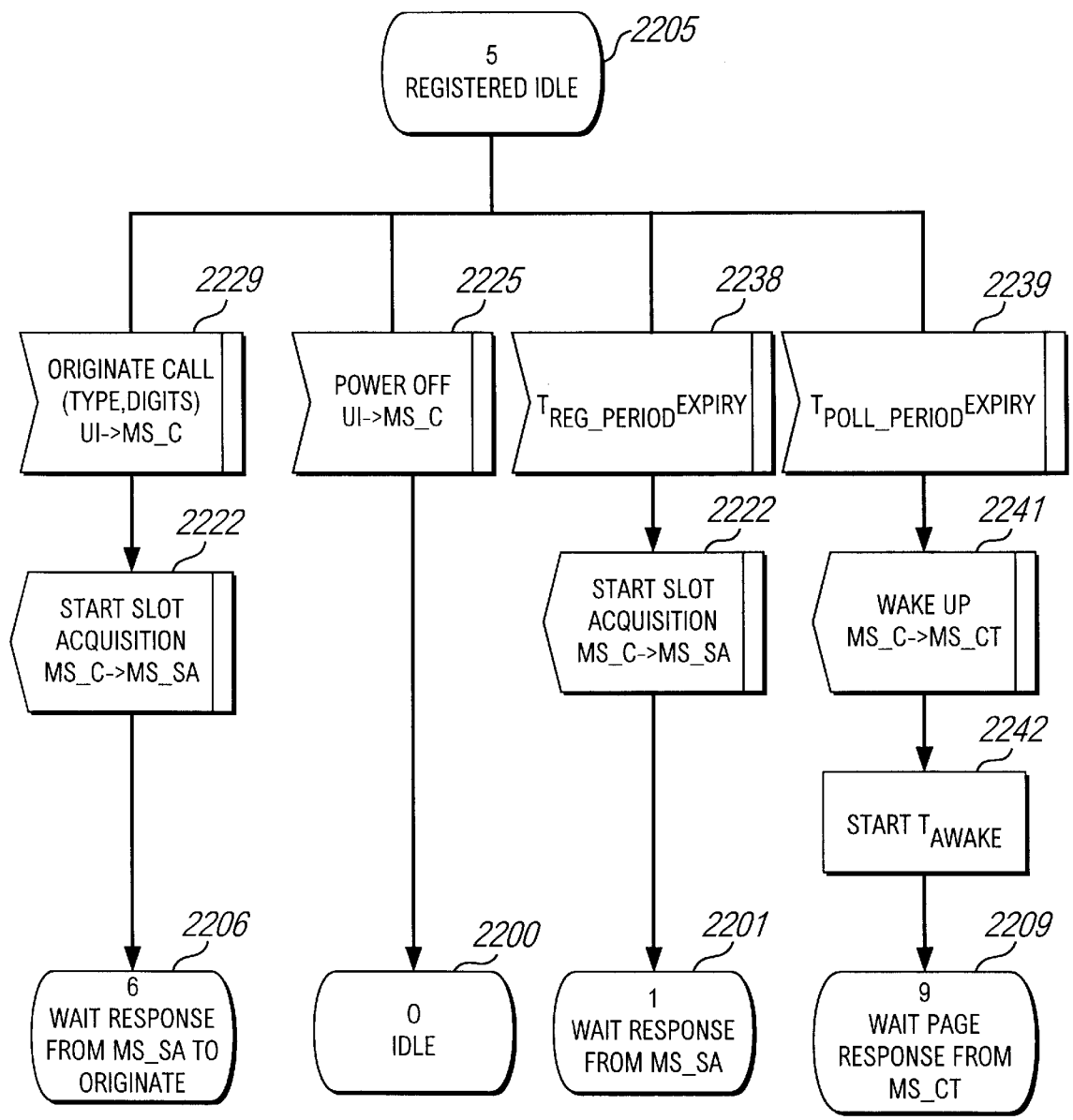
Figure 22G:
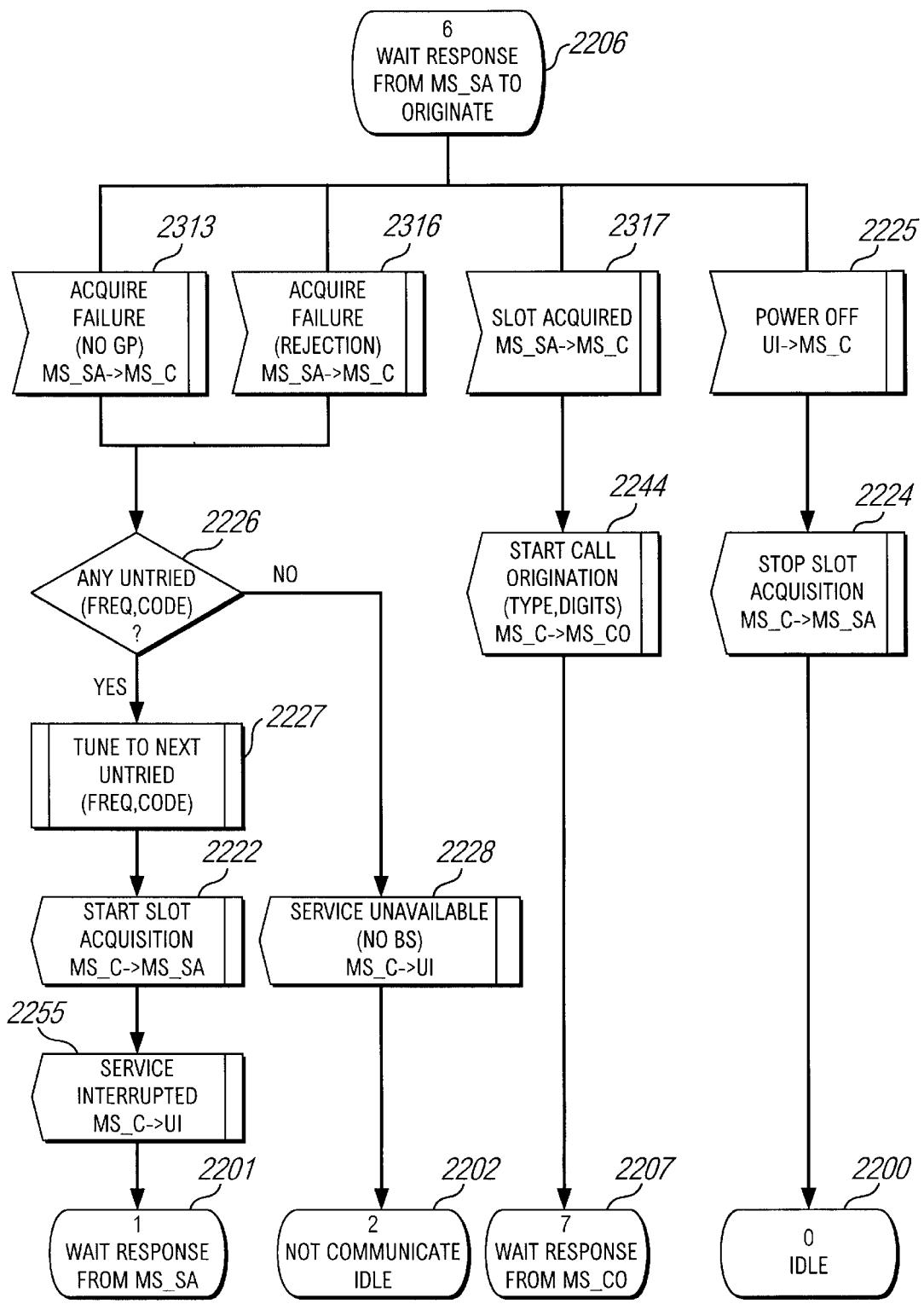

As previously noted, if the mobile station successfully registers with a base station, the MS_C task 2101 transitions to the MS_C(5) state 2205, depicted in FIG. 22f. In the MS_C(5) state 2205, if the MS_C task 2101 receives a Power Off message 2225 from the UI task 2111, the MS_C task 2101 transitions to the MS_C(0) state 2200, previously discussed, and depicted in FIG. 22a.

While in the MS_C(5) state 2205, if timer T(reg_period) expires 2238, the MS_C task 2101 activates the MS_SA task 2102, previously discussed and depicted in FIG. 23, by sending it a Start Slot Acquisition message 2222. At this time, the mobile station will attempt to acquire a channel on a base station, which it can then use to execute the registration protocol sequence on, to register with the base station. The MS_C task 2101, thus, transitions to the MS_C(1) state 2201, previously discussed, and depicted in FIG. 22b.

Figures 1, 27:
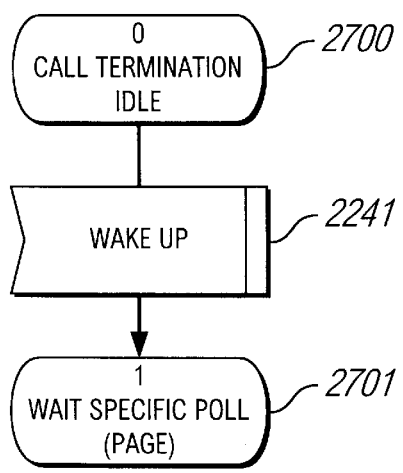
FIG. 27 is a state diagram of the MS software Call Termination (MS_CT) task.
Figures 2, 27:
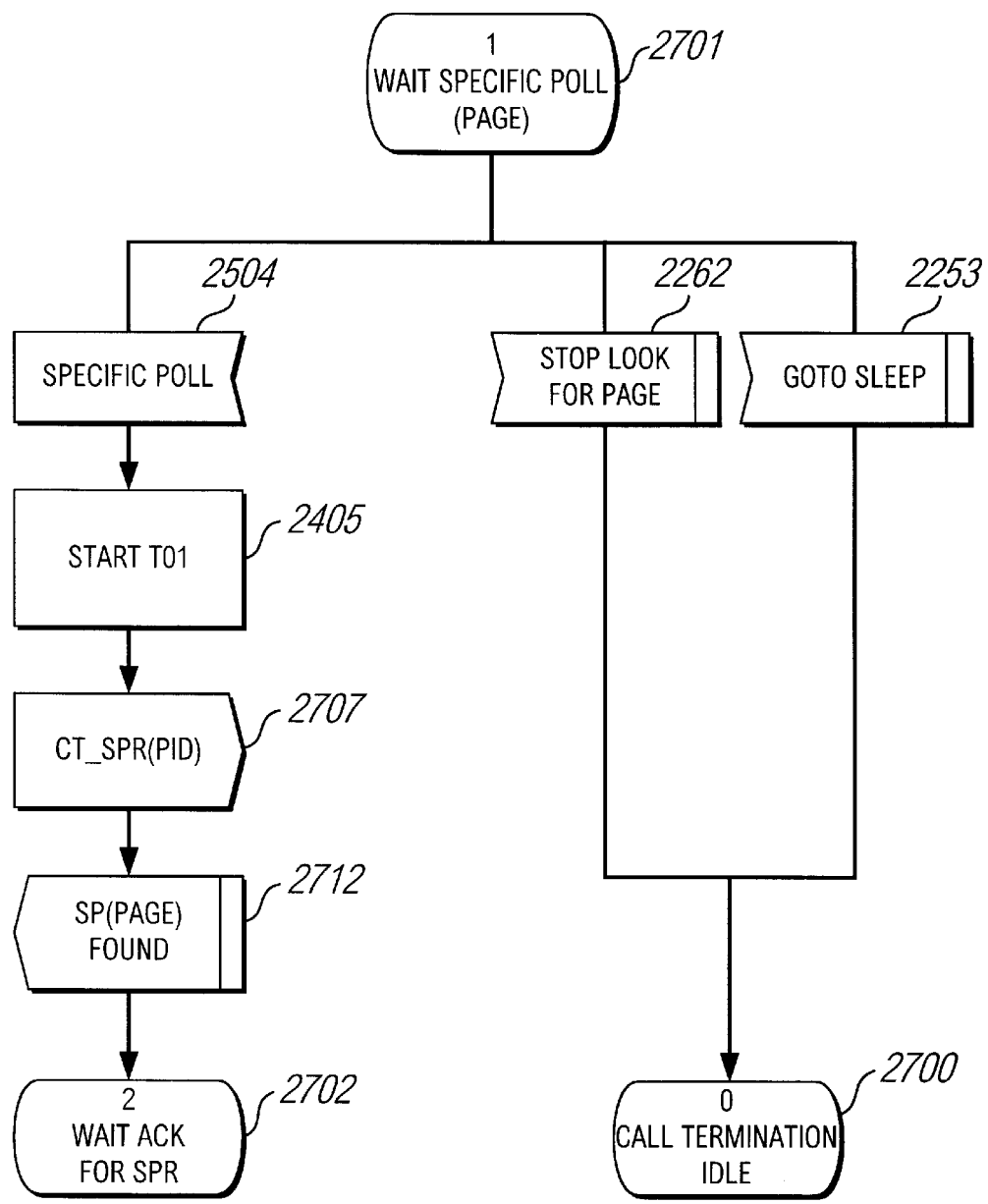
Figures 3, 27:
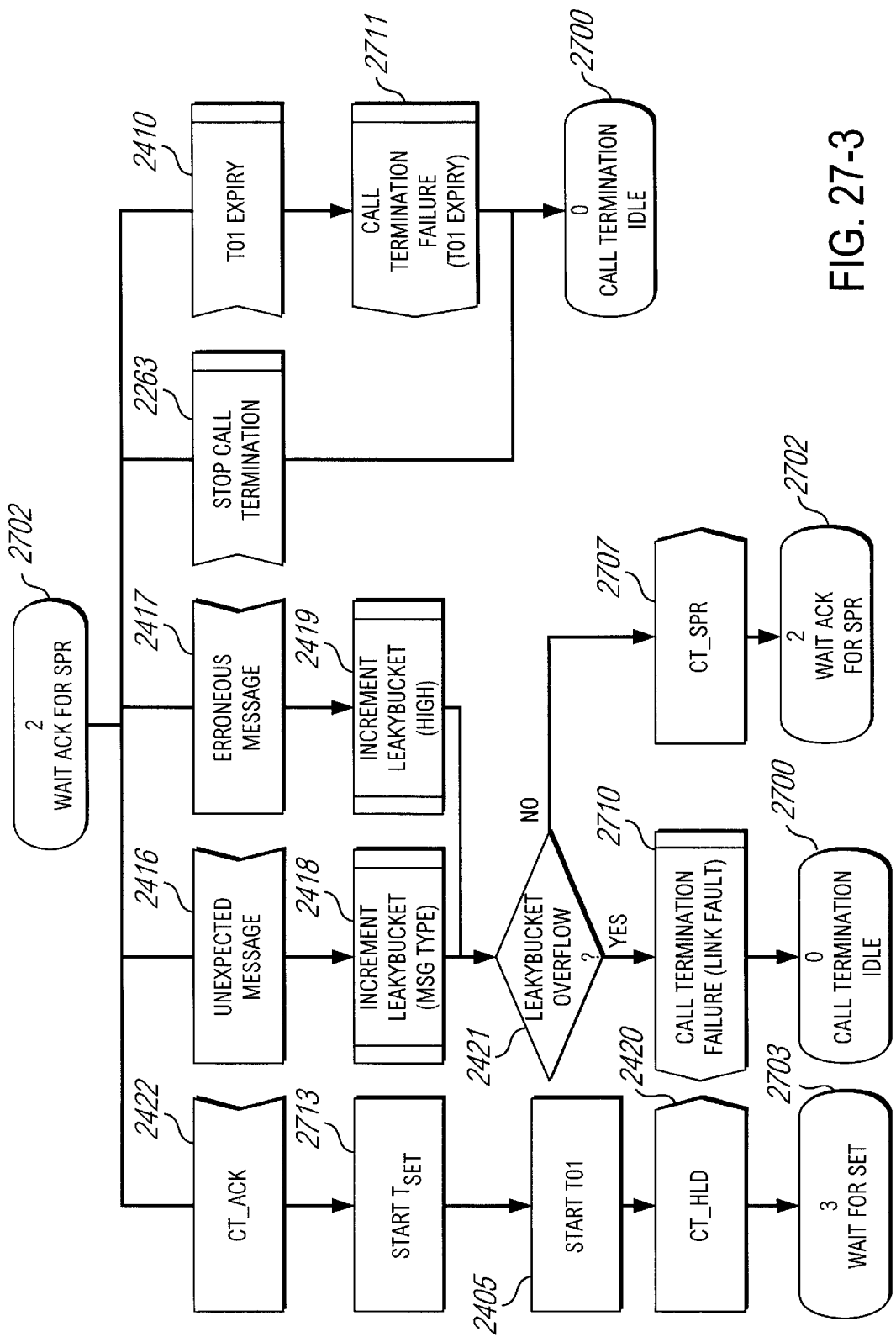
Figures 4, 27:
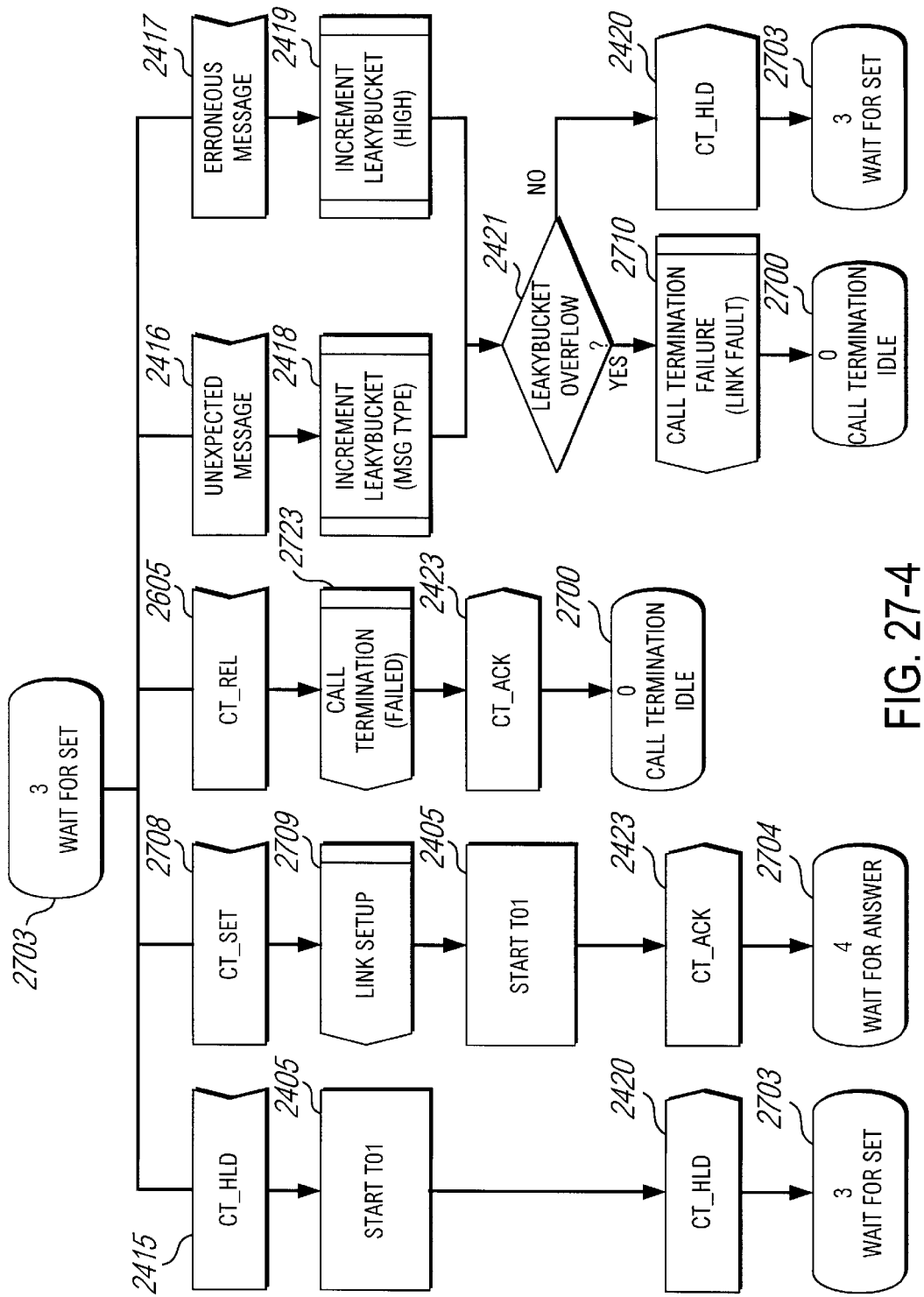
Figures 5, 27:
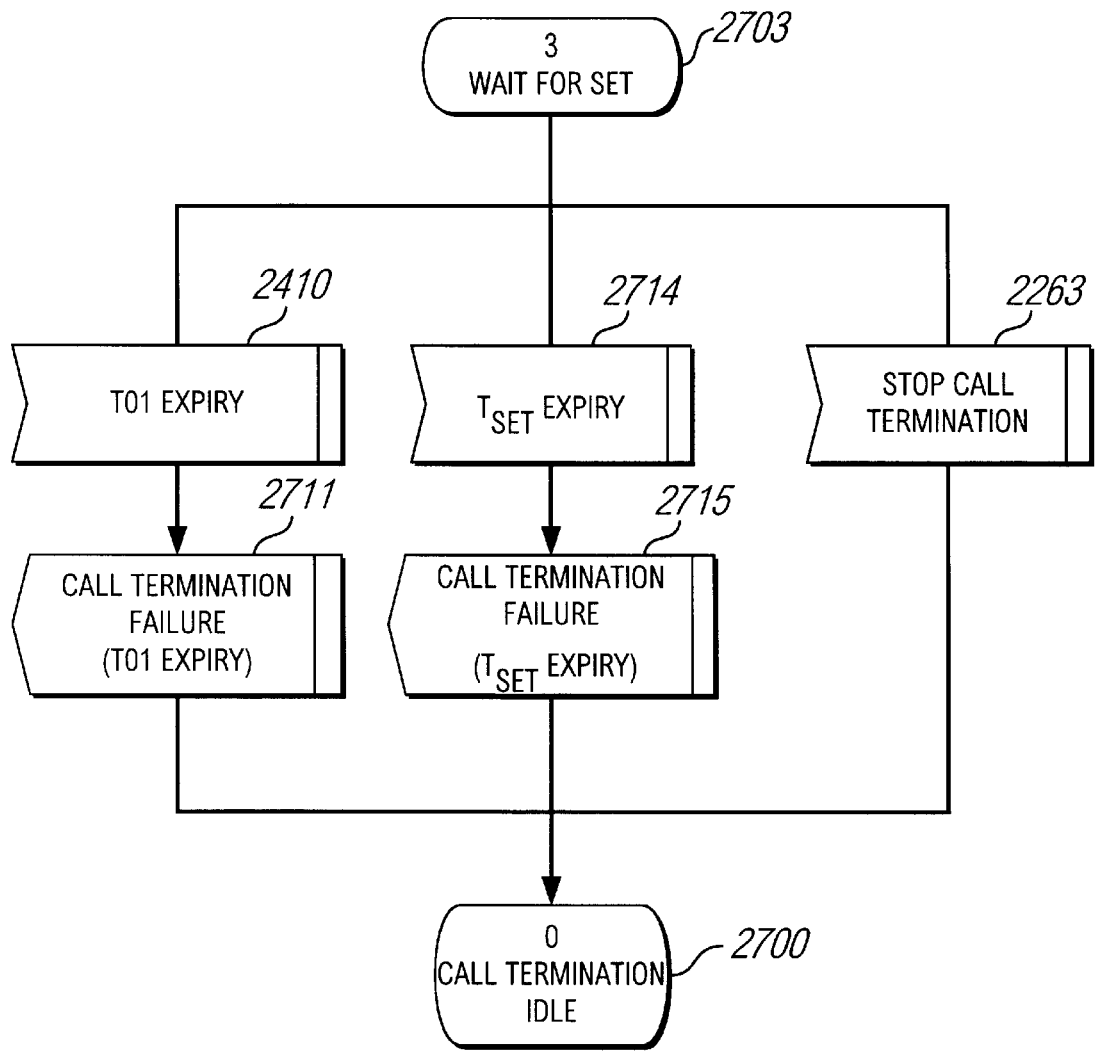
Figures 6, 27:
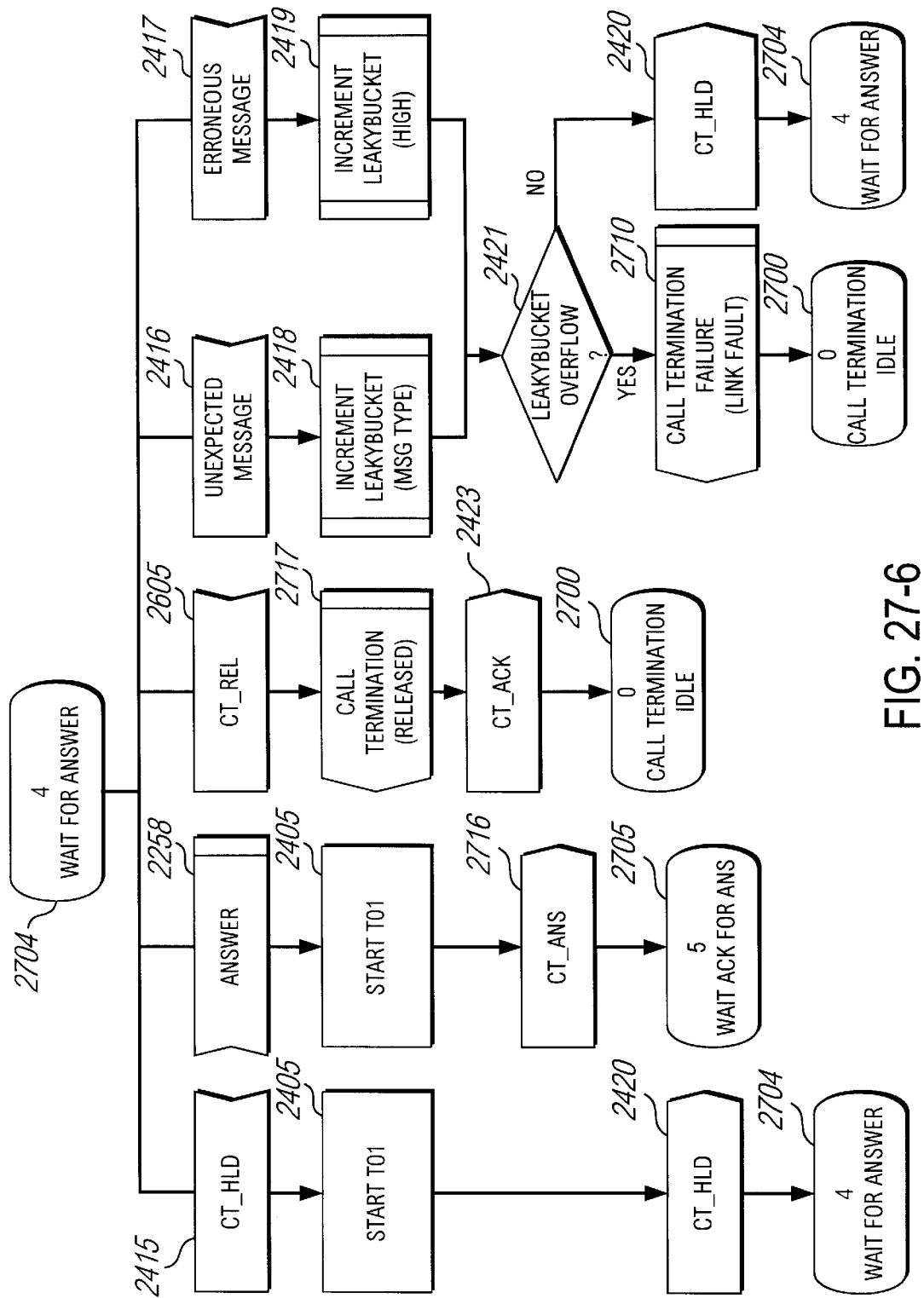
Figures 7, 27:
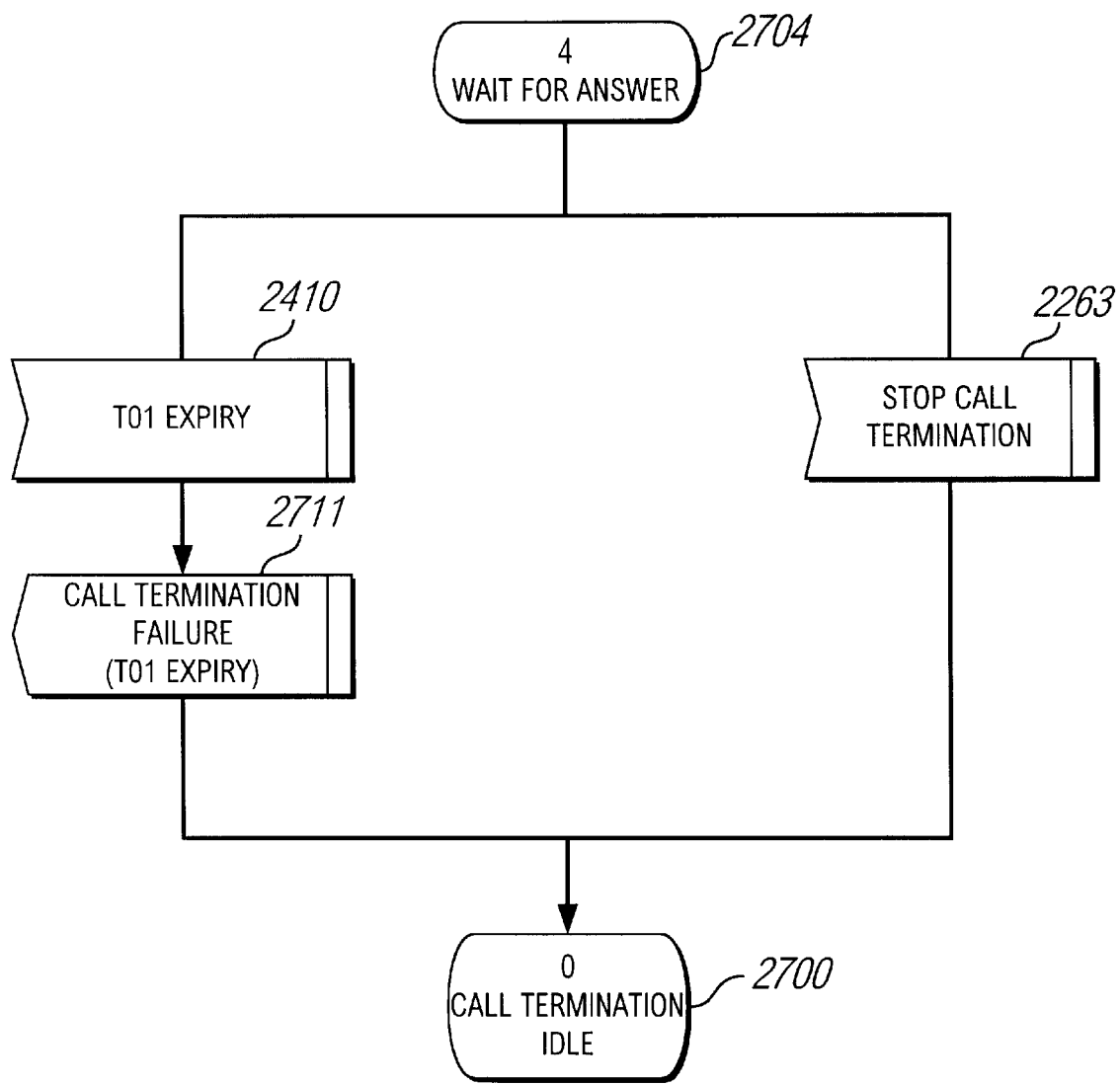
Figures 8, 27:
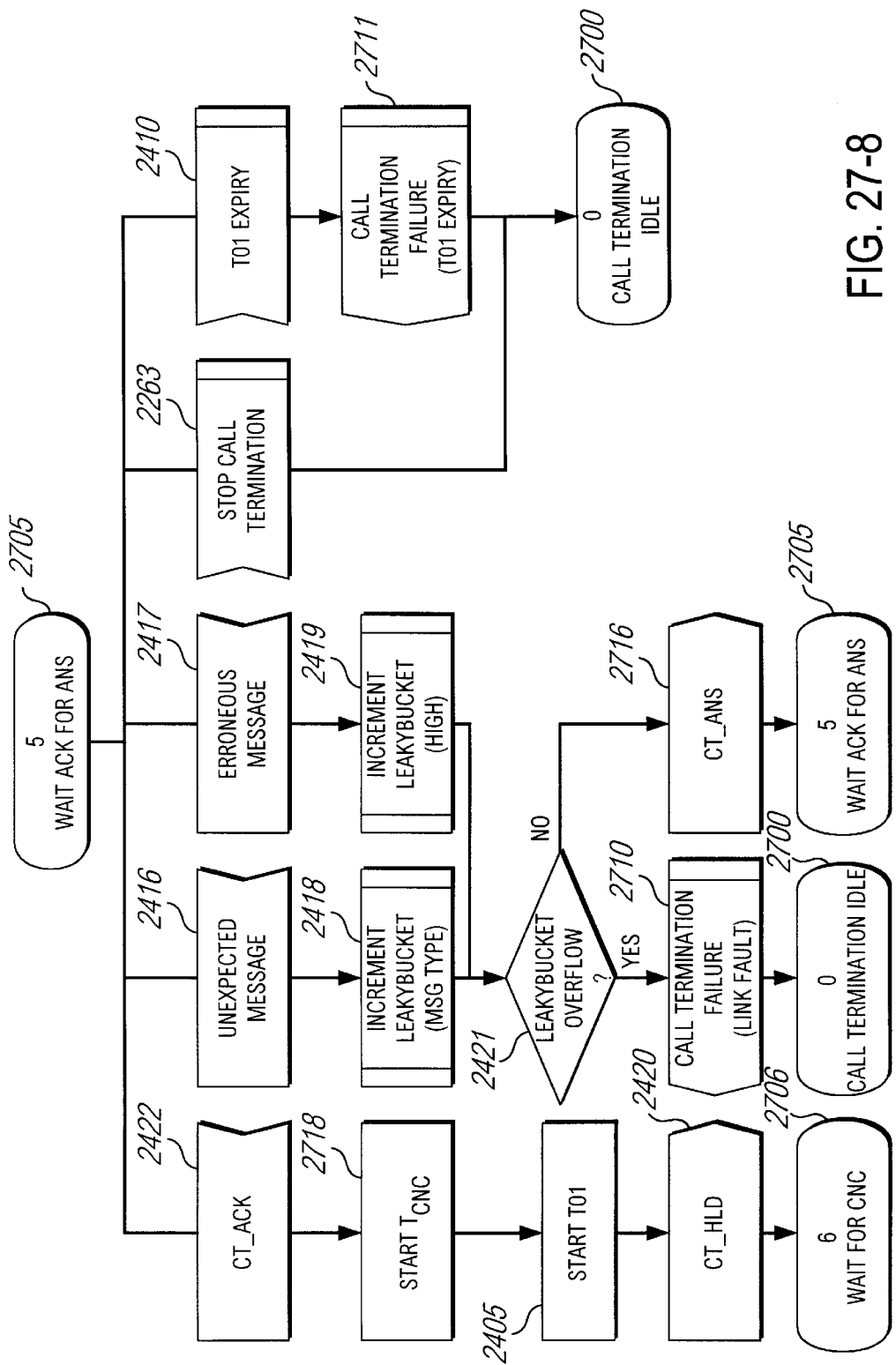
Figures 9, 27:
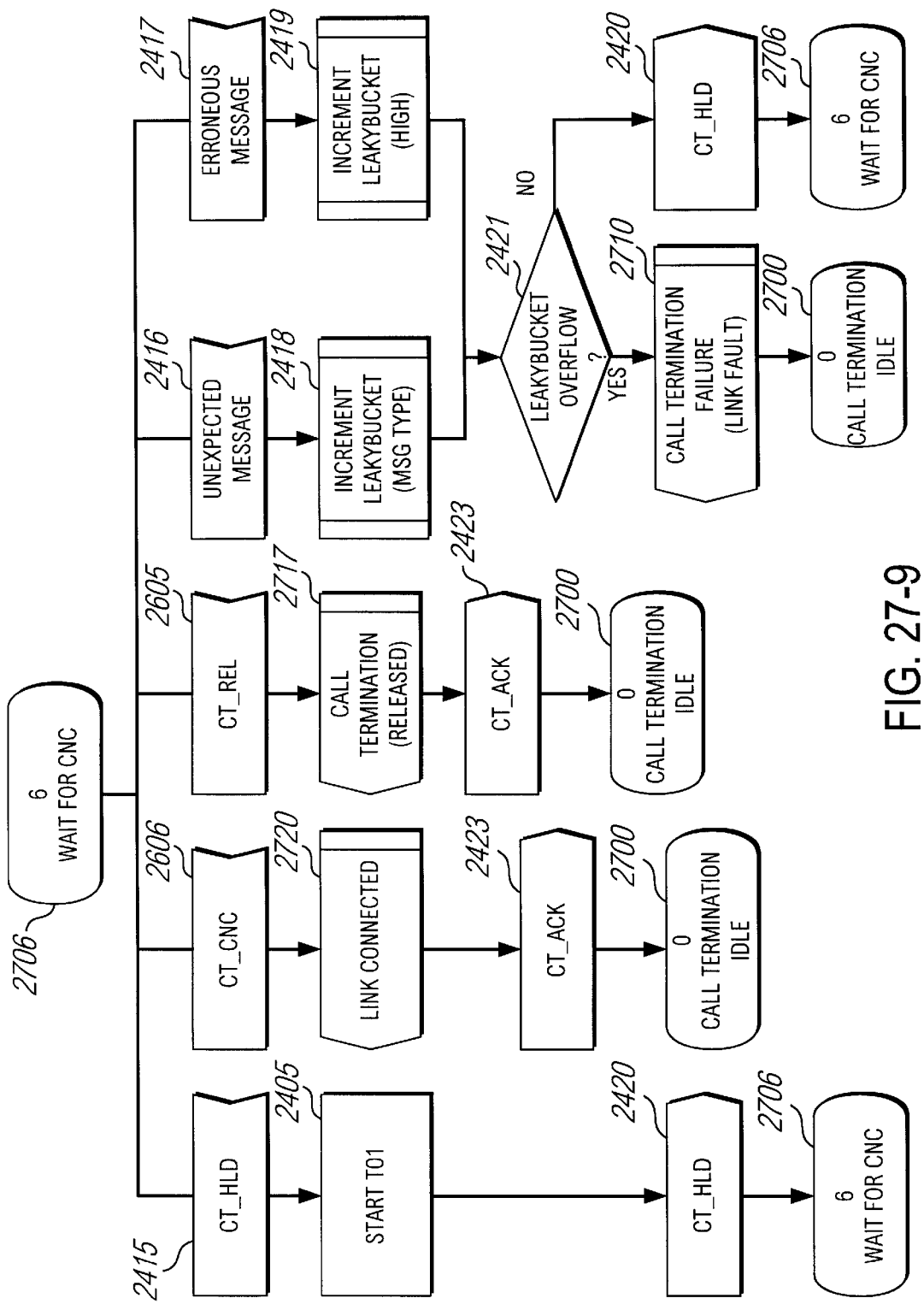
Figures 10, 27:
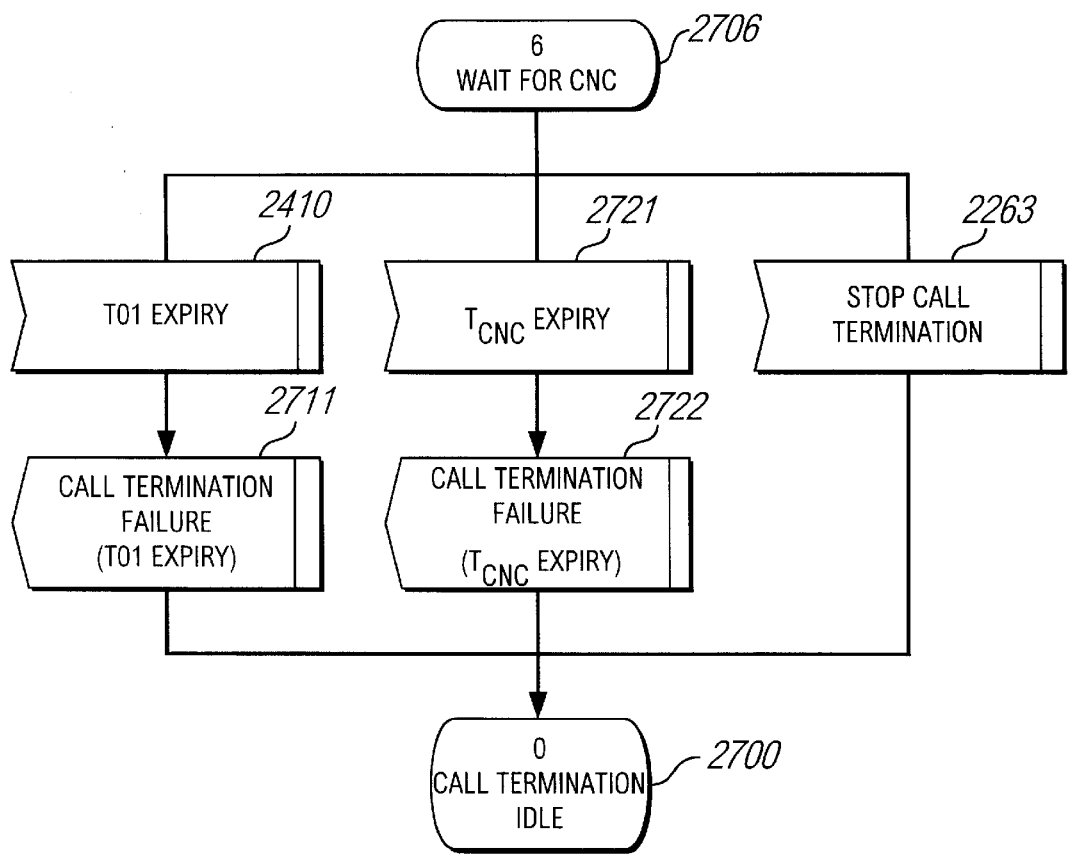

While in the MS_C(5) state 2205, if timer T(poll_period) expires 2239, the MS_C task 2101 activates the MS_CT task 2104, depicted in FIG. 27, sending it a Wake Up message 2241. At this time, the mobile station checks to see if the base station it is currently tuned to is paging it, for a call for its end user. The MS_C task 2101 enables a timer, T(awake) 2242, for the maximum time it will process in the MS_CT task 2104, waiting to receive a Specific Poll message for the mobile station. The MS_C task 2101 then transitions to the MS_C(9) state 2209, depicted in FIG. 22j.

While in the MS_C(5) state 2205, if the MS_C task 2101 receives an Originate Call message 2229 from the UI task 2111, the MS_C task 2101 activates the MS_SA task 2102, previously discussed, and depicted in FIG. 23, to acquire a channel on a base station. At this time, the mobile station end user wishes to place a call on the communication system 101. The MS_C task 2101 now transitions to the MS_C(6) state 2206, depicted in FIG. 22g, where it waits to receive a Slot Acquired message from the MS_SA task 2102.

Figures 1, 26:
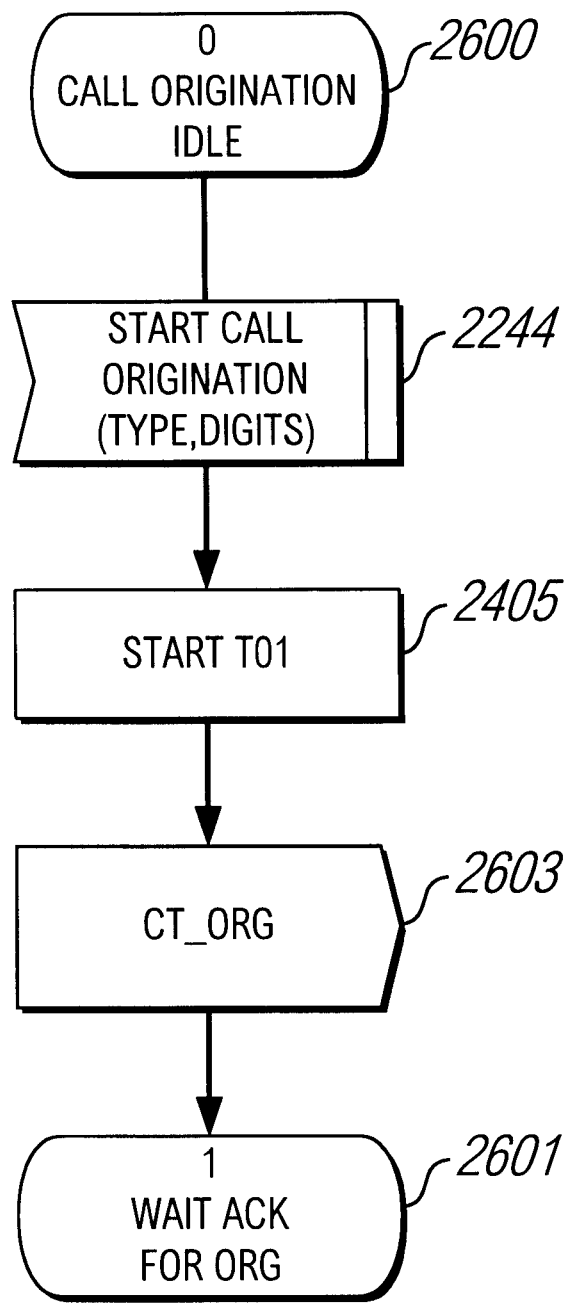
FIG. 26 is a state diagram of the MS software Call Origination (MS_CO) task.
Figures 2, 26:
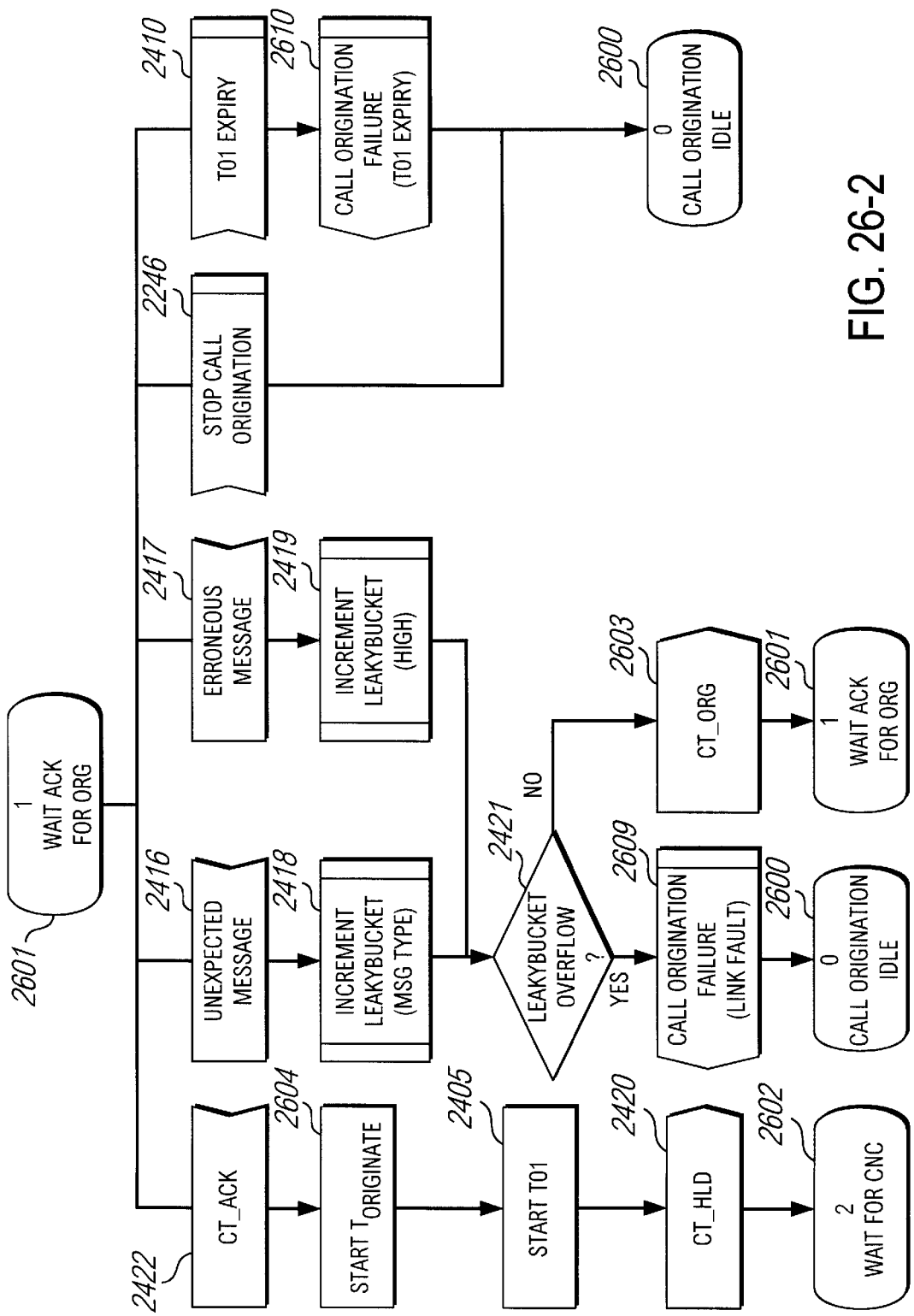
Figures 3, 26:
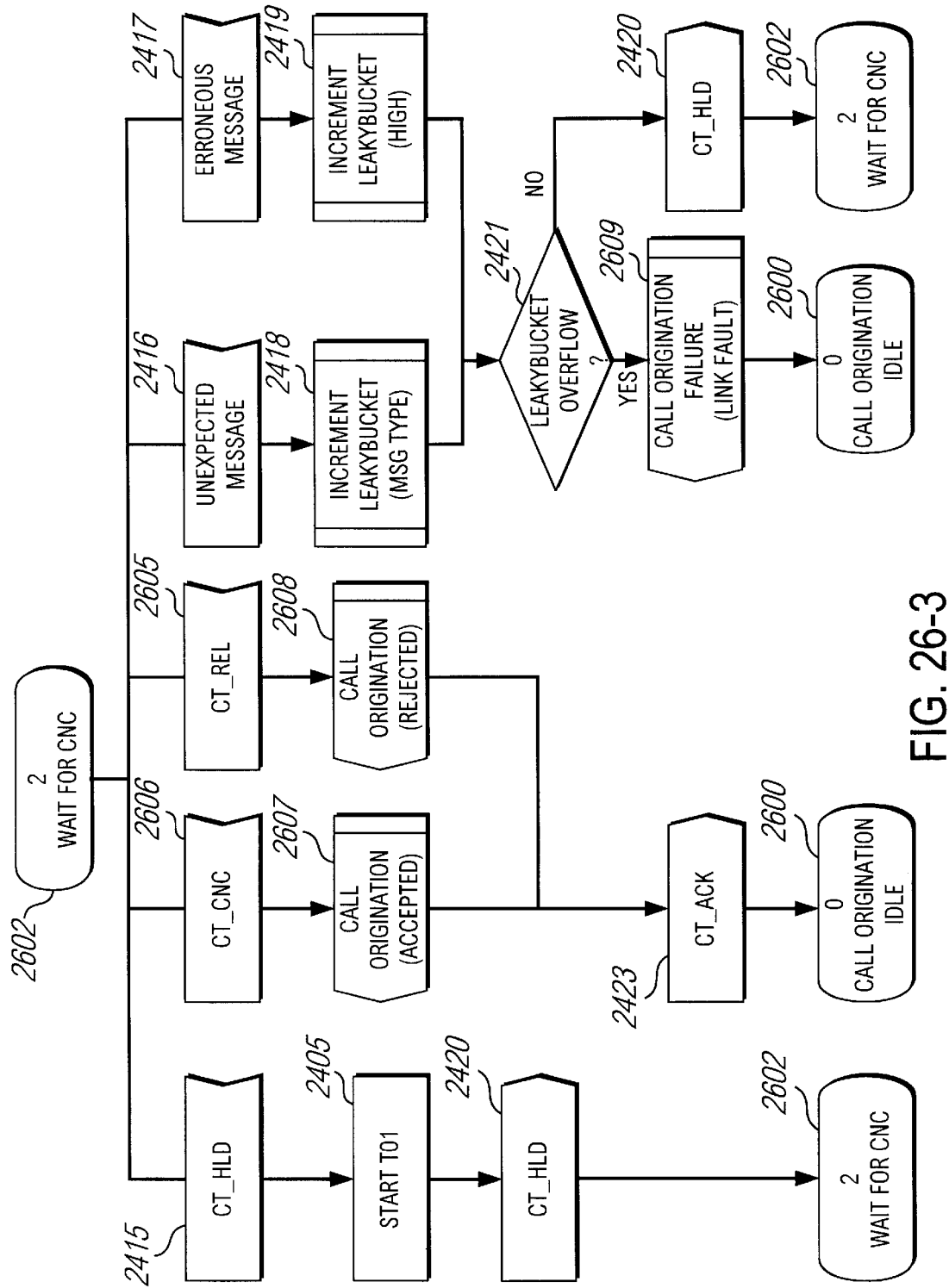
Figures 4, 26:
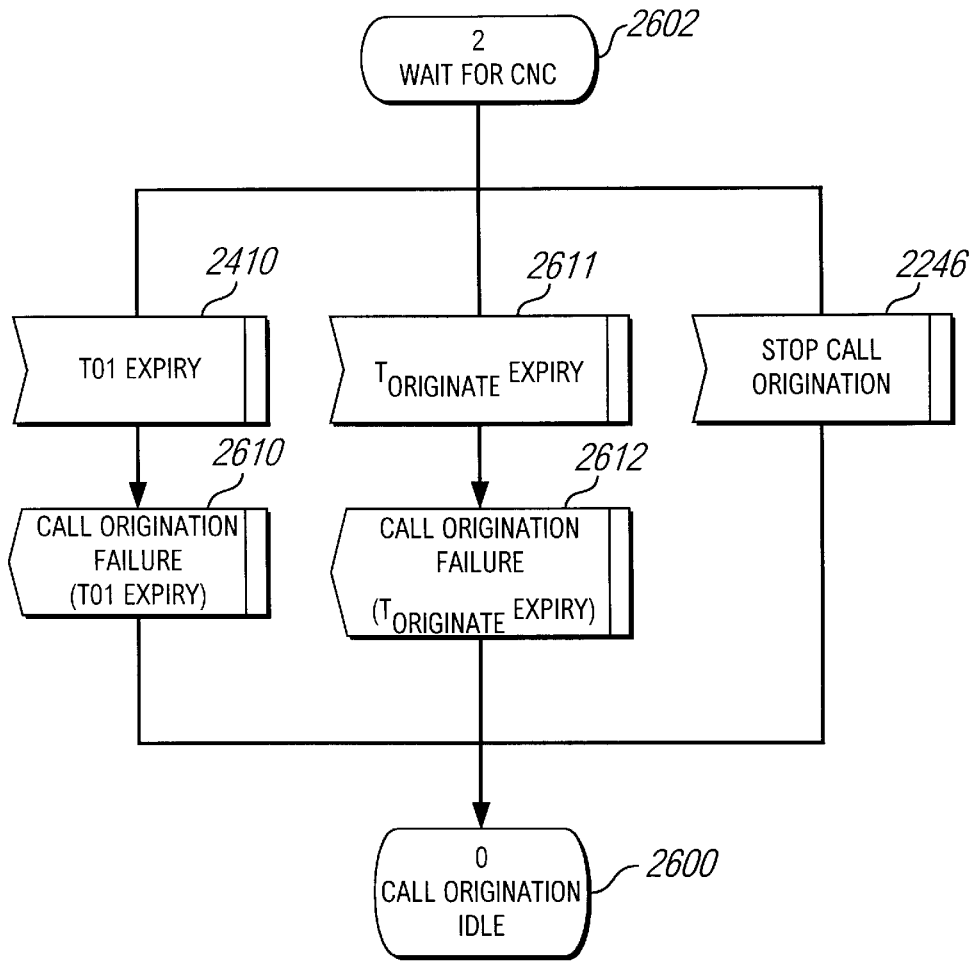

In the MS_C(6) state 2206, if the MS_C task 2101 receives a Slot Acquired message 2317 from the MS_SA task 2102, it activates the MS_CO task 2108, depicted in FIG. 26, by sending it a Start Call Origination message 2244. The MS_C task 2101 then transitions to the MS_C (7) state 2207, depicted in FIG. 22h.

In the MS_C(6) state 2206, the MS_C task 2101 may also receive a Power Off message 2225 from the UI task 2111. On receiving a Power Off message 2225 at this time, the MS_C task 2101 sends a Stop Slot Acquisition message 2224 to the MS_SA task 2102, and then transitions to the MS_C(0) state 2200, previously discussed and depicted in FIG. 22a. The MS_SA task 2102, for its part, on receiving a Stop Slot Acquisition message 2224 from the MS_C task 2101, as previously discussed, terminates processing, re-transitioning to the MS_SA(0) state 2300.

In the MS_C(6) state 2206, if the MS_C task 2101 receives an Acquire Failure (No GP) message 2313 or an Acquire Failure (Rejection) message 2316, from the MS_SA task 2102, the MS_C task 2101 checks 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, previously discussed, and depicted in FIG. 22c.

If, however, the MS software database indicates there is an untried base station the mobile station may attempt to acquire a channel on, the MS_C task 2101 tunes 2227 the mobile station to the Frequency/Code of this new untried base station and re-activates the MS_SA task 2102, depicted in FIG. 23, by sending it a Start Slot Acquisition message 2222. The MS_C task 2101 also posts a Service Interrupt message to the UI task 2111, and then transitions to the MS_C(1) state 2201, previously discussed, and depicted in FIG. 22b, where it waits for a Slot Acquire message 2317 from the MS_SA task 2102.

Figures 1, 22H:
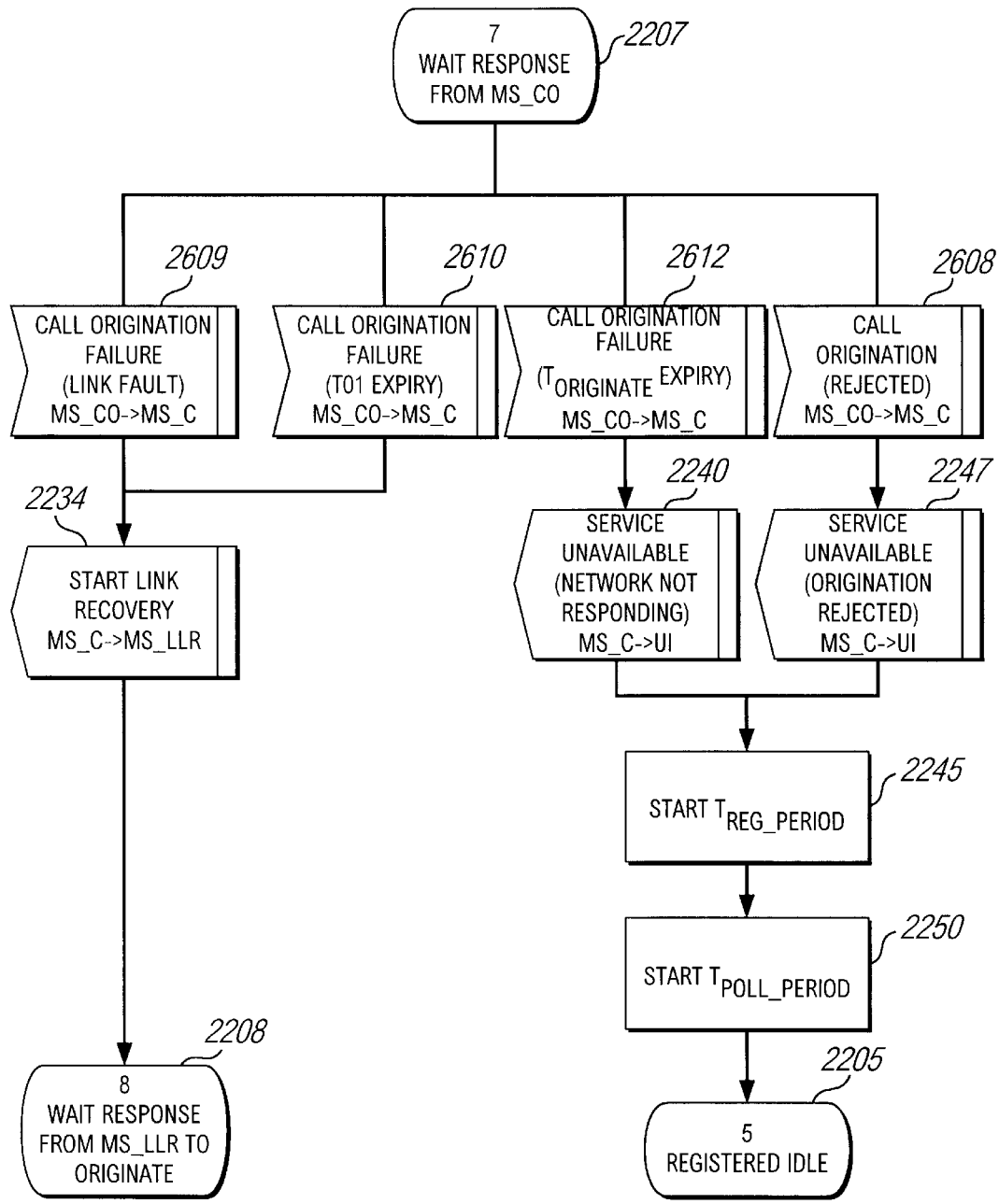
Figures 2, 22H:
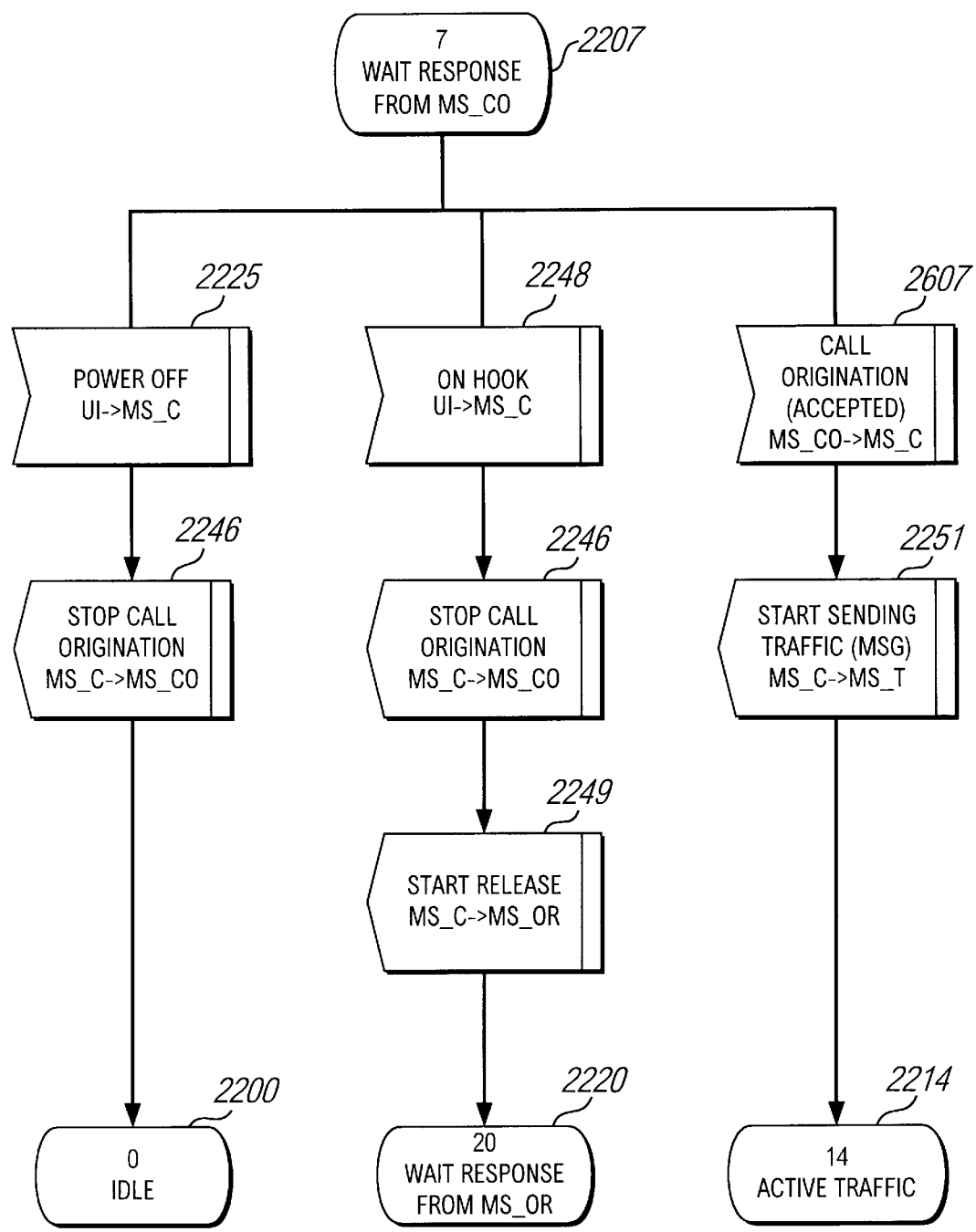

As previously noted, the MS_C task 2101 transitions to the MS_C(7) state 2207, depicted in FIG. 22h, when the mobile station has acquired a channel on a base station to originate a call on the communication system 101 on. In the MS_C(7) state 2207, the MS_C task 2101 waits for a Call Origination (Accepted) message 2607 from the MS_CO task 2108.

The MS_CO task 2108, depicted in FIG. 26, is activated from the MS_CO(0) ("Idle") state 2600 when the MS_C task 2101 sends it a Start Call Origination message 2244. The MS_CO task 2108 transmits a CT_ORG (Call Originate) message 2603 to the base station, indicating that the mobile station wishes to place a call on the communication system 101. The MS_CO task 2108 also enables a timer T01 2405, for the maximum time it will wait for a CT_ACK message response from the base station. The MS_CO task 2108 then transitions to the MS_CO(1) state 2601.

If T01 expires 2410 in the MS_CO(1) state 2601, the MS_CO task 2108 sends the MS_C task 2101 a Call Origination Failure (T01 Expiry) message 2610, and then terminates processing, re-transitioning to the MS_CO(0) state 2600.

If the mobile station receives the expected CT_ACK message 2422 from the base station while processing in the MS_CO(1) state 2601, the MS_CO task 2108 enables a timer T(originate) 2604, for the maximum time the MS_CO task 2108 will wait to receive a CT_CNC (Connection Complete) message from the base station, indicating a call link has been established on the communication system 101 for the mobile station's call. The MS_CO task 2108 also re-enables timer T01 2405, transmits a CT_HLD message 2420 to the base station, and then transitions to the MS_CO (2) state 2602. Timer T01 is established for the maximum time the MS_CO task 2108 will wait for a CT_HLD message from the base station. As previously discussed, the base station and the mobile station transmit CT_HLD messages to each other when they are executing a protocol sequence, and have no other message to transmit to the other.

In the MS_CO(2) state 2602, the MS_CO task 2108 continues to process the transmission 2420 and reception 2415 of CT_HLD messages to/from the base station, re-enabling timer T01 2405 each time a CT_HLD message is received 2415 from the base station. If T01 expires 2410 while processing in this state, the MS_CO task 2108 sends the MS_C task 2101 a Call Origination Failure (T01 Expiry) message 2610, and then terminates processing, re-transitioning to the MS_CO(0) state 2600.

If the mobile station receives the expected CT_CNC (Connection Complete) message 2606 from the base station before timer T(originate) expires, the MS_CO task 2108 sends the MS_C task 2101 a Call Origination (Accepted) message 2607. The MS_CO task 2108 also transmits a CT_ACK message 2423 to the base station, acknowledging the CT_CNC message, and then terminates processing, re-transitioning to the MS_CO(0) state 2600.

If timer T(originate) expires 2611, the MS_CO task 2108 sends the MS_C task 2101 a Call Origination Failure (T(originate) Expiry) message 2612. The MS_CO task 2108 then terminates processing, re-transitioning to the MS_CO(0) state 2600.

In the MS_CO(1) state 2601 or the MS_CO(2) state 2602, the mobile station may receive an unexpected 2416 or erroneous 2417 message on the O-Interface (as previously described). Upon receiving an unexpected or erroneous message while processing in either of these states, the MS_CO task 2108 increments the appropriate LeakyBucket counter (2418 or 2419). The MS_CO task 2108 then checks 2421 if either LeakyBucket counter indicates a maximum error count has been reached. If no, the MS_CO task 2108 re-transmits the last message it transmitted to the base station, and continues processing in the current MS_CO state. If the MS_CO task 2108 is in the MS_CO(1) state 2601, the last message transmitted was a CT_ORG (Call Originate) message 2603. If the MS_CO task 2108 is in the MS_CO(2) state 2602, the last message transmitted was a CT_HLD message 2420.

If, however, the MS_CO task 2108 checks 2421 its LeakyBucket counters and finds that either indicates a maximum error count, it sends the MS_C task 2101 a Call Origination Failure (Link Fault) message 2609, and then terminates processing, re-transitioning to the MS_CO(0) state 2600.

While in the MS_CO(2) state 2602, the mobile station may receive a CT_REL message 2605 from the base station, indicating the mobile station's call link on the communication system 101 is being (or has been) released. Upon receiving a CT_REL message 2605 from the base station at this time, the MS_CO task 2108 sends the MS_C task 2101 a Call Origination (Rejected) message 2608. The MS_CO task 2108 transmits a CT_ACK message 2423 to the base station, acknowledging the CT_REL message, and then terminates processing, re-transitioning to the MS_CO(0) state 2600.

As previously noted, the MS_C task 2101 is in the MS_C(7) state 2207, depicted in FIG. 22h, while it waits for a Call Origination (Accepted) message from the MS_CO task 2108. While in the MS_C(7) state 2207, if the MS_C task 2101 receives a Power Off message 2225 from the UI task 2111, it sends the MS_CO task 2108 a Stop Call Origination message 2246. The MS_C task 2101 then transitions to the MS_C(0) state 2200, previously discussed, and depicted in FIG. 22a.

While in the MS_CO(1) state 2601 or the MS_CO(2) state 2602, if the MS_CO task 2108 receives a Stop Call Origination message 2246 from the MS_C task 2101, it terminates processing, re-transitioning to the MS_CO(0) state 2600.

While in the MS_C(7) state 2207, if the MS_C task 2101 receives a Call Origination Failure (Link Fault) message 2609 or a Call Origination Failure (T01 Expiry) message 2610 from the MS_CO task 2108, the MS_C task 2101 activates the MS_LLR task 2107, previously discussed and depicted in FIG. 25, by sending it a Start Link Recovery message 2234. The MS_C task 2101 then transitions to the MS_C(8) state 2208, depicted in FIG. 22i.

While in the MS_C(7) state 2207, if the MS_C task 2101 receives a Call Origination Failure (T(originate) Expiry) message 2612 or a Call Origination (Rejected) message 2608, the MS_C task 2101 re-enables timer T(reg_period) 2245, previously discussed, re-enables timer T(poll_period) 2250, also previously discussed, and transitions to the MS_C(5) state 2205, also previously discussed, and depicted in FIG. 22f. Before transitioning to the MS_C(5) state 2205, if the MS_C task 2101 received a Call Origination Failure (T(originate) Expiry) message 2612, it posts a Service Unavailable (Network Not Responding) message 2240 to the UI task 2111. Otherwise, if the MS_C task 2101 received a Call Origination (Rejected) message 2608 before transitioning to the MS_C(5) state 2205, it posts a Service Unavailable (Origination Rejected) message 2247 to the UI task 2111.

while in the MS_C(7) state 2207, if the MS_C task 2101 receives an On Hook message 2248 from the UI task 2111, it sends the MS_CO task 2108 a Stop Call Origination message 2246. The MS_C task 2101 then activates the MS_OR task, depicted in FIG. 31, by sending it a Start Release message 2249. The MS_C task 2101 then transitions to the MS_C(20) state 2220, depicted in FIG. 22u. For its part, as previously described, the MS_CO task 2108, on receiving a Stop Call Origination message 2246 from the MS_C task 2101, terminates processing, re-transitioning to the MS_CO(0) state 2600.

While in the MS_C(7) state 2207, if the MS_C task 2101 receives a Call Origination (Accepted) message 2607 from the MS_CO task 2108, a call link has been established on the communication system for the mobile station's call. The MS_C task 2101, therefore, activates the MS_T task 2106, depicted in FIG. 28, by sending it a Start Sending Traffic message 2251. The MS_C task 2101 then transitions to the MS_C(14) state 2214.

Figure 22I:
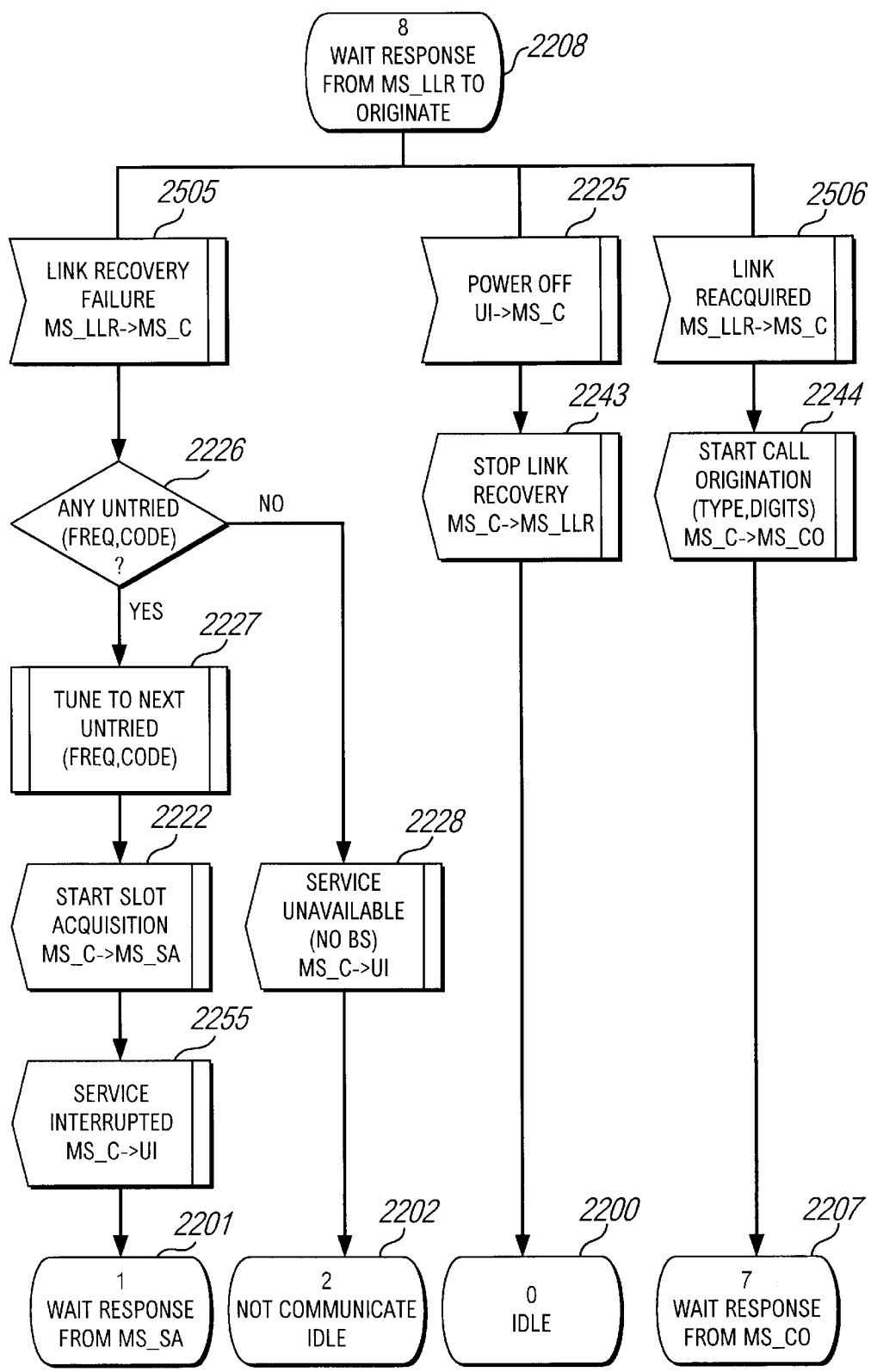

In the MS_C(8) state 2208, depicted in FIG. 22i, the MS_C task 2101 is waiting for Link Reacquired message from the MS_LLR task 2107, previously discussed, and depicted in FIG. 25. If the MS_C task 2101 receives a Link Reacquired message 2506 from the MS_LLR task 2107 at this time, the MS_C task 2101 activates the MS_CO task 2108, previously discussed, and depicted in FIG. 26, by sending it a Start Call Origination message 2244. The MS_C task 2101 then transitions to the MS_C(7) state 2207, previously discussed, and depicted in FIG. 22h.

In the MS_C(8) state 2208, if the MS_C task 2101 receives a Power Off message 2225 from the UI task 2111, it sends the MS_LLR task 2107 a Stop Link Recovery message 2243. The MS_C task 2101 then transitions to the MS_C(0) state 2200, previously discussed, and depicted in FIG. 22a. The MS_LLR task 2107, for its part, as previously discussed, on receiving a Stop Link Recovery message 2243 from the MS_C task 2101, terminates processing, re-transitioning to the MS_LLR(0) state 2500.

In the MS_C(8) state 2208, if the MS_C task 2101 receives a Link Recovery Failure message 2505 from the MS_LLR task 2107, it checks 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, previously discussed, and depicted in FIG. 22c.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102, depicted in FIG. 23, by sending it a Start Slot Acquisition message 2222. The MS_C task 2101 also posts a Service Interrupted message 2255 to the UI task 2111, and then transitions to the MS_C(1) state 2201, previously discussed, and depicted in FIG. 22b, where it waits for a Slot Acquired message from the MS_SA task 2102.

Figure 22J:
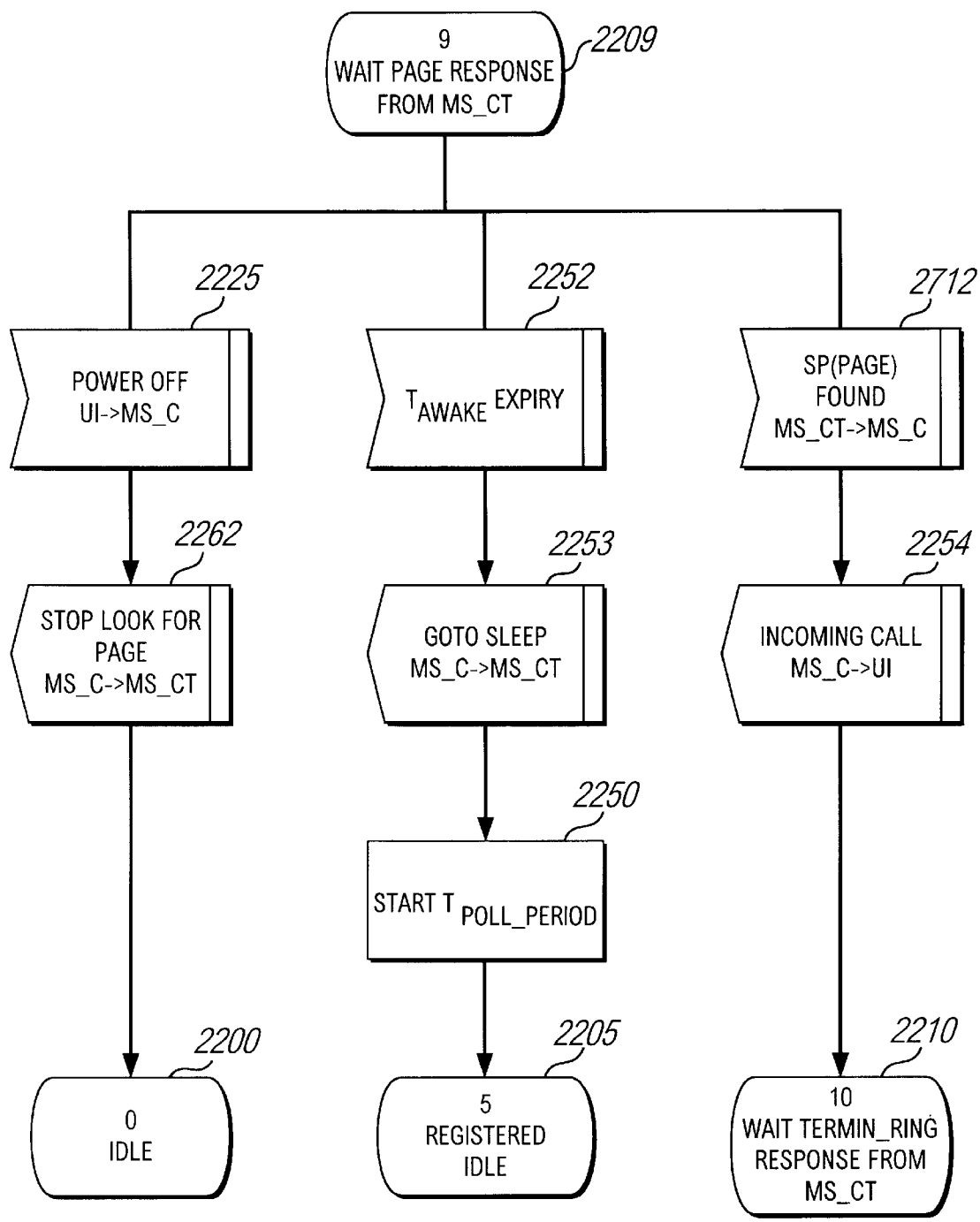

As previously discussed, the MS_C task 2101 transitions to the MS_C(9) state 2209, depicted in FIG. 22j, when Timer T(poll_period) expires 2239 in the MS_C(5) state 2205, depicted in FIG. 22*f*. In the MS_C(9) state 2209, the MS_C task 2101 waits for the MS_CT task 2104 to notify it that an SP(Page) was Found, indicating the base station is paging the mobile station for a call for the mobile station's end user.

The MS_CT task 2104, depicted in FIG. 27, is activated from the MS_CT(0) ("Idle") state 2700 when the MS_C task 2101 sends it a Wake Up message 2241. The MS_CT task 2104 then transitions to the MS_CT(1) state 2701, where it waits to receive a Specific Poll message for the mobile station, from the base station.

If the mobile station receives a Specific Poll message 2504 for it, while in the MS_CT(1) state 2701, the MS_CT task 2104 transmits a CT_SPR (Specific Poll Response) message 2707 to the base station, acknowledging the Specific Poll message. The MS_CT task 2104 enables a timer T01 2405, for the maximum time it will wait for a CT_ACK message response from the base station. The MS_CT task 2104 sends the MS_C task 2101 an SP (Page) Found message 2712, and then transitions to the MS_CT(2) state 2702.

While in the MS_C(9) state 2209, depicted in FIG. 22*j*, if the MS_C task 2101 receives an SP (Page) Found message 2712 from the MS_CT task 2104, it posts an Incoming Call message 2254 to the UI task 2111. The MS_C task 2101 then transitions to the MS_C(10) state 2210, depicted in FIG. 22*k*.

While in the MS_C(9) state 2209, if the MS_C task 2101 receives a Power Off message 2225 from the UI task 2111, it sends the MS_CT task 2104 a Stop Look For Page message 2262. The MS_C task 2101 then transitions to the MS_C(0) state 2200, previously discussed, and depicted in FIG. 22*a*. For its part, if the MS_CT task 2104 receives a Stop Look For Page message 2262 from the MS_C task 2101, it terminates processing, re-transitioning to the MS_CT(0) state 2700.

While in the MS_C(9) state 2209, if timer T(awake) expires 2252, the MS_C task 2101 sends the MS_CT task 2104 a Goto Sleep message 2253. The MS_C task 2101 also re-enables timer T(poll_period) 2250 and transitions to the MS_C(5) state 2205, previously discussed, and depicted in FIG. 22*f*. For its part, if the MS_CT task 2104 receives a Goto Sleep message 2253 from the MS_C task 2101, it terminates processing, re-transitioning to the MS_CT(0) state 2700.

Figures 1, 22K:
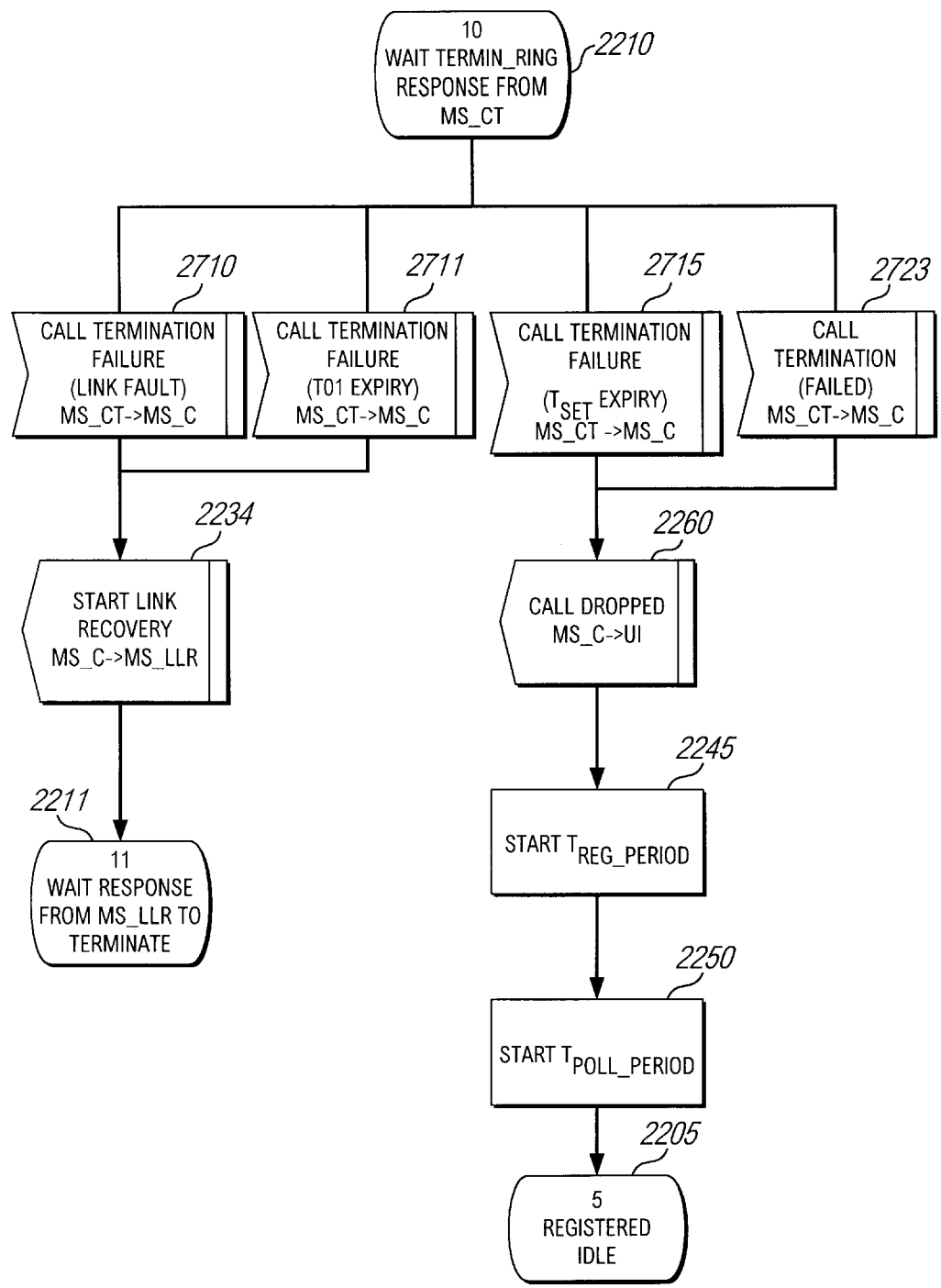
Figures 2, 22K:
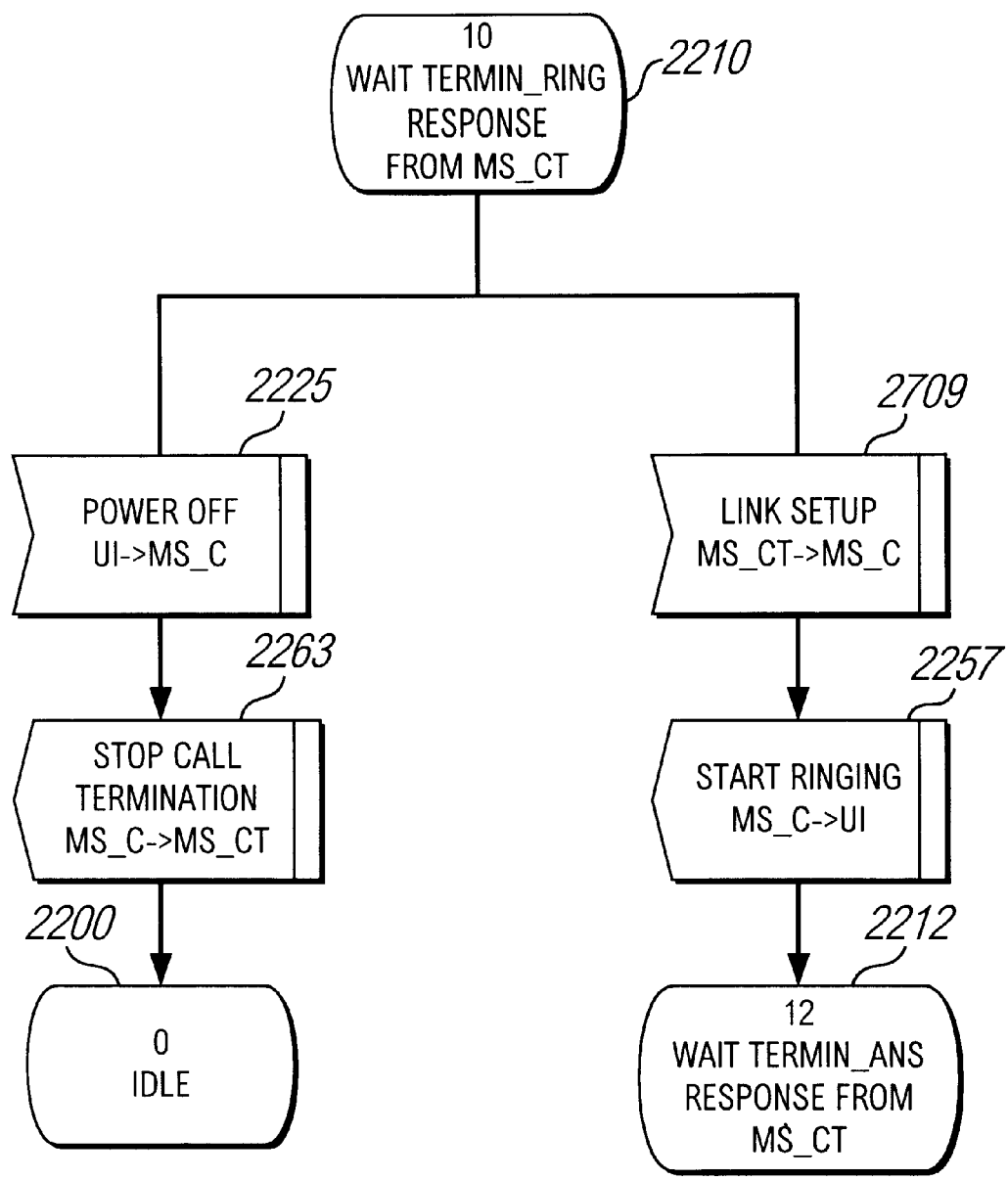

In the MS_C(10) state 2210, depicted in FIG. 22*k*, the MS_C task 2101 is waiting for a Link Setup message from the MS_CT task 2104.

Figures 1, 28:
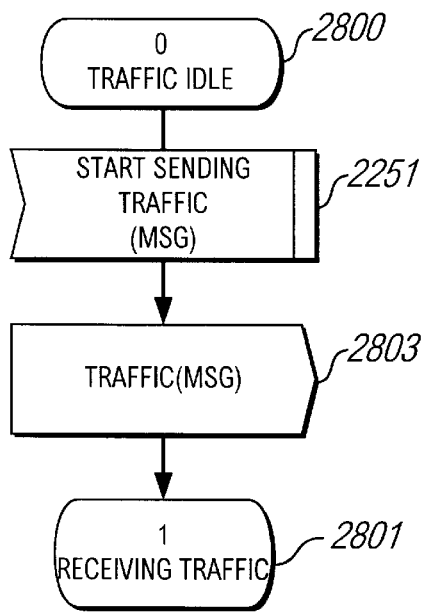
FIG. 28 is a state diagram of the MS software Traffic (MS_T) task.
Figures 2, 28:
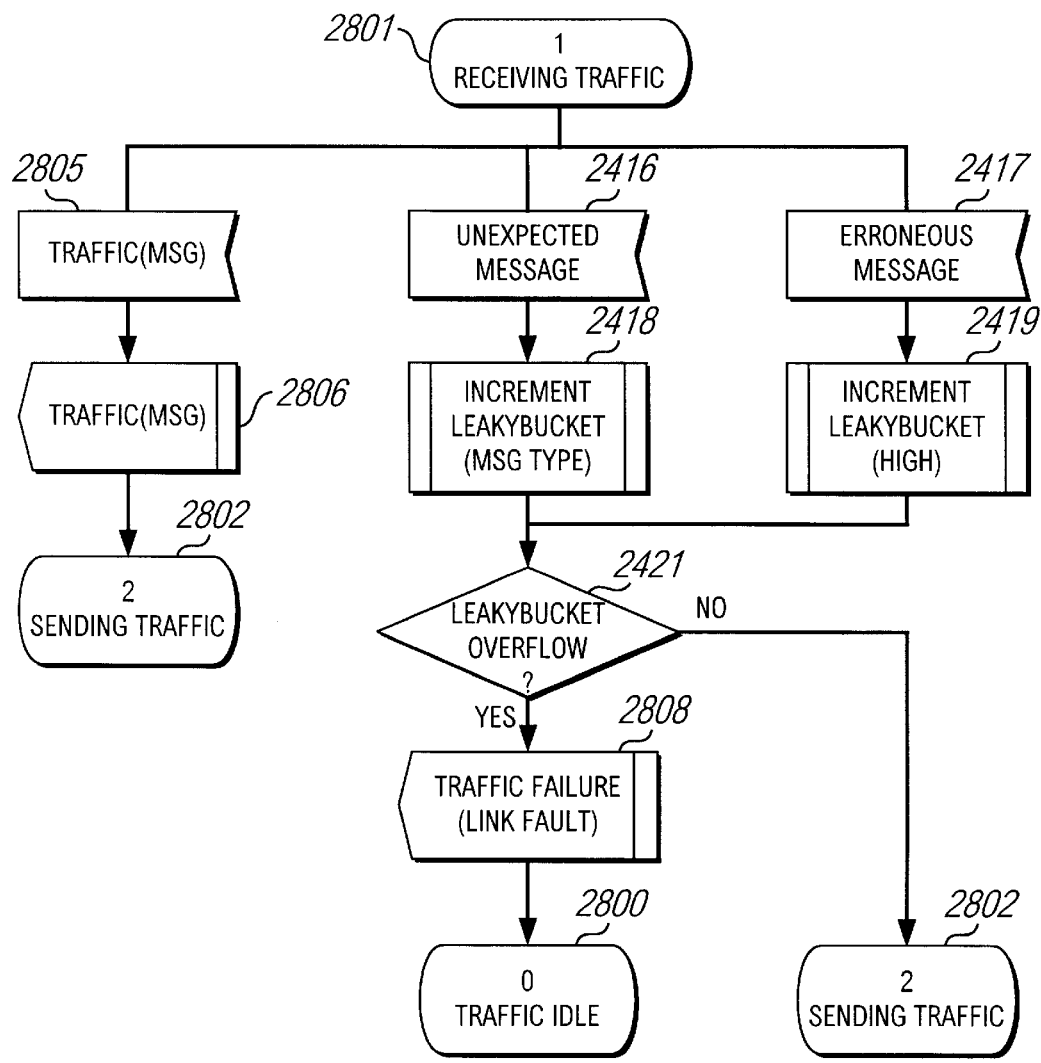
Figures 3, 28:
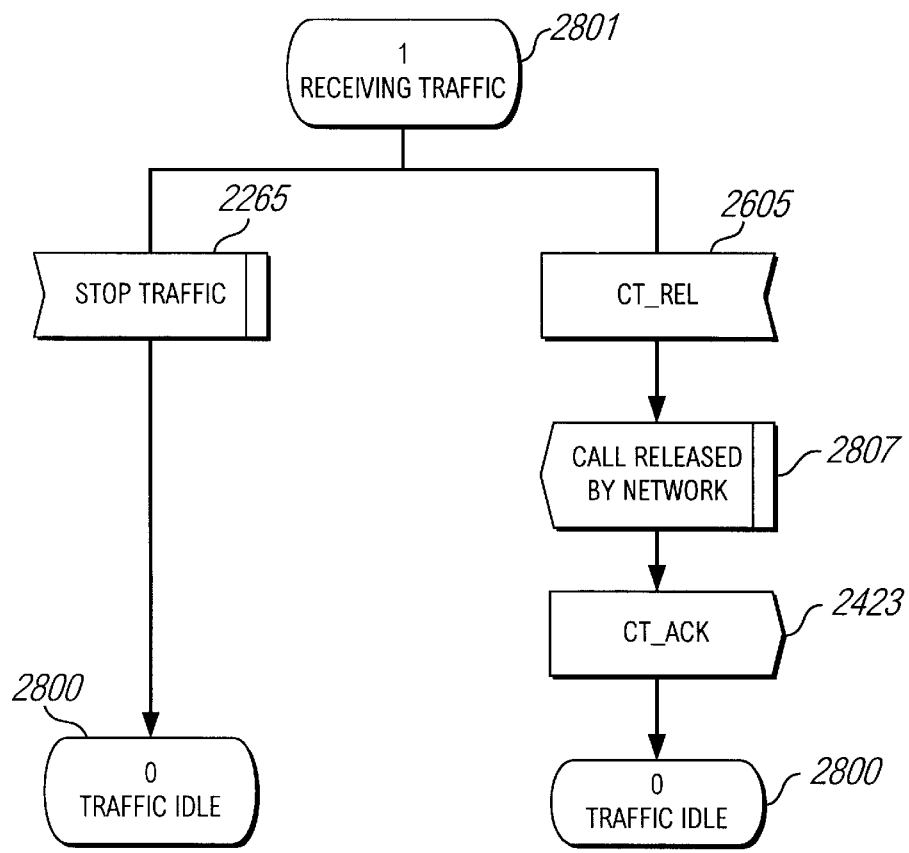
Figures 4, 28:
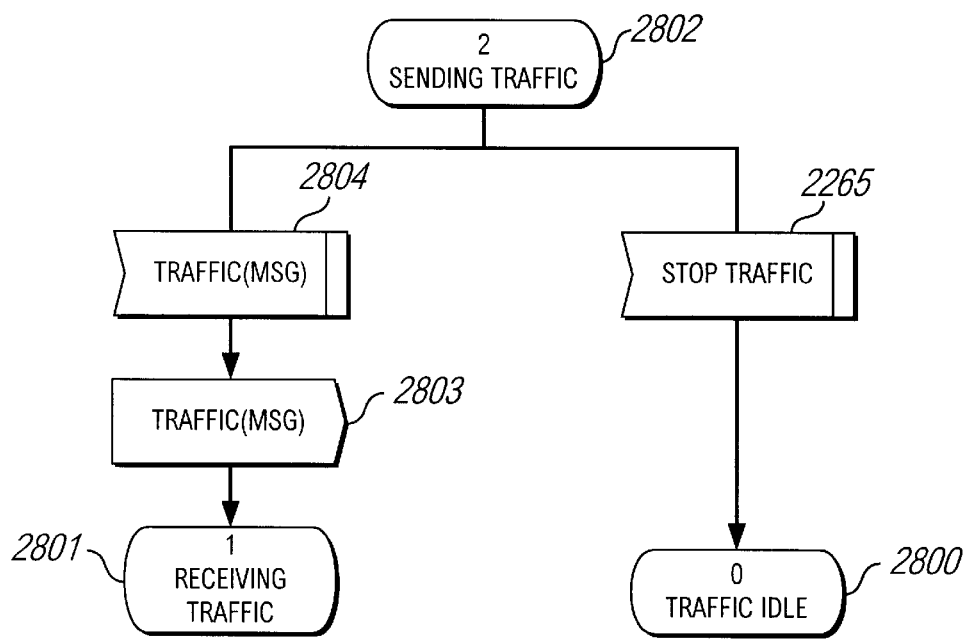

In the MS_CT(2) state 2702, depicted in FIG. 28, if the timer T01 expires 2410, the MS_CT task 2104 sends the MS_C task 2101 a Call Termination Failure (T01 Expiry) message 2711. The MS_CT task 2104 then terminates processing, re-transitioning to the MS_CT(0) state 2700.

In the MS_CT(2) state 2702, if the mobile station receives the expected CT_ACK message 2422 from the base station, the MS_CT task 2104 enables a timer, T(set) 2713, for the maximum time it will wait for a CT_SET message from the base station. The MS_CT task 2104 also re-enables timer T01 2405, transmits a CT_HLD message 2420 to the base station, and then transitions to the MS_CT (3) state 2703. Timer T01 is established for the maximum time the MS_CT task 2104 will wait for a CT_HLD message from the base station. As previously discussed, the base station and the mobile station transmit CT_HLD messages to each other when they are executing a protocol sequence, and have no other message to transmit to the other.

In the MS_CT(3) state 2703, the MS_CT task 2104 continues to process the transmission 2420 and reception 2415 of CT_HLD messages to/from the base station, re-enabling timer T01 2405 each time a CT_HLD message is received 2415 from the base station. If T01 expires 2410 while processing in this state, the MS_CT task 2104 sends the MS_C task 2101 a Call Termination Failure (T01 Expiry) message 2711, and then terminates processing, re-transitioning to the MS_CT(0) state 2700.

If the mobile station receives the expected CT_SET message 2708 from the base station before timer T(set) expires, the MS_CT task 2104 sends the MS_C task 2101 a Link Setup message 2709. The MS_CT task 2104 also transmits a CT_ACK message 2423 to the base station, acknowledging the CT_SET message, re-enables timer T01 2405, for the maximum time it will wait for a CT_HLD message from the base station, and then transitions to the MS_CT(4) state 2704.

If timer T(set) expires 2714, the MS_CT task 2104 sends the MS_C task 2101 a Call Termination Failure (T(set) Expiry) message 2715. The MS_CT task 2104 then terminates processing, re-transitioning to the MS_CT(0) state 2700.

In the MS_C(10) state 2210, depicted in FIG. 22*k*, if the MS_C task 2101 receives a Link Setup message 2709 from the MS_CT task 2104, it posts a Start Ringing message 2257 to the UI task 2111. The MS_C task 2101 then transitions to the MS_C(12) state 2212, depicted in FIG. 22*l*.

In the MS_CT(4) state 2704, the MS_CT task 2104 processes the transmission 2420 and reception 2415 of CT_HLD messages to/from the base station, re-enabling timer T01 2405 each time a CT_HLD message is received 2415 from the base station. If T01 expires 2410 while processing in this state, the MS_CT task 2104 sends the MS_C task 2101 a Call Termination Failure (T01 Expiry) message 2711, and then terminates processing, re-transitioning to the MS_CT(0) state 2700.

Figure 22L:
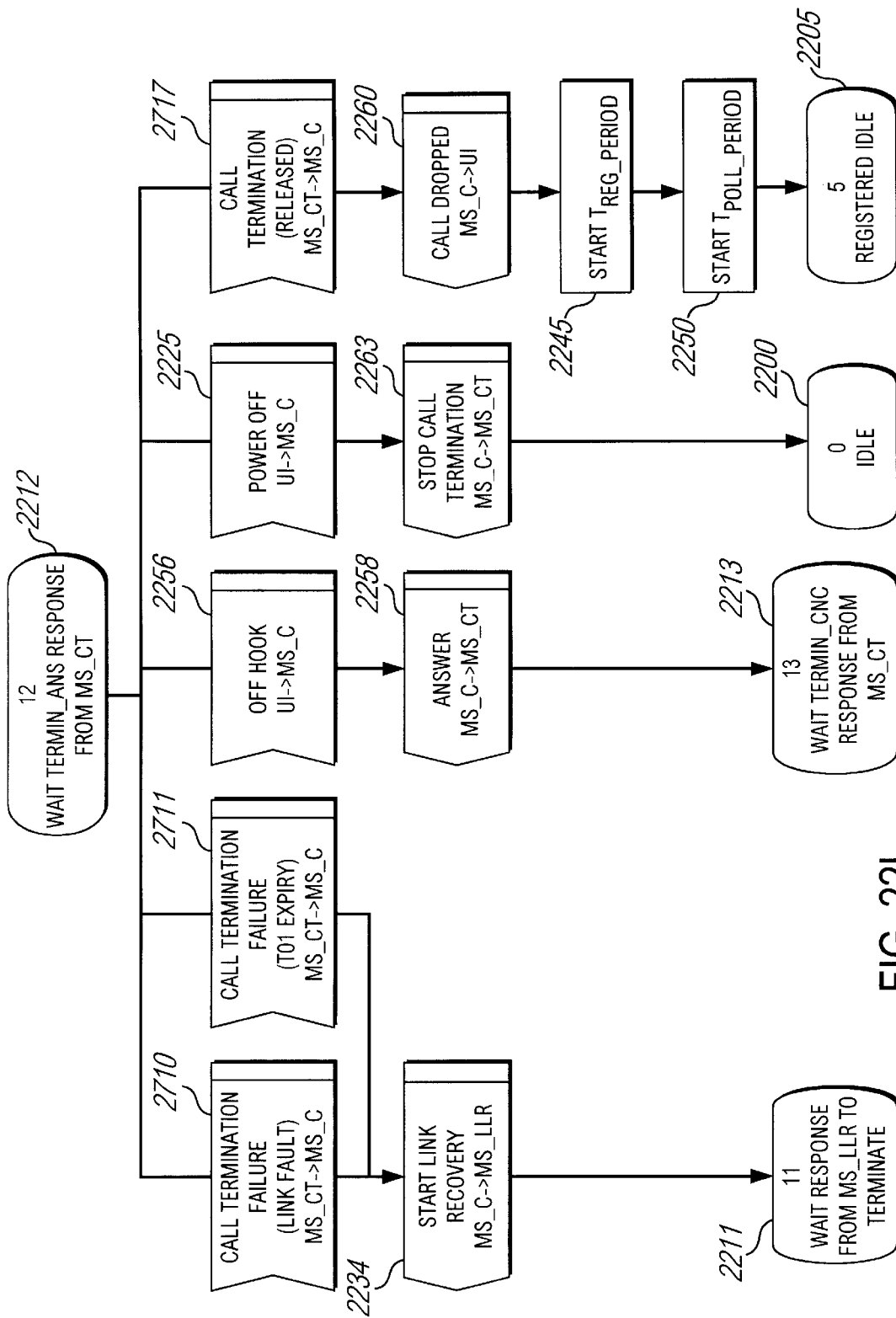
Figures 1, 22M:
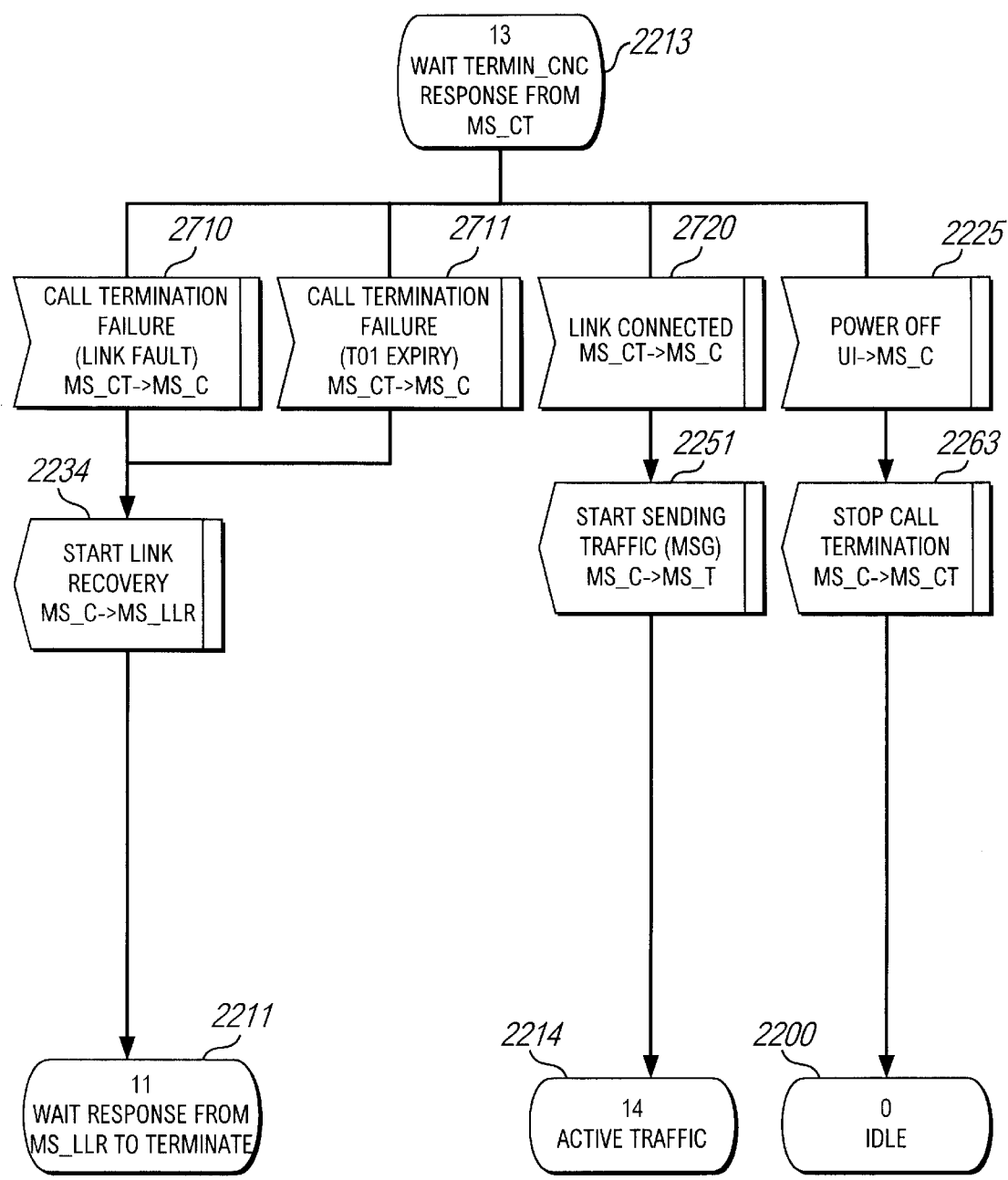
Figures 2, 22M:
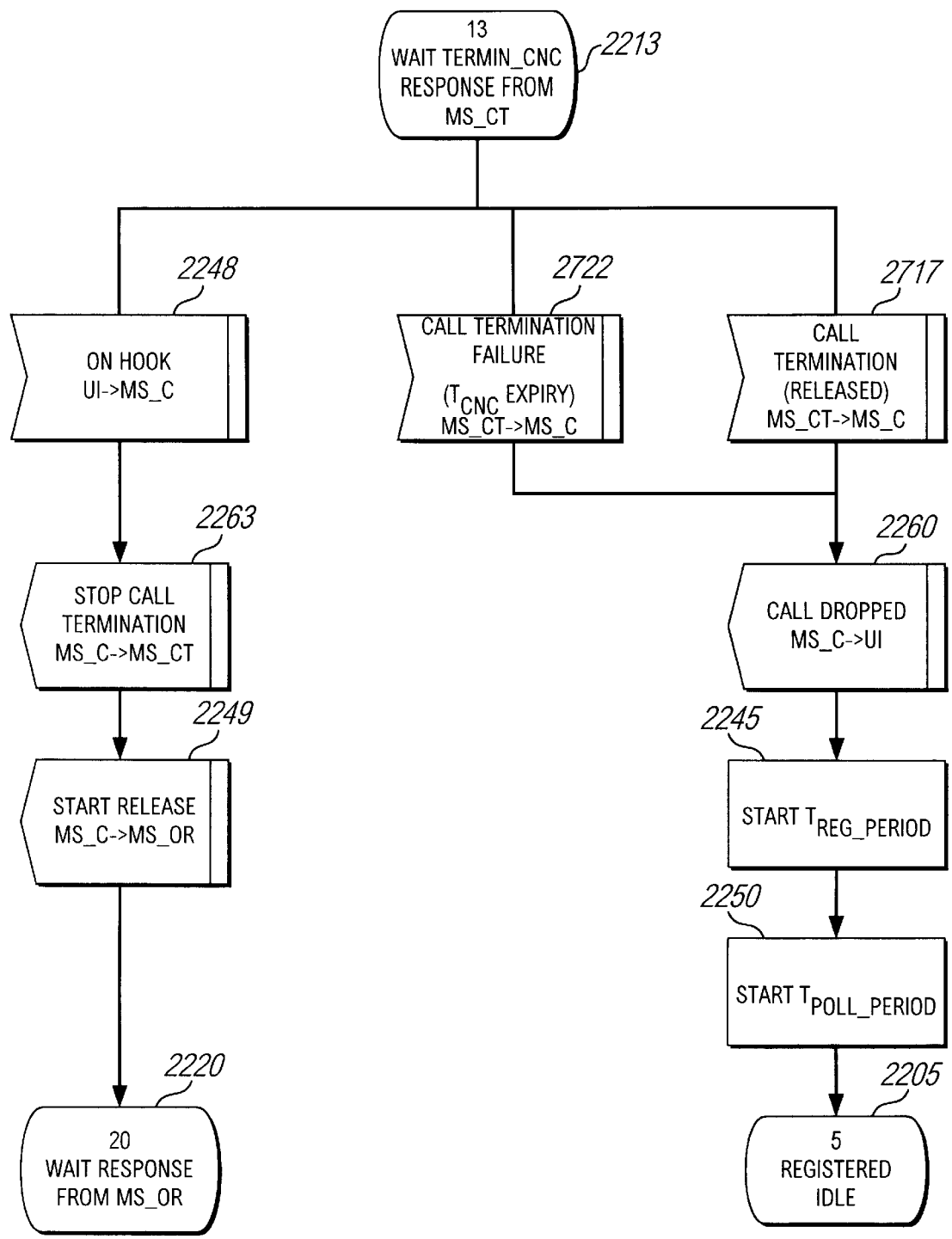

In the MS_C(12) state 2212, depicted in FIG. 22*l*, if the MS_C task 2101 receives an Off Hook message 2256 from the UI task 2111, indicating the mobile station's end user has answered the phone, the MS_C task 2101 sends the MS_CT task 2104 an Answer message 2258, and then transitions to the MS_C(13) state 2213, depicted in FIG. 22*m*.

In the MS_CT(4) state 2704, if the MS_CT task 2104 receives an Answer message 2258 from the MS_C task 2101, it transmits a CT_ANS message 2716 to the mobile station, indicating its end user has answer the call. The MS_CT task 2104 also re-enables timer T01 2405, now for the maximum time the MS_CT task 2104 will wait for a CT_ACK message response from the base station. The MS_CT task 2104 then transitions to the MS_CT(5) state.

In the MS_CT(5) state, if the timer T01 expires 2410, the MS_CT task 2104 sends the MS_C task 2101 a Call Termination Failure (T01 Expiry) message 2711. The MS_CT task 2104 then terminates processing, re-transitioning to the MS_CT(O) state 2700.

In the MS_CT(5) state, if the mobile station receives the expected CT_ACK message 2422 from the base station, the MS_CT task 2104 enables a timer T(cnc) 2718, for the maximum time it will wait for a CT_CNC (Connection Complete) message from the base station. The MS_CT task 2104 also re-enables timer T01 2405, transmits a CT_HLD message 2420 to the base station, and then transitions to the MS_CT(6) state. Timer T01 is established for the maximum time the MS_CT task 2104 will wait for a CT_HLD message from the base station. As previously discussed, the base station and the mobile station transmit CT_HLD messages to each other when they are executing a protocol sequence, and have no other message to transmit to the other.

In the MS_CT(6) state, the MS_CT task 2104 continues to process the transmission 2420 and reception 2415 of CT_HLD messages to/from the base station, re-enabling timer T01 2405 each time a CT_HLD message is received 2415 from the base station. If T01 expires 2410 while processing in this state, the MS_CT task 2104 sends the MS_C task 2101 a Call Termination (T01 Expiry) message 2711, and then terminates processing, re-transitioning to the MS_CT(0) state 2700.

If the mobile station receives the expected CT_CNC 2606 message from the base station before timer T(cnc) expires, the MS_CT task 2104 sends the MS_C task 2101 a Link Connected message 2720. The MS_CT task 2104 also transmits a CT_ACK message 2423 to the base station, acknowledging the CT_CNC message, and then terminates processing, re-transitioning to the MS_CT(0) state 2700.

If timer T(cnc) expires 2721, the MS_CT task 2104 sends the MS_C task 2101 a Call Termination Failure (T(cnc) Expiry) message 2722. The MS_CT task 2104 then terminates processing, re-transitioning to the MS_CT(0) state 2700.

In the MS_C(13) state 2213, depicted in FIG. 22m, if the MS_C task 2101 receives a Link Connected message 2720 from the MS_CT task 2104, it activates the MS_T task 2106, depicted in FIG. 28, by sending it a Start Sending Traffic message 2251. At this time, a call link has been established between two mobile stations in the communication system 101, and the mobile station can now begin transmitting and receiving bearer data (Traffic messages) with the base station. The MS_C task 2101 then transitions to the MS_C(14) state 2214, depicted in FIG. 22o.

In the MS_CT(2) state 2702, the MS_CT(3) state 2703, the MS_CT(4) state 2704, the MS_CT(5) state, or the MS_CT(6) state, the mobile station may receive an unexpected 2416 or erroneous 2417 message on the O-Interface (as previously described). Upon receiving an unexpected or erroneous message while processing in any of these states, the MS_CT task 2104 increments the appropriate Leaky-Bucket counter (2418 or 2419). The MS_CT task 2104 then checks 2421 if either LeakyBucket counter indicates a maximum error count has been reached. If no, the MS_CT task 2104 re-transmits the last message it transmitted to the base station, and continues processing in the current MS_CT state. If the MS_CT task 2104 is in the MS_CT(2) state 2702, the last message transmitted was a CT_SPR (Specific Poll Response) message 2707. If the MS_CT task 2104 is in the MS_CT(3) state 2703, the last message transmitted was a CT_HLD message 2420. If the MS_CT task 2104 is in the MS_CT(4) state 2704, the last message transmitted was a CT_HLD message 2420. If the MS_CT task 2104 is in the MS_CT(5) state, the last message transmitted was a CT_ANS (Answer) message 2716. If the MS_CT task 2104 is in the MS_CT(6) state, the last message transmitted was a CT_HLD message 2420.

If, however, the MS_CT task 2104 checks 2421 its LeakyBucket counters and finds that either indicates a maximum error count, it sends the MS_C task 2101 a Call Termination Failure (Link Fault) message 2710, and then terminates processing, re-transitioning to the MS_CT(0) state 2700.

While in the MS_CT(3) state 2703, the MS_CT(4) state 2704, or the MS_CT(6) state, the mobile station may receive a CT_REL message 2605 from the base station, indicating the mobile station's call link on the communication system 101 is being (or has been) released. Upon receiving a CT_REL message 2605 from the base station, if processing in the MS_CT(3) state 2703, the MS_CT task 2104 sends the MS_C task 2101 a Call Termination (Failed) message 2723. If processing in the MS_CT(4) state 2704 or the MS_CT(6) state, on receiving a CT_REL message 2605 from the base station, the MS_CT task 2104 sends the MS_C task 2101 a Call Termination (Released) message 2717. In any of these three states, the MS_CT task 2104 also transmits a CT_ACK message 2423 to the base station, acknowledging the CT_REL message, and then terminates processing, re-transitioning to the MS_CT(0) state 2700.

In the MS_CT(2) state 2702, the MS_CT(3) state 2703, the MS_CT(4) state 2704, the MS_CT(5) state 2705, or the MS_CT(6) state 2706, if the MS_CT task 2104 is sent a Stop Call Termination message 2263 by the MS_C task 2101, it terminates processing, re-transitioning to the MS_CT(0) state 2700.

In the MS_C(10) state 2210, depicted in FIG. 22k, the MS_C(12) state 2212, depicted in FIG. 22l, or the MS_C(13) state 2213, depicted in FIG. 22m, if the MS_C task 2101 receives a Call Termination Failure (Link Fault) message 2710 or a Call Termination Failure (T01 Expiry) message 2711 from the MS_CT task 2104, the MS_C task 2101 activates the MS_LLR task 2107, previously discussed, and depicted in FIG. 25, by sending it a Start Link Recovery message 2234. The MS_C task 2101 then transitions to the MS_C(11) state 2211, depicted in FIG. 22n, where the MS_C task 2101 waits to receive a Link Reacquired message from the MS_LLR task 2107.

In the MS_C(10) state 2210, FIG. 22k, if the MS_C task 2101 receives a Call Termination Failure (T(set) Expiry) message 2715 or a Call Termination (Failed) message 2723 from the MS_CT task 2104, the MS_C task 2101 posts a Call Dropped message 2260 to the UI task 2111. The MS_C task 2101 also re-enables timer T(reg_period) 2245, previously described, re-enables timer T(poll_period) 2250, also previously described, and transitions to the MS_C(5) state 2205, also previously described, and depicted in FIG. 22f.

In the MS_C(12) state 2212, FIG. 22l, if the MS_C task 2101 receives a Call Termination (Released) message 2717 from the MS_CT task 2104, it posts a Call Dropped message 2260 to the UI task 2111. The MS_C task 2101 also re-enables timer T(reg_period) 2245, previously described, re-enables timer T(poll_period) 2250, also previously described, and transitions to the MS_C(5) state 2205, also previously described, and depicted in FIG. 22f.

In the MS_C(13) state 2213, FIG. 22m, if the MS_C task 2101 receives a Call Termination Failure (T(cnc) Expiry) message 2722 or a Call Termination (Released) message 2717 from the MS_CT task 2104, the MS_C task 2101 posts a Call Dropped message 2260 to the UI task 2111. The MS_C task 2101 also re-enables timer T(reg_period) 2245, previously described, re-enables timer T(poll_period) 2250, also previously described, and transitions to the MS_C(5) state 2205, also previously described, and depicted in FIG. 22f.

In the MS_C(10) state 2210, FIG. 22k, the MS_C(12) state 2212, FIG. 22l, or the MS_C(13) state 2213, FIG. 22m, if the MS_C task 2101 receives a Power Off message 2225 from the UI task 2111, it sends the MS_CT task 2104 a Stop Call Termination message 2263, and then transitions to the MS_C(0) state 2200, previously described, and depicted in FIG. 22a. The MS_CT task 2104, for its part, as previously described, on receiving a Stop Call Termination message 2263 from the MS_C task 2101, terminates processing, re-transitioning to the MS_CT(0) state 2700.

In the MS_C(13) state 2213, FIG. 22m, if the MS_C task 2101 receives an On Hook 2248 message from the UI task 2111, indicating the mobile station's end user has hung up the phone, the MS_C task 2101 sends the MS_CT task 2104 a Stop Call Termination message 2263. The MS_C task 2101 also activates the MS_OR task 2109, depicted in FIG. 31, by sending it a Start Release message 2249. The MS_C task 2101 then transitions to the MS_C(20) state 2220, depicted in FIG. 22u. The MS_CT task 2104, for its part, as previously described, on receiving a Stop Call Termination message 2263 from the MS_C task 2101, terminates processing, transitioning to the MS_CT(0) state 2700.

Figure 22N:
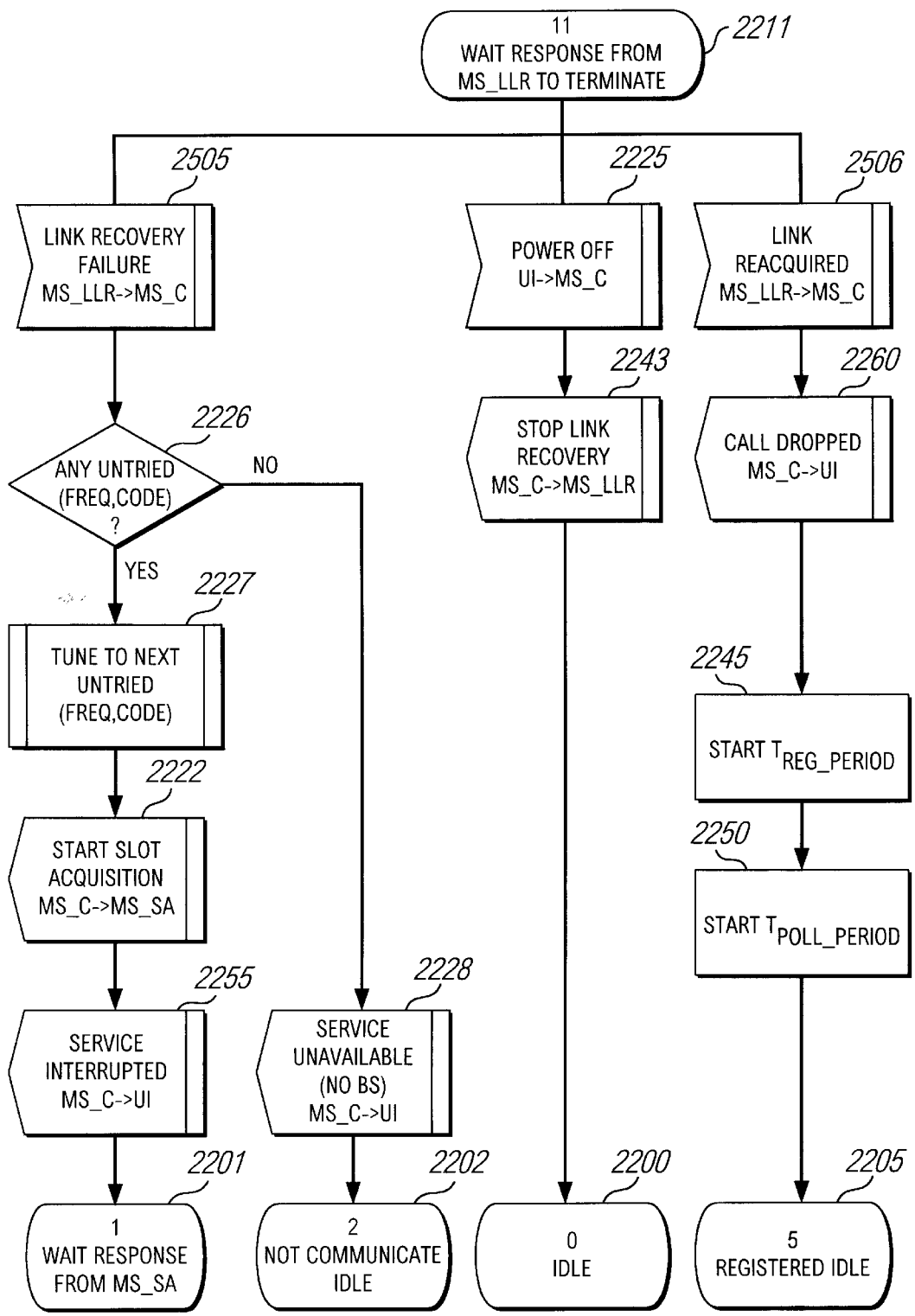
Figures 1, 220:
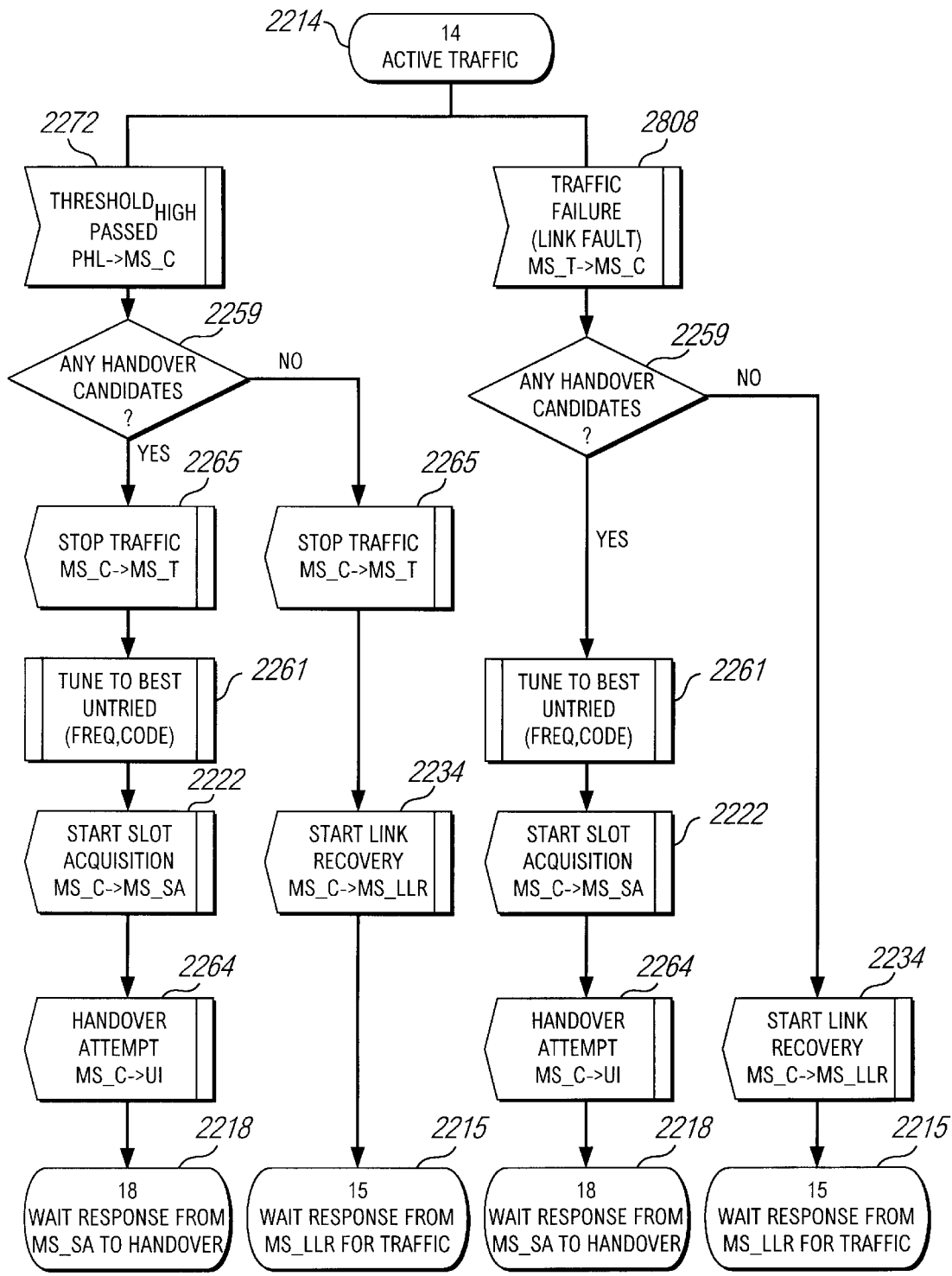

In the MS_C(11) state 2211, depicted in FIG. 22n, the MS_C task 2101 is waiting for a Link Reacquired message from the MS_LLR task 2107, previously discussed, and depicted in FIG. 25, indicating the mobile station has resynced with the base station. If the MS_C task 2101 receives a Link Reacquired message 2506 from the MS_LLR task 2107 at this time, indicating the mobile station has resynced to the base station, it posts a Call Dropped message 2260 to the UI task 2111. The MS_C task 2101 also re-enables timer T(reg_period) 2245, previously described, re-enables timer T(poll_period) 2250, also previously described, and transitions to the MS_C(5) state 2205, also previously described, and depicted in FIG. 22f.

In the MS_C(11) state 2211, if the MS_C task 2101 receives a Power Off message 2225 from the UI task 2111, the MS_C task 2101 sends the MS_LLR task 2107 a Stop Link Recovery message 2243. The MS_C task 2101 then transitions to the MS_C(0) state 2200, previously discussed, and depicted in FIG. 22a. The MS_LLR task 2107, for its part, as previously discussed, on receiving a Stop Link Recovery message 2243 from the MS_C task 2101, terminates processing, re-transitioning to the MS_LLR(0) state 2500.

In the MS_C(11) state 2211, if the MS_C task 2101 receives a Link Recovery Failure message 2505 from the MS_LLR task 2107, it then check 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, previously discussed, and depicted in FIG. 22c.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102, depicted in FIG. 23, by sending it a Start Slot Acquisition message 2222. The MS_C task 2101 also posts a Service Interrupted message 2255 to the UI task 2111, and then transitions to the MS_C(1) state 2201, previously discussed, and depicted in FIG. 22b, where it waits for a Slot Acquired message from the MS_SA task 2102.

In an MS active traffic protocol sequence, the mobile station accepts bearer data (Traffic messages) from its user interface, which it then transmits on the O-Interface to the base station in the user portion 205 of the time frames of the dedicated channel. The mobile station also receives bearer traffic (Traffic messages) from the base station in the base portion 206 of the time frames of the dedicated channel, which it then sends to its user interface.

Bearer data transmitted between a base station and a mobile station is organized into sequential data packets, called Traffic messages, in order that any one data packet can be transmitted in the base or user portion of a time frame.

The MS_T task 2106, depicted in FIG. 28, is activated by the MS_C task 2101 when a call link has been established on the communication system 101 for the mobile station, for either an outbound or incoming call. The MS_T task 2106 is activated from the MS_T(0) ("Idle") state 2800 when it receives a Start Sending Traffic message 2251 from the MS_C task 2101. The MS_T task 2106 transmits a Traffic message 2803 to the base station, and then transitions to the MS_T(1) state 2801. In the MS_T(1) state 2801, when the mobile station receives a Traffic message 2805 from the base station, the MS_T task 2106 forwards this message 2806 on to the UI task 2111, and then transitions to the MS_T(2) state 2802. In the MS_T(2) state 2802, the MS_T task 2106 receives a Traffic message 2804 from the UI task 2111, which it then outputs 2803 to the base station. The MS_T task 2106 then re-transitions to the MS_T(1) state 2801. The MS_T task 2106 continues to transitions between the MS_T(1) state 2801 and the MS_T(2) state 2802, as it continues to handle the processing of a call for the mobile station, transmitting 2803 and receiving 2805 Traffic messages to/from the base station, and sending 2806 and receiving 2804 Traffic messages to/from the UI task 2111.

In the MS_T(1) state 2801, the mobile station may receive an unexpected 2416 or erroneous 2417 message on the O-Interface (as previously described). Upon receiving an unexpected or erroneous message while processing in this state, the MS_T task 2106 increments the appropriate LeakyBucket counter (2418 or 2419). The MS_T task 2106 then checks 2421 if either LeakyBucket counter indicates a maximum error count has been reached. If no, the MS_T task 2106 transitions to the MS_T(2) state 2802, where it receives the next Traffic message 2804 from the UI task 2111, and then transmits this Traffic message 2803 to the base station.

If, however, the MS_T task 2106 checks 2421 its Leaky-Bucket counters and finds that either indicates a maximum error count, it sends the MS_C task 2101 a Traffic Failure (Link Fault) message 2808, and then terminates processing, re-transitioning to the MS_T(0) state 2800.

While in the MS_T(1) state 2801, the mobile station may receive a CT_REL message 2605 from the base station, indicating the mobile station's call link on the communication system 101 is being (or has been) released. Upon receiving a CT_REL message 2605 from the base station at this time, the MS_T task 2106 sends the MS_C task 2101 a Call Released By Network message 2807. The MS_T task 2106 also transmits a CT_ACK message 2423 to the base station, acknowledging the receipt of the CT_REL message, and then terminates processing, re-transitioning to the MS_T(0) state 2800.

In the MS_T(1) state 2801 or the MS_T(2) state 2802, if the MS_T task 2106 receives a Stop Traffic message 2265 from the MS_C task 2101, it terminates processing, re-transitioning to the MS_T(0) state 2800.

Figures 2, 22O:
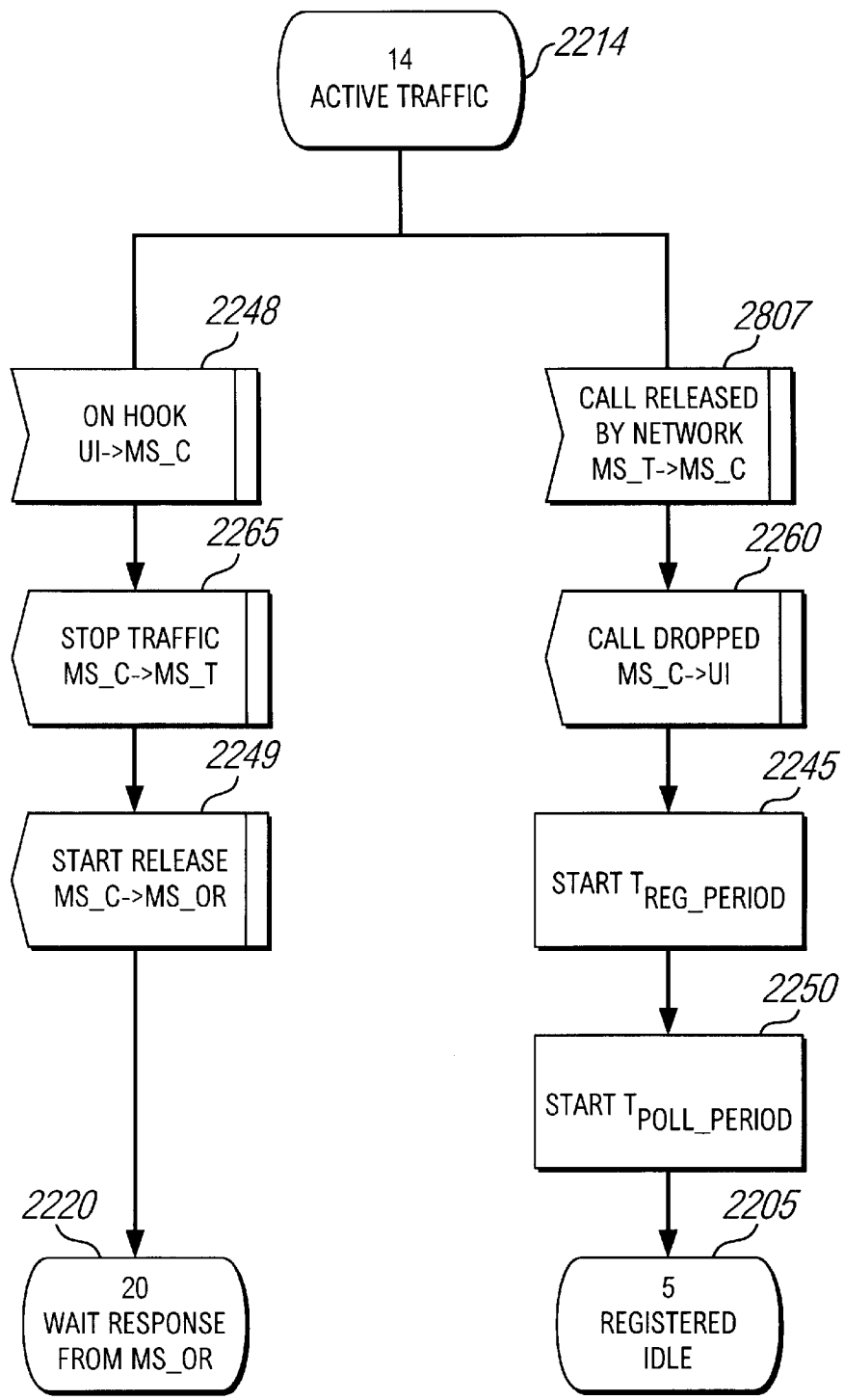
Figures 3, 22O:
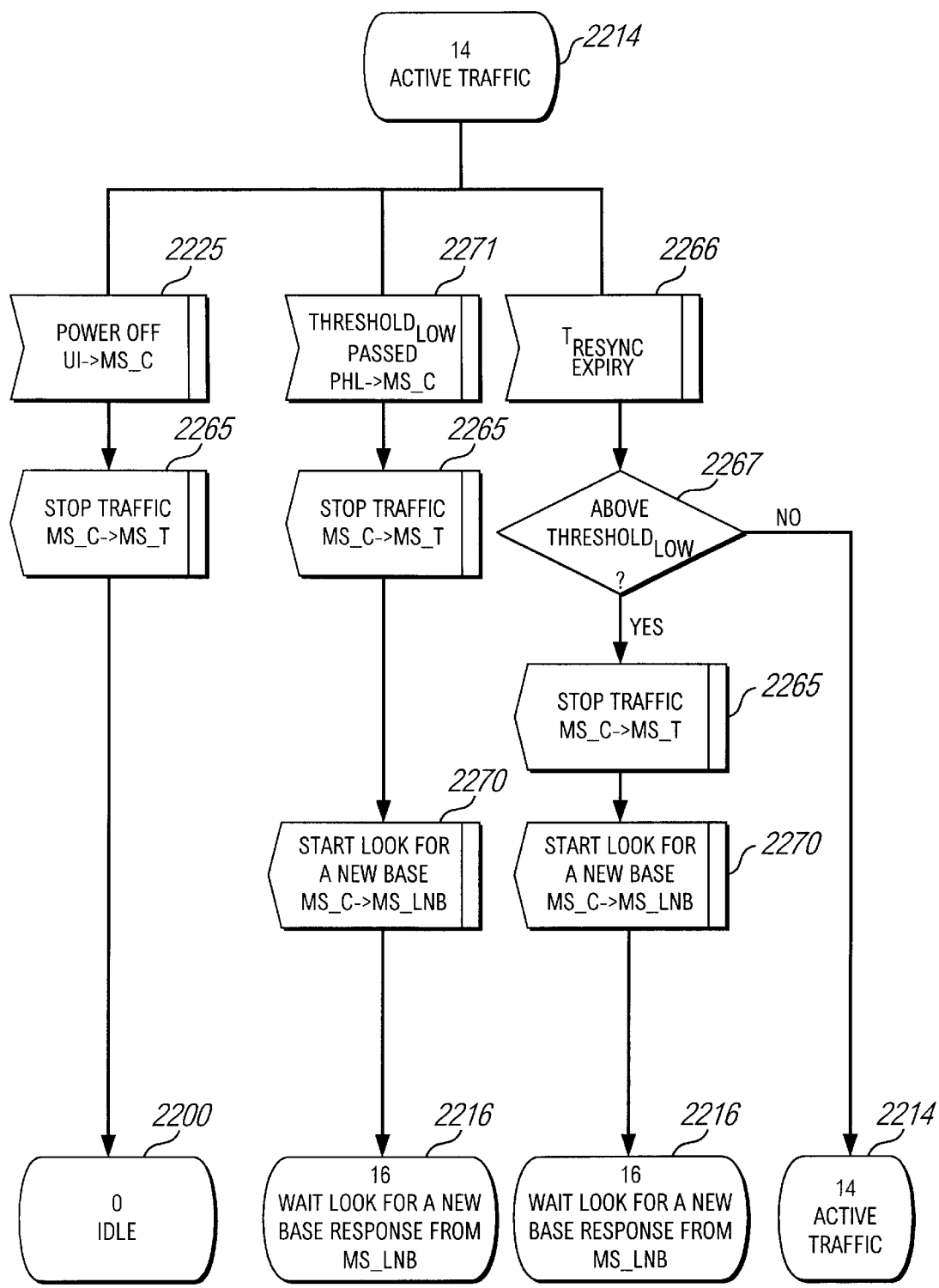

As previously discussed, the MS_C task 2101 transitions to the MS_C(14) state 2214, depicted in FIG. 22o, when the MS software begins processing call data, for either an outbound or incoming call. While in the MS_C(14) state 2214, if the MS_C task 2101 receives an On Hook message 2248 from the UI task 2111, indicating the mobile station end user has hung up the phone, thereby terminating the call, the MS_C task 2101 sends the MS_T task 2106 a Stop Traffic message 2265. The MS_C task 2101 then activates the MS_OR task 2109, depicted in FIG. 31, by sending it a Start Release message 2249. The MS_C task 2101 then transitions to the MS_C(20) state 2220, depicted in FIG. 22*u*.

In the MS_C(14) state 2214, if the MS_C task 2101 receives a Call Released By Network message 2807 from the MS_T task 2106, it posts a Call Dropped message 2260 to the UI task 2111. The MS_C task 2101 also re-enables timer T(reg_period) 2245, previously described, re-enables timer T(poll_period) 2250, also previously described, and transitions to the MS_C(5) state 2205, also previously described, and depicted in FIG. 22*f*.

In the MS_C(14) state 2214, if the MS_C task 2101 receives a Power Off message 2225 from the UI task 2111, the MS_C task 2101 sends the MS_T task 2106 a Stop Traffic message 2265. The MS_C task 2101 then transitions to the MS_C(0) state 2200, previously discussed, and depicted in FIG. 22*a*. The MS_T task 2106, for its part, as previously discussed, on receiving a Stop Traffic message 2265 from the MS_C task 2101, terminates processing, re-transitioning to the MS_T(0) state 2800.

In the MS_C(14) state 2214, if the MS_C task 2101 receives a Traffic Failure (Link Fault) message 2808 from the MS_T task 2106, it then checks 2226 the MS software database to see if there are any untried base stations indicated therein, that the mobile station may attempt to acquire a channel on. If no, the MS_C task 2101 activates the MS_LLR task 2107, previously discussed, and depicted in FIG. 25, by sending it a Start Link Recovery message 234. The MS_C task 2101 then transitions to the MS_C(15) state 2215, depicted in FIG. 22*p*, where it waits for a Link Reacquired message from the MS_LLR task 2107.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102, depicted in FIG. 23, by posing it a Start Slot Acquisition message 2222. The MS_C task 2101 also posts a Handover Attempt message 2264 to the UI task 2111, and then transitions to the MS_C(18) state 2218, depicted in FIG. 22*s*, where it waits for a Slot Acquired message from the MS_SA task 2102 that a Slot was Acquired.

In MS_C(14) state 2214, while the mobile station is receiving bearer data from the base station, the received signal quality of the mobile station's call link is measured by the mobile station's physical layer 2115. This value, along with the current frame error rate and other metrics, provides an indication of the call link quality. The mobile station uses two threshold values, Threshold(Low) and Threshold(High), each of which represents a call link degradation level. In the MS_C(14) state 2214, the first time the physical layer 2115 notifies it that the Threshold(Low) value is passed 2271, the MS_C task 2101 sends the MS_T task 2106 a Stop Traffic message 2265. The MS_C task 2101 then activates the MS_LNB task 2105, depicted in FIG. 29, by sending it a Start Look For A New Base message 2270. The MS_C task 2101 then transitions to the MS_C(16) state 2216, depicted in FIG. 22*q*, where it waits for a Looking Finished message from the MS_LNB task 2105.

Figure 22P:
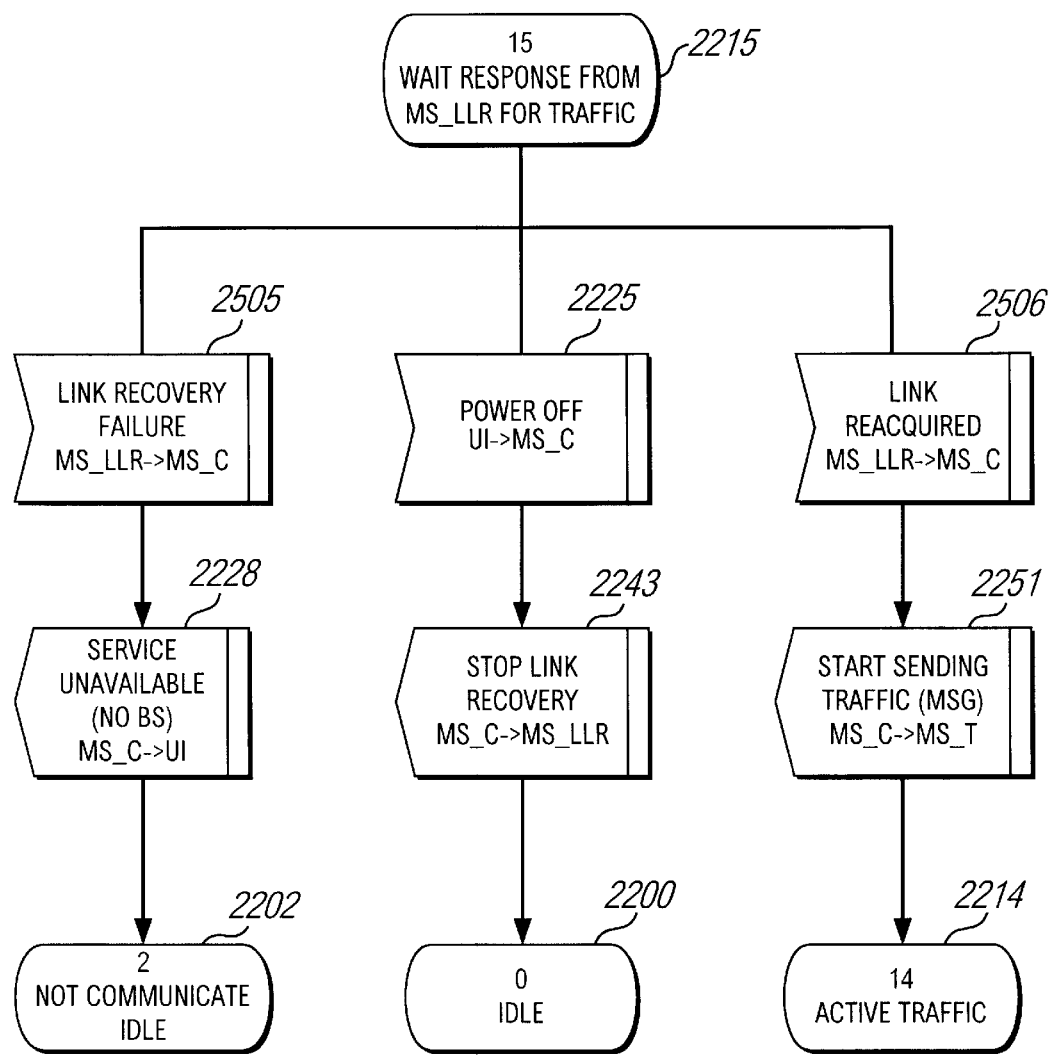
Figure 22Q:
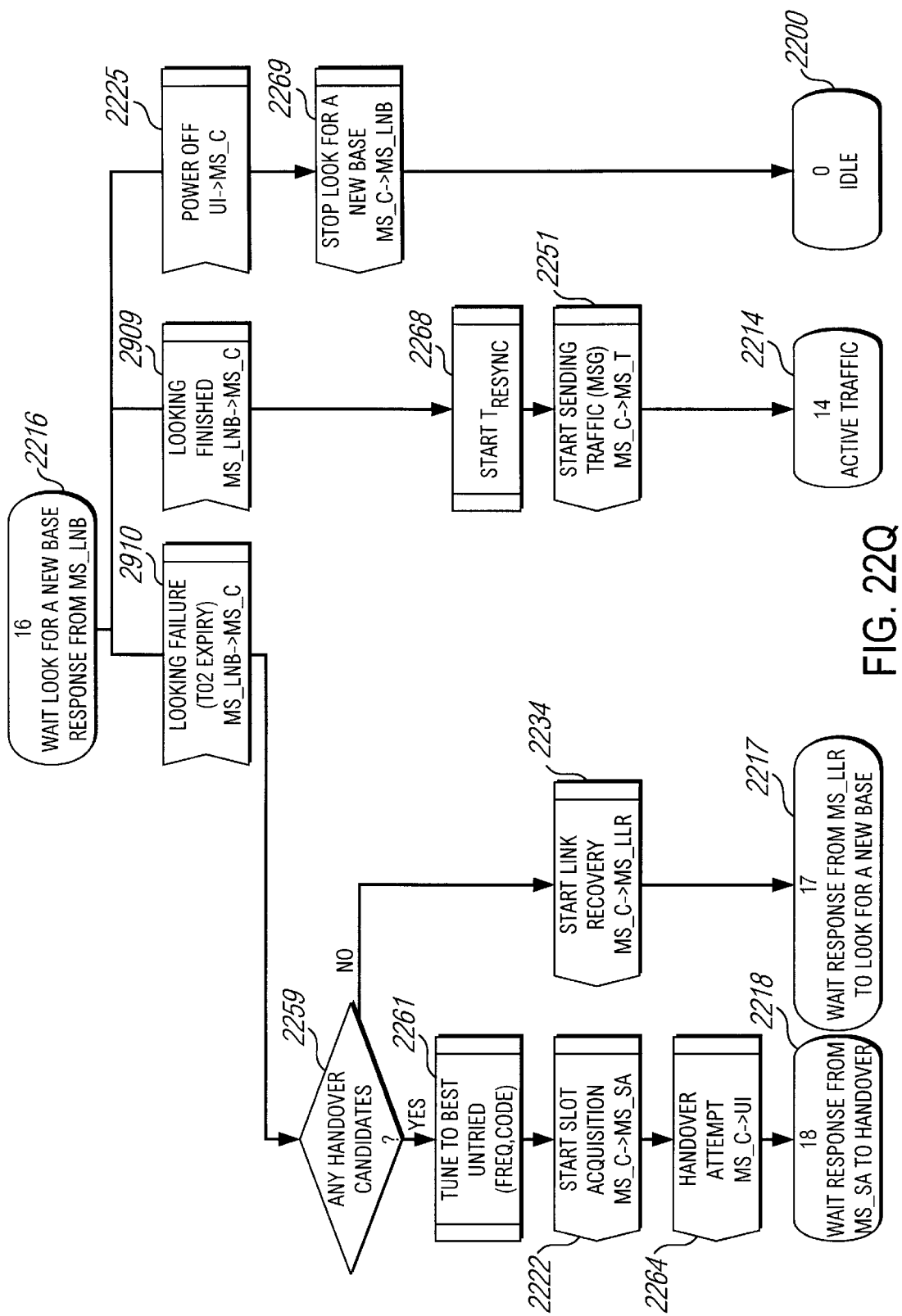

In the MS_C(16) state 2216, depicted in FIG. 22*q*, when the MS_C task 2101 receives a Looking Finished message 2909 from the MS_LNB task 2105, the MS_C task 2101 enables a timer T(resynch) 2268. The MS_C task 2101 also re-activates the MS_T task 2106, depicted in FIG. 28, by sending it a Start Sending Traffic message 2251. The MS_C task 2101 then re-transitions to the MS_C(14) state 2214. From this point on, while processing the current call, the MS_C task 2101 will only check 2267 to see if the physical layer 21115 is notifying it that the Threshold(Low) value has been passed when timer T(resync) expires 2266.

In the MS_C(14) state 2214, if the timer T(resync) expires 2266, the MS_C task 2101 checks 2267 whether the physical layer 2115 is notifying it that the Threshold(Low) value has been passed. If no, and the MS_C task 2101 remains processing in the MS_C(14) state 2214. If, however, Threshold(Low) has been passed, the MS_C task 2101 once again sends the MS_T task 2106 a Stop Traffic message 2265, activates the MS_LNB task 2105 by sending it a Start Look For A New Base message 2270, and transitions to the MS_C(16) state 2216.

In the MS_C(14) state 2214, if the MS_C task 2101 is notified by the physical layer 2115 that the Threshold(High) value is passed, the MS_C task 2101 checks 2259 the MS software database to see if there are any handover base station candidates indicated therein, that the mobile station may attempt to acquire a channel on, and then handover its current call to. If no, the MS_C task 2101 activates the MS_LLR task 2107, previously discussed, and depicted in FIG. 25, by sending it a Start Link Recovery message 2234. The MS_C task 2101 then transitions to the MS_C(15) state 2215, depicted in FIG. 22*p*, where it waits for a Link Reacquired message from the MS_LLR task 2107.

If, however, the MS software database indicates there is an untried base station the mobile station may attempt to acquire a channel on, the MS_C task 2101 tunes 2261 the mobile station to the Frequency/Code of the untried base station with the best perceived call link quality for the mobile station. The MS_C task 2101 then activates the MS_SA task 2102, depicted in FIG. 23, by sending it a Start Slot Acquisition message 2222. The MS_C task 2101 also posts a Handover Attempt message 2264 to the UI task 2111, and then transitions to the MS_C(18) state 2218, depicted in FIG. 22*s*, where it waits for a Slot Acquired message from the MS_SA task 2102.

In the MS_C(15) state 2215, depicted in FIG. 22*p*, the MS_C task 2101 is waiting for a Link Reacquired message from the MS_LLR task 2107, previously discussed, and depicted in FIG. 25. If the MS_C task 2101 receives a Link Reacquired message 2506 from the MS_LLR task 2107 at this time, it re-activates the MS_T task 2106, previously discussed, and depicted in FIG. 28, by sending it a Start Sending Traffic message 2251. The MS_C task 2101 then re-transitions to the MS_C(14) state 2214.

In the MS_C(15) state 2215, if the MS_C task 2101 receives a Power Off message 2225 from the UI task 2111, the MS_C task 2101 sends the MS_LLR task 2107 a Stop Link Recovery message 2243. The MS_C task 2101 then transitions to the MS_C(0) state 2200, previously discussed, and depicted in FIG. 22*a*. The MS_LLR task 2107, for its part, as previously discussed, on receiving a Stop Link Recovery message 2243 from the MS_C task 2101, terminates processing, re-transitioning to the MS_LLR(0) state 2500.

In the MS_C(15) state 2215, if the MS_C task 2101 receives a Link Recovery Failure message 2505 from the MS_LLR task 2107, the mobile station has failed to resync to the base station it is currently tuned to. As the MS_C task 2101 has already determined there is no other base station it can attempt to handover its call to at this time, the MS_C task 2101 posts a Service Unavailable (No BS) message

2228 to the UI task 2111, and then transitions to the MS_C(2) state 2202, previously described, and depicted in FIG. 22c.

The MS_C task 2101 transitions to the MS_C(16) state 2216, depicted in FIG. 22q, when the mobile station has a call established on the communication system 101 and the physical layer 2115 has notified the MS_C task that the Threshold(Low) level value has been passed. At this time, the MS_C task 2101 is waiting for a Looking Finished message from the MS_LNB task 2105.

Figures 1, 29:
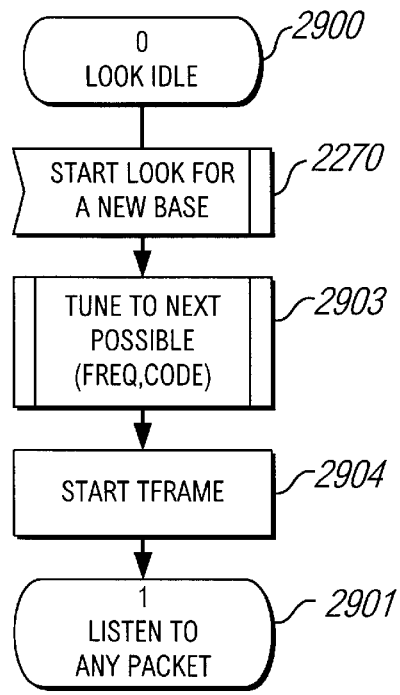
FIG. 29 is a state diagram of the MS software Look for a New Base (MS_LNB) task.
Figures 2, 29:
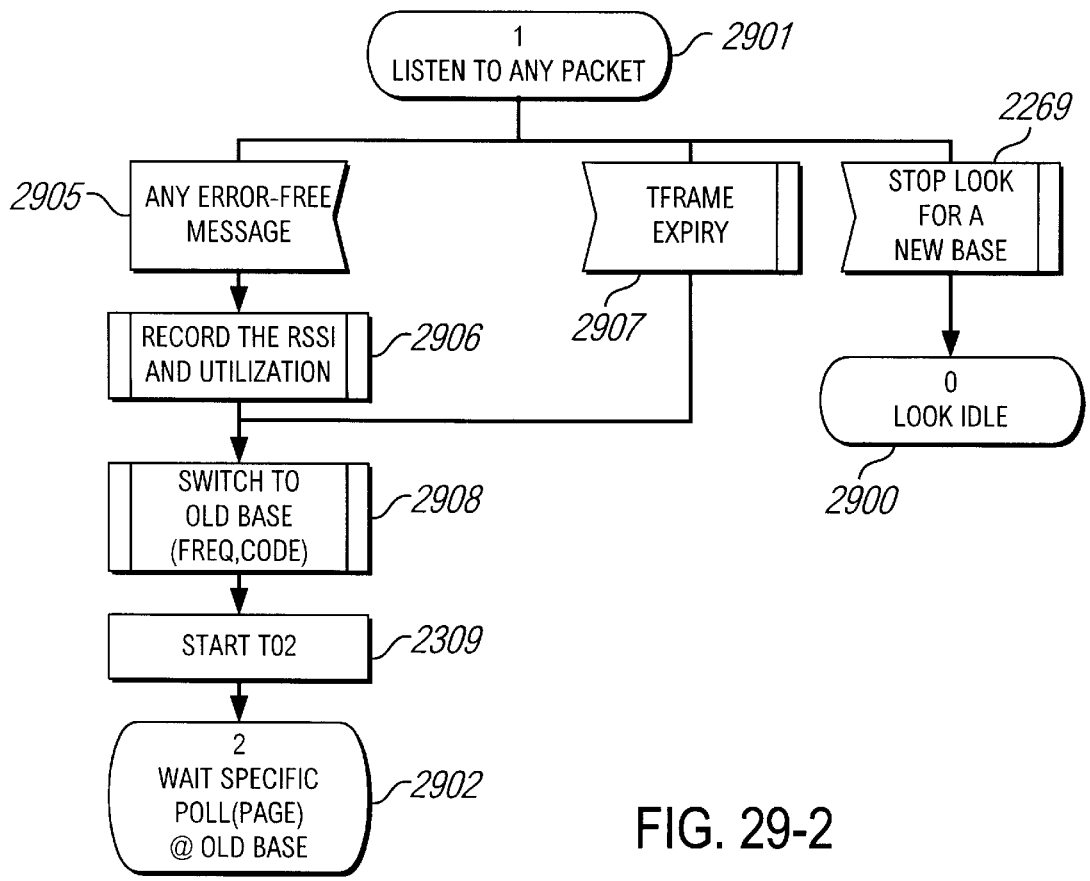
Figures 3, 29:
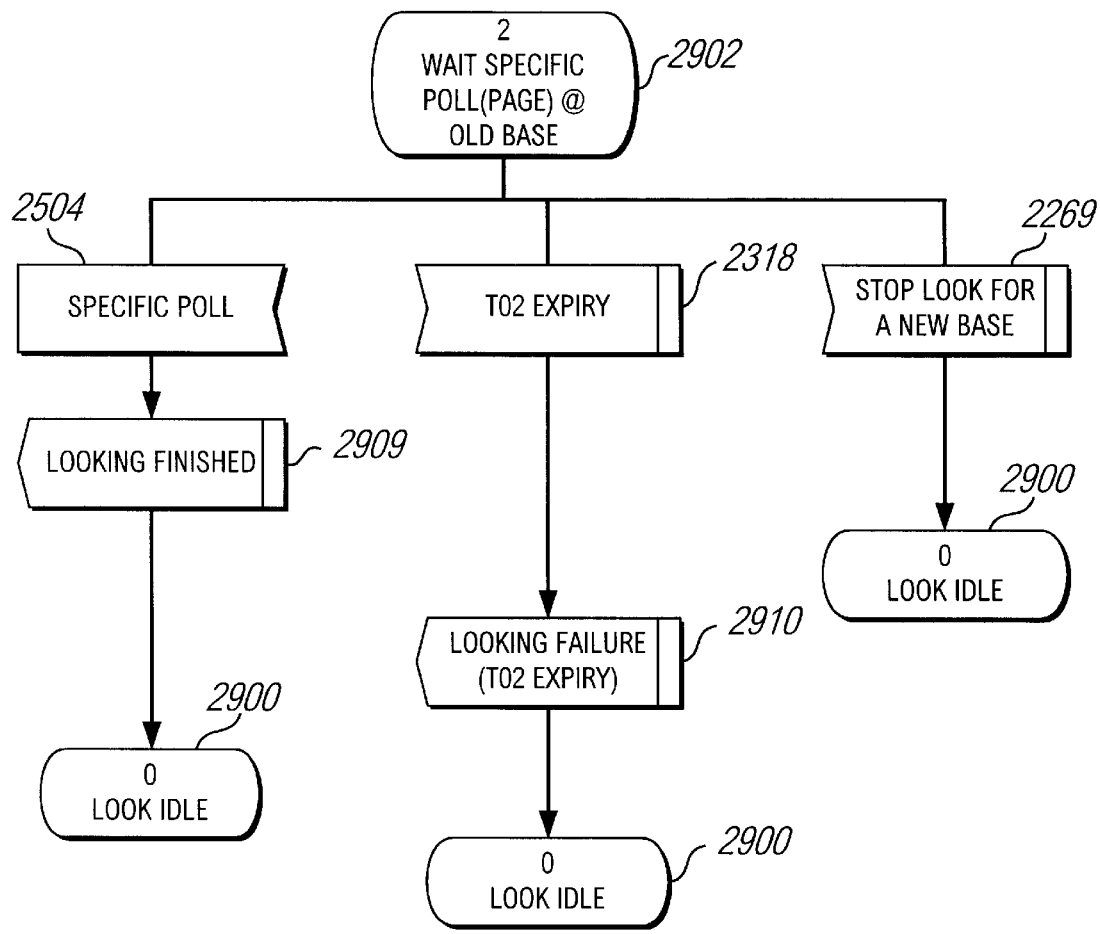

The MS_LNB task 2105, depicted in FIG. 29, is activated from the MS_LNB(0) ("Idle") state 2900 when the MS_C task 2101 sends it a Start Look For A New Base message 2270. Upon being activated, the MS_LNB task 2105 tunes 2903 the mobile station to the Frequency/Code of the next possible base station candidate indicated in the MS software database. The MS_LNB task 2105 enables a timer Tframe 2904, for the maximum time it will continue to process, waiting to receive an error-free message from the base station it is currently tuned to. In a preferred embodiment, the mobile station only looks for a General Poll message from this new base station, as General Poll messages are associated with the maximum signal strength a base station can transmit. The MS_LNB task 2105 then transitions to the MS_LNB(1) state 2901.

In the MS_LNB(1) state 2901, if the mobile station receives an error-free message 2905 from the base station it is tuned to, the MS_LNB task 2105 records statistics 2906 regarding the base station's RSSI (received signal strength) and utilization (i.e., how many other active calls the base station is currently handling) in the MS software database. The MS_LNB task 2105 then re-tunes 2908 the mobile station to the base station currently processing its call (the "original" base station). The MS_LNB task 2105 then enables a timer T02 2309, for the maximum time it will wait to resync with this original base station, and transitions to the MS_LNB(2) state 2902.

In the MS_LNB(1) state 2901, if timer Tframe expires 2907 before the mobile station receives an error-free message from the base station it is currently tuned to, the MS_LNB task 2105 re-tunes 2908 the mobile station to the original base station. The MS_LNB task 2105 also enables timer T02 2309, for the maximum time it will wait to resync with this original base station, and transitions to the MS_LNB(2) state 2902.

In the MS_LNB(2) state 2902, if the mobile station receives a Specific Poll message 2504 for it from the original base station, the MS_LNB task 2105 sends the MS_C task 2101 a Looking Finished message 2909, and terminates processing, transitioning to the MS_LNB(0) state 2900.

On the other hand, if timer T02 expires 2318 in the MS_LNB(2) state 2902, the mobile station has failed to resync with the original base station. In this case, the MS_LNB task 2105 sends the MS_C task 2101 a Looking Failure (T02 Expiry) message 2910. The MS_LNB task 2105 then terminates processing, transitioning to the MS_LNB(0) state 2900.

In the MS_LNB(1) state 2901 or the MS_LNB(2) state 2902, if the MS_LNB task 2105 receives a Stop Look For A New Base message 2269 from the MS_C task 2101, it terminates processing, transitioning to the MS_LNB(0) state 2900.

As previously described, the MS_C task 2101 transitions to the MS_C(16) state 2216, depicted in FIG. 22q, when the mobile station has a call established on the communication system 101, and the physical layer 2115 has notified the MS_C task 2101 that the Threshold(Low) value has been passed. At this time, the MS_C task 2101 is waiting for a Looking Finished message from the MS_LNB task 2105.

Also as previously described, while in the MS_C(16) state 2216, if the MS_C task 2101 receives a Looking Finished message 2909 from the MS_LNB task 2105, it enables a timer T(resynch) 2268. The MS_C task 2101 also re-activates the MS_T task 2106, depicted in FIG. 28, by sending it a Start Sending Traffic message 2251. The MS_C task 2101 then re-transitions to the MS_C(14) state 2214. From this point on, while processing the current call, the MS_C task 2101 only checks 2267 to see if the physical layer 2115 is notifying it that the Threshold(Low) value has been passed when timer T(resync) expires 2266.

In the MS_C(16) state 2216, if the MS_C task 2101 receives a Looking Failure (T02 Expiry) message 2910, it then checks 2259 the MS software database to see if there are any handover base station candidates indicated therein, that the mobile station may attempt to acquire a channel on, and then handover its current call to. If no, the MS_C task 2101 activates the MS_LLR task 2107, previously discussed, and depicted in FIG. 25, by sending it a Start Link Recovery message 2234. The MS_C task 2101 then transitions to the MS_C(17) state 2217, depicted in FIG. 22r, where it waits for a Link Reacquired message 2506 from the MS_LLR task 2107.

If, however, the MS software database indicates there is an untried base station the mobile station may attempt to acquire a channel on, the MS_C task 2101 tunes 2261 the mobile station to the Frequency/Code of the untried base station with the best perceived call link quality for the mobile station. The MS_C task 2101 then activates the MS_SA task 2102, depicted in FIG. 23, by sending it a Start Slot Acquisition message 2222. The MS_C task 2101 also posts a Handover Attempt message 2264 to the UI task 2111, and then transitions to the MS_C(18) state 2218, depicted in FIG. 22s, where it waits for a Slot Acquired message from the MS_SA task 2102.

In the MS_C(16) state 2216, if the MS_C task 2101 receives a Power Off message 2225 from the UI task 2111, the MS_C task 2101 sends the MS_LNB task 2105 a Stop Look For A New Base message 2269. The MS_C task 2101 then transitions to the MS_C(0) state 2200, previously discussed, and depicted in FIG. 22a. The MS_LNB task 2105, for its part, as previously discussed, on receiving a Stop Traffic message 2265 from the MS_C task 2101, terminates processing, re-transitioning to the MS_LNB(0) state 2900.

Figure 22R:
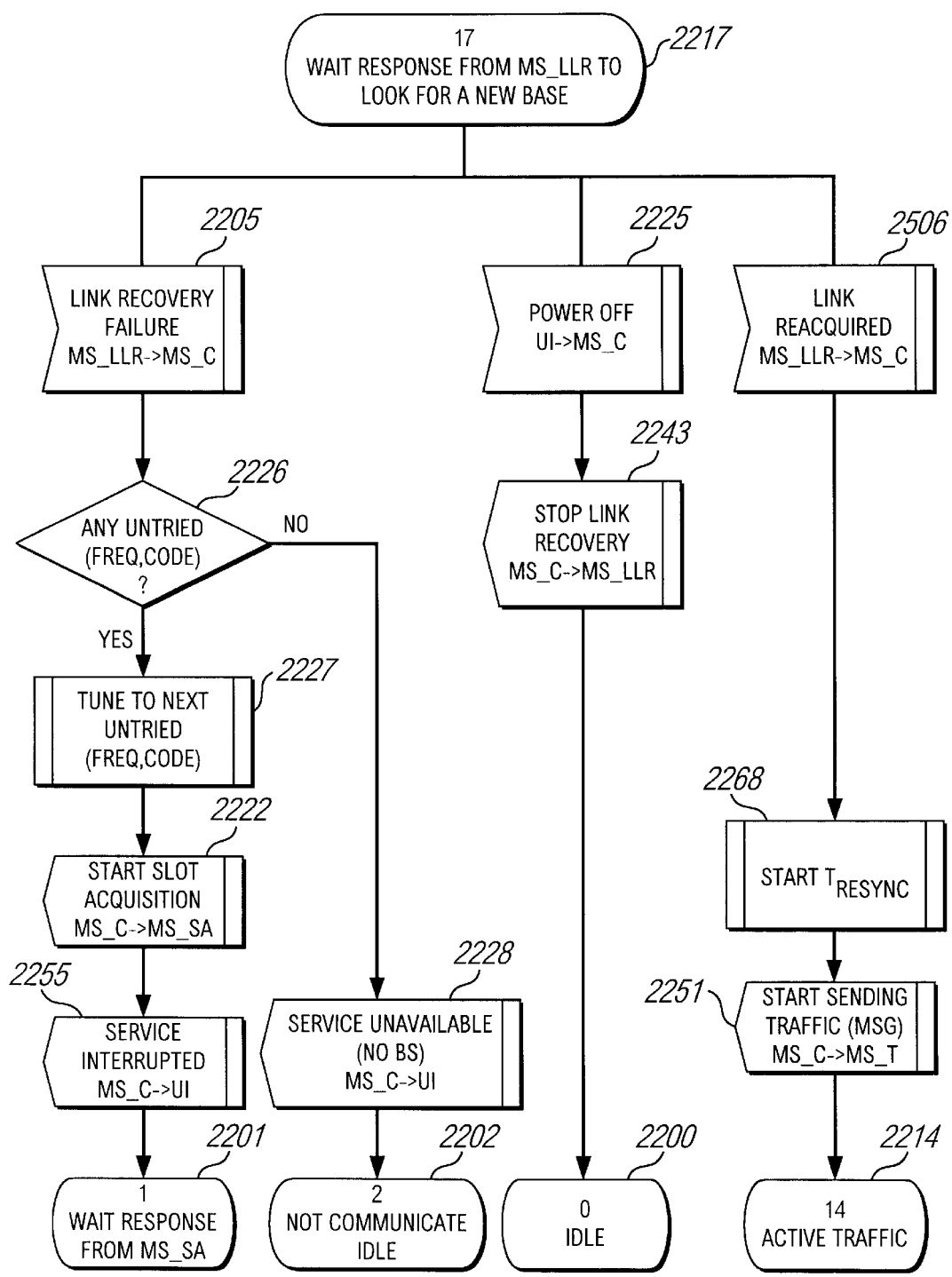

In the MS_C(17) state 2217, depicted in FIG. 22r, the MS_C task 2101 is waiting for a Link Reacquired message from the MS_LLR task 2107, previously discussed, and depicted in FIG. 25.

If the MS_C task 2101 receives a Link Reacquired message 2506 from the MS_LLR task 2107 at this time, it enables timer T(resynch), previously described. The MS_C task 2101 then re-activates the MS_T task 2106, previously discussed, and depicted in FIG. 28, by sending it a Start Sending Traffic message 2251. The MS_C task 2101 then re-transitions to the MS_C(14) state 2214.

In the MS_C(17) state 2217, if the MS_C task 2101 receives a Power Off message 2225 from the UI task 2111, the MS_C task 2101 sends the MS_LLR task 2107 a Stop Link Recovery message 2243. The MS_C task 2101 then transitions to the MS_C(0) state 2200, previously discussed, and depicted in FIG. 22a. The MS_LLR task 2107, for its part, as previously discussed, on receiving a Stop Link Recovery message 2243 from the MS_C task 2101, terminates processing, re-transitioning to the MS_LLR(0) state 2500.

In the MS_C(17) state 2217, if the MS_C task 2101 receives a Link Recovery Failure message 2505 from the MS_LLR task 2107, it then checks 2226 the MS software database to see if there are any untried base stations indicated therein, that the mobile station may attempt to acquire a channel on. If no, the MS_C task 2101 posts a Service Unavailable (No BS) message 2228 to the UI task 2111, and transitions to the MS_C(2) state 2202, previously discussed, and depicted in FIG. 22c.

If, however, the MS software database indicates there is an untried base station the mobile station may attempt to acquire a channel on, the MS_C task 2101 tunes 2227 the mobile station to the Frequency/Code of this new untried base station and activates the MS_SA task 2102, depicted in FIG. 23, by sending it a Start Slot Acquisition message 2222. The MS_C task 2101 also posts a Service Interrupted message 2255 to the UI task 2111. The MS_C task 2101 then transitions to the MS_C(1) state 2201, previously discussed, and depicted in FIG. 22b, where it waits for a Slot Acquired message from the MS_SA task 2102.

Figure 22S:
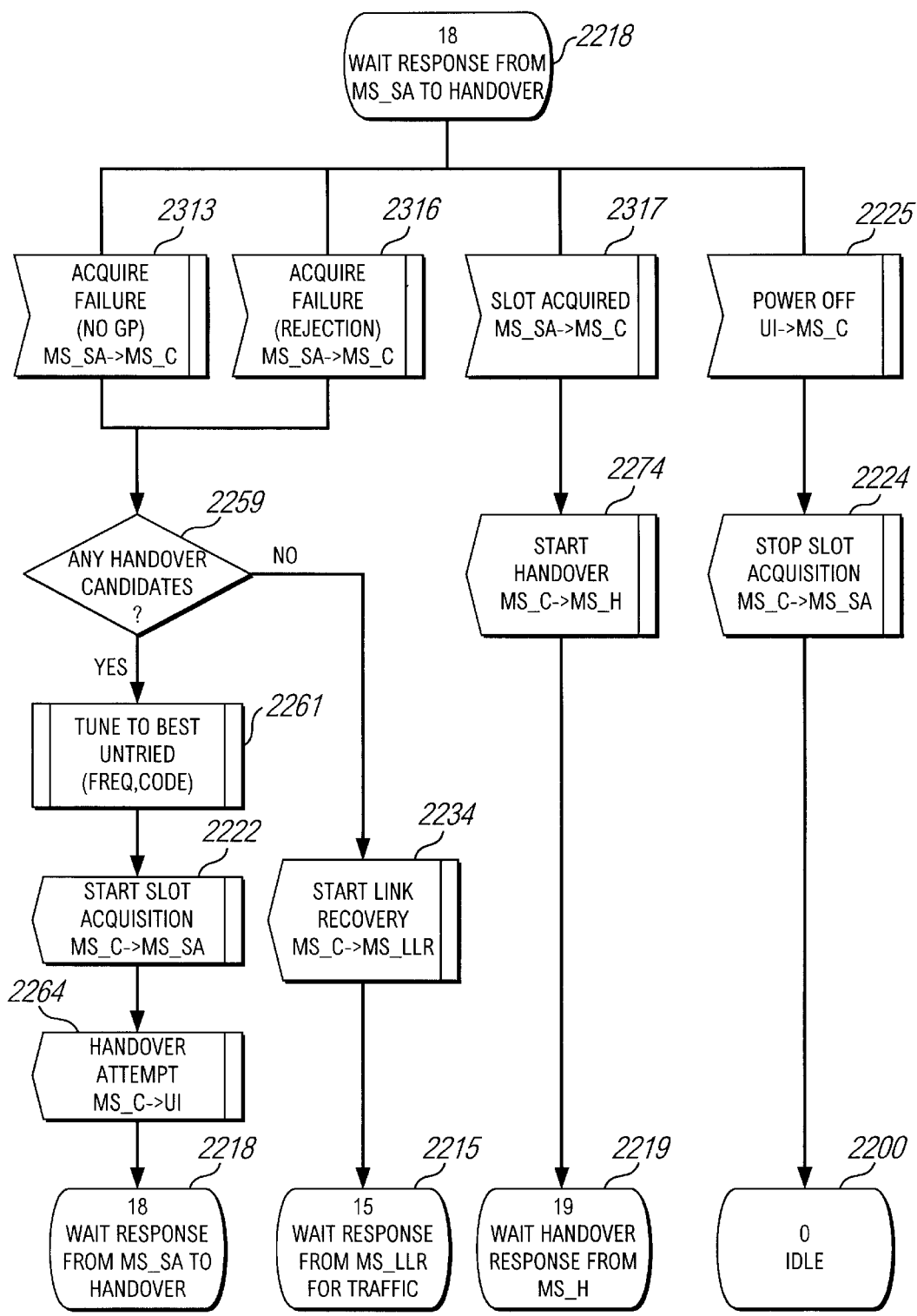

In the MS_C(18) state 2218, depicted in FIG. 22s, the MS_C task 2101, is waiting for a Slot Acquired message from the MS_SA task 2102, indicating the mobile station has seized a channel on a new base station. At this time, the mobile station has a call established on the communication system 101, and it is looking for a base station that it can hand this call over to.

Figures 1, 30:
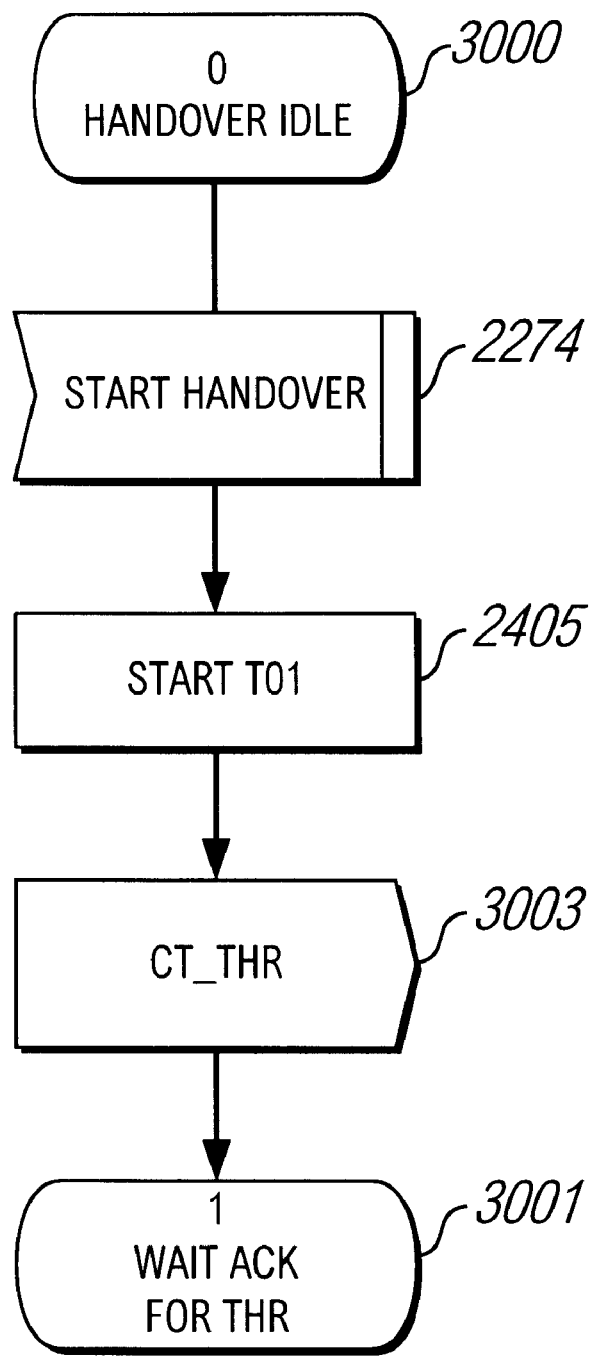
FIG. 30 is a state diagram of the MS software Handover (MS_H) task.
Figures 2, 30:
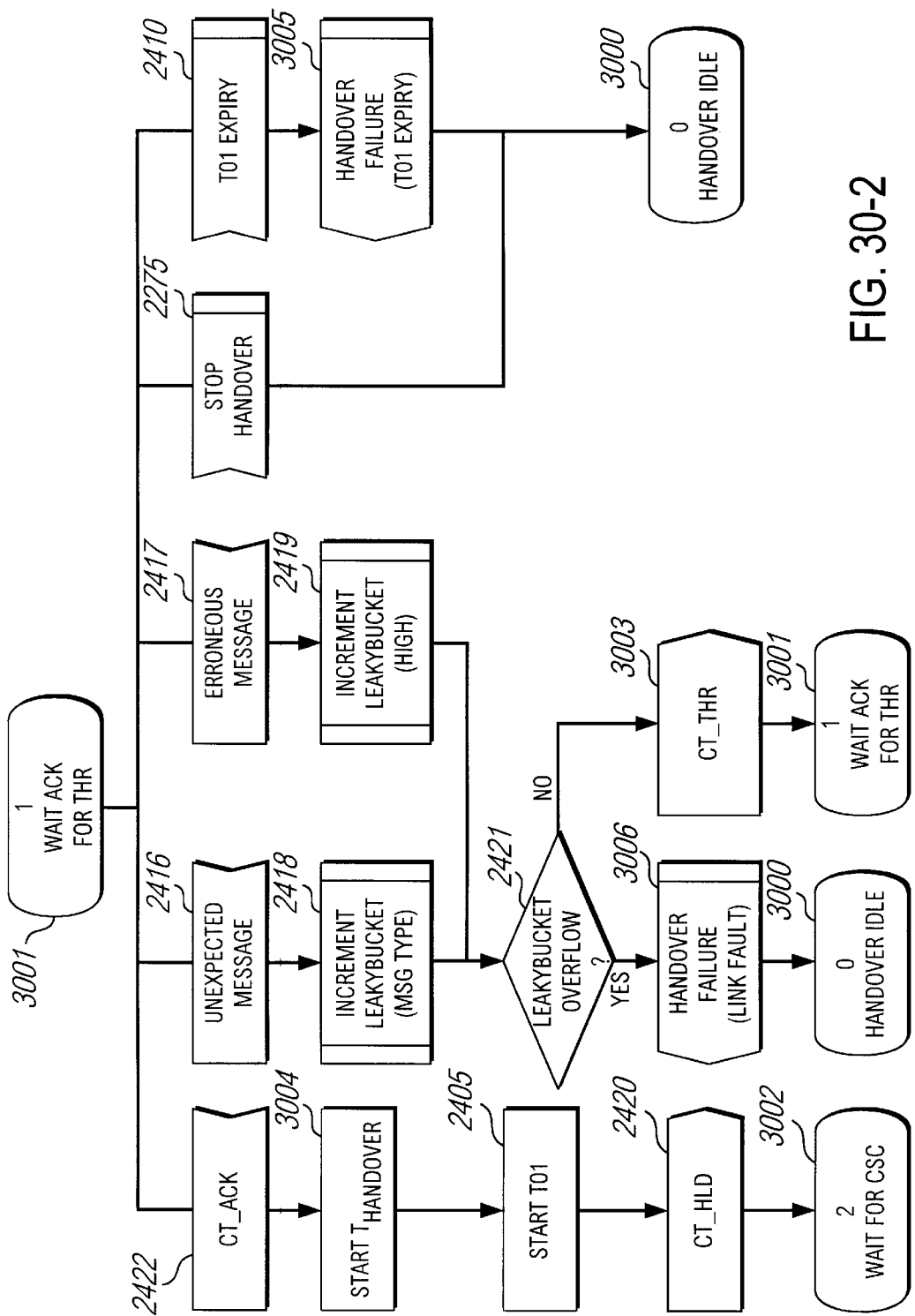
Figures 3, 30:
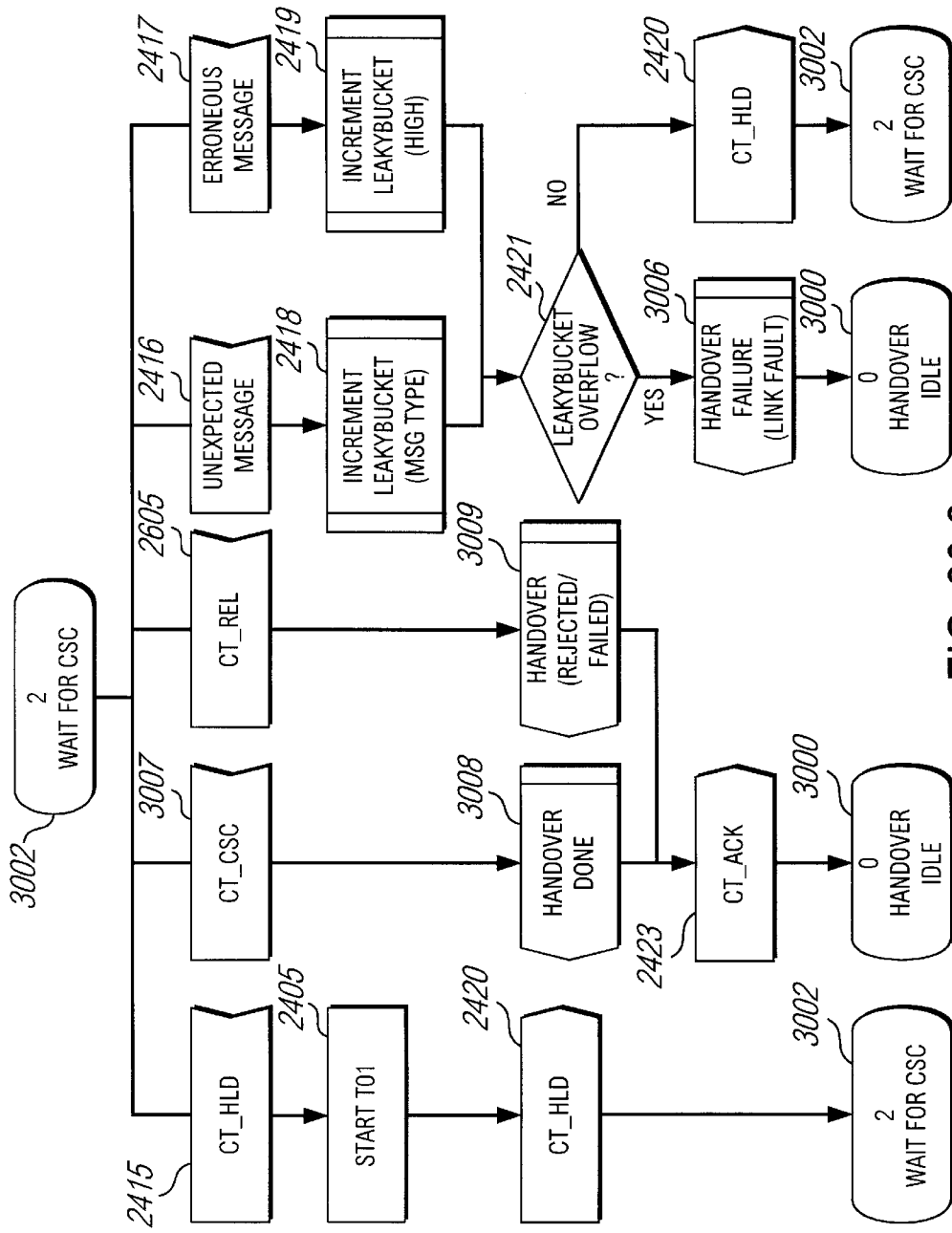
Figures 4, 30:
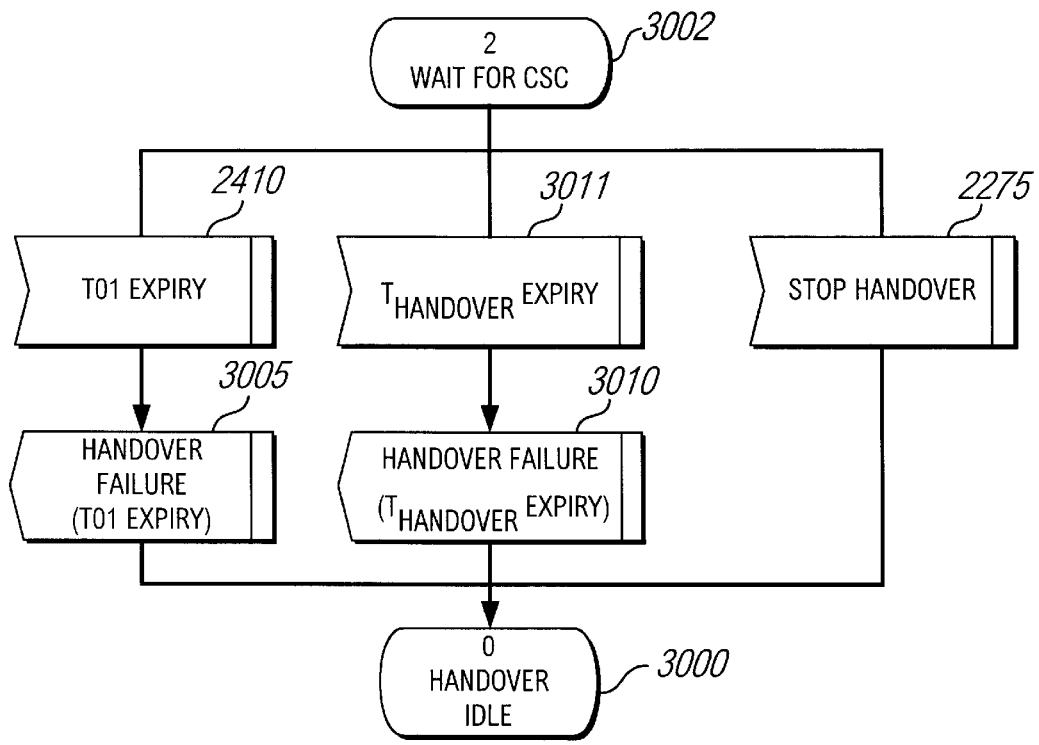

In the MS_C(18) state 2218, if the MS_C task 2101 receives a Slot Acquired message 2317 from the MS_SA task 2102, the MS_C task 2101 activates the MS_H task 2110, depicted in FIG. 30, by sending it a Start Handover message 2274. The MS_H task 2110 handles the mobile station handover protocol processing. The MS_C task 2101 then transitions to the MS_C(19) state 2219, depicted in FIG. 22t, where it waits for a Handover Done message from the MS_H task 2110.

In the MS_C(18) state 2218, if the MS_C task 2101 receives an Acquire Failure (No GP) message 2313 or an Acquire Failure (Rejection) message 2316 from the MS_SA task 2102, the MS_SA task 2102 has failed to acquire a channel on the base station the mobile station is currently tuned to. Thus, the MS_C task 2101 checks 2259 the MS software database to see if there are any handover base station candidates indicated therein, that the mobile station may attempt to acquire a channel on, and then handover its current call to. If no, the MS_C task 2101 activates the MS_LLR task 2107, previously discussed, and depicted in FIG. 25, by sending it a Start Link Recovery message 2234. The MS_C task 2101 then transitions to the MS_C(15) state 2215, depicted in FIG. 22p, where it waits for a Link Reacquired message 2506 from the MS_LLR task 2107.

If, however, the MS software database indicates there is an untried base station the mobile station may attempt to acquire a channel on, the MS_C task 2101 tunes 2261 the mobile station to the Frequency/Code of the untried base station with the best perceived call link quality for the mobile station. The MS_C task 2101 then activates the MS_SA task 2102, depicted in FIG. 23, by sending it a Start Slot Acquisition message 2222. The MS_C task 2101 also posts a Handover Attempt message 2264 to the UI task 2111. The MS_C task 2101 remains in the MS_C(18) state 2218 at this time, where it waits for a Slot Acquired message from the MS_SA task 2102.

In the MS_C(18) state 2218, if the MS_C task 2101 receives a Power Off message 2225 from the UI task 2111, the MS_C task 2101 sends a Stop Slot Acquisition message 2224 to the MS_SA task 2102. The MS_C task 2101 then transitions to the MS_C(0) state 2200, previously discussed, and depicted in FIG. 22a. The MS_SA task 2102, for its part, as previously discussed, on receiving a Stop Slot Acquisition message 2224 from the MS_C task 2101, terminates processing, re-transitioning to the MS_SA(0) state 2300.

Figures 1, 22T:
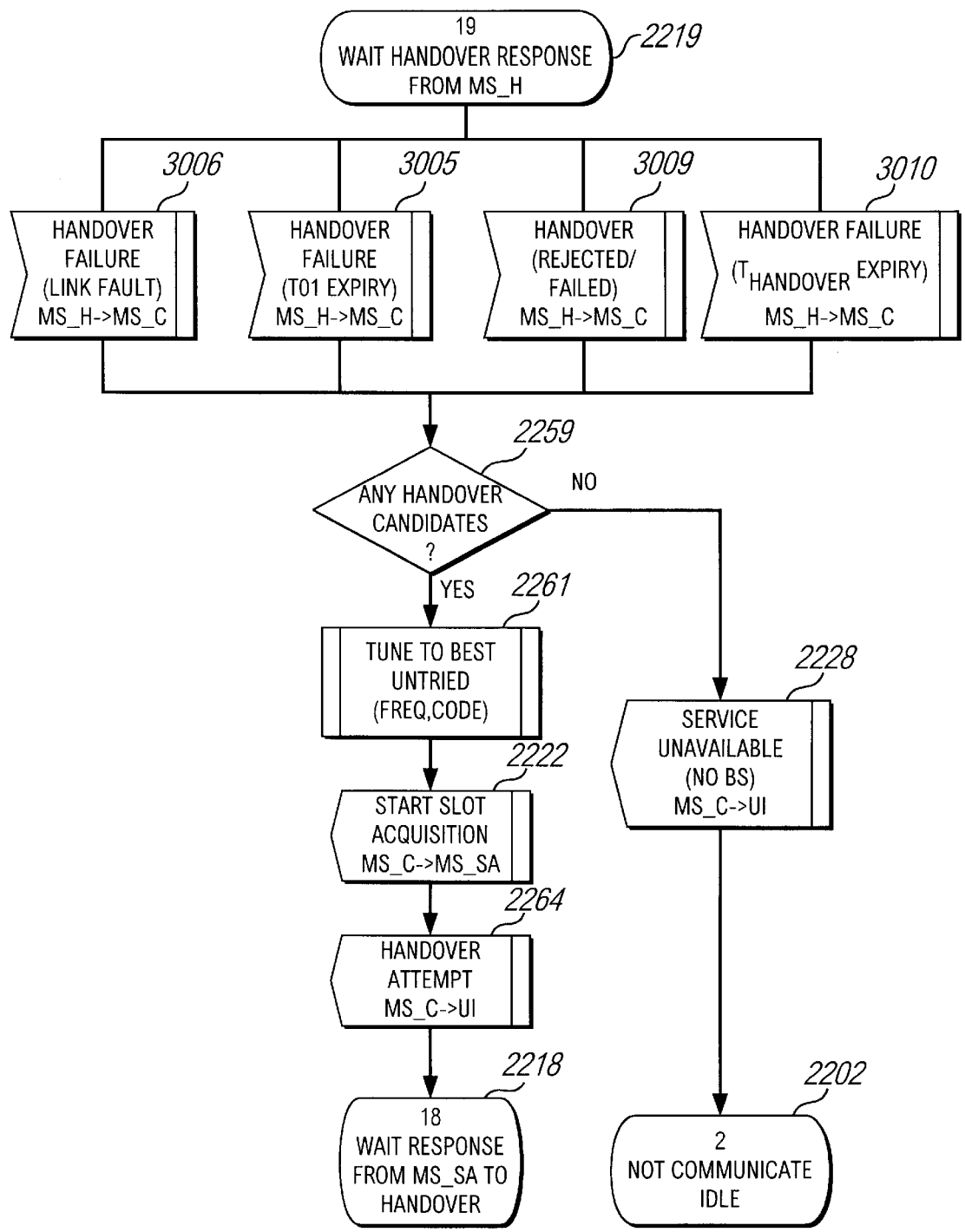
Figures 2, 22T:
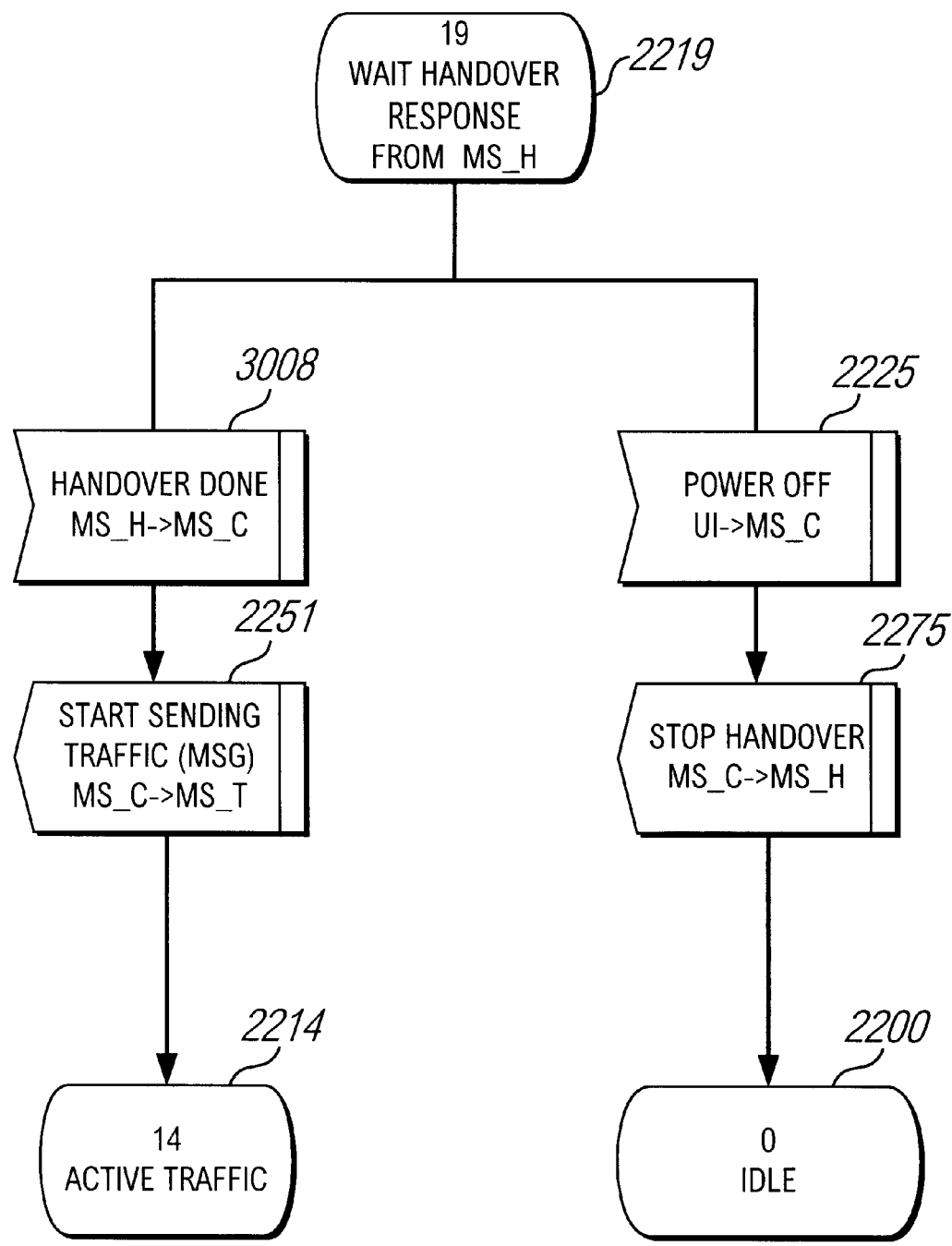

As previously discussed, the MS_C task 2101 transitions to the MS_C(19) state 2219, depicted in FIG. 22t, when the mobile station has a call established on the communication system 101, and it wishes to hand over this call to a new base station. At this time, the mobile station has acquired a channel on a new base station. The MS_C task 2101 is now waiting for a Handover Done message from the MS_H task 2110, indicating that the handover protocol with the new base station is completed.

The MS_H task 2110, depicted in FIG. 30, is activated by the MS_C task 2101 when the MS software determines to process a handover protocol sequence with the base station it is now tuned to. When the MS_H task 2110 is activated, the mobile station has already acquired a channel on the base station, and it is now going to process the handover protocol with this base station. The MS_H task 2110 is activated from the MS_H(0) ("Idle") state 3000 when the MS_C task 2101 sends it a Start Handover message 2274. The MS_H task 2110 transmits a CT_THR (Terminating Handover Request) message 3003 to the base station, requesting to handover its call to the base station. The MS_H task 2110 also enables a timer T01 2405, for the maximum time it will wait for a CT_ACK message response from the base station. The MS_H task 2110 then transitions to the MS_H(1) state 3001.

If T01 expires 2410 in the MS_H(1) state 3001, the MS_H task 2110 sends the MS_C task 2101 a Handover Failure (T01 Expiry) message 3005, and then terminates processing, re-transitioning to the MS_H(0) state 3000.

If the mobile station receives the expected CT_ACK message 2422 from the base station while processing in the MS_H(1) state 3001, the MS_H task 2110 enables a timer T(handover), 3004 for the maximum time the MS_H task 2110 will wait to receive a CT_CSC (Circuit Switch Complete) message from the base station. The MS_H task 2110 also re-enables timer T01 2405, transmits a CT_HLD message 2420 to the base station, and then transitions to the MS_H(2) state 3002. Timer T01 is established for the maximum time the MS_H task 2110 will wait for a CT_HLD message from the base station. As previously discussed, the base station and the mobile station transmit CT_HLD messages to each other when they are executing a protocol sequence, and have no other message to transmit to the other.

In the MS_H(2) state 3002, the MS_H task 2110 continues to process the transmission 2420 and reception 2415 of CT_HLD messages to/from the base station, re-enabling timer T01 2405 each time a CT_HLD message is received 2415 from the base station. If T01 expires 2410 while processing in this state, the MS_H task 2110 sends the MS_C task 2101 a Handover Failure (T01 Expiry) message 3005, and then terminates processing, re-transitioning to the MS_H(0) state 3000.

If the mobile station receives the expected CT_CSC (Circuit Switch Complete) message from the base station before timer T(handover) expires, the MS_H task 2110 sends the MS_C task 2101 a Handover Done message 3008. The MS_H task 2110 also transmits a CT_ACK message 2423 to the base station, acknowledging the CT_CSC message, and then terminates processing, re-transitioning to the MS_H(0) state 3000.

If timer T(handover) expires 3011, the MS_H task 2110 sends the MS_C task 2101 a Handover Failure (T(handover) Expiry) message 3010. The MS_H task 2110 then terminates processing, re-transitioning to the MS_H(0) state 3000.

In the MS_H(1) state 3001 or the MS_H(2) state 3002, the mobile station may receive an unexpected 2416 or erroneous 2417 message on the O-Interface (as previously described). Upon receiving an unexpected or erroneous message while processing in either of these states, the MS_H task 2110 increments the appropriate LeakyBucket counter (2418 or 2419). The MS_H task 2110 then checks 2421 if either LeakyBucket counter indicates a maximum error count has been reached. If no, the MS_H task 2110 re-transmits the last message it transmitted to the base station, and continues processing in the current MS_H state. If the MS_H task 2110 is in the MS_H(1) state 3001, the last message transmitted was a CT_THR (Terminating Handover Request) message 3003. If the MS_H task 2110 is in the MS_H(2) state 3002, the last message transmitted was a CT_HLD message 2420.

If, however, the MS_H task 2110 checks 2421 its Leaky-Bucket counters and finds that either indicates a maximum error count, it sends the MS_C task 2101 a Handover Failure (Link Fault) message 3006, and then terminates processing, re-transitioning to the MS_H(0) state 3000.

While in the MS_H(2) state 3002, the mobile station may receive a CT_REL message 2605 from the base station. Upon receiving a CT_REL message 2605 from the base station at this time, the MS_H task 2110 sends the MS_C task 2101 a Handover (Rejected/Failed) message 3009. The MS_H task 2110 transmits a CT_ACK message 2423 to the base station, acknowledging the CT_REL message, and then terminates processing, re-transitioning to the MS_H(0) state 3000.

As previously noted, the MS_C task 2101 is in the MS_C(19) state 2219, depicted in FIG. 22t, while it waits for a Handover Done message from the MS_H task 2110. While in the MS_C(19) state 2219, if the MS_C task 2101 receives a Power Off message 2225 from the UI task 2111, the MS_C task 2101 sends the MS_H task 2110 a Stop Handover message 2275. The MS_C task 2101 then transitions to the MS_C(0) state 2200, previously discussed, and depicted in FIG. 22a.

While in the MS_H(1) state 3001 or the MS_H(2) state 3002, if the MS_H task 2110 receives a Stop Handover message 2275 from the MS_C task 2101, it terminates processing, re-transitioning to the MS_H(0) state 3000.

While in the MS_C(19) state 2219, if the MS_C task 2101 receives a Handover Failure (Link Fault) message 3006, a Handover Failure (T01 Expiry) message 3005, a Handover (Rejected/Failed) message 3009, or a Handover Failure (T(handover) Expiry) message 3010 from the MS_H task 2110, the mobile station has failed to hand over its call to the base station it is currently tuned to. Thus, the MS_C task 2101 checks 2259 the MS software database to see if there are any handover base station candidates indicated therein, that the mobile station may attempt to acquire a channel on, and then handover its current call to. If no, the MS_C task 2101 posts a Service Unavailable (No BS) message 2228 to the UI task 2111, and then transitions to the MS_C(2) state 2202, previously described, and depicted in FIG. 22c.

If, however, the MS software database indicates there is an untried base station the mobile station may attempt to acquire a channel on, the MS_C task 2101 tunes 2261 the mobile station to the Frequency/Code of the untried base station with the best perceived call link quality for the mobile station. The MS_C task 2101 then activates the MS_SA task 2102, depicted in FIG. 23, by sending it a Start Slot Acquisition message 2222. The MS_C task 2101 also posts a Handover Attempt message 2264 to the UI task 2111, and then transitions to the MS_C(18) state 2218, previously described, and depicted in FIG. 22s, where it waits for a Slot Acquired message from the MS_SA task 2102.

While in the MS_C(19) state 2219, if the MS_C task 2101 receives a Handover Done message 3008 from the MS_H task 2110, the mobile station's call has been successfully handed over to the base station the mobile station is currently tuned to. The MS_C task 2101, therefore, activates the MS_T task 2106, depicted in FIG. 28, by sending it a Start Sending Traffic message 2251. The MS_C task 2101 then transitions to the MS_C(14) state 2214, previously described, and depicted in FIG. 22o.

Figure 22U:
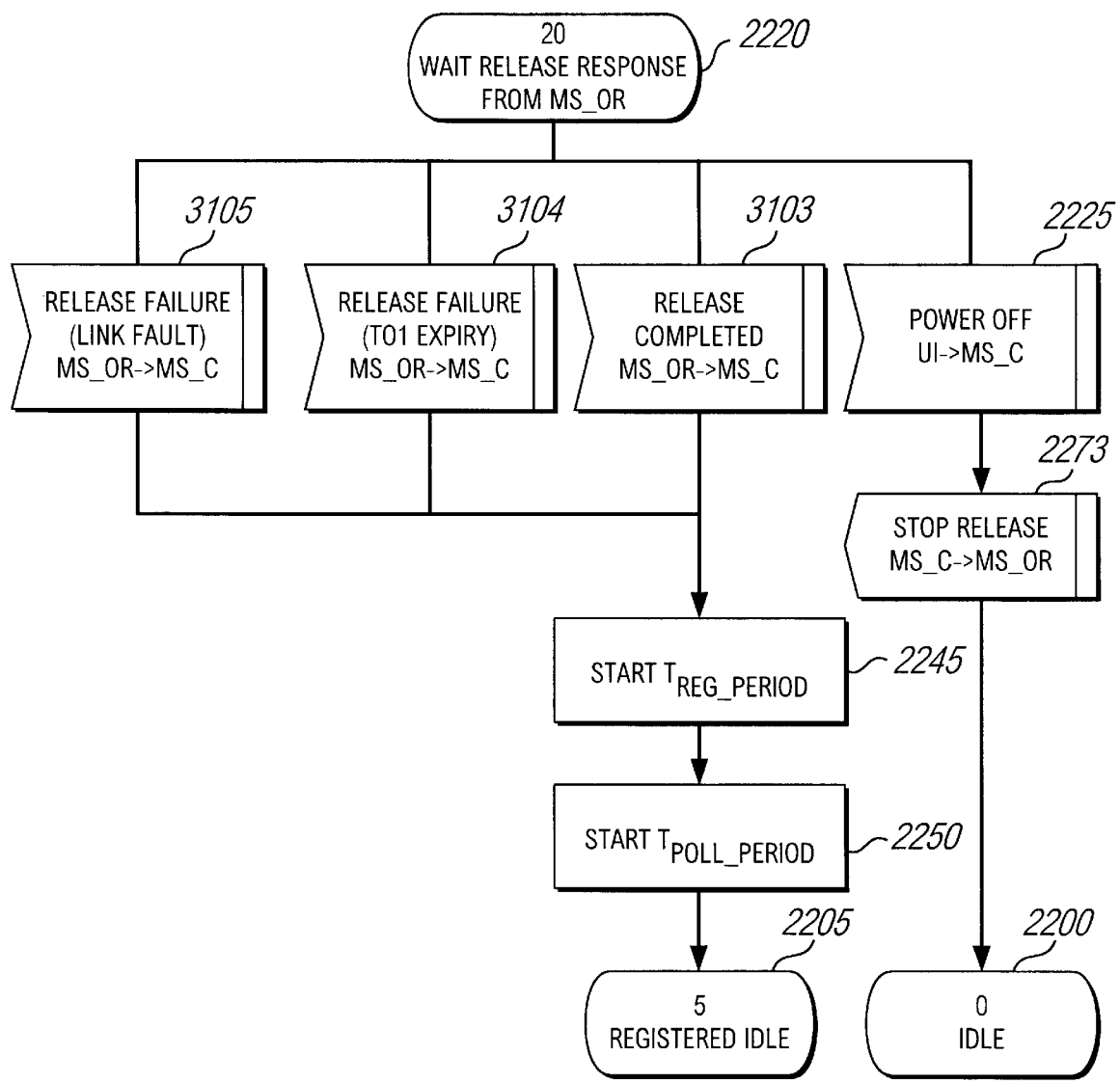

The MS_C task 2101 transitions to the MS_C(20) state 2220, depicted in FIG. 22u, from the MS_C(7) state 2207, the MS_C(13) state 2213, or the MS_C(14) state 2214, when it receives an On Hook message 2248 from the UI task 2111, indicating the mobile station end user has hung up the phone. In the MS_C(20) state 2220, the MS_C task 2101 is waiting for a Release Completed message from the MS_OR task 2109 that the release protocol processing is completed.

Figures 1, 31:
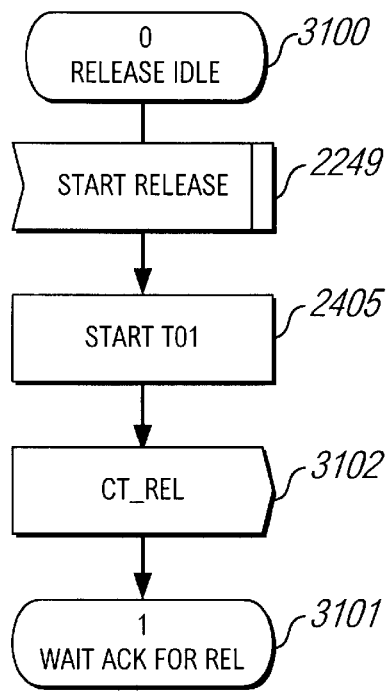
FIG. 31 is a state diagram of the MS software Originated Release (MS_OR) task.
Figures 2, 31:
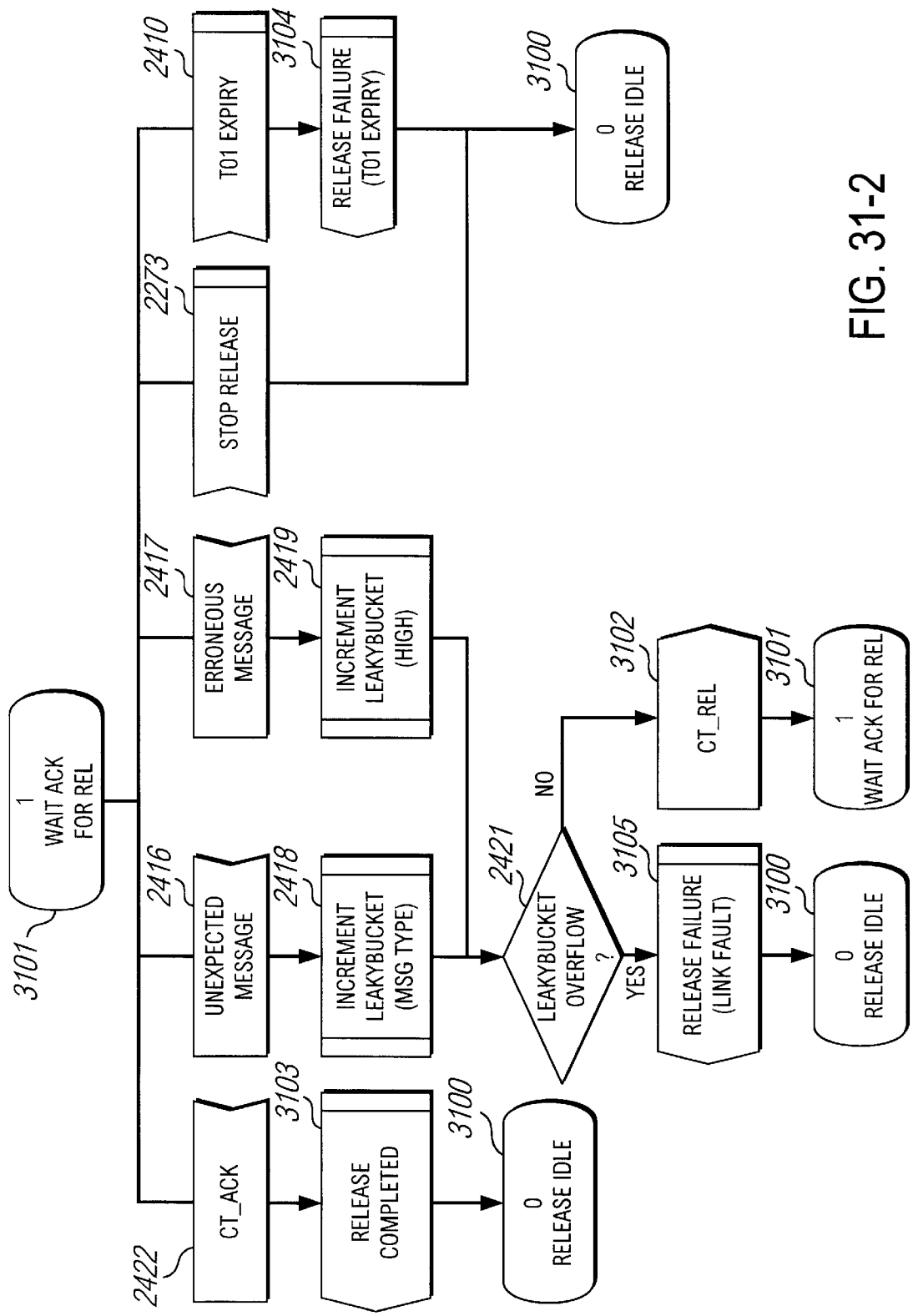

The MS_OR task 2109, depicted in FIG. 31, is activated from the MS_OR(0) ("Idle") state 3100 when it receives a Start Release message 2249 from the MS_C task 2101. The MS_C task 2101 activates the MS_OR task 2109 when it receives an On Hook message 2248 from the UI task 2111. The MS_OR task 2109 handles the release protocol processing for the mobile station, with the base station the mobile station currently has acquired a channel on. Upon being activated, the MS_OR task 2109 transmits a CT_REL (Release) message 3102 to the base station. The MS_OR task 2109 also enables a timer T01 2405, for the maximum time it will wait for a CT_ACK message response from the base station. The MS_OR task 2109 then transitions to the MS_OR(1) state 3101.

If T01 expires 2410 in the MS_OR(1) state 3101, the MS_OR task 2109 sends the MS_C task 2101 a Release Failure (T01 Expiry) message 3104, and then terminates processing, re-transitioning to the MS_OR(0) state 3100.

If the mobile station receives the expected CT_ACK message 2422 from the base station while processing in the MS_OR(1) state 3101, the MS_OR task 2109 sends the MS_C task 2101 a Release Completed message 3103. The MS_OR task 2109 then terminates processing, re-transitioning to the MS_OR(0) state 3100.

In the MS_OR(1) state 3101, the mobile station may receive an unexpected 2416 or erroneous 2417 message on the O-Interface (as previously described). Upon receiving an unexpected or erroneous message while processing in this state, the MS_OR task 2109 increments the appropriate LeakyBucket counter (2418 or 2419). The MS_OR task 2109 then checks 2421 if either LeakyBucket counter indicates a maximum error count has been reached. If no, the MS_OR task 2109 re-transmits the last message it transmitted to the base station, in this case, a CT_REL (Release) message 3102, and continues processing in the MS_OR(1) state 3101.

If, however, the MS_OR task 2109 checks 2421 its LeakyBucket counters and finds that either indicates a maximum error count, it sends the MS_C task 2101 a Release Failure (Link Fault) message 3105, and then terminates processing, re-transitioning to the MS_OR(0) state 3100.

As previously noted, the MS_C task 2101 is in the MS_C(20) state 2220, depicted in FIG. 22*u*, while the MS_OR task 2109 is activated. While in the MS_C(20) state 2220, if the MS_C task 2101 receives a Power Off message 2225 from the UI task 2111, the MS_C task 2101 sends the MS_OR task 2109 a Stop Release message 2273. The MS_C task 2101 then transitions to the MS_C(0) state 2200, previously discussed, and depicted in FIG. 22*a*.

While in the MS_OR(1) state 3101, if the MS_OR task 2109 receives a Stop Release message 2273 from the MS_C task 2101, it terminates processing, re-transitioning to the MS_OR(0) state 3100.

While in the MS_C(20) state 2220, if the MS_C task 2101 receives a Release Failure (Link Fault) message 3105, a Release Failure (T01 Expiry) message 3104, or a Release Completed message 3103 from the MS_OR task 2109, it re-enables timer T(reg_period). 2245, previously discussed, re-enables timer T(poll_period) 2250, also previously discussed, and transitions to the MS_C(5) state 2205, also previously discussed, and depicted in FIG. 22*f*.

Alternative Embodiments

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is as follows:

1. A remote station for use in a wireless communication system comprising at least one base station, the remote station comprising:
   a computer program;
   wherein the computer program causes the remote station to register with a base station in the wireless communication system;
   periodically re-register, with a first period, with the base station in the wireless communication system;
   initiate a call on an over-the-air interface in response to user demand; and
   periodically poll, with a second period, the over-the-air-interface to determine if there is a call directed to the remote station; wherein the remote station does not poll the over-the-air interface to determine if there is a call directed to the remote station except on a periodic time basis; and wherein the second period is shorter than the first period.

2. The remote station of claim 1, wherein the computer program further causes the remote station to periodically wait a first time to poll the over-the-air interface, and then poll the over-the-air interface for a maximum second time, unless the remote station determines there is a call directed to it before the maximum second time expires.

3. The remote station of claim 1, wherein an over-the-air interface comprises a plurality of time slots, and when the remote station initiates a call on the over-the-air interface, the remote station waits a maximum time x to receive a message indicating the remote station can acquire one or more time slots on the over-the-air interface.

4. The remote station of claim 3, in which the remote station waits a maximum of n number of y time periods, in which the n number of y time periods equals the time x, to receive a message indicating the remote station can acquire one or more time slots on the over-the-air interface.

5. The remote station of claim 1 wherein the first period is a regular period and the second period is a regular period.

6. A method for a remote station to establish a communication connection between the remote station and a base station in a wireless communication system, the method comprising:
   receiving a first message from the base station in a non-dedicated time slot;
   transmitting a second message from the remote station to the base station;
   waiting a maximum first time to receive a third message from the base station;
   if the first time expires, waiting a second time, and, after the second time expires, polling an over-the-air interface for a first message from the base station in a non-dedicated time slot; and
   if the third message is received from the base station before the first time expires, transmitting a fourth message from the remote station to the base station, the fourth message transmitted in one or more dedicated time slots between the base station and the remote station.

7. The method for a remote station to establish a communication connection of claim 6, wherein the remote station is tuned to the transmission code/frequency of one base station in the wireless communication system at a time.

8. A method for a base station to establish a communication connection between the base station and a remote station in a wireless communication system, comprising:
   designating one or more time slots for the remote station as dedicated;
   periodically transmitting a first message from the base station in one or more dedicated time slots;
   waiting a maximum first time to receive a second message from the remote station, the second message transmitted in one or more dedicated time slots for the remote station;
   redesignating the one or more dedicated time slots for the remote station as non-dedicated if the first time expires before the second message is received from the remote station;
   transmitting a third message from the base station to the remote station in the one or more dedicated time slots if the second message is received from the remote station.

9. The method for a base station to establish a communication connection of claim 8, in which the first message from the base station and the second message from the remote station are transmitted with the same code/frequency.

10. A method for a remote station to seek base stations in a multi-channel wireless communication system, in which the remote station comprises a remote station receiver, the method comprising:
    establishing a database of base stations, the database comprising metrics on each represented base station;
    tuning the remote station receiver to a base-station channel associated with a represented base station;
    polling the over-the-air interface for a transmission of a first message from the represented base station;
    determining metrics on the represented base station if the remote station receiver receives a first message from the represented base station; and storing the metrics of the represented base station in the database.

11. The method for a remote station to seek base stations in a multi-channel wireless communication system of claim 10, in which a metric for a represented base station comprises the received signal quality of a first message received by the remote station from the represented base station.

12. The method for a remote station to seek base stations in a multi-channel wireless communication of claim 10, in which the channels are defined at least in part by frequency.

13. The method for a remote station to seek base stations in a multi-channel wireless communication system of claim 10, in which the channels are defined at least in part by a spread-spectrum code.

14. A method for remote station communication in a multi-channel wireless communication system, in which the remote station comprises a remote station receiver, the method comprising;
   transmitting bearer data in a first base-station channel between a remote station and a first base station in the wireless communication system;
   determining metrics for the first base station based on the received bearer data transmitted from the first base station to the remote station; and
   if a metric for the first base station is lower than a first threshold value, ceasing transmitting bearer data from the remote station to the first base station, tuning the remote station receiver to a second base-station channel of a second base station, determining metrics on the second base station if a first message is received by the remote station receiver from the second base station; storing the metrics of the second base station in a database, re-tuning the remote station receiver to the first base-station channel, and resuming transmitting bearer data between the remote station and the first base station.

15. The method for remote station communication of claim 14, further comprising,
   if a metric for the first base station is lower than a second threshold value, ceasing transmitting bearer data in a first base-station channel from the remote station to the first base station, tuning the remote station receiver to a third base-station channel of a third base station, acquiring a communication channel with the third base station, transmitting a second message to the third base station, wherein the second message requests the third base station take over the transmission of bearer data to the remote station and the reception of bearer data from the remote station, and transmitting bearer data between the remote station and the third base station.

16. The method for remote station communication of claim 14, in which the channels are defined at least in part by frequency.

17. The method for remote station communication of claim 14, in which the channels are defined at least in part by a spread-spectrum code.

18. A method for managing a remote station in a wireless communication system, comprising:
   activating each of a plurality of subtasks resident on the remote station by a main task resident on the remote station;
   using the main task or one of the plurality of subtasks to notify a user interface of the remote station of information;
   receiving information from the user interface of the remote station at the main task or one of the plurality of subtasks; and
   modifying the functionality of a subtask of the plurality of subtasks resident on the remote station at a time t without having to modify any other of the plurality of subtasks resident on the remote station at the time t.

19. The method for managing a remote station of claim 18, in which said activating each of a plurality of subtasks resident on the remote station by a main task further comprises activating only one of each of a plurality of subtasks resident on the remote station by a main task resident on the remote station at a time.

20. The method for managing a remote station of claim 18, further comprising
   loading a main task on the remote station; and
   loading each of the plurality of subtasks on the remote station.

21. The method for managing a remote station of claim 20, further comprising loading one of the plurality of subtasks on the remote station without re-loading any other of the plurality of subtasks or the main task on the remote station.

22. A method of operation for a remote station in a wireless communication system, comprising:
   attempting to register the remote station with a base station of the wireless communication system;
   transitioning the remote station to a first operating state if the remote station successfully registers with the base station;
   setting a first timer on the remote station in the first operating state;
   setting a second timer on the remote station in the first operating state;
   attempting to re-register the remote station with the base station if the first timer expires; and
   if the second timer expires
      transitioning the remote station to a second operating state,
      setting a third timer on the remote station in the second operating state,
      looking for a message directed to the remote station as long as the third timer is not expired, and
      transitioning the remote station to the first operating state if the third timer expires.

23. The method of operation for a remote station of claim 22, further comprising transitioning the remote station to a third operating state if the remote station does not successfully register with a base station, wherein in the third operating state the remote station initiates only emergency calls in the wireless communication system.

24. A remote station for use in a wireless communication system, comprising:
   a first timer for determining when the remote station should register in the wireless communication system;
   a second timer for determining when the remote station should look for a message directed to the remote station; and
   a third timer for determining the maximum time the remote station should continue to look for a message directed to the remote station, wherein the remote station disables said third timer and re-enables said second timer at the expiration of said third timer.

25. The remote station of claim 24, further comprising a computer program executing on the remote station, said computer program comprising a main task and a plurality of subtasks in which said first timer is activated by said main task, and said first timer is re-activated after each time the remote station successfully registers in the wireless communication system.

26. A remote station for use in a wireless communication system comprising at least one base station, the remote station comprising:

registration means to register with a base station in the wireless communication system;

re-registration means to periodically re-register, with a first period, with a base station in the wireless communication system;

call initiating means to initiate a call on an over-the-air interface; and polling means to periodically poll, with a second period, the over-the-air interface to determine if there is a call directed to the remote station, wherein the polling means do not poll the over-the-air interface to determine if there is a call directed to the remote station except on a periodic time basis, and wherein the second period is shorter than the first period.

27. The remote station of claim 26, in which the remote station polls the over-the-air interface for a maximum amount of time, unless the remote station determines that there is a call directed to it before the maximum time expires.

28. The remote station of claim 26, in which the first period is a regular period and the second period is a regular period.

* * * * *